US007595368B2

(12) United States Patent
Kriesel et al.

(10) Patent No.: US 7,595,368 B2
(45) **Date of Patent: *Sep. 29, 2009**

(54) NANOFILM COMPOSITIONS WITH POLYMERIC COMPONENTS

(75) Inventors: Joshua W. Kriesel, San Francisco, CA (US); Donald B. Bivin, Oakland, CA (US); David J. Olson, San Francisco, CA (US); Jeremy J. Harris, San Mateo, CA (US)

(73) Assignee: Covalent Partners, LLC, Hayward, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/202,322

(22) Filed: Aug. 10, 2005

(65) Prior Publication Data

US 2006/0041077 A1 Feb. 23, 2006

Related U.S. Application Data

(63) Continuation of application No. 10/426,475, filed on Apr. 29, 2003, now abandoned.

(60) Provisional application No. 60/411,588, filed on Sep. 17, 2002.

(51) Int. Cl.

| | |
|---|---|
| ***C08F 4/00*** | (2006.01) |
| ***C08F 28/06*** | (2006.01) |
| ***C08F 24/00*** | (2006.01) |
| ***C08F 14/14*** | (2006.01) |

(52) U.S. Cl. .................... 526/201; 526/348.1; 526/202; 526/203; 526/280; 526/256; 526/266; 526/291

(58) Field of Classification Search .............. 526/348.1, 526/201, 202, 203, 280, 256, 266, 291
See application file for complete search history.

(56) References Cited

U.S. PATENT DOCUMENTS

| | | | |
|---|---|---|---|
| 3,847,949 | A | 11/1974 | Pedersen et al. |
| 4,031,111 | A | 6/1977 | Pedersen et al. |
| 4,379,041 | A | 4/1983 | Petranek et al. |

(Continued)

FOREIGN PATENT DOCUMENTS

| | | |
|---|---|---|
| DE | 40 35 378 | 5/1992 |

(Continued)

OTHER PUBLICATIONS

Hendel et al., "Assembly and Disassembly of Langmuir-Blodgett Films on Poly[1-(trimethylsilyl)-1-propyne]: The Uniqueness of Calix[6]arene Multilayers as Permeation-Selective Membranes," *J. Am. Chem. Soc.*, 119(29); 6909-6918 (1997).

(Continued)

*Primary Examiner*—William K Cheung
(74) *Attorney, Agent, or Firm*—Finnegan, Henderson, Farabow, Garrett & Dunner, LLP

(57) ABSTRACT

Nanoflims useful for filtration are prepared from amphiphilic species and one or more polymeric components. The amphiphilic species or components may be oriented on an interface or surface. A nanofilm may be prepared by coupling one or more of the components. The nanofilm may also be deposited or attached to a substrate.

11 Claims, 24 Drawing Sheets

U.S. PATENT DOCUMENTS

| | | | | |
|---|---|---|---|---|
| 4,438,251 | A | 3/1984 | Herweh | |
| 4,554,076 | A | 11/1985 | Speaker | |
| 4,661,526 | A | 4/1987 | Ford | |
| 4,828,917 | A | 5/1989 | Wegner et al. | |
| 4,839,219 | A | 6/1989 | Uekita et al. | |
| 4,902,424 | A | 2/1990 | Wrasidlo | |
| 4,910,293 | A | 3/1990 | Uekita et al. | |
| 4,948,506 | A | 8/1990 | Lonsdale et al. | |
| 5,035,762 | A | 7/1991 | Wegner et al. | |
| 5,059,510 | A | 10/1991 | Jones, Jr. et al. | |
| 5,069,945 | A | 12/1991 | Wrasidlo | |
| 5,143,784 | A | 9/1992 | Mita | |
| 5,196,257 | A | 3/1993 | Barraud et al. | |
| 5,231,161 | A | 7/1993 | Brunelle et al. | |
| 5,238,570 | A | 8/1993 | Hugl et al. | |
| 5,342,934 | A | 8/1994 | Still et al. | |
| 5,357,029 | A | 10/1994 | Takekoshi et al. | |
| 5,368,889 | A | 11/1994 | Johnson et al. | |
| 5,384,168 | A | 1/1995 | Dübal et al. | |
| 5,405,550 | A | 4/1995 | Michl et al. | |
| 5,405,552 | A | 4/1995 | Jüngbauer et al. | |
| 5,593,656 | A | 1/1997 | Belinka, Jr. et al. | |
| 5,622,945 | A | 4/1997 | Sessler et al. | |
| 5,702,777 | A | 12/1997 | Rösch et al. | |
| 5,788,862 | A | 8/1998 | Degen et al. | |
| 5,831,087 | A | 11/1998 | Haubs et al. | |
| 5,843,351 | A | 12/1998 | Hirose et al. | |
| 5,876,830 | A | 3/1999 | Michl et al. | |
| 5,883,246 | A | 3/1999 | Brückner et al. | |
| 5,919,440 | A * | 7/1999 | Kaiser et al. | 424/76.4 |
| 6,033,773 | A | 3/2000 | Yang et al. | |
| 6,036,778 | A | 3/2000 | Albrecht et al. | |
| 6,045,821 | A * | 4/2000 | Garrity et al. | 424/450 |
| 6,171,497 | B1 | 1/2001 | Hirose et al. | |
| 6,177,181 | B1 | 1/2001 | Hamada et al. | |
| 6,210,551 | B1 | 4/2001 | Osman et al. | |
| 6,262,257 | B1 | 7/2001 | Gale et al. | |
| 6,294,697 | B1 | 9/2001 | Wilbur et al. | |
| 6,380,347 | B1 | 4/2002 | Lau et al. | |
| 7,368,564 | B2 | 5/2008 | Whiteford et al. | |
| 2001/0009904 | A1 | 7/2001 | Wolff et al. | |
| 2001/0020011 | A1 | 9/2001 | Mathiowitz et al. | |
| 2001/0021703 | A1 | 9/2001 | Kosak | |
| 2002/0026047 | A1 | 2/2002 | Gale et al. | |
| 2003/0199688 | A1 * | 10/2003 | Kriesel et al. | 540/454 |
| 2004/0034223 | A1 * | 2/2004 | Karpishin et al. | 544/238 |
| 2004/0106741 | A1 | 6/2004 | Kriesel et al. | |
| 2004/0260085 | A1 | 12/2004 | Kriesel et al. | |
| 2005/0154199 | A1 | 7/2005 | Whiteford et al. | |
| 2006/0041077 | A1 | 2/2006 | Kriesel et al. | |
| 2006/0128680 | A1 | 6/2006 | Kriesel et al. | |
| 2006/0270846 | A1 | 11/2006 | Karpishin et al. | |

FOREIGN PATENT DOCUMENTS

| | | | |
|---|---|---|---|
| DE | 196 36 337 | A1 | 3/1998 |
| DE | 196 46 537 | A1 | 5/1998 |
| DE | 197 11 078 | | 9/1998 |
| SU | 1139730 | | 2/1985 |
| SU | 1139731 | | 2/1985 |
| SU | 1266849 | | 10/1986 |
| SU | 1532560 | | 12/1989 |
| WO | WO 92/12708 | | 8/1992 |
| WO | WO 95/11449 | | 4/1995 |
| WO | WO 96/39402 | | 12/1996 |
| WO | WO 97/37995 | | 10/1997 |
| WO | WO 99/51570 | | 10/1999 |
| WO | WO 03/066646 | A1 | 8/2003 |
| WO | WO 03/066646 | A2 | 8/2003 |
| WO | WO 03/066646 | A3 | 8/2003 |
| WO | WO 03/067286 | A1 | 8/2003 |
| WO | WO 03/067286 | A2 | 8/2003 |
| WO | WO 03/067286 | A3 | 8/2003 |

OTHER PUBLICATIONS

Arslanov, V.V. (1992). "Monolayers and Langmuir-Blodgett Films of Monomers and Polymers Polyreactions, Structural Transformations, Properties and Applications," *Advances in Colloid and Interface Science* 40:307-370.

Batten, J.H. et al. (1998). "Langmuir Film Polymerization To Form a Soluble Poly(phenylenevinylene) (PPV) Precursor Polymer," *Macromolecules* 31(9):3148-3150.

Black, D. et al. (2002). "Compartmental Schiff-Base Ligands as Selective Double-Loaded Extractants For Copper(II)," *Chem. Commun*. 4:340-341.

Böhmer, V. (1995): "Calixarenes, Macrocycles With (Almost) Unlimited Possibilities," *Angew Chem. Int. Ed. Eng*. 34(7):713-745.

Busch, D.H. et al. (1996). "Molecular Template Effect: Historical View, Principles, and Perspectives" Chapter 1 In *Compr. Supramol. Chem. Atwood*, J.L. et al. eds. Elsevier Science Inc.: New York, NY 9:1-43.

Büschl, R. et al. (1982). "Polyreactions in Oriented Systems. Mixed Monolayers and Liposomes from Natural and Polymerizable Lipids," *Makromol. Chem. Rapid Commun*. 3(9):589-596.

Campbell, E.J. et al. (2001). "Unsymmetrical Salen-Type Ligands: High Yield Synthesis of Salen-Type Schiff Bases Containing Two Different Benzaldehyde Moleties," *Tetrahedron Lett*. 42(7):1221-1225.

Endo, K. and Takahashi, H. (1999). "Synthesis of Novel Peptidomimetics, Cyclic Hexamers of Unnatural Amino Acids, 2,5-Disubstituted 3-Aminobenzoic Acids," *Heterocycles* 51(2):337-344.

Fichet, O. et al. (2002) "A New Type of Spontaneous Vinyl Monomer Polymerization in Langmuir Films," *Macromolecules* 35(14):5352-5354.

Fuhrhop, J.-H. et al. (1988). "A Macrocyclic Tetraether Bolaamphiphile And An Oligoamino α,ω-Dicarboxylate Combine To Form Monolayered, Porous Vesicle Membranes, Which Are Reversibly Sealed By EDTA And Other Bulky Anions," *J. Am. Chem. Soc*. 110(20):6840-6845.

Höger, S. (1999). "Highly Efficient Template-Based Preparation of Shape-Persistent Macrocyclics," *Macromol. Symp*. 142:185-191.

Kim, Y.H. et al. (1996). "$CaCl_3$ or $Ca_2Cl_4$ Complexing Cyclic Aromatic Amide. Template Effect on Cyclization," *J. Am. Chem. Soc*. 118(6):1545-1546.

Korupoju, et al..(1998). "New Optically Active Hexaaza Triphenolic Macrocycles: Synthesis, Molecular Structure and Crystal Packing Features," *Chemical Communications* pp. 1267-1268.

Korupoju, S.R. et al. (2000). Formation of Dinuclear Macrocyclic and Mononuclear Acyclic Complexes of a New Trinucleating Hexaaza Triphenoiic Schiff Base Macrocycle: Structure and NLO Properties, *J. Chem. Soc. Dalton Trans*. pp. 2845-2852.

Kuhnert, N. et al. (2002). "Synthesis of Novel Chiral Non-Racemic Substituted Trianglimine and Trianglamine Macrocycles," *Tetrahedron Letters*. 43:3329-3332.

Kuhnert, N. et al. (2002). "Synthesis of Novel Enantiomerically Pure Trianglimine and Trianglamine Macrocycles," *Tetrahedron: Asymmetry*. 13:123-128.

Kwit, M. et al. (2003). "Chiral Calixsalen-Type Macrocycles From *trans*-1,2-diaminocyclohexane," *Tetrahedron: Asymmetry* 14:1303-1308.

Lednev, I.K. et al. (1996). "Langmuir Monolayers and Langmuir—Blodgett Multilayers Containing Macrocyclic Ionophores," *Adv. Mater*. 8(8):615-630.

Lee, W. et al. (1995). "Membrane Composites Derived from Porous Versus Nonporous Surfactants: Evidence for Uniqueness of Calix[6]arene-Based Surfactants,". *J. Am. Chem. Soc*. 117(25):6793-6794.

Lee, W. et al. (1995). "Unusual Pressure Effects on the Permeation Properties of a Langmuir-Blodgett Composite Membrane," *J. Am. Chem. Soc*. 117(42):10599-10600.

Li, D. et al. (1998). "Preparation, Characterization, and Properties of Mixed Organic and Polymeric Self-Assembled Multilayers," *J. Am. Chem. Soc*. 120(34):8797-8804.

Li, Z. et al. (1999). "Synthesis and Characterization of 'Calixsalens':. A New Class of Macrocyclic Chiral Ligands," *Chem. Commun*. pp. 1531-1532.
Liu, S. et al. (1999). "Cross-Linking Polymerization in Two-Dimensional Assemblies: Effect of the Reactive Group Site," *Macromolecules* 32:5519-5524.
Malzert, A. et al. (2000). "Interfacial Properties of Mixed Polyethylene Glycol/Poly (D, L-lactide-co-glycolide) Films Spread at the Air/Water Interface," *Langmuir* 16(4):1861-1867.
Markowitz, M.A. et al. (1988). "Perforated Monolayers: Porous and Cohesive Monolayers from Mercurated Calix[6]arenes," *J. Am. Chem. Soc*. 110:7545-7546.
Markowitz, M.A. et al. (1989). "Perforated Monolayers: Design and Synthesis of Porous and Cohesive Monolayers From Mercurated Calix[*n*]arenes," J. *Am. Chem. Soc*. 111(21):8192-8200.
McKee, V. et al. (1989). "An Octacopper(II) Complex with $\mu_5$-Oxo and Tripodlike Perchlorate Ligands: Formation and X-ray Structure of the $[Cu_4(L)O(ClO_4)]_2(ClO_4)_2$ -$2H_2O$ Dimer," *Inorg*. Chem. 28(15):2901-2902.
Michl, J. (1995). "The 'Molecular Tinkertoy' Approach to Materials," Proceeding of the Nato *ARW Meeting*: Applications *Organometallic* Chemistry in Preparation and Processing of Advanced *Materials* (1994), Kluwer Academic Publishers: Cap.d' Agde, France, pp. 243-267.
Miller, S.A. et al. (1999). "Nanostructured Materials Based on Polymerizable Amphiphiles," Current *Opinion in Colloid and Interface Science* 4(5):338-347.
Mohanta, S. et al. (1997). "Macrocyclic $Cu^{II}_2$, $Cu^{II}_4$, $Ni^{II}_3$, and $Ni^{II}_4$ Complexes: Magnetic Properties of Tetranuclear Systems," *Inorg. Chem*. 36(21):4656-4664.
Murakami, Y. et al. (Feb. 1993). "Supramolecular Effects and Molecular Discrimination by Macrocyclic Hosts Embedded in Synthetic Bilayer Membranes," *Proc. Natl. Acad. Sci. USA* 90:1140-1145.
Murakata, T. et al. (1988). "Structure and Photophysical Behaviors of Langmuir-Blodgett (LB) Films Containing Copolymers of Diethyl Fumarate with Vinylcarbazole and Acenaphthylene;" *Macromolecules* 21(9):2730-2733.
Niwa, M. et al. (1989). "Aggregation State of Maleic Anhydride Based Amphiphilic Alternating Copolymers Containing Plural Alkyl Chains in Langmuir-Blodgett Films," *Langmuir* 5(5):1256-1257.
Niwa, M. et al. (1990). "pH-Induced Permeation Control of a Polyion-Complexed Langmuir-Blodgett Film with a Channel-Like Pathway of Poly(methacrylic acid) Segment," *Langmuir* 6(8):1432-1434.
Perrin, R. et al. (1991). "Industrial Applications of Calixarenes," *In Calixarenes: A Versatile Class of Macrocyclic Compounds*, Vicens, J. et al. eds, 3:235-259.
Rolandi, R. et al. (1995). "Polymerized Monomolecular Films: Microscopic Structure. Viscosity, and Photopolymerization Kinetics," *Langmuir* 11(8):3119-3129.
Ruaudel-Teixier, A. (1996). "Supermolecular Architecture in Langmuir-Blodgett Films: Control and Chemistry," *Heterogeneous Chemistry Reviews*. 3:1-15.
Rudkevich, D.M. et al. (1994). "Calix[4]arene Salenes: A Bifunctional Receptor for $NaH_2PO_4$," *J.Org. Chem*. 59(13):3683-3686.
Schrader, T. et al. (2001). "Towards Synthetic Adrenaline Receptors," *Materials Science & Engineering*, C18:147-155.
Shetty, A.S. et al. (1996). "Assembly of Amphiphilic Phenylacetylene Macrocycles at the Air-Water Interface and on Solid Surfaces," *J. Am. Chem. Soc*. 118(39):9409-9414.
Sisson, T.M. et al. (1998). "Methodologies and Models of Cross-Linking Polymerization in Supramolecular Assemblies" Chapter 9 *In Organic Thin Films, Structure aid Applications* American Chemical Society: Washington,.D.C., pp. 119-130.
Sun, S.-S. et al. (2002). "Fumaryl Chloride and.Maleic Anhydride Derived Crosslinked Functional Polymers and Nano Structures" Chapter 2 *In Functional Condensation Polymers*. Carraher, C.E. eds., Kluwer Academic/Plenum Publishers: New York, NY pp. 17-30.
Ueno, T. et al. (1990). "Improved Stability By Two-Dimensional Crosslinking of Langmuir-Blodgett Films of a Polyamine/Polycarboxylate Salt," *Chemistry Letters* pp. 1927-1930.
van Nostrum, C. F. et al. (1993). "Supramolecular Architectures From Phthalocyanine Building Blocks," *Polym. Prepr*. 34(1):164-165.
van Nostrum, C. F. et al. (1994). "Supramolecular Architectures From Phthalocyanine Building Blocks," *Macromol. Symp*. 77:267-276.
Wilkop, T. et al. (1999). "Smart Structures for Sensing Environmental Pollution," *Proceedings of SPIE—The International Society for Optical Engineering* (*Smart Electronics and MEMS*),(Mar. 1-3, 1999) Newport Beach: CA 3673:327-334.
Yan, X. et al. (2000). "Selective Dampening of the Gas Permeability of a Langmuir-Blodgett Film Using Moist Permeants,". *J. Am. Chem. Soc*. 122:11944-11947.
Yatsimirskil, et al. (1986). "Interphase Transfer of Iron (III) Chloride By Means of Macrocyclic Ligands," *Theoretical and Experimental Chemistry* 22(10):162-167 with Table of Contents, *A translation of the article published in Teoreticheskaya I Ekspermental' naya Khimiya* (Jan.-Feb. 1986) 22(1):174-180.
Yoshino, N. et al. (2001). "An Artificial Ion Channel Formed by a Macrocyclic Resorcin[4]arene With Amphiphilic Cholic Acid Ether Groups," *Angew. Chem. Int. Ed. Engl*. 40(2):457-459.
Zhao, D. et al. (2002). "Synthesis and Self-Association of an Imine-Containing *m*-Phenylene Ethynylene Macrocycle," *J. Org. Chem*. 67(11):3548-3554.
Office Action mailed Mar. 10, 2005, in U.S. Appl. No. 10/426,475, filed Apr. 29, 2003.
PCT Notification of Transmittal of the International Search Report or the Declaration mailed Jul. 6, 2005, in International Application No. PCT/US03/22749, filed Sep. 5, 2003.
Akine et al., "Synthesis and Crystal Structure of a Novel Triangular Macrocyclic Molecule, Tris(H2saloph), and its Water Complex," *Tetrahedron Letters* 42:8861-8864 (2001).
Alston et al., "Second Sphere Coordination of Tetraamminep latinum(II) by a Macropolycyclic Crown Ether Bisamide Receptor," *Angew. Chem. Int. Ed Engl*. 26(7):692-693 (1987).
Asfari et al., "Synthesis and Properties of Double-Calix[4]arenes, Doubly-Crowned Calix[4]arenes, and Double-Calix-Crowns," *Pure & Appl. Chem*. 65(3):585-590 (1993).
Baguley et al., "Heterocyclic Imines and Amines. Part VIII. Identification of "o-Cyanothiobenzamide" as 1-Imino-3-Thioisoindoline, and its Conversion With Amines Into Macrocycles and Intermediates," *The Journal of the Chemical Society* Part I: 709-719 (1957).
Belanger et al., "Chloroplast Biogenesis—47:Spectroscopic Study of Net Spectral Shifts Induced by Axial Ligand Coordination in Metalated Tetrapyrroles," *Spectrochim. Acta*, 40A(9):807-827 (1984).
Chadim et al., "(3+3)-Cyclocondensation of the Enantiopure and Racemic Forms of *Trans*-1, 2-Diaminocyclohexane with Terephthaldehyde. Formation of Diasteromeric Molecular Triangles and Their Stereoselective Solid-State Stacking into Microporous Chiral Columns," *Tetrahedron: Asymmetry* 12:127-133 (2001).
Conner et al., "Perforated Monolayers," *Advanced Materials* 6(11):872-874 (1994).
Conner et al., "Perforated Monolayers: Fabrication of Calix[6]arene-Based Composite Membranes That Function as Molecular Sieves," *Langmuir* 9:2389-2397 (1993).
Dutta et al., "Stoichiometric and Metal-Deficient Copper (II) Complexes of a Dinucleating Macrocyclic Ligand. Structural Studies," *Inorg. Chem*. 37(19):5029-5032 (1998).
Gawronski et al., "Designing Large Triangular Chiral Macrocycles Efficient [3+3] Diamine-Dialdehyde Condensations Based on Conformational Bias," *J. Org. Chem*. 65:5768-5773 (2000).
Hendel et al., "Extraordinary Cohesiveness of a Boronic Acid-Based Calix[6]arene Monolayer at the Air-Water Interface," *Langmuir* 12(23):5745-5746 (1996).
Hendel et al., "Insight Into The Fabrication Of Highly Permselective Polymer/Surfactant Composite Membranes," *Polymeric Materials Science and Engineering* (*PMSE*) *Proceedings of the American Chemical Society, Division of Polymeric Materials, Science and Engineering*, (Sep. 8-11, 1997) Las Vegas: NV 77:318-319 (1997).
Höger et al., "High-Yield Macrocyclization via Glaser Coupling of Temporary Covalent Templated Bisacetylenes," *J. Org. Chem*. 62:4556-4557 (1997).

Höger et al., "Shape-Persistent Macrocycles: Building Blocks for Comply Organic and Polymeric Architectures," *Macromol. Symp.* 177:185-191 (2002).
Höger et al., "Solvent Triggering Between Conformational States in Amphiphilec Shape-Persistent Macrocycles," *JACS*. 124(23):6734-6736 (2002).
Höger et al., "Template-Direoted Synthesis of Shape-persistent Macrocyclic Amphiphiles with Convergently Arranged Functionalities," *Chem. Eur. J.* 5(6):1686-1691 (1999).
Holliday et al., "Strategies for the Construction of Supramolecular Compounds Through Coordination Chemistry," *Angew. Chem. Int. Ed.* 40(11):2022-2043 (2001).
Hosokawa et al., "8,16,24,32,40,48-Hexamethoxy[$2_6$]Metacyclophane-1,9,17,25,33,41-Hexayne: A Novel Near Planar Ammonium-Selective Ionophore," *Chem. Commun.* 1948-1949 (2001).
Ishida et al., "Molecular. Design and Synthesis of Artifical Ion Channels Based on Cyclic Peptides Containing Unnatural Amino Acids," *J. Org. Chem.* 66(9):2978-2989 (2001).
Ito et al., "Syntheses of Chiral Homoazacalix[4]arenes Incorportating Amino Acid Residues: Molecular Recognition for Racemic Quaternary Ammonium Ions," *J. Org. Chem.* 67(21):7519-7522 (2002).
Kanamathareddy et al., "Conformational Characteristics of *p-tert*-Butylcalix[6]arene Ethers," *J. Org. Chem.*, 59:3871-3879 (1994).
Kim et al., "Pyrene-Armed Calix[4]azacrowns as New Fluorescent Ionophores: "Molecular Taekowndo" Process via -Fluorescence Change," *J. Org. Chem.* 67:2348-2351 (2002).
Kon et al., "Synthesis of Macrocyclic Cage Compounds by Diamine-Dihalide One-Step Coupling-Reaction," *J. Org. Chem.* 65:3708-3715 (2000).
Korupoju et al., "Synthesis, Structure, and DNA Cleavage Activity of New Trinuclear $Zn_3$ and $Zn_2Cu$ Complexes of a Chiral Macrocycle: Structural Correlation with the Active Center of P1 Nuclease" *Inorganic Chemistry* 41:(6)4099-4101 (2002).
Kraft et al., "Regioselective Synthesis of Calixcrowns Derived From p-tert-Butylcalix[5]arene," *Tetrahedron* 49(27):6019-6024 (1993).
Kuroda et al., "Syntheses and Redox Behavior of Novel Cyclic Hosts Having Multiple Redox Centers of NAD+ Analogue," *Tetrahedron Letters* 38:3939-3942 (1997).
Lin et al., "Hydrogen-Bond-Assisted π-Stacking of Shape-Persistent Cyclopbanes," *J. Org. Chem.* 67(21):7761-7768 (2002).
Molina et al., "A Generalized and Efficient Preparation of a Novel Class of Macrocyclic Bis(guanidines) From Cyclic Bis(carbodiimides)," *J. Org.Chem.* 63:2922-2927 (1998).
Morrison et al., "Shape-Persistent Macrocyclic Amphiphiles: Molecular Reversible Coats," *Chem Commun.* 20:2313-2314 (1996).
Nakamoto et al., Langmuir Monolayers of *p*-Octadecylcalix[4]arene, *American Chemical Society*, 5(4):1116-17 (1989).
Notti et al., "Calix[4]-and Calix[5]arene-Based Multicavity Macrocyles," *J. Org. Chem.* 67(21):7569-7572 (2002).
O'Connor et al., "Calixarenes in Electroanalysis," *Electroanalysis* 7(3):205-215 (1995).
Pigge et al., "An Enaminone-Directed Benzannulation/ Macrocyclization Approach to Cyclophane Ring Systems," *J. Org. Chem.* 67(13):4547-4552 (2002).
Qian et al., "Spectroscopic Studies of the Multiporphyrin Arrays at the Air-Water Interface and in Langmuir-Blodgett Films," *Thin Solid Film* 397:266-275 (2001).
Rajca et al., "Biphenylene dimer. Molecular fragment of a two-dimensional carbon net and double-stranded polymer," *J. Am. Chem. Soc.*, 118:7272-7279 (1996).
Timmerman et al., "A Novel Type of Stereoisomerism in Calix[4]arene-Based Carceplexes," *Angew. Chem.* 33(22):2345-2348 (1994).
Tsukruk V.V., "Assembly of Supramolecular Polymers in Ultrathin Films," *Prog. Polym. Sci.* 22(2):247-311 (1997).
Van der Heyden et al., "Probing Inter- and Intramolecular Interactions of Six New *p-tert*-Butylcalix[4]arene-Based Bipyridyl Podands with Langmuir Monolayers," *Langmuir* 18:8854-8861 (2002).
Foreign language article, "Macrocyclic Compounds with Selective Molecular Recognition Functions and Application Thereto," f(1):85-8 (1991).
Foreign language article, "Calixarene-A macrocyclic Compound with Bright Prospect," *Chemical Research and Application*, 2(2):8-21 (1990).
Foreign language article, "Synthesis and Application of Calix[4]pyrrole Macrocyclic Compounds," *Hecheng Huaxue*, 9(5):436-438 (2001).
International Search Report mailed Dec. 18, 2003, issued in PCT Application No. PCT/US03/03830.
International Search Report mailed Feb. 23, 2004, issued in PCT Application No. PCT/US03/03829.
International Search Report mailed Jul. 6, 2005, issued in PCT Application No. PCT/US03/22749.
Supplementary European Search Report mailed May 13, 2005, in European Patent Application No. 03709017.2-1211.
Supplementary European Search Report mailed May 13, 2005, in European Patent Application No. 03709018.0-1211.
Office Action mailed Jan. 23, 2004, in U.S. Appl. No. 10/071,377, filed Feb. 7, 2002.
Office Action mailed Jul. 6, 2004, in U.S. Appl. No. 10/071,377, filed Feb. 7, 2002.
Office Action mailed Apr. 18, 2005, in U.S. Appl. No. 10/071,377, filed Feb. 7, 2002.
Office Action mailed Jan. 23, 2004, in U.S. Appl. No. 10/226,400, filed Aug. 23, 2002.
Office Action mailed Jul. 6, 2004, in U.S. Appl. No. 10/226,400, filed Aug. 23, 2002.
Office Action mailed Apr. 7, 2005, in U.S. Appl. No. 10/226,400, filed Aug. 23, 2002.
Office Action mailed Dec. 19, 2005, in U.S. Appl. No. 10/359,894, filed Feb. 7, 2003.
Office Action mailed Sep. 27, 2006, in U.S. Appl. No. 10/359,894, filed Feb. 7, 2003.
Office Action mailed May 4, 2007, in U.S. Appl. No. 10/359,894, filed Feb. 7, 2003.
Advisory Action mailed Oct. 3, 2007, in U.S. Appl. No. 10/359,894, filed Feb. 7, 2003.
Notice of Allowance mailed Apr. 30, 2008, in U.S. Appl. No. 10/359,894, filed Feb. 7, 2003.
Office Action mailed Nov. 9, 2006, in U.S. Appl. No. 10/913,634, filed Aug. 6, 2004.
Office Action mailed Mar. 29, 2007, in U.S. Appl. No. 10/913,634, filed Aug. 6, 2004.
Notice of Allowance mailed Dec. 27, 2007, in U.S. Appl. No. 10/913,634, filed Aug. 6, 2004.
Office Action mailed Feb. 11, 2008, in U.S. Appl. No. 11/199,913, filed Aug. 8, 2005.
Office Action mailed Oct. 10, 2008, in U.S. Appl. No. 11/199,913, filed Aug. 8, 2005.
Office Action mailed Aug. 2, 2007, in U.S. Appl. No. 11/207,383, filed Aug. 18, 2005.
Office Action mailed Feb. 11, 2008, in U.S. Appl. No. 11/207,383, filed Aug. 18, 2005.
Office Action mailed Sep. 26, 2008, in U.S. Appl. No. 11/207,383, filed Aug. 18, 2005.

* cited by examiner

NANOFILM COMPOSITIONS WITH POLYMERIC COMPONENTS

CROSS REFERENCE TO RELATED APPLICATIONS

This application is a continuation of U.S. patent application Ser. No. 10/426,475, filed on Apr. 29, 2003 now abandoned, which claims priority to U.S. Provisional Application Ser. No. 60/411,588 filed on Sep. 17, 2002, the contents of each of which are incorporated herein by reference in their entirety.

TECHNICAL FIELD

This invention relates to thin layer compositions which are nanofilms prepared from various macrocyclic module components and various polymeric and amphiphilic components. This invention also relates to the fields of organic chemistry and nanotechnology, in particular, it relates to nanofilm compositions useful for filtration.

BACKGROUND OF THE INVENTION

Nanotechnology involves the ability to engineer novel structures at the atomic and molecular level. One area of nanotechnology is to develop chemical building blocks from which hierarchical molecules of predicted properties can be assembled. An approach to making chemical building blocks or nanostructures begins at the atomic and molecular level by designing and synthesizing starting materials with highly tailored properties. Precise control at the atomic level is the foundation for development of rationally tailored synthesis-structure-property relationships which can provide materials of unique structure and predictable properties. This approach to nanotechnology is inspired by nature. For example, biological organization is based on a hierarchy of structural levels: atoms formed into biological molecules which are arranged into organelles, cells, and ultimately, into organisms. These building block capabilities are unparalleled by conventional materials and methods such as polymerizations which produce statistical mixtures or confinement of reactants to enhance certain reaction pathways. For example, from twenty common amino acids found in natural proteins, more than 105 stable and unique proteins are made.

One field that will benefit from nanotechnology is filtration using membranes. Conventional membranes used in a variety of separation processes can be made selectively permeable to various molecular species. The permeation properties of conventional membranes generally depend on the pathways of transport of species through the membrane structure. For example, while the diffusion pathway in conventional selectively permeable materials can be made tortuous in order to control permeation, porosity is not well defined or controlled by conventional methods. The ability to fabricate regular or unique pore structures of membranes is a long-standing goal of separation technology.

Resistance to flow of species through a membrane may also be governed by the flow path length. Resistance can be greatly reduced by using a very thin film as a membrane, at the cost of reduced mechanical strength of the membrane material. Conventional membranes may have a barrier thickness of at least one to two hundred nanometers, and often up to millimeter thickness. In general, a thin film of membrane barrier material can be deposited on a porous substrate of greater thickness to restore material strength.

Membrane separation processes are used to separate components from a fluid in which atomic or molecular components having sizes smaller than a certain "cut-off" size can be separated from components of larger size. Normally, species smaller than the cut-off size are passed by the membrane. The cut-off size may be an approximate empirical value which reflects the phenomenon that the rate of transport of components smaller than the cut-off size is merely faster than the rate of transport of larger components. In conventional pressure-driven membrane separation processes, the primary factors affecting separation of components are size, charge, and diffusivity of the components in the membrane structure. In dialysis, the driving force for separation is a concentration gradient, while in electrodialysis electromotive force is applied to ion selective membranes.

In all these methods what is required is a selectively permeable membrane barrier to components of the fluid to be separated.

SUMMARY OF THE INVENTION

In one aspect, the invention provides nanofilm compositions. In some embodiments, the nanofilm composition comprises a reaction product of macrocyclic modules and at least one polymeric component. In some embodiments, the nanofilm composition comprises a reaction product of a polymeric component and an amphiphile. In other embodiments, the nanofilm composition comprises a reaction product of a polymeric component, wherein the polymeric components are linked by, linker molecules. In still other embodiments, the nanofilm composition comprises a reaction product of at least two polymeric components, wherein the first polymeric component is a polymerizable amphiphile, and the second polymeric component is a polymerizable monomer.

In some embodiments, the macrocyclic modules are selected from the group consisting of Hexamer 1a, Hexamer 1dh, Hexamer 3j-amine, Hexamer 1jh, Hexamer 1jh-AC, Hexamer 2j-amine/ester, Hexamer 1dh-acryl, Octamer 5jh-aspartic, Octamer 4jh-acryl, and mixtures thereof. In some preferred embodiments, the macrocyclic modules are Hexamer 1dh.

In some embodiments, the polymeric component comprises a polymerizable monomer. In some embodiments, the polymerizable monomer comprises $CH_2{=}CHC(O)OCH_2CH_2OH$. In other embodiments, the polymeric component comprises a polymerizable amphiphile. In some embodiments, the polymerizable amphiphile is selected from the group consisting of amphiphilic acrylates, amphiphilic acrylamides, amphiphilic vinyl esters, amphiphilic anilines, amphiphilic diynes, amphiphilic dienes, amphiphilic acrylic acids, amphiphilic enes, amphiphilic cinnamic acids, amphiphilic amino-esters, amphiphilic oxiranes, amphiphilic amines, amphiphilic diesters, amphiphilic diacids, amphiphilic diols, amphiphilic polyols, and amphiphilic diepoxides. In some embodiments, the polymeric component is a polymer. In some embodiments, the polymeric component is amphiphilic.

In some embodiments, the polymeric component is selected from the group consisting of poly(maleic anhydride)s, poly(ethylene-co-maleic anhydride)s, poly(maleic anhydride-co-alpha olefin)s, polyacrylates, polymethylmethacrylate, polymers containing at least one oxacyclopropane group, polyethyleneimides, polyetherimides, polyethylene oxides, polypropylene oxides, polyurethanes, polystyrenes, poly(vinyl acetate)s, polytetrafluoroethylenes, polyethylenes, polypropylenes, ethylene-propylene copolymers, polyisoprenes, polyneopropenes, polyamides, polyimides, polysulfones, polyethersulfones, polyethylene terephthalates, polybutylene terephthalates, polysulfonamides, polysulfoxides, polyglycolic acids, polyacrylamides, polyvinylalcohols, polyesters, polyester ionomers, polycarbonates, polyvinylchlorides, polyvinylidene chlorides, polyvinylidene fluorides, polyvinylpyrrolidones, polylactic acids, polypeptides, polysorbates, polylysines, hydrogels, carbohydrates, polysaccharides, agaroses, amyloses, amylopectins, glycogens, dextrans, celluloses, cellulose acetates, chitins, chitosans, peptidoglycans, glycosaminoglycans, polynucleotides, poly(T), poly(A), nucleic acids, proteoglycans, glycoproteins, glycolipids, and mixtures thereof. In some preferred embodiments, the polymeric component is poly (maleic anhydride-co-alpha olefin).

In some embodiments, the amphiphile is a polymerizable amphiphile. In some embodiments, the polymerizable amphiphile is selected from the group consisting of amphiphilic acrylates, amphiphilic acrylamides, amphiphilic vinyl esters, amphiphilic anilines, amphiphilic diynes, amphiphilic dienes, amphiphilic acrylic acids, amphiphilic enes, amphiphilic cinnamic acids, amphiphilic amino-esters, amphiphilic oxiranes, amphiphilic amines, amphiphilic diesters, amphiphilic diacids, amphiphilic diols, amphiphilic polyols, and amphiphilic diepoxides. In some embodiments, the amphiphile is non-polymerizable. In some embodiments, the non-polymerizable amphiphile is selected from the group consisting of decylamine and stearic acid.

In some embodiments, the nanofilm composition may further comprise a non-polymerizable amphiphile. In some embodiments, the non-polymerizable amphiphile is selected from the group consisting of decylamine and stearic acid. In some embodiments, the polymeric component is a polymer, and the non-polymerizable amphiphiles are coupled to the polymer.

In some embodiments, the macrocyclic modules are coupled to each other. In some embodiments, the macrocyclic modules are coupled to the at least one polymeric component. In some embodiments, the polymeric components are coupled to each other. In some embodiments, the at least one polymeric component is coupled to an amphiphile. In some embodiments, the coupling is through linker molecules. In some embodiments, the linker molecules are selected from the group consisting of

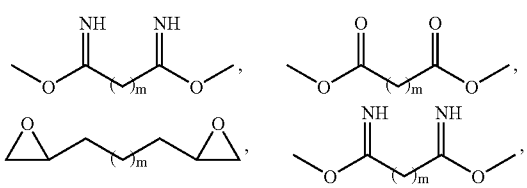

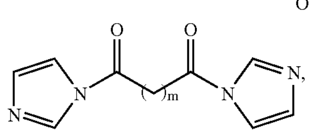

$(RO)_2BR'B(OR)_2$, $X—(CH_2)_n—X$, $XC(O)—(CH_2)_n—C(O)X$,

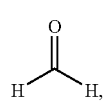

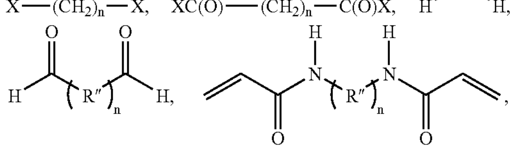

-continued

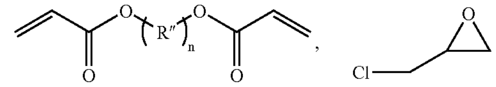

and mixtures thereof; wherein m is 1-10, n is 1-6, R is —H or $—CH_3$, R' is $—(CH_2)_n—$ or phenyl, R'' is $—(CH_2)_n—$, polyethylene glycol (PPG), or polypropylene glycol (PPG), and X is Br, Cl, I, or other leaving group.

In some embodiments, the nanofilm composition is prepared by a process comprising polymerizing the at least one polymeric component at an air-water interface. In some embodiments, the nanofilm composition is prepared by a process comprising polymerizing polymerizable amphiphiles at an air-water interface.

In some embodiments, the area fraction of the polymeric components is from 0.5 to 98 percent. In other embodiments, the area fraction of the polymeric components is less than about 20 percent. In yet other embodiments, the area fraction of the polymeric components is less than about 5 percent.

In some embodiments, the thickness of the nanofilm composition is less than about 30 nanometers. In other embodiments, the thickness of the nanofilm composition is less than about 6 nanometers. In yet other embodiments, the thickness of the nanofilm composition is less than about 2 nanometers.

In some embodiments, the nanofilm composition comprises at least two layers of a nanofilm. In some embodiments, the nanofilm composition further comprises at least one spacing layer between any two of the nanofilm layers. In some embodiments, the spacing layer comprises a layer of a polymer, a gel, or inorganic particles.

In some embodiments, the nanofilm composition is deposited on a substrate. In some embodiments, the nanofilm is coupled to the substrate through the polymeric component. In some embodiments, the substrate is porous. In other embodiments, the substrate is non-porous. In other embodiments, the nanofilm is coupled to the substrate through biotin-strepavidin mediated interaction.

In some embodiments, the surface loss modulus of the nanofilm composition at a surface pressure from 5-30 mN/m is less than about 50% of the surface loss modulus of the same nanofilm composition made without the polymeric components. In other embodiments, the surface loss modulus of the nanofilm composition at a surface pressure from 5-30 mN/m is less than about 30% of the surface loss modulus of the same nanofilm composition made without the polymeric components. In yet other embodiments, the surface loss modulus of the nanofilm composition at a surface pressure from 5-30 mN/m is less than about 20% of the surface loss modulus of the same nanofilm composition made without the polymeric components.

The nanofilm compositions may have a filtration function which may be used to describe the species that pass through the nanofilm compositions. A nanofilm composition may be permeable only to a particular species, including anions, cations, and neutral solutes in a particular fluid, and species smaller than the particular species. A particular nanofilm composition may have high permeability for a certain species in a certain solvent. A nanofilm composition may have low permeability for certain species in a certain solvent. A nanofilm composition may have high permeability for certain species and low permeability for other species in a certain solvent. In one embodiment, a nanofilm composition may have the following filtration function:

| SOLUTE | MOLECULAR WEIGHT | PASS/NO PASS |
|---|---|---|
| Albumin | 68 kDa | NP |
| Ovalbumin | 44 kDa | P |
| Myoglobin | 17 kDa | P |
| $\beta_2$-Microglobulin | 12 kDa | P |
| Insulin | 5.2 kDa | P |
| Vitamin $B_{12}$ | 1350 Da | P |
| Urea, $H_2O$, ions | <1000 Da | P |

In another embodiment, a nanofilm composition may have the following filtration function:

| SOLUTE | MOLECULAR WEIGHT | PASS/NO PASS |
|---|---|---|
| $\beta_2$-Microglobulin | 12 kDa | NP |
| Insulin | 5.2 kDa | NP |
| Vitamin $B_{12}$ | 1350 Da | NP |
| Glucose | 180 Da | NP |
| Creatinine | 131 Da | NP |
| $H_2PO_4^-$, $HPO_4^{2-}$ | ≈97 Da | NP |
| $HCO_3^-$ | 61 Da | NP |
| Urea | 60 Da | NP |
| K+ | 39 Da | P |
| Na+ | 23 Da | P |

In another embodiment, the nanofilm composition is impermeable to viruses and larger species. In other embodiments, the nanofilm composition is impermeable to immunoglobulin G and larger species. In other embodiments, the nanofilm composition is impermeable to albumin and larger species. In other embodiments, the nanofilm composition is impermeable to $\beta_2$-Microglobulin and larger species. In other embodiments, the nanofilm composition is permeable only to water and smaller species. In another embodiment, the nanofilm composition has permeability for water molecules and $Na^+$, $K^+$, and $Cs^+$ in water. In another embodiment, the nanofilm composition has low permeability for glucose and urea. In another embodiment, the nanofilm composition has high permeability for water molecules and $Cl^-$ in water. In another embodiment, the nanofilm composition has high permeability for water molecules and $K^+$ in water, and low permeability for $Na^+$ in water. In another embodiment, the nanofilm composition has high permeability for water molecules and $Na^+$ in water, and low permeability for $K^+$ in water. In another embodiment, the nanofilm composition has low permeability for urea, creatinine, $Li^+$, $Ca^{2+}$, and $Mg^{2+}$ in water. In another embodiment, the nanofilm composition has high permeability for $Na^+$, $K^+$, hydrogen phosphate, and dihydrogen phosphate in water. In another embodiment, the nanofilm composition has high permeability for $Na^+$, $K^+$, and glucose in water. In another embodiment, the nanofilm composition has low permeability for myoglobin, ovalbumin, and albumin in water. In another embodiment, the nanofilm composition has high permeability for organic compounds and low permeability for water. In another embodiment, the nanofilm composition has low permeability for organic compounds and high permeability for water. In another embodiment, the nanofilm composition has low permeability for water molecules and high permeability for helium and hydrogen gases.

A nanofilm composition may have a molecular weight cut off. In one embodiment, the nanofilm composition has a molecular weight cut-off of about 13 kDa. In another embodiment, the nanofilm composition has a molecular weight cut-off of about 190 Da. In another embodiment, the nanofilm composition has a molecular weight cut-off of about 100 Da. In yet another embodiment, the nanofilm composition has a molecular weight cut-off of about 45 Da. In another embodiment, the nanofilm composition has a molecular weight cut-off of about 20 Da.

In another aspect the invention provides compositions comprising a mixture of macrocyclic modules and at least one polymeric component in organic solvent.

In another aspect the invention provides compositions comprising a thin film of a reaction product of macrocyclic modules and at least one polymeric component, wherein the composition is prepared by a process comprising contacting the macrocyclic modules and the at least one polymeric component at an air-liquid or liquid-liquid interface.

In another aspect the invention provides methods for making nanofilm compositions. In one embodiment, a method for making a nanofilm composition comprising the reaction product of macrocyclic modules and at least one polymeric component comprises: (a) providing a mixture of macrocyclic modules and at least one polymeric component; and (b) forming the mixture into a thin film at an air-liquid or liquid-liquid interface. In some embodiments, the polymeric component is polymerizable, further comprising polymerizing the polymeric component at the air-liquid or liquid-liquid interface. In another embodiment, a method for making a nanofilm composition comprising the reaction product of macrocyclic modules and at least one polymeric component, comprises: (a) providing a subphase containing the at least one polymeric component; and (b) contacting macrocyclic modules with the surface of the subphase. In some embodiments, the method further comprises: (c) contacting a linker molecule with the surface of the subphase. In another embodiment, a method for making a nanofilm composition comprising the reaction product of macrocyclic modules and at least one polymeric component, comprises: (a) providing a first liquid phase comprising the macrocyclic modules; (b) providing a second liquid phase comprising the at least one polymeric component; and (c) forming a liquid-liquid interface from the first liquid phase and the second liquid phase.

In some embodiments, the nanofilm compositions may be prepared by spin coating, spray coating, dip coating, grafting, casting, phase inversion, electroplating, or knife-edge coating.

In another aspect of the invention is provided methods for filtration using the nanofilm compositions described herein. In one embodiment, the method comprises using the nanofilm composition to separate one or more components from a fluid. In another embodiment, the method comprises using the nanofilm composition to separate one or more components from a mixture of at least two gases.

DETAILED DESCRIPTION OF THE INVENTION

Definitions

Figure 1A:
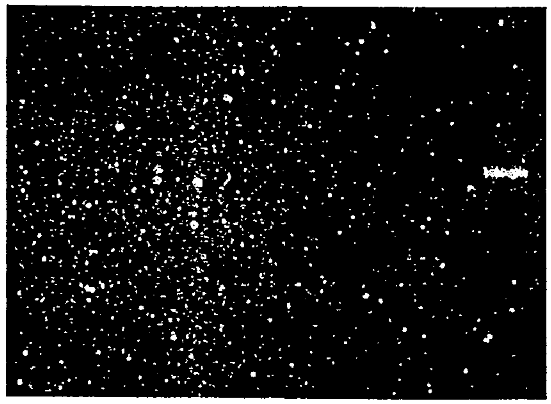
FIG. 1 (A-C) illustrates examples of ellipsometric images of a nanofilm of Hexamer 1dh and poly(maleic anhydride-alt-1-octadecene) (PMAOD).

As used herein, the term "reaction product" refers to a product formed from the indicated components. Coupling may or may not occur between the components in forming a reaction product. Polymeric components may or may not be polymerized in forming a reaction product. In a non-limiting example, a nanofilm comprising a reaction product of macrocyclic modules and a polymeric component may have coupling between the modules, and/or coupling between the modules and the polymeric component, and/or coupling between the polymeric components, or may have no coupling at all. In some cases, the polymeric components are polymerized. The polymeric components may be fully or partially polymerized. Alternatively, the polymeric components may not be polymerized.

As used herein, the term "synthon" refers to a monomeric molecular unit from which a macrocyclic module may be made; a macrocyclic module is a closed ring of coupled synthons. Structures and syntheses of synthons and macrocyclic modules are described in greater detail hereinbelow.

As used herein, the terms "polymer" and "polymeric molecule" refer to a polymer or a molecule which is predominantly a polymer, but may have some non-polymer atoms or species attached. The term polymer includes copolymers, terpolymers, and polymers containing any number of different monomers.

As used herein, the term "polymeric component" refers to a molecule or species which is either a polymer, or may form a polymer by polymerization. A polymerizable monomer or polymerizable molecule may be a polymeric component. In some cases, the polymeric component may be amphiphilic.

As used herein, "polymerizable" indicates a molecular species which may polymerize under the reaction conditions in which the nanofilm is prepared. "Non-polymerizable" is used herein to indicate a molecular species which will not polymerize under the reaction conditions in which the nanofilm is prepared. A species which is "non-polymerizable" under one set of reaction conditions may be "polymerizable" under another set of reaction conditions.

As used herein, the terms "amphiphile" or "amphiphilic" refer to a molecule or species which exhibits both hydrophilic and lipophilic character. In general, an amphiphile contains a lipophilic moiety and a hydrophilic moiety. The terms "lipophilic" and "hydrophobic" are interchangeable as used herein. An amphiphile may form a Langmuir film. An amphiphile may be polymerizable. Alternatively, the amphiphile may not be polymerizable.

Non-limiting examples of hydrophobic groups or moieties include lower alkyl groups, alkyl groups having 7, 8, 9, 10, 11, 12, or more carbon atoms, including alkyl groups with 14-30, or 30 or more carbon atoms, substituted alkyl groups, alkenyl groups, alkynyl groups, aryl groups, substituted aryl, saturated or unsaturated cyclic hydrocarbons, heteroaryl, heteroarylalkyl, heterocyclic, and corresponding substituted groups. A hydrophobic group may contain some hydrophilic groups or substituents insofar as the hydrophobic character of the group is not outweighed. In further variations, a hydrophobic group may include substituted silicon atoms, and may include fluorine atoms. The lipophilic moieties may be linear, branched, or cyclic.

Non-limiting examples of groups which may be coupled to a synthon or macrocyclic module as a lipophilic group include alkyls, —CH═CH—R, —C≡C—R, —OC(O)—R, —C(O)O—R, —NHC(O)—R, —C(O)NH—R, and —O—R, where R is 4-18C alkyl.

Non-limiting examples of hydrophilic groups or moieties include hydroxyl, methoxy, phenol, carboxylic acids and salts thereof, methyl, ethyl, and vinyl esters of carboxylic acids, amides, amino, cyano, isocyano, nitrile, ammonium salts, sulfonium salts, phosphonium salts, mono- and di-alkyl substituted amino groups, polypropyleneglycols, polyethylene glycols, epoxy groups, acrylates, sulfonamides, nitro, —OP(O)($OCH_2CH_2N^+RR'R''$)$O^-$, guanidinium, aminate, acrylamide, pyridinium, piperidine, and combinations thereof, wherein R, R' and R" are each independently selected from H or alkyl. A hydrophilic group may contain some hydrophobic groups or substituents insofar as the hydrophilic character of the group is not outweighed. Further examples include polymethylene chains substituted with alcohol, carboxylate, acrylate, methacrylate, or

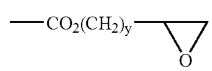

groups, where y is 1-6. Hydrophilic moieties may also include alkyl chains having internal amino or substituted amino groups, for example, internal —NH—, —NC(O)R—, or —NC(O)CH═$CH_2$— groups. Hydrophilic moieties may also include polycaprolactones, polycaprolactone diols, poly(acetic acid)s, poly(vinyl acetates)s, poly(2-vinyl pyridine)s, cellulose esters, cellulose hydroxyl ethers, poly(L-lysine hydrobromide)s, poly(itaconic acid)s, poly(maleic acid)s, poly(styrenesulfonic acid)s, poly(aniline)s, or poly(vinyl phosphonic acid)s.

As used herein, the terms "coupling" and "coupled" with respect to molecular moieties or species, polymeric components, synthons, and macrocyclic modules refers to their attachment or association with other molecular moieties or species, molecules, synthons, or macrocyclic modules. The attachment or association may be specific or non-specific, reversible or non-reversible, the result of chemical reaction, or complexation. The bonds formed by a coupling reaction are often covalent bonds, or polar-covalent bonds, or mixed ionic-covalent bonds, and may sometimes be Coulombic forces, ionic or electrostatic forces or interactions. In some preferred embodiments, the bonds formed by a coupling reaction are covalent.

As used herein, the terms "R," "R'," "R"'," and "R""" in a chemical formula refer to a hydrogen or a functional group, each independently selected, unless stated otherwise. In some preferred embodiments, the functional group may be an organic group.

As used herein, the term "functional group" includes, but is not limited to, chemical groups, organic groups, inorganic groups, organometallic groups, aryl groups, heteroaryl groups, cyclic hydrocarbon groups, amino (—$NH_2$), hydroxyl (—OH), cyano (—C≡N), nitro (—$NO_2$), carboxyl (—COOH), formyl (—CHO), keto (—$CH_2$C(O)$CH_2$—), alkenyl (—C═C—), alkynyl, (—C≡C—), and halo (F, Cl, Br and I) groups. In some embodiments, the functional group is an organic group.

As used herein, the term "alkyl" refers to a branched or unbranched monovalent hydrocarbon radical. An "n-mC" alkyl or "(nC-mC)alkyl" refers to all alkyl groups containing from n to m carbon atoms. For example, a 1-4C alkyl refers to a methyl, ethyl, propyl, or butyl group. All possible isomers of an indicated alkyl are also included. Thus, propyl includes isopropyl, butyl includes n-butyl, isobutyl and t-butyl, and so on. An alkyl group with from 1-6 carbon atoms is referred to as "lower alkyl." The term alkyl includes substituted alkyls. As used herein, the term "substituted alkyl" refers to an alkyl group with an additional group or groups attached to any carbon of the alkyl group. Additional groups attached to a substituted alkyl may include one or more functional groups such as alkyl, lower alkyl, aryl, acyl, halogen, alkylhalo, hydroxy, amino, alkoxy, alkylamino, acylamino, acyloxy, aryloxy, aryloxyalkyl, mercapto, both saturated and unsaturated cyclic hydrocarbons, heterocycles, and others.

As used herein, the term "alkenyl" refers to any structure or moiety having the unsaturation C═C. As used herein, the term "alkynyl" refers to any structure or moiety having the unsaturation C≡C.

As used herein, the term "aryl" refers to an aromatic group which may be a single aromatic ring or multiple aromatic rings which are fused together, linked covalently, or linked to a common group such as a methylene, ethylene, or carbonyl, and includes polynuclear ring structures. An aromatic ring or rings may include substituted or unsubstituted phenyl, naphthyl, biphenyl, diphenylmethyl, and benzophenone groups, among others. The term "aryl" includes substituted aryls.

As used herein, the term "substituted aryl" refers to an aryl group with an additional group or groups attached to any carbon of the aryl group. Additional groups may include one or more functional groups such as lower alkyl, aryl, acyl, halogen, alkylhalos, hydroxy, amino, alkoxy, alkylamino, acylamino, acyloxy, aryloxy, aryloxyalkyl, thioether, heterocycles, both saturated and unsaturated cyclic hydrocarbons which are fused to the aromatic ring(s), linked covalently or linked to a common group such as a methylene or ethylene group, or a carbonyl linking group such as in cyclohexyl phenyl ketone, and others.

As used herein, the term "heteroaryl" refers to an aromatic ring(s) in which one or more carbon atoms of the aromatic ring(s) are substituted by a heteroatom such as nitrogen, oxygen, or sulfur. Heteroaryl refers to structures which may include a single aromatic ring, multiple aromatic rings, or one or more aromatic rings coupled to one or more nonaromatic rings. It includes structures having multiple rings, fused or unfused, linked covalently, or linked to a common group such as a methylene or ethylene group, or linked to a carbonyl as in phenyl pyridyl ketone. As used herein, the term "heteroaryl" includes rings such as thiophene, pyridine, isoxazole, phthalimide, pyrazole, indole, furan, or benzo-fused analogues of these rings.

As used herein, the term "acyl" refers to a carbonyl substituent, —C(O)R, where R is alkyl or substituted alkyl, aryl or substituted aryl, which may be called an alkanoyl substituent when R is alkyl.

As used herein, the term "amino" refers to a group —NRR', where R and R' may independently be hydrogen, lower alkyl, substituted lower alkyl, aryl, substituted aryl or acyl.

As used herein, the term "alkoxy" refers to an —OR group, where R is an alkyl, substituted lower alkyl, aryl, substituted aryl. Alkoxy groups include, for example, methoxy, ethoxy, phenoxy, substituted phenoxy, benzyloxy, phenethyloxy, t-butoxy, and others.

As used herein, the term "thioether" refers to the general structure R—S—R' in which R and R' are the same or different and may be alkyl, aryl or heterocyclic groups. The group —SH may also be referred to as "sulfhydryl" or "thiol" or "mercapto."

As used herein, the term "saturated cyclic hydrocarbon" refers to ring structures such as cyclopropyl, cyclobutyl, cyclopentyl, and others, including substituted groups. Substituents to saturated cyclic hydrocarbons include substituting one or more carbon atoms of the ring with a heteroatom such as nitrogen, oxygen, or sulfur. Saturated cyclic hydrocarbons include bicyclic structures such as bicycloheptanes and bicyclooctanes, and multicyclic structures.

As used herein, the term "unsaturated cyclic hydrocarbon" refers to nonaromatic cyclic groups with at least one double bond, such as cyclopentenyl, cyclohexenyl, and others, including substituted groups. Substituents to unsaturated cyclic hydrocarbons include substituting one or more carbon atoms of the ring with a heteroatom such as nitrogen, oxygen, or sulfur. Unsaturated cyclic hydrocarbons include bicyclic structures such as bicycloheptenes and bicyclooctenes, and multicyclic structures.

As used herein, the term "cyclic hydrocarbon" includes substituted and unsubstituted, saturated and unsaturated cyclic hydrocarbons, and includes unicyclic and multicyclic structures.

As used herein, the term "heteroarylalkyl" refers to alkyl groups in which the heteroaryl group is attached through an alkyl group.

As used herein, the term "heterocyclic" refers to a saturated or unsaturated nonaromatic group having a single ring or multiple condensed rings comprising from 1-12 carbon atoms and from 1-4 heteroatoms selected from nitrogen, phosphorous, sulfur, or oxygen within the ring. Examples of heterocycles include tetrahydrofuran, morpholine, piperidine, pyrrolidine, and others.

As used herein, each chemical term described above expressly includes the corresponding substituted group. For example, the term "heterocyclic" includes substituted heterocyclic groups.

As used herein, the term "activated acid" refers to a —C(O)X moiety, where X is a leaving group, in which the X group is readily displaced by a nucleophile to form a covalent bond between the —C(O)— and the nucleophile. Examples of activated acids include acid chlorides, acid fluorides, p-nitrophenyl esters, pentafluorophenyl esters, and N-hydroxysuccinimide esters.

As used herein, the term "amino acid residue" refers to the product formed when a species comprising at least one amino (—$NH_2$) and at least one carboxyl (—C(O)O—) group couples through either of its amino or carboxyl groups with an atom or functional group of a synthon. Whichever of the amino or carboxyl groups is not involved in the coupling may optionally be blocked with a removable protective group.

Nanofilm Components

In one aspect, this invention relates variously to nanotechnology in the preparation of porous structures and materials having pores that are of atomic to molecular size. Materials such as nanofilm compositions may be formed from macrocyclic modules. Nanofilm compositions may also be formed from macrocyclic modules in combination with one or more polymeric components. Nanofilm compositions may also be formed from a polymer and an amphiphile, wherein the amphiphile may be polymerizable or non-polymerizable. Nanofilm compositions may also be formed from polymeric components which have been coupled through linkers. In some embodiments, pores may be supplied through the structure of the nanofilm. In some embodiments, pores are supplied through the structure of the macrocyclic modules.

In some variations, the nanofilm is prepared from coupled macrocyclic modules, which may also be coupled to one or more polymeric components. In other variations, the nanofilm includes amphiphilic molecules, which optionally may be coupled to any of the other components. These amphiphilic molecules may be polymerizable or non-polymerizable. It is to be understood that a "non-polymerizable" amphiphile is non-polymerizable under the reaction conditions in which the nanofilm is prepared.

A nanofilm may be prepared with mixtures of different modules, or with mixtures of macrocyclic modules, amphiphilic molecules, and/or polymeric components. In these variations, the polymeric component may be intermixed, aggregated, or phase separated from the macrocyclic modules and amphiphilic molecules, as described herein. Nanofilms having one or more polymeric components made with mixtures of different modules and/or amphiphilic molecules may also have interspersed arrays of pores of various sizes.

These materials may have regions in which unique structures exist. The unique structures may repeat at regular intervals to provide a lattice of pores having substantially uniform dimensions. The unique structures may have a variety of shapes and sizes, thereby providing pores of various shapes and sizes. Because the unique structures may be formed in a monolayer of molecular thickness, the pores defined by the unique structures may include a cavity, opening, or chamber-like structure of molecular size. In general, pores of atomic to molecular size defined by those unique structures may be used for selective permeation or molecular sieving functions. Some aspects of nanotechnology are given in *Nanostructured Materials*, J. Ying, ed., Academic Press, San Diego, 2001.

The nanofilm may have one or more polymeric components. These nanofilms may have regions composed primarily of one or more polymeric components. In some cases, the polymeric components act as a plasticizer. In some cases, regions composed primarily of one or more polymeric components may form a barrier to permeation by fluids, small molecules, biomolecules, solvent molecules, or ions. In other cases, the porosity of the nanofilm is controlled by the type and degree of cross-linking of the polymeric components.

A wide variety of structural features and properties such as amorphous, glassy, semicrystalline or crystalline structures, and elastomeric, pliable, thermoplastic, or deformation properties may be exhibited by the nanofilms.

The various components, such as, for example, modules and polymeric components, may be deposited on a surface to form a nanofilm. Macrocyclic modules can be oriented on a surface by providing functional groups on the modules which impart amphiphilic character to the modules. For example, when the module is deposited on a hydrophilic surface, hydrophobic substituent groups or hydrophobic tails attached to the module may cause the module to reorient on the surface so that the hydrophobic substituents are oriented away from the surface, leaving a more hydrophilic facet of the module oriented toward the surface. Other components may also optionally similarly be oriented on the surface by providing amphiphilic groups in the component.

The conformation of a molecule on a surface may depend on the loading, density, or state of the phase or layer in which the molecule resides on the surface. Surfaces which may be used to orient modules or other molecules include interfaces such as gas-liquid, air-water, immiscible liquid-liquid, liquid-solid, or gas-solid interfaces. The thickness of the oriented layer may, in some cases, be substantially a monomolecular layer thickness.

The composition of the nanofilm may be solid, gel, or liquid. The modules of the nanofilm may be in an expanded state, a liquid state, or a liquid-expanded state. The state of the modules of the nanofilm may be condensed, liquid-condensed, collapsed, or may be a solid phase or close-packed state. The modules and/or other components of the nanofilm may interact with each other by weak forces of attraction. Alternatively, they may be coupled through, for example, covalent bonds. For example, the modules of a nanofilm prepared from surface-oriented macrocyclic modules need not be linked by any strong interaction or coupling. Alternatively, for example, the modules of the nanofilm may be linked through, for example, covalent bonds.

This invention further includes the rational design of molecules or macrocyclic modules that may be assembled as "building blocks" for further assembly into larger species. Standardized molecular subunits or modules may be used from which hierarchical molecules of predicted properties can be assembled. Coupling reactions can be employed to combine or attach modules in directed syntheses.

The preparation of macrocyclic modules beginning with a set of synthons is described in U.S. patent application Ser. Nos. 10/071,377 and 10/226,400, and in the PCT Application entitled "Macrocyclic module compositions" filed Feb. 7, 2003, incorporated by reference herein in their entirety. The assembly of molecular building blocks, beginning with a set of synthons assembled to make macrocyclic modules, which, in turn, are combined to form a nanofilm are described in U.S. Ser. No. 60/383,236, filed May 22, 2002, and in U.S. Patent Application entitled "Nanofilm and Membrane Compositions" filed Feb. 7, 2003, incorporated by reference herein in their entirety. Examples and syntheses of synthons, macrocyclic modules, and amphiphilic macrocyclic modules are further described hereinbelow.

Examples of modules useful as molecular building blocks are shown in Table 1.

TABLE 1

| Examples of macrocyclic modules | |
|---|---|
| MODULE | STRUCTURE |
| Hexamer 1a | 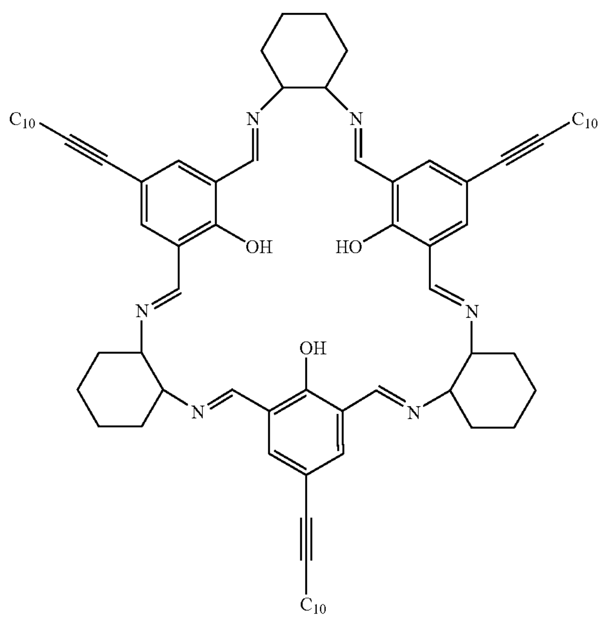 |
| Hexamer 1dh | 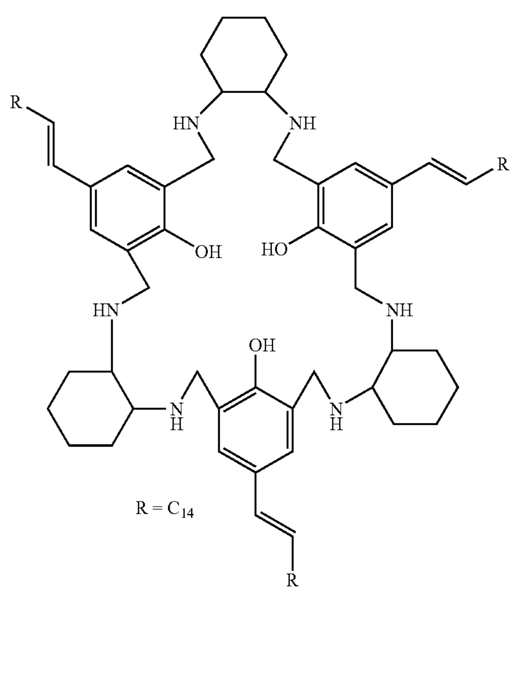 |

TABLE 1-continued
| Examples of macrocyclic modules | |
|---|---|
| MODULE | STRUCTURE |
| Hexamer 3j-amine | 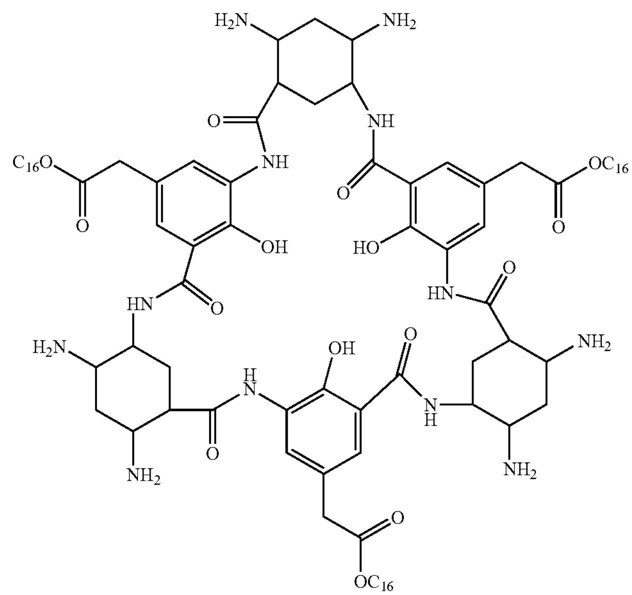 |
| Hexamer 1jh-AC | 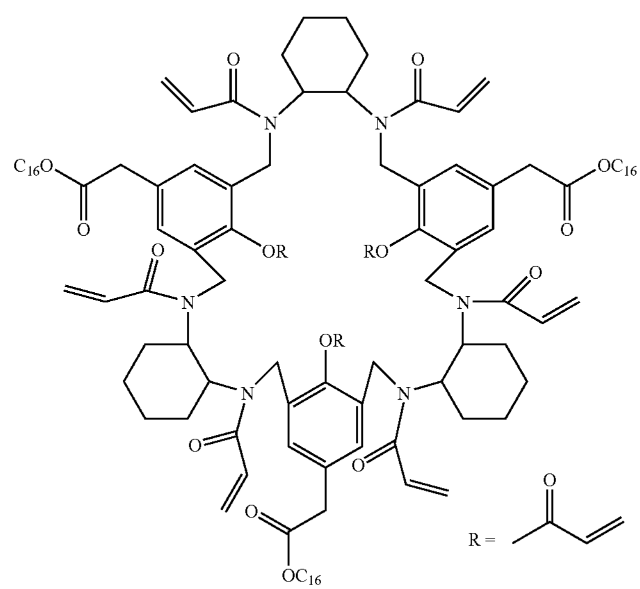 |
Hexamer 1jh-AC TABLE 1-continued
| Examples of macrocyclic modules | |
|---|---|
| MODULE | STRUCTURE |
| Hexamer 1jh | 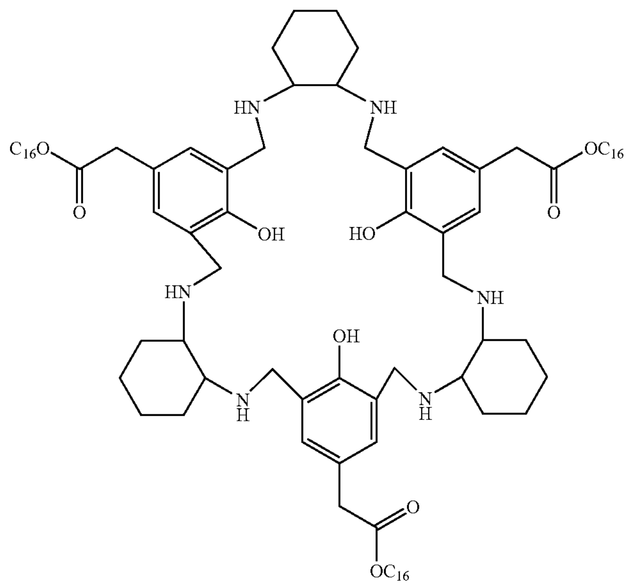 |
| Hexamer 2j-amine/ester | 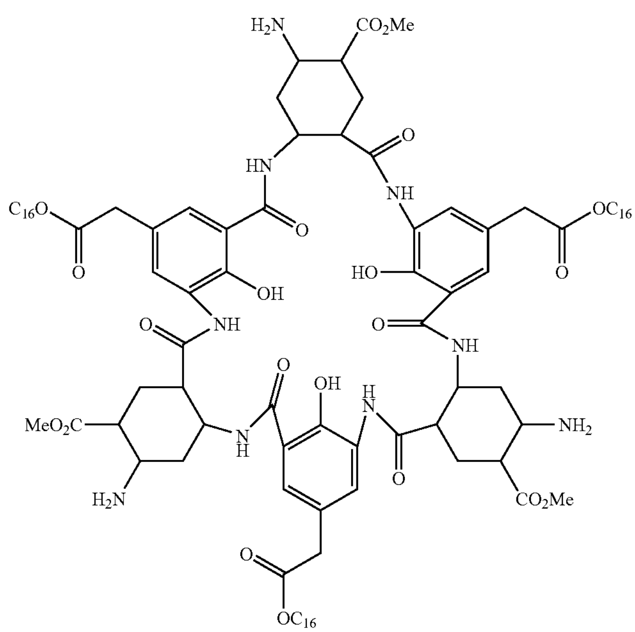 |

TABLE 1-continued
| Examples of macrocyclic modules | |
|---|---|
| MODULE | STRUCTURE |
| Hexamer 1dh-acryl | 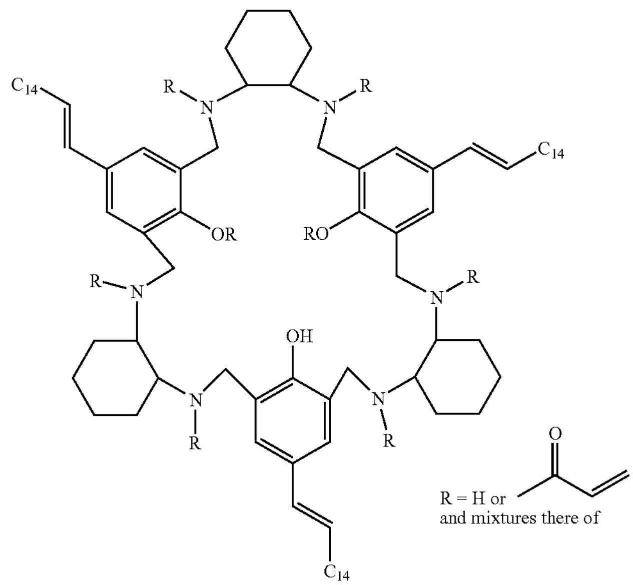 |
| Octamer 5jh-aspartic | 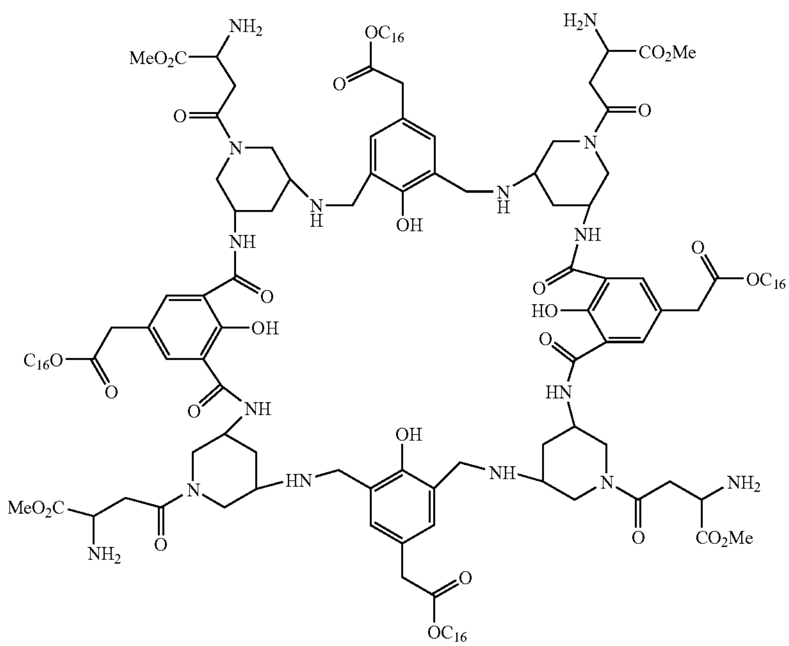 |

TABLE 1-continued

| Examples of macrocyclic modules | |
|---|---|
| MODULE | STRUCTURE |
| Octamer 4jh-acryl | 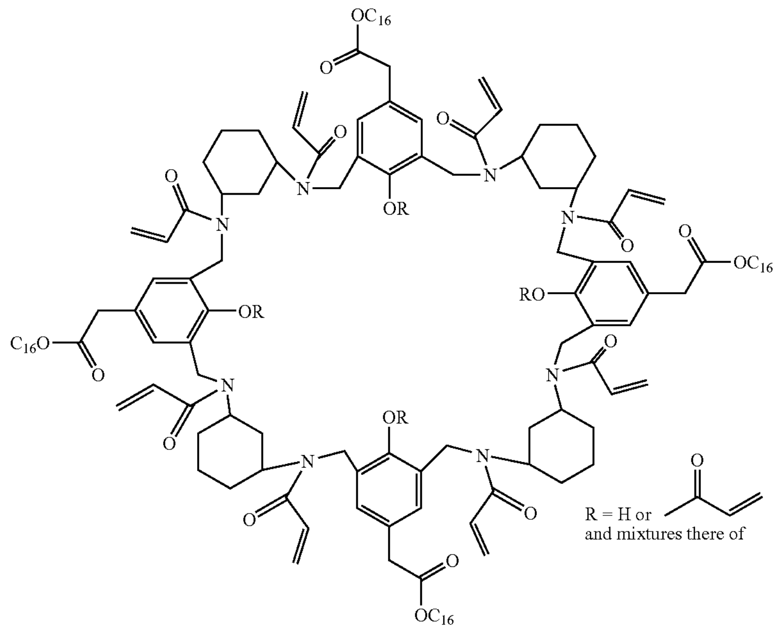 |

Nanofilm Polymeric Components

In one aspect, this invention relates variously to nanofilm compositions having polymeric components. Polymeric components may be introduced into nanofilm compositions which contain macrocyclic modules. Nanofilm compositions may also be made from polymeric components coupled by linker molecules. Nanofilm compositions may also be made from polymeric components and amphiphilic molecules, wherein the amphiphilic molecules may optionally be polymerizable.

A polymeric component is a polymerizable species, or a polymer or macromolecule of any molecular weight which is made of monomers. Polymerizable species include monomers, which are molecules that can be repeated in a polymer, and polymers, wherein the monomers or polymers have polymerizable or crosslinkable groups. Any polymeric component, polymerizable species, polymer, or monomer may also be amphiphilic. Examples of polymeric components include organic polymers, thermoplastics, synthetic and natural elastomers, conducting polymers, synthetic and natural biopolymers, and inorganic polymers. Examples of polymeric components of this invention include organic polymers containing atoms selected from H, C, N, O, S, F, and Cl.

The polymeric component may be a homopolymer, or a mixed, block, or graft copolymer. Mixed polymers, block polymers, and copolymers include macromolecules having two, three, or more different monomers. The polymeric component may have any combination of the monomers or polymers which make up any of the example polymers described herein, or may be a blend of polymers. Mixtures of polymeric components may be used in variations of this invention. Examples of polymers include linear or branched, side-chain branched, or branched comb polymers. A polymer may be a star or dendrimeric form, or forms including microtubules, cylinders, or nanotubes of various compositions. Polymer branches may be long-chain branches or short-chain branches. The polymers may be made by synthetic methods, or may be obtained from naturally-occurring sources.

A polymeric component may be in the form of a polymer when introduced into the mixture used to form a nanofilm. In some variations, a polymeric component which is already in the form of a polymer when introduced into the mixture used to form a nanofilm may have amphiphilic character. A polymer having amphiphilic character may be more soluble in water than organic solvent, or vice-versa. In some variations, a polymeric component may be a water soluble polymer having polar groups and amphiphilic character.

In further variations, the polymeric component may be in the form of a polymerizable molecule when introduced into the mixture used to form a nanofilm. Polymerizable molecules used to prepare a nanofilm include monomers. In some variations, polymerizable molecules used to prepare a nanofilm may have amphiphilic character. The polymeric component of a nanofilm may be formed in-situ during preparation of the nanofilm from macrocyclic modules and/or other components. In-situ formation of the polymeric component of a nanofilm may be carried out by polymerization of a monomer or polymerizable amphiphile in a multicomponent mixture.

Examples of a polymeric component include poly(maleic anhydrides), a copolymer of maleic anhydride, poly(ethylene-co-maleic anhydride), poly(maleic anhydride-co-alpha olefin), polyacrylates, a polymer or copolymer having acrylate side groups, a polymer or copolymer having oxacyclopropane side groups, polyethyleneimides, polyetherimides, polyethylene oxides, polypropylene oxides, polystyrenes, poly(vinyl acetate)s, polytetrafluoroethylenes, polyolefins, polyethylenes, polypropylenes, ethylene-propylene copolymers, polyisoprenes, neopropenes, polyanilines, polyacetylenes, polyvinylchlorides, polyvinylidene chlorides, polyvinylidene fluorides, polyvinylalcohols, polyurethanes, polyamides, polyimides, polysulfones, polyethersulfones, polysulfonamides, polysulfoxides, polyglycolic acids, polyacrylamides, polyvinylalcohols, polyesters, polyester ionomers, polyethylene terephthalates, polybutylene terephthalates, polycarbonates, polysorbates, polylysines, polypeptides, poly(amino acids), polyvinylpyrrolidones, polylactic acids, gels, hydrogels, carbohydrates, polysaccharides, agarose, amylose, amylopectin, glycogen, dextran, cellulose, cellulose acetates, chitin, chitosan, peptidoglycan, and glycosaminoglycan. Examples of a polymeric component also include amino-branched, amino-substituted, and amino-terminal derivatives of the preceding example polymers. Other examples of a polymeric component include polynucleotides, synthetic or naturally-occurring polynucleotides, for example, poly(T) and poly(A), nucleic acids, as well as proteoglycans, glycoproteins, and glycolipids.

Examples of polymeric components which are polymerizable monomers include vinyl halide compounds such as vinyl chloride; vinylidene monomers such as vinylidene chloride; unsaturated carboxylic acids such as acrylic acid, methacrylic acid, maleic acid, itaconic acid, and salts thereof; acrylates such as methyl acrylate, ethyl acrylate, butyl acrylate, octyl acrylate, methoxyethyl acrylate, phenyl acrylate and cyclohexyl acrylate; methacrylates such as methyl methacrylate, ethyl methacrylate, butyl methacrylate, octyl methacrylate, phenyl methacrylate and cyclohexyl methacrylate; unsaturated ketones such as methyl vinyl ketone, ethyl vinyl ketone, phenyl vinyl ketone, methyl isobutenyl ketone and methyl isopropenyl ketone; vinyl esters such as vinyl formate, vinyl acetate, vinyl propionate, vinyl butyrate, vinyl benzoate, vinyl monochloroacetate, vinyl dichloroacetate, vinyl trichloroacetate, vinyl monofluoroacetate, vinyl difluoroacetate and vinyl trifluoroacetate; vinyl ethers such as methyl vinyl ether and ethyl vinyl ether; acrylamide and alkyl substituted compounds thereof; acid compounds containing a vinyl group and salts, anhydrides and derivatives thereof such as vinylsulfonic acid, allylsulfonic acid, methallylsulfonic acid, styrenesulfonic acid, 2-acrylamido-2-methylpropanesulfonic acid, sulfopropyl methacrylate, vinylstearic acid and vinylsulfinic acid; styrene or alkyl- or halogen-substituted compounds thereof such as styrene, methylstyrene and chlorostyrene; allyl alcohol or esters or ethers thereof; vinylimides such as N-vinylphthalimide and N-vinylsuccinoimide; basic vinyl compounds such as vinylpyridine, vinylimidazole, dimethylaminoethyl methacrylate, N-vinylpyrrolidone, N-vinylcarbazole and vinylpyridine; unsaturated aldehydes such as acrolein and methacrolein; and cross-linking vinyl compounds such as glycidyl methacrylate, N-methylolacrylamide, hydroxyethyl methacrylate, triallyl isocyanurate, triallyl cyanurate, divinylbenzene, ethylene glycol di(meth) acrylate, diethylene glycol di(meth)acrylate, triethylene glycol di(meth)acrylate, trimethylolpropane tri(meth)acrylate and methylene bisacrylamide.

Examples of polymeric components which are polymerizable amphiphiles include long chain alkyl derivatives of vinyl halides, vinylidene halides, unsaturated carboxylic acids and salts thereof, acrylates, methacrylates, unsaturated ketones, vinyl esters, vinyl ethers, acrylamides, acid compounds containing a vinyl group, anhydrides, styrenes, allyl alcohol or esters or ethers thereof, vinylimides, vinyl compounds, unsaturated aldehydes, and vinyl compounds. Examples of polymeric components which are polymerizable amphiphiles generally include amphiphilic acrylates, amphiphilic acrylamides, amphiphilic vinyl esters, amphiphilic anilines, amphiphilic diynes, amphiphilic dienes, amphiphilic acrylic acids, amphiphilic enes, amphiphilic cinnamic acids, amphiphilic amino-esters, and amphiphilic oxiranes. Further examples of polymeric components which are polymerizable amphiphiles include amphiphilic amines, amphiphilic diesters, amphiphilic diacids, amphiphilic diols, amphiphilic polyols, and amphiphilic diepoxides, any of which may be coupled with linker molecules.

Preferred polymeric components include poly(maleic anhydride-co-alpha olefin), PMAOD, PMMA, poly(2-hydroxyethyl methacrylate) (PHEMA), PGM, polyethylene imine (PEI) and $CH_2{=}CHC(O)OCH_2CH_2OH$. Further preferred polymeric components which may be used in the nanofilms of the invention include those described in Tables 5-9 hereinbelow. In some embodiments, the polymeric component is poly(maleic anhydride-co-alpha olefin). In some embodiments, the polymeric component is PMAOD. In some embodiments, the polymeric component is PMMA. In some embodiments, the polymeric component is PHEMA. In some embodiments, the polymeric component is PGM. In some embodiments, the polymeric component is PEI. In some embodiments, the polymeric component is $CH_2{=}CHC(O)OCH_2CH_2OH$.

A polymeric component may have an atom or a group of atoms which couple to other species or components of a nanofilm. Coupling of the polymeric component to other species in a nanofilm may be complete or incomplete. The polymeric component may couple to macrocyclic modules or linker molecules, or to other polymeric components, or to other species such as amphiphiles or monomers. Coupling of macrocyclic modules, linker molecules, or other species may be to domains of the polymeric component, occurring at the interface or surface of the domains.

Nanofilms of Amphiphilic Molecules

Amphiphilic molecules may be oriented on a surface such as an air-water interface in a Langmuir trough, and may be compressed to form a Langmuir thin film. The amphiphilic molecules of the Langmuir thin film may be coupled to each other or to other components, and may form a substantially monomolecular layer thin film material.

Non-limiting examples of polar groups of the amphiphilic molecules include amide, amino, ester, —SH, acrylate, acrylamide, epoxy, —OH, $—OCH_3$, $—NH_2$, —CN, $—NO_2$, $—N^+RR'R''$, $—SO_3^-$, $—OPO_2^{2-}$, $—OC(O)CH{=}CH_2$, $—SO_2NH_2$, $—SO_2NRR'$, $—OP(O)(OCH_2CH_2N^+RR'R'')O^-$, —C(O)OH, $—C(O)O^-$, guanidinium, aminate, pyridinium, $—C(O)OCH_3$, $—C(O)OCH_2CH_3$,

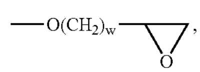

where w is 1-6, $—C(O)OCH{=}CH_2$, $—O(CH_2)_xC(O)NH_2$, where x is 1-6, $—O(CH_2)_yC(O)NHR$, where y is 1-6, and $—O(CH_2CH_2O)_zR$, where z is 1-6, and hydrophilic groups. The polar groups may be coupled together by coupling reactions to form a thin film material. The polar groups of the amphiphilic molecules may be linked directly to each other. For example, sulfhydryl groups may be coupled to form disulfide link, or polar groups having ester and amino groups may couple to attach the amphiphilic molecules through amide linkages. The coupling may attach more than two amphiphilic molecules, for example, by extended amide linkages. The polar groups of the amphiphilic molecules may also be linked to each other with a linker molecule. For example, amino may be coupled by the Mannich reaction with formaldehyde. A portion of the amphiphilic molecules of the nanofilm may be coupled, while the rest are not coupled. The amphiphilic molecules of the nanofilm, both those which are coupled and those which are not coupled, may also interact through weak non-bonding or bonding interactions such as hydrogen bonding and other interactions.

The hydrophobic tails of the amphiphilic molecules may be any length, and are sometimes from about 1 to 28 carbon atoms. Examples of hydrophobic tails of the amphiphilic molecules include the hydrophobic groups which may be attached to macrocyclic modules to impart amphiphilic character to the modules.

Preferred polymerizable amphiphiles include amphiphilic acrylates, amphiphilic acrylamides, amphiphilic vinyl esters, amphiphilic anilines, amphiphilic diynes, amphiphilic dienes, amphiphilic acrylic acids, amphiphilic enes, amphiphilic cinnamic acids, amphiphilic amino-esters, amphiphilic oxiranes, amphiphilic amines, amphiphilic diesters, amphiphilic diacids, amphiphilic diols, amphiphilic polyols, and amphiphilic diepoxides.

Preferred non-polymerizable amphiphiles include decylamine and stearic acid. It is to be understood that these are "non-polymerizable amphiphiles" when they are non-polymerizable under the conditions in which the nanofilm is prepared. These may be considered polymerizable amphiphiles when included in other nanofilms, wherein the conditions of the preparation of those nanofilms could cause the amphiphiles to be polymerized.

In some embodiments, the amphiphile may be octadecylamine (ODA). In some embodiments, the amphiphile may be methylheptadecanoate (MHD). In some embodiments, the amphiphile may be N-octadecylacrylamide (ODAA). In some embodiments, the amphiphile may be decylamine. In some embodiments, the amphiphile may be stearic acid. In some embodiments, the amphiphile may be a methyl ester of stearic acid. In some embodiments, the amphiphile may be icosanol, or other long chain alkanol. Further examples of preferred amphiphiles may be found in the Examples, and in Tables 5-9.

Pores and barrier properties are found in the structure of the nanofilm made by coupling amphiphilic molecules. The pores and barrier properties may be modified by the degree or extent of coupling or interaction of the amphiphilic molecules, and for example, by the length of the linker molecules.

Coupling of Macrocyclic Modules and Other Components

Macrocyclic modules and/or other components oriented on a surface may be coupled to form a thin layer composition or nanofilm. For example, surface-oriented modules may be coupled in a two-dimensional array to form a substantially monomolecular layer nanofilm. The two-dimensional array is generally one molecule thick throughout the thin layer composition, and may vary locally due to physical and chemical forces. Coupling of modules and/or other components may be done to form a substantially two-dimensional thin film by orienting the modules and/or other components on a surface before or during the process of coupling. In general, amphiphilic components may be oriented on an interface. In general, water soluble components may be added to the subphase for the formation of a nanofilm. Components may also be mixed prior to orienting on an interface.

Macrocyclic modules can be prepared to possess functional groups which permit coupling of the modules. The nature of the products formed by coupling modules depends, in one variation, on the relative orientations of the functional groups with respect to the module structure, and in other variations on the arrangement of complementary functional groups on different modules which can form covalent, non-covalent or other binding attachments with each other.

In some variations, a macrocyclic module includes functional groups which couple directly to complementary functional groups of other macrocyclic modules to form linkages between macrocyclic modules. The functional groups may in some cases contribute to the amphiphilic character of the module before or after coupling, and may be covalently or non-covalently attached to the modules. In some embodiments, the functional groups are covalently attached to the modules. The functional groups may be attached to the modules before, during, or after orientation of the modules on the surface.

In other variations, a macrocyclic module includes functional groups which couple to polymeric components and/or other components. Macrocyclic modules may be prepared with functional groups which couple to complementary functional groups of polymeric and/or other components to form linkages. The coupling between macrocyclic modules and these other components may be direct, or may occur through linker molecules.

In other variations, components such as polymeric components and amphiphiles may also comprise functional groups for coupling to themselves or to other components, such as coupling a polymeric component to another polymeric component, or coupling a polymeric component to an amphiphilic component. The functional groups may be attached to the components before, during, or after orientation of the components on a surface or subphase. In some cases, the functional groups impart amphiphilic character to the component, either before or after coupling.

In making nanofilms from macrocyclic modules and/or other components, one or more coupling linkages may be formed between macrocyclic modules, and coupling may occur between macrocyclic modules and other components. In some variations, coupling may also occur between other components, for example, between amphiphilic groups and polymeric components. The linkage formed between, e.g., macrocyclic modules or between a macrocyclic module and another component may be the product of the coupling of one functional group from each molecule. For example, a hydroxyl group of a first macrocyclic module may couple with an acid group or acid halide group of a second macrocyclic module to form an ester linkage between the two macrocyclic modules. Another example is an imine linkage, —CH═N—, resulting from the reaction of an aldehyde, —CH═O, on one macrocyclic module with an amine, —NH2, on another macrocyclic module. Examples of linkages between macrocyclic modules or between macrocyclic modules and other components are shown in Table 2.

TABLE 2

Examples of functional groups and linkages formed

| Functional Group A | Functional Group B | Linkage Formed |
|---|---|---|
| —$NH_2$ | —C(O)H | —N═CH— |
| —$NH_2$ | —$CO_2H$ | —NHC(O)— |
| —NHR | —$CO_2H$ | —NRC(O)— |
| —OH | —$CO_2H$ | —OC(O)— |
| —X | —O Na | —O— |
| —SH | —SH | —S—S— |
| —X | —(NR)Li | —NR— |
| —X | —S Na | —S— |
| —X | —NHR | —NR— |
| —X | —$CH_2$CuLi | —$CH_2$— |
| —X | —$(CRR')_{n=1-6}$CuLi | —$(CRR')_n$— |
| module-X | module-X | module-module |
| —$CH_2X$ | —$CH_2X$ | —$CH_2CH_2$— |
| —ONa | —C(O)OR | —C(O)O— |
| —SNa | —C(O)OR | —C(O)S— |
| —X | —C≡CH | —C≡C— |
| —C≡CH | —C≡CH | —C≡C—C≡C— |
| —MgX | —C(O)H | —CH(OH)— |
| module-$NH_2$ | 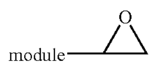 | 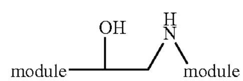 |
| module-MgX | 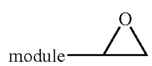 | 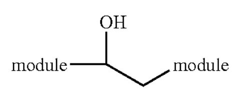 |
| 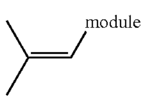 | module-X | 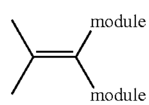 |
| —C(O)H | —C(O)H | —HC═CH— |
| $(CH_3)_2$C═CH-module | module-C(O)Cl | 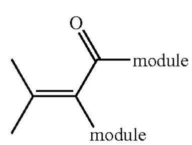 |
| —N═C═O | —$NH_2$ | —NHC(O)NH— |
| —N═C═O | HO— | —NHC(O)O— |
| —C(O)H | —$NHNH_2$ | —CH═N—NH— |
| —OH | —OC(O)X | —OC(O)O— |
| $(CH_3)_2$C═CH-module | module-SH | 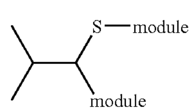 |
| $(CH_3)_2$CHC(O)O-module | module-CH(O) | 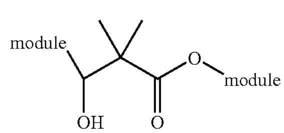 |
| module-$CH_2$C(O)OH | module-$CH_2$C(O)OH | 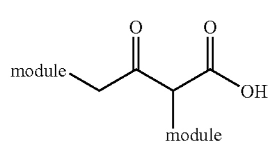 |
| 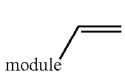 | $R_2$SiH-module | 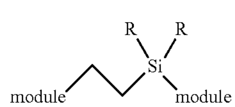 |

TABLE 2-continued
| Examples of functional groups and linkages formed | | |
| --- | --- | --- |
| Functional Group A | Functional Group B | Linkage Formed |
| 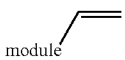 | 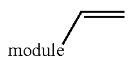 | 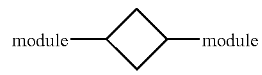 |
| 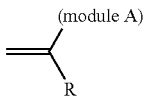 | 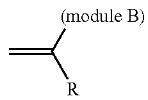 | 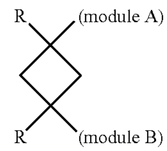 |
| 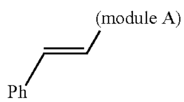 | 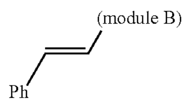 | 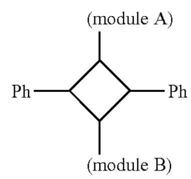 |
| 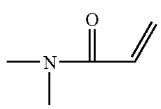 | 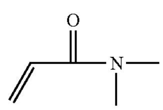 | 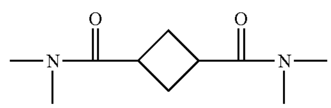 |
| 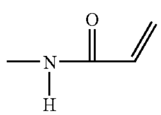 | 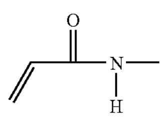 | 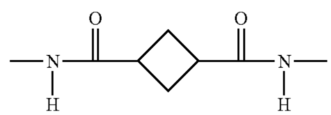 |
| 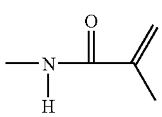 | 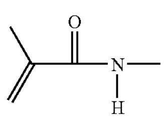 | 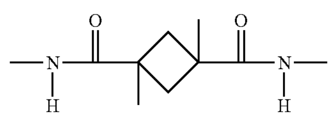 |
| 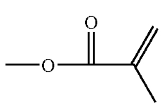 | 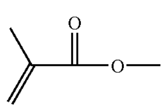 | 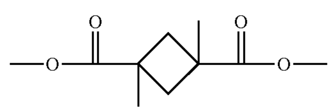 |
| 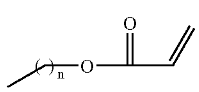 | 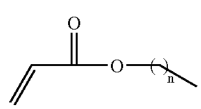 | 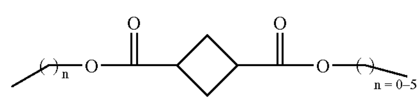 |
| —OP(O)(OH)$_2$ | —OH | —OP(O)(OH)O— |
| 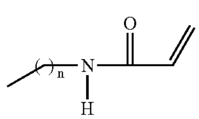 | 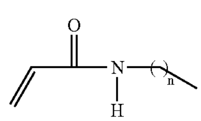 | 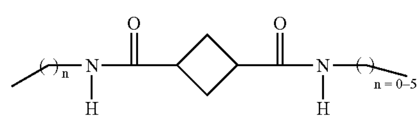 |
| 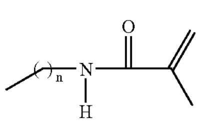 | 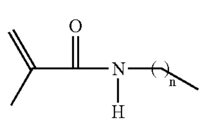 | 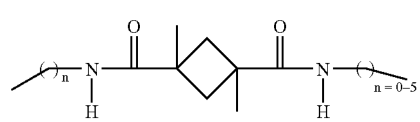 |
| 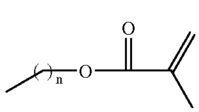 | 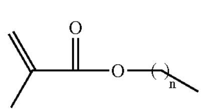 | 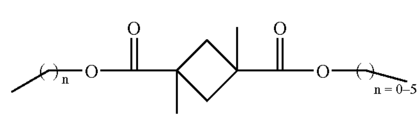 |

TABLE 2-continued

| Examples of functional groups and linkages formed | | |
|---|---|---|
| Functional Group A | Functional Group B | Linkage Formed |
| 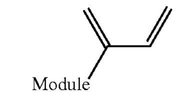 | 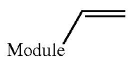 | 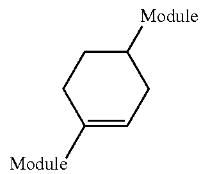 |
| 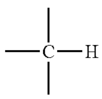 | 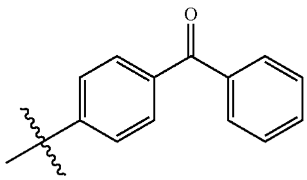 | 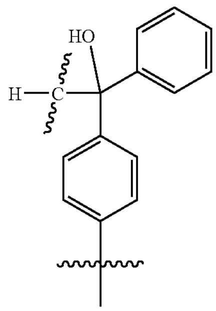 |
| 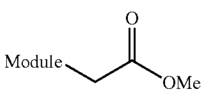 | —$NH_2$ | 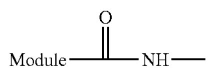 |
| 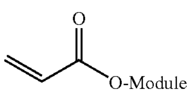 | 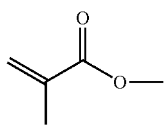 | 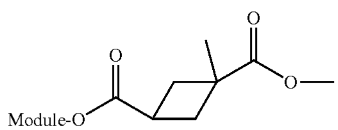 |
| 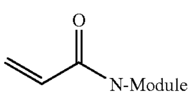 | 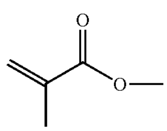 | 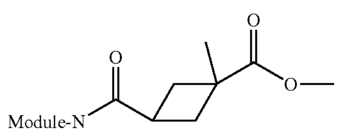 |

In Table 2, R and R' represent hydrogen or alkyl groups, and X is halogen or other good leaving group. It is to be understood that the functional groups included in Table 2 may also be used to link a module with another component, such as a polymeric component, and may also be used to link non-module components together, such as a polymeric component to another polymeric component, or a polymeric component to an amphiphilic component.

In another variation, a macrocyclic module may have functional groups for coupling to other macrocyclic modules wherein the functional groups are coupled to the macrocyclic module after initial preparation of the closed ring of the module. For example, an amine linkage between the synthons of a macrocyclic module may be substituted with one of various functional groups to produce a substituted linkage. Examples of such linkages between synthons of a macrocyclic module having functional groups for coupling other macrocyclic modules are shown in Table 3.

TABLE 3

| Examples of macrocyclic module linkages | | |
|---|---|---|
| Macrocyclic Module Linkage | Reagent | Substituted Linkage |
| 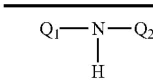 | 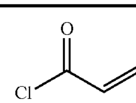 | 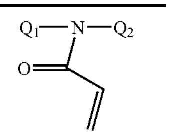 |
| 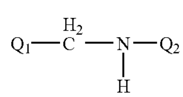 | 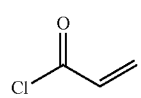 | 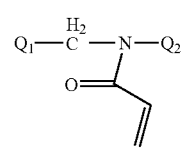 |

TABLE 3-continued

Examples of macrocyclic module linkages

| Macrocyclic Module Linkage | Reagent | Substituted Linkage |
| --- | --- | --- |
| 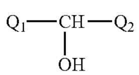 | 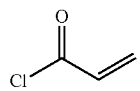 | 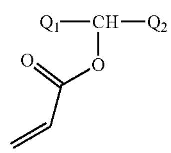 |
| 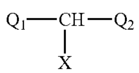 |  | 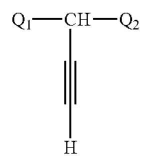 |
| 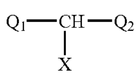 | 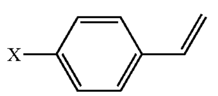 | 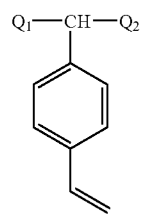 |
| 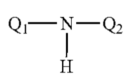 | 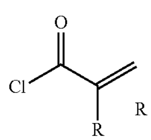 R = alkyl | 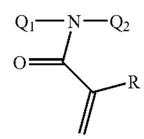 |
| 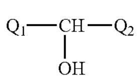 | 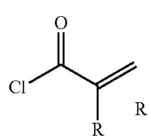 R = alkyl | 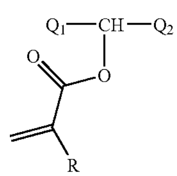 |
| 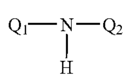 | 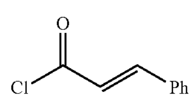 | 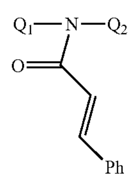 |
| 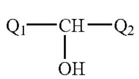 | 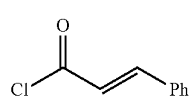 | 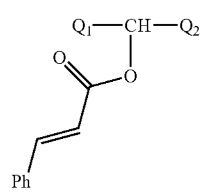 |

In Table 3, X is halogen, and Q represents a synthon in a macrocyclic module.

Referring to Table 3, the substituted linkage of a macrocyclic module may couple to a substituted linkage of another module. In some variations, the coupling of these linkages is done by initiating 2+2 cycloaddition. For example, acrylamide linkages may couple to produce

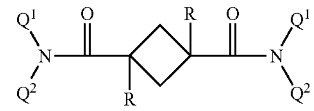

by 2+2 cycloaddition. In other variations, coupling of these reactive substituted linkages may be initiated by other chemical, thermal, photochemical, electrochemical, and irradiative methods to provide a variety of coupled structures. It is to be understood that the functional groups and substituted linkages formed included in Table 3 may also be used to link a module with another component, such as a polymeric component, and may also be used to link non-module components together, such as a polymeric component to an amphiphilic component.

The functional groups used to form linkages between macrocyclic modules and/or other components may be separated from the module or component by a spacer. A spacer can be any atom or group of atoms which couples the functional group to the macrocyclic module or other component, and does not interfere with the linkage-forming reaction. A spacer is part of the functional group, and becomes part of the linkage between macrocyclic modules and/or other components. An example of a spacer is a polymethylene group, —(CH2)n—, where n is 1-6. The spacer may be said to extend the linkage between macrocyclic modules and/or other components. Other examples of spacer groups are alkylene, aryl, acyl, alkoxy, saturated or unsaturated cyclic hydrocarbon, heteroaryl, heteroarylalkyl, heterocyclic, and corresponding substituted groups. Further examples of spacer groups are polymer, copolymer, or oligomer chains, for example, polyethylene oxides, polypropylene oxides, polysaccharides, polylysines, polypeptides, poly(amino acids), polyvinylpyrrolidones, polyesters, polyacrylates, polyamines, polyimines, polystyrenes, poly(vinyl acetate)s, polytetrafluoroethylenes, polyisoprenes, neopropene, polycarbonate, polyvinylchlorides, polyvinylidene fluorides, polyvinylalcohols, polyurethanes, polyamides, polyimides, polysulfones, polyethersulfones, polysulfonamides, polysulfoxides, and copolymers thereof. Examples of polymer chain spacer structures include linear, branched, comb and dendrimeric polymers, random and block copolymers, homo- and heteropolymers, flexible and rigid chains. The spacer may be any group which does not interfere with formation of the linkage. A spacer group may be substantially longer or shorter than the functional group to which it is attached.

Coupling of macrocyclic modules and/or other components to each other may occur through coupling of functional groups of the macrocyclic modules and/or other components to linker molecules. The functional groups involved may be, for example, those exemplified in Table 2. For example, modules may couple to at least one other module through a linker molecule. A linker molecule is a discrete molecular species used to couple at least two modules. Each module may have 1 to 30 or more functional groups which may couple to a linker molecule. Linker molecules may have 1 to 20 or more functional groups which may couple to, for example, a module.

In one variation, a linker molecule has at least two functional groups, each of which can couple to a module and/or other component. In these variations, linker molecules may include a variety of functional groups for coupling modules and/or other components. Non-limiting examples of functional groups of modules and linker molecules are illustrated in Table 4.

TABLE 4

Examples of functional groups of modules and linker molecules

| Functional Group of Module A | Functional Group of Module B | Linker Molecule | Linkage |
|---|---|---|---|
| —NHR or —$NH_2$ | —NHR or —$NH_2$ | 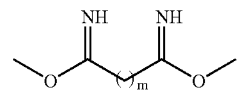 | 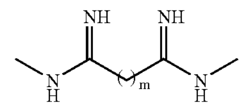 |
| —NHR or —$NH_2$ | —NHR or —$NH_2$ | 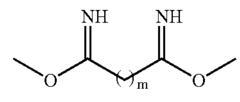 | 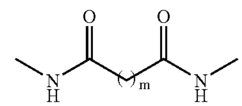 |
| —NHR or —$NH_2$ | —NHR or —$NH_2$ | 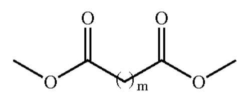 | 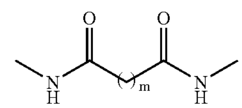 |
| —NHR or —$NH_2$ | —NHR or —$NH_2$ | 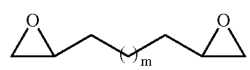 | 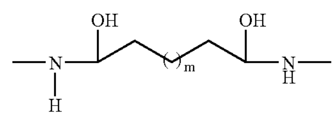 |
| —OH | —OH | 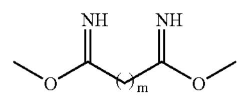 | 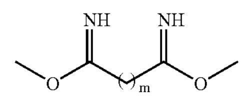 |
| —OH | —OH | 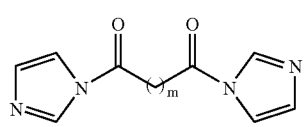 | 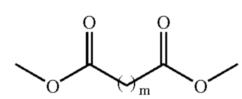 |
| —OH | —OH | $(RO)_2BR'B(OR)_2$ | —O(HO)BR'B(OH)O— |
| —NHR or —$NH_2$ | —NHR or —$NH_2$ | $(RO)_2BR'B(OR)_2$ | —NH(HO)BR'B(OH)NH— |
| —OH | —OH | X—$(CH_2)_n$—X | —O—$(CH_2)_n$—O— |
| —OH | —OH | ClC(O)—$(CH_2)_n$—C(O)Cl | 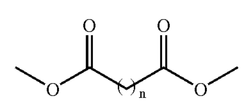 |
| —NHR or —$NH_2$ | —NHR or —$NH_2$ | 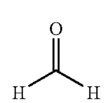 | 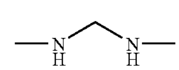 |
| —NHR or —$NH_2$ | —NHR or —$NH_2$ | 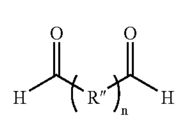 | 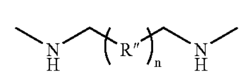 |

TABLE 4-continued
Examples of functional groups of modules and linker molecules
| Functional Group of Module A | Functional Group of Module B | Linker Molecule | Linkage |
|---|---|---|---|
| 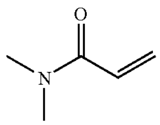 | 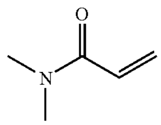 | 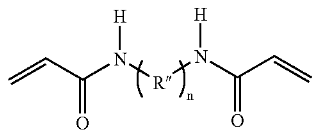 | 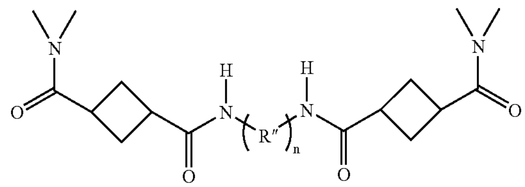 |
| 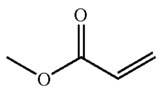 | 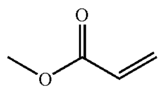 | 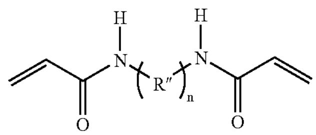 | 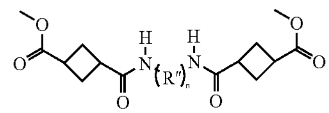 |
| 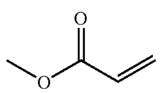 | 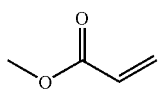 | 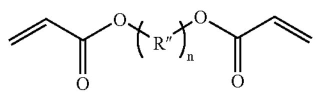 | 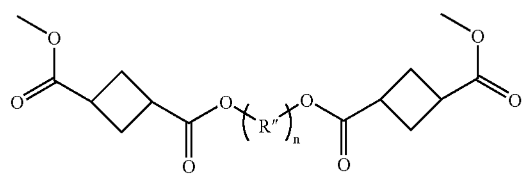 |
| 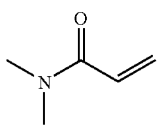 | 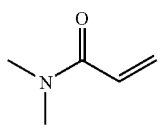 | 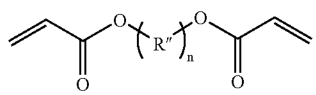 | 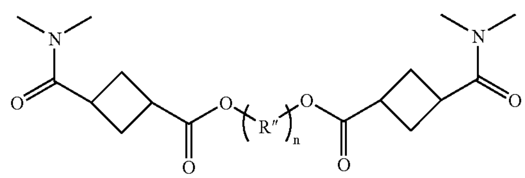 |
| —OH | —OH | 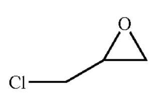 | —$OCH_2CH(OH)CH_2O$— |
| —OH | —$NH_2$ | 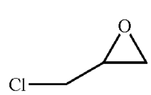 | —$OCH_2CH(OH)CH_2NH$— |
| —$NH_2$ | —$NH_2$ | 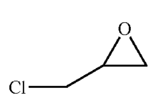 | —$NHCH_2CH(OH)CH_2NH$— |
| —NRH | —NRH | 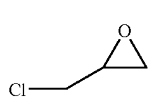 | —$NHCH_2CH(OH)CH_2NR$— |

In Table 4, n is 1-6, m is 1-10, R is —$CH_3$ or —H, R' is —$(CH_2)_n$— or phenyl, R" is —$(CH_2)$—, polyethylene glycol (PEG), or polypropylene glycol (PPG), and X is Br, Cl, I, or other good leaving groups which are organic groups containing atoms selected from the group of carbon, oxygen, nitrogen, halogen, silicon, phosphorous, sulfur, and hydrogen. A module may have a combination of the various functional groups exemplified in Table 4. It is to be understood that the functional groups and linkers included in Table 4 may also be used to link a module with another component, such as a polymeric component, and may also be used to link non-module components together, such as a polymeric component to an amphiphilic component. Preferred linkers include DEM and ethylene diamine. Further examples of suitable linkers are found in the Examples, and in Tables 5-9.

Methods of initiating coupling of the modules and/or components to linker molecules include chemical, thermal, photochemical, electrochemical, and irradiative methods.

A nanofilm comprising coupled modules and/or other components can be made by coupling together one or more members of the collection of modules and/or other components, perhaps with other bulky or flexible components, to form a thin layer nanofilm material or composition. Coupling of modules and/or other components may be complete or incomplete, providing a variety of structural variations useful as nanofilm membranes.

In general, the coupling of polymeric components to macrocyclic modules to prepare a nanofilm may be done with myriad combinations of complementary functional groups. For example, as shown herein, macrocyclic modules which may couple to other macrocyclic modules through linker molecules may also couple to polymeric components and other components having complementary functional groups. In the various schemes for the preparation of nanofilm with linker molecules illustrated in Table 5 hereinbelow, a polymeric component having amino functional groups, for example, may couple to linker molecules and compete with the macrocyclic modules for coupling to other macrocyclic modules. In another example, a macrocyclic module having amino functional groups may couple to poly(ethylene-co-maleic anhydride) to form a maleimide group in the polymer. The various types and degrees of coupling depend on the identity of the functional groups of the polymeric components.

When mixtures of polymerizable species are used to prepare a nanofilm, the species may copolymerize. Copolymerization may involve coupling to functional groups of macrocyclic modules.

The coupling of modules in a nanofilm may attach two or more components by a linkage or linkages. The coupling may attach more than two modules, for example, by an array of linkages each formed between two modules. Each module may form more than one linkage to another module, and each module may form several types of linkages, including those exemplified in Tables 2-4. A module may have direct linkages, linkages through a linker molecule, and linkages which include spacers, in any combination. A linkage may connect any portion of a module to any portion of another module. An array of linkages and an array of modules may be described in terms of the theory of Bravais lattices and theories of symmetry.

A portion of each of the components of a nanofilm may be coupled, while the remainder of each is not coupled. The components of the nanofilm may interact through, for example, hydrogen bonding, van der Waals, and other interactions. The arrangement of linkages formed in a nanofilm may be represented by a type of symmetry, or may be substantially unordered.

Nanofilms of Macrocyclic Modules and Polymeric Components

A nanofilm may be prepared from mixtures of macrocyclic modules and other components. The types of coupling between the components and the phase and domain behavior of the mixture, as described herein, may influence the composition and properties of the product nanofilm. Multicomponent mixtures of these types sometimes result in phase separated or aggregated compositions. A macrocyclic module may participate in more than one type of coupling, and the product nanofilm may have a wide variety of compositions.

In one aspect, this invention relates to the introduction of polymeric components into nanofilms comprising macrocyclic modules. Various types of coupling may be used to prepare a nanofilm with macrocyclic modules and polymeric components. In one type of coupling, a macrocyclic module may have functional groups which couple to a linker molecule which, in turn, couples to another macrocyclic module or other species, but may not effectively couple to a polymeric component. In this type of coupling, the macrocyclic module may couple much more rapidly to another macrocyclic module than to the polymeric component, and form a nanofilm in which the degree of coupling between macrocyclic modules and the polymeric component is limited. For example, a macrocyclic module having amino functional groups may couple readily with a linker molecule such as ClC(O)CH2C(O)Cl, but not as readily with some polymeric components.

In another mode of coupling, a macrocyclic module may not have functional groups which readily couple to other components. An example of this type is a macrocyclic module having imine linkages and only alkyl substituents which may not readily couple to other macrocyclic modules, polymeric components, or other species. A macrocyclic module which does not readily couple to other species may form a nanofilm with polymeric components without substantial coupling between macrocyclic modules and polymeric components.

In one aspect, this invention involves the formation of a nanofilm using multicomponent mixtures of macrocyclic modules and polymeric components, wherein the macrocyclic modules may not directly couple to other macrocyclic modules or to polymeric components in forming the nanofilm, and wherein the macrocyclic modules may be coupled through linker molecules.

Various schemes for the preparation of nanofilms with linker molecules are illustrated in Table 5.

TABLE 5
| Schemes to prepare nanofilms from macrocyclic modules with linker molecules and polymeric components | |
|---|---|
| Reagents | Scheme |
| macrocyclic module linker molecule polymer | 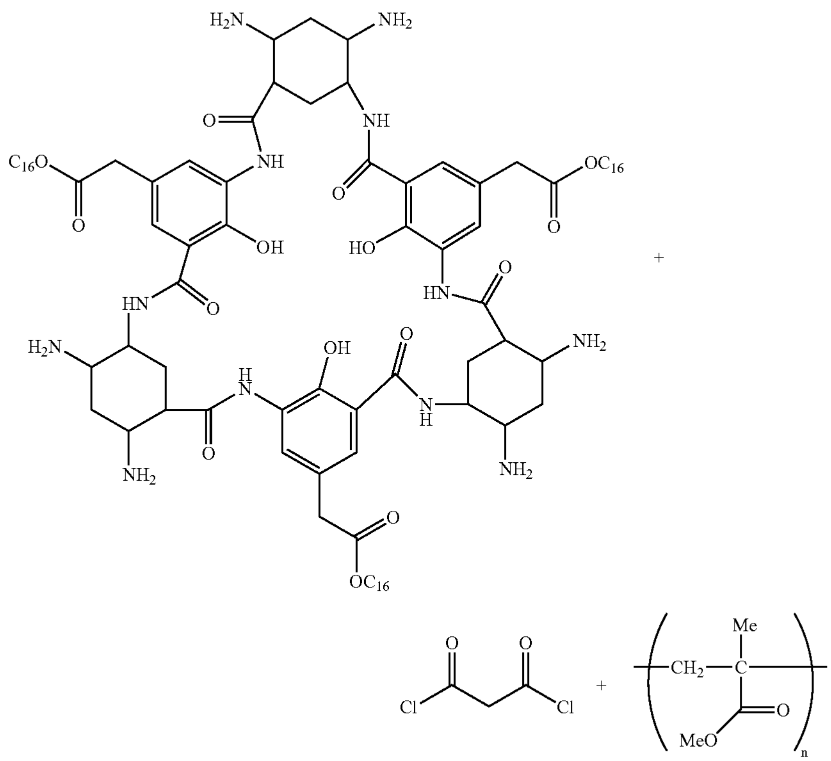 |
| macrocyclic module linker molecule amphiphilic polymer | 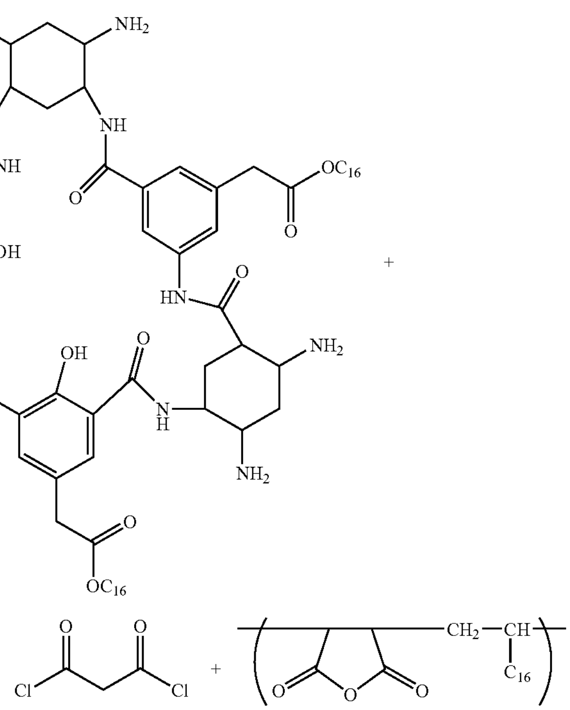 |

TABLE 5-continued
Schemes to prepare nanofilms from macrocyclic modules with linker molecules and polymeric components
| Reagents | Scheme |
| --- | --- |
| macrocyclic module<br>linker molecule<br>polymerizable amphiphile | 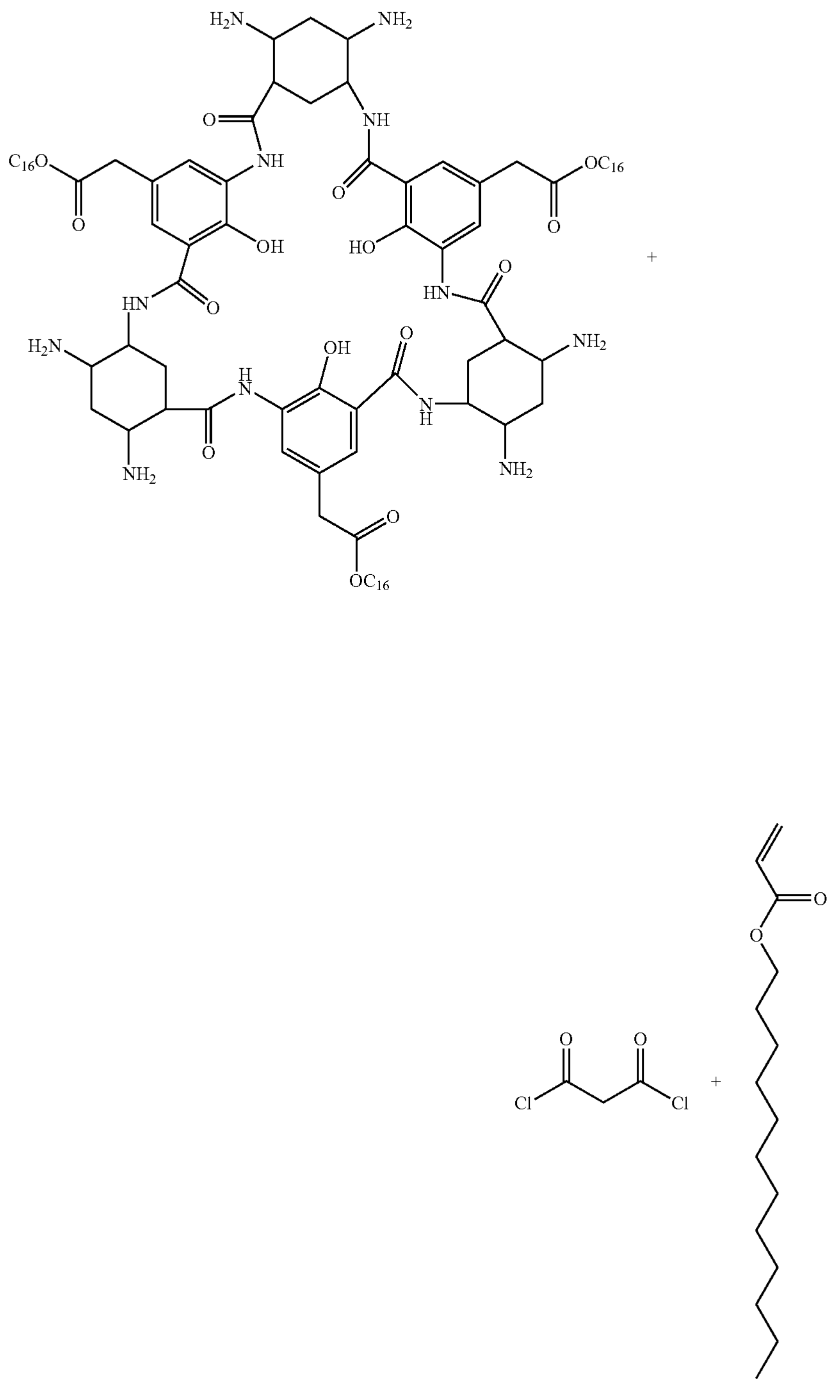 |

TABLE 5-continued
| Schemes to prepare nanofilms from macrocyclic modules with linker molecules and polymeric components | |
|---|---|
| Reagents | Scheme |
| macrocyclic module<br>linker molecule<br>polymerizable monomer | 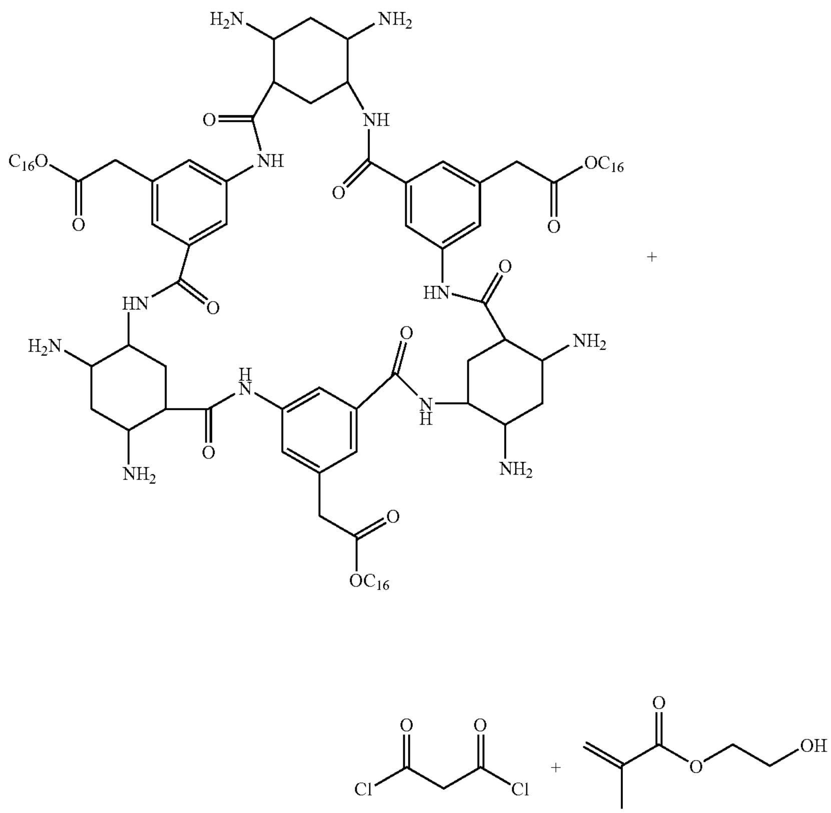 |
| Macrocyclic module<br>linker molecule<br>polymer amphiphile | 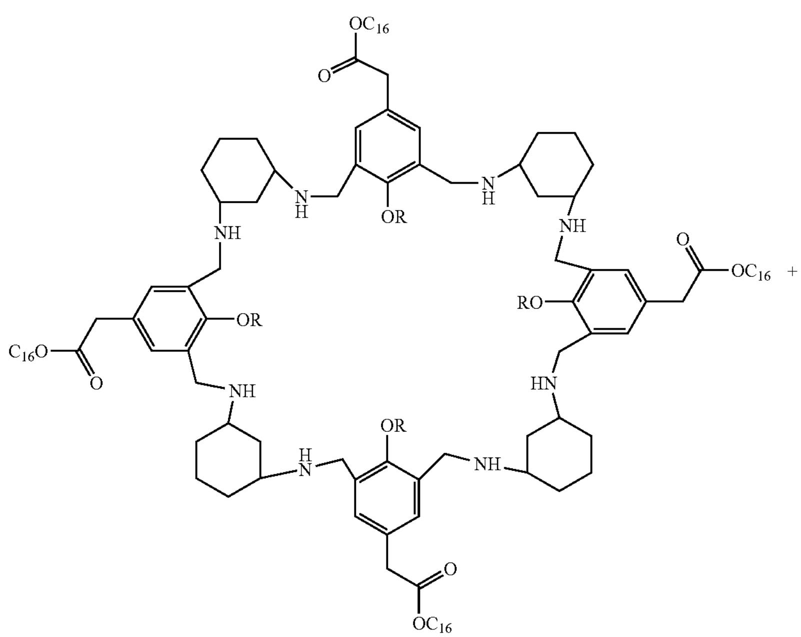 |

TABLE 5-continued
Schemes to prepare nanofilms from macrocyclic modules with linker molecules and polymeric components
| Reagents | Scheme |
| --- | --- |
| | 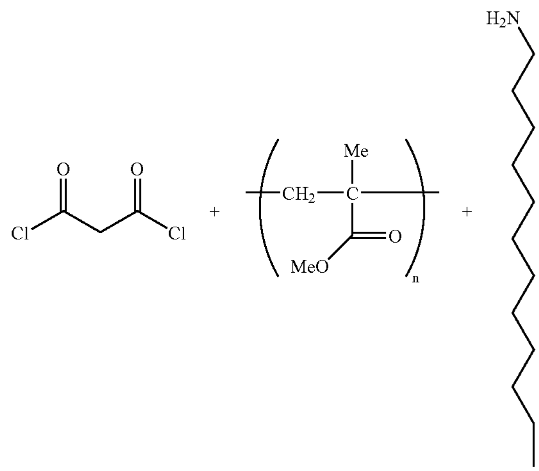 |
| macrocyclic module<br>linker molecule polymer<br>polymerizable amphiphile | 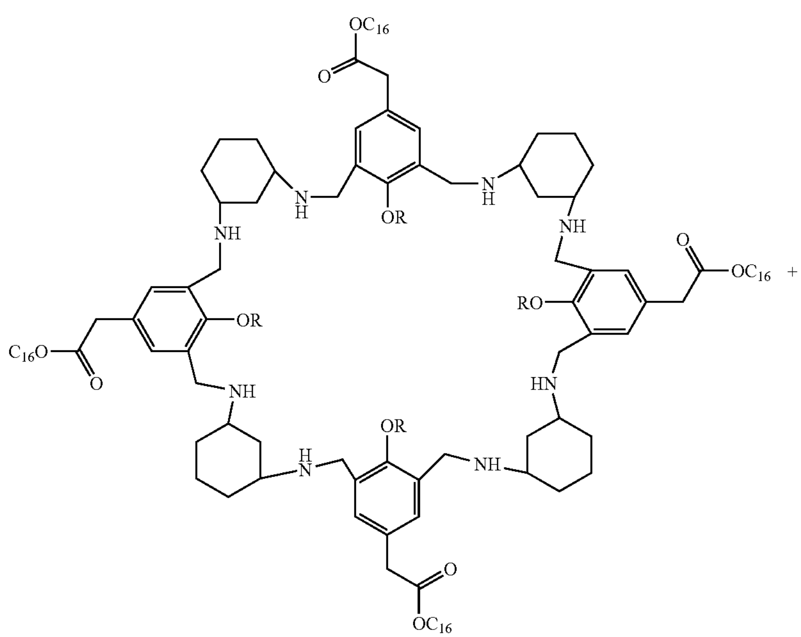 |

TABLE 5-continued
Schemes to prepare nanofilms from macrocyclic modules with linker molecules and polymeric components
| Reagents | Scheme |
| --- | --- |
| | 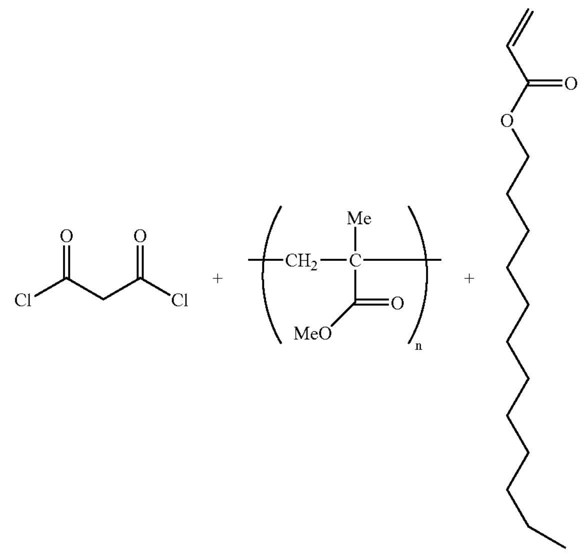 |
| macrocyclic module<br>linker molecule polymer<br>amphiphilic polymer | 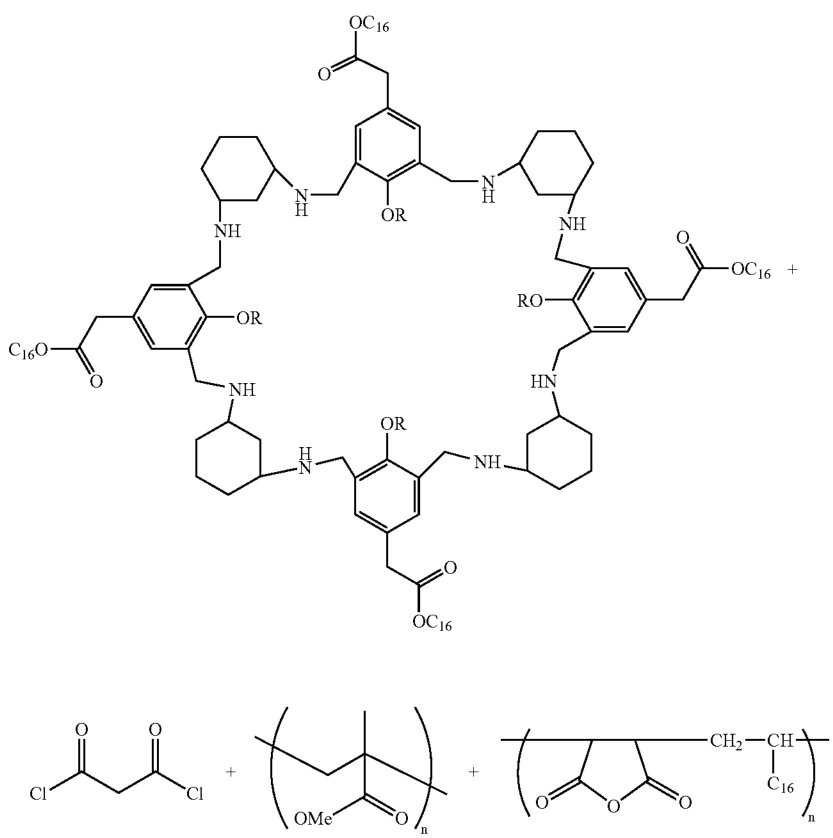 |

TABLE 5-continued
| Schemes to prepare nanofilms from macrocyclic modules with linker molecules and polymeric components | |
|---|---|
| Reagents | Scheme |
| macrocyclic module<br>linker molecule<br>amphiphilic polymer<br>polymerizable amphiphile | 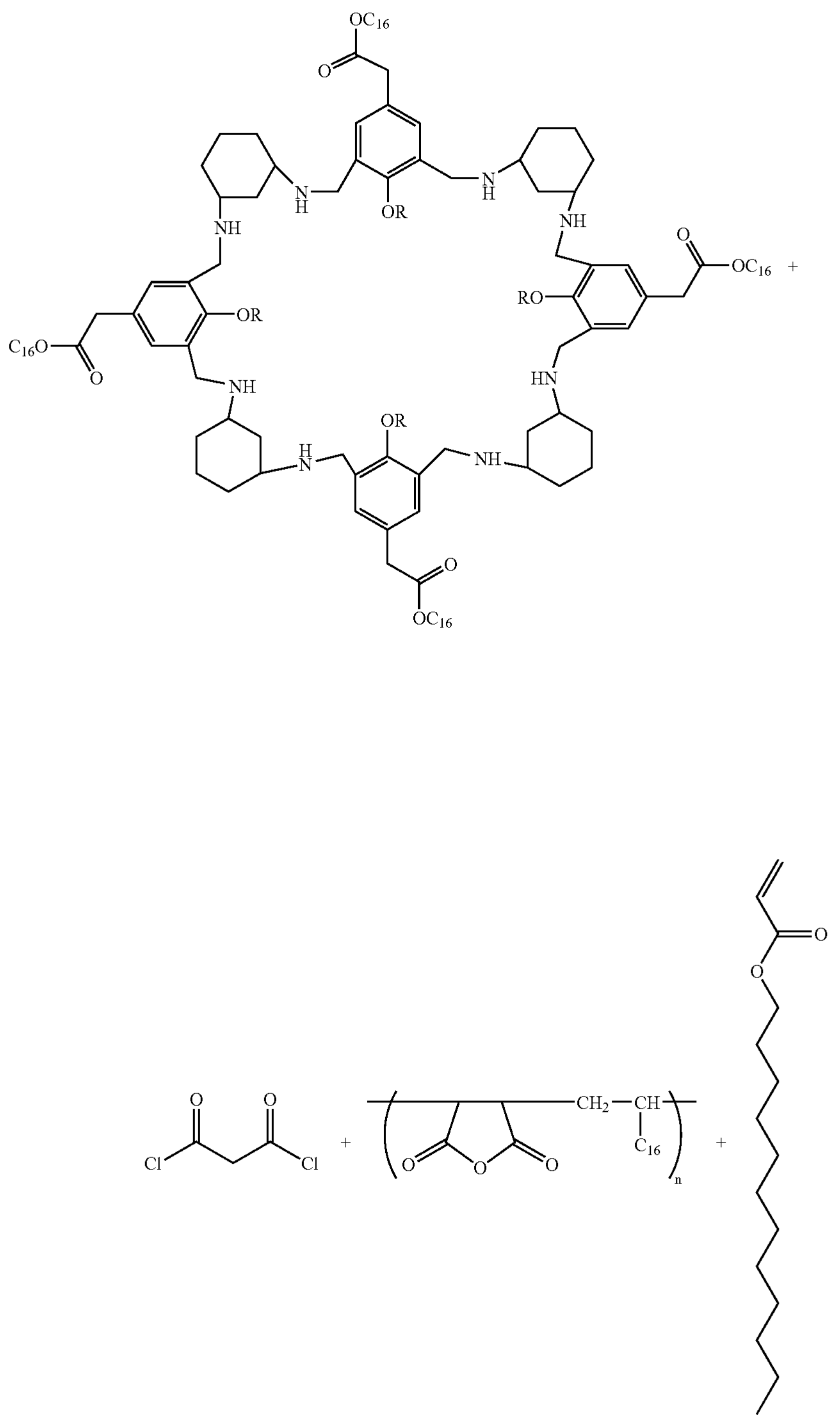 |

TABLE 5-continued
| Schemes to prepare nanofilms from macrocyclic modules with linker molecules and polymeric components | |
|---|---|
| Reagents | Scheme |
| macrocyclic module<br>linker molecule amphiphile<br>polymerizable amphiphile | 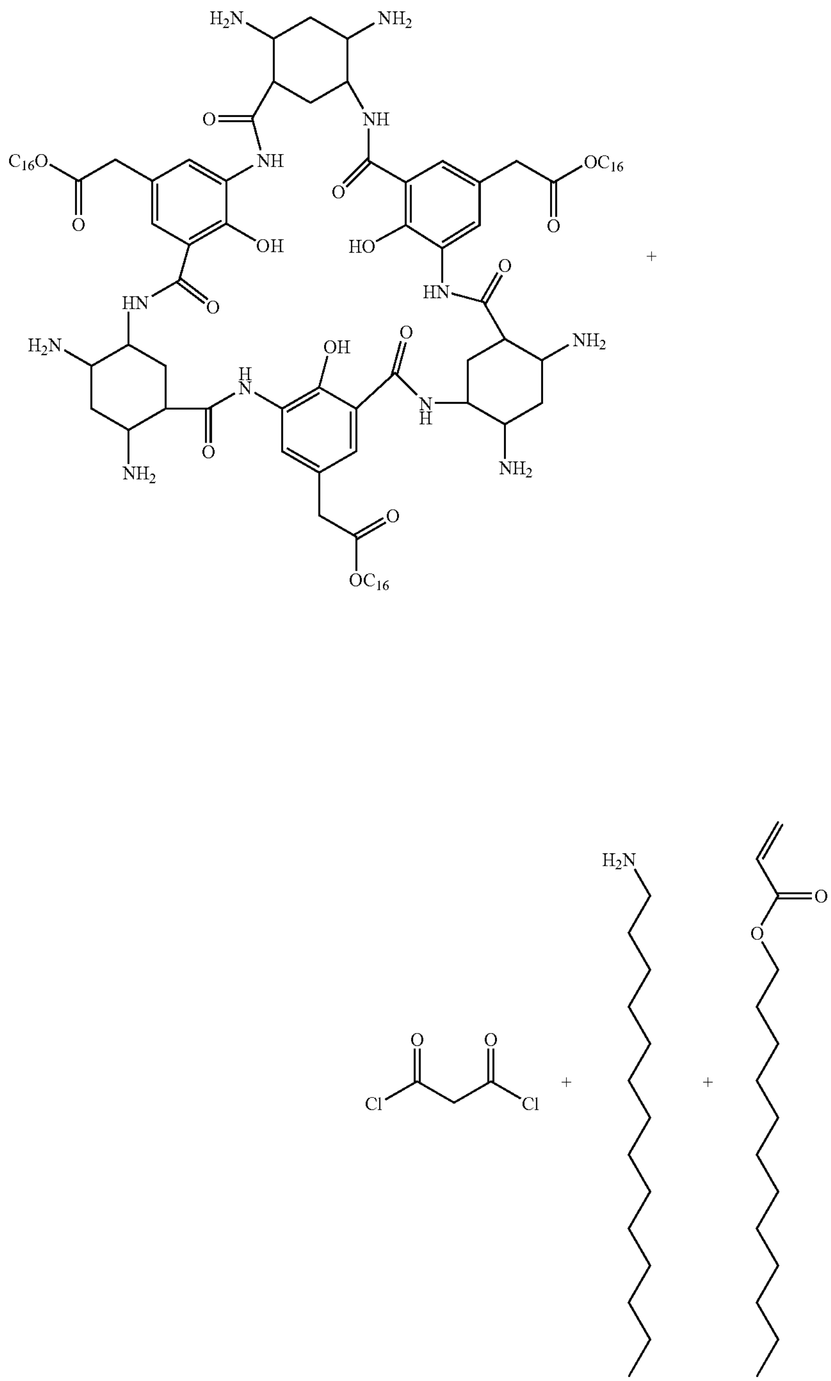 |

TABLE 5-continued

Schemes to prepare nanofilms from macrocyclic modules with linker molecules and polymeric components

| Reagents | Scheme |
|---|---|
| macrocyclic module<br>linker molecule<br>polymerizable amphiphile<br>polymerizable monomer | 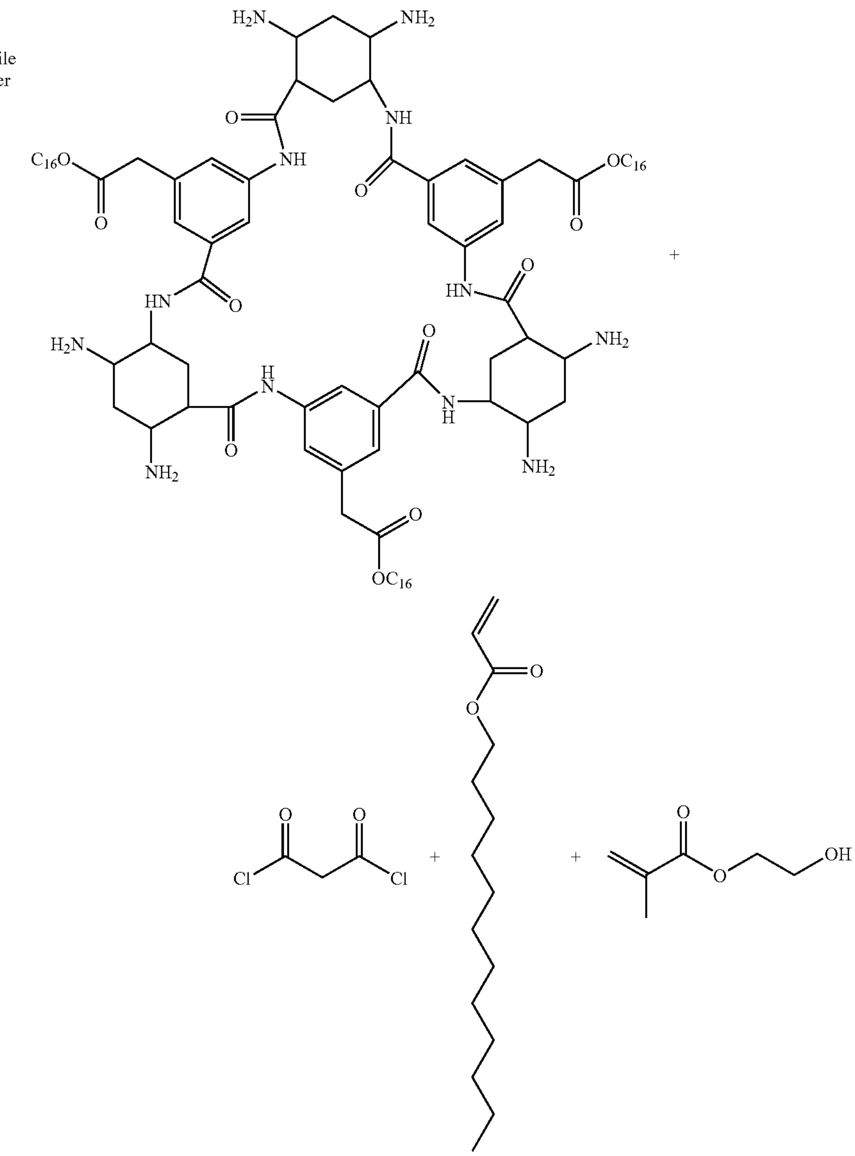 |

In Table 5, R is alkyl, and n is about 3 to 1,000,000. Referring to Table 5, in some schemes the multicomponent mixture of macrocyclic modules may include a polymer, or an amphiphilic polymer, or mixtures thereof. In one scheme, for example, macrocyclic modules having amino functional groups are mixed with polymethylmethacrylate (PMMA), which is immiscible with water. The macrocyclic modules are then coupled with linker molecules ClC(O)CH2C(O)Cl. In schemes with such mixtures, the macrocyclic modules may not couple directly to polymeric components, except at interfaces between phases. Even where the macrocyclic modules and polymeric components form a single continuous phase, the macrocyclic modules may be coupled predominantly to other macrocyclic modules. In nanofilms where macrocyclic modules and polymeric components are phase separated, surface coupling and other adhesion of various domains may occur.

In other schemes illustrated in Table 5, multicomponent mixtures of macrocyclic modules used to prepare nanofilm may include a polymer and/or an amphiphilic polymer, and may further include a molecule which is amphiphilic which may or may not be polymerizable, or a monomer which is polymerizable, or mixtures thereof.

In other schemes illustrated in Table 5, multicomponent mixtures of macrocyclic modules used to prepare nanofilms may include a polymerizable amphiphile or a polymerizable monomer species, or mixtures thereof. These nanofilms may optionally include a non-polymerizable amphiphilic species.

In the schemes illustrated in Table 5, multicomponent mixtures of macrocyclic modules used to prepare nanofilm may optionally include amphiphilic molecules which may have a functional group that can couple to macrocyclic modules or to polymeric components.

In another aspect, this invention involves formation of nanofilm using multicomponent mixtures of macrocyclic modules and polymeric components, where the macrocyclic modules may not readily couple to the polymeric components or to other macrocyclic modules. Various schemes for the preparation of such nanofilms are illustrated in Table 6.

TABLE 6

Schemes to prepare nanofilm from macrocyclic modules which may not readily couple

| Reagents | Scheme |
| --- | --- |
| macrocyclic module polymer | 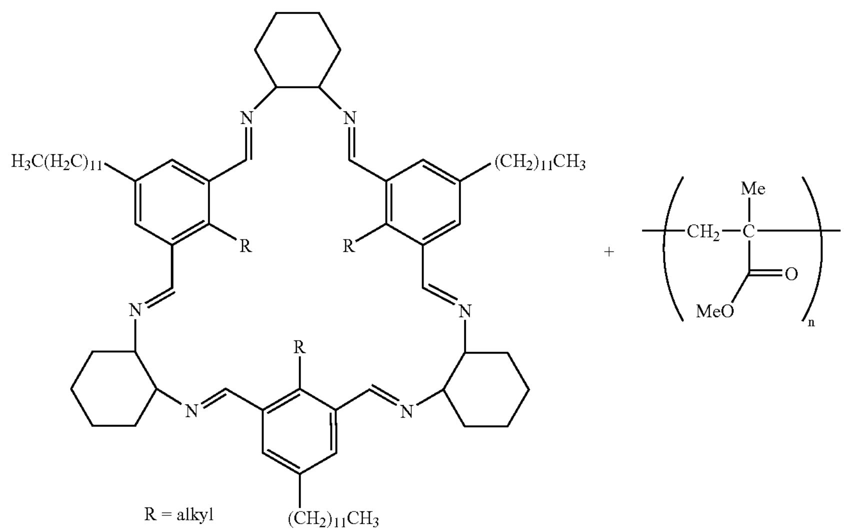 |
| macrocyclic module amphiphilic polymer | 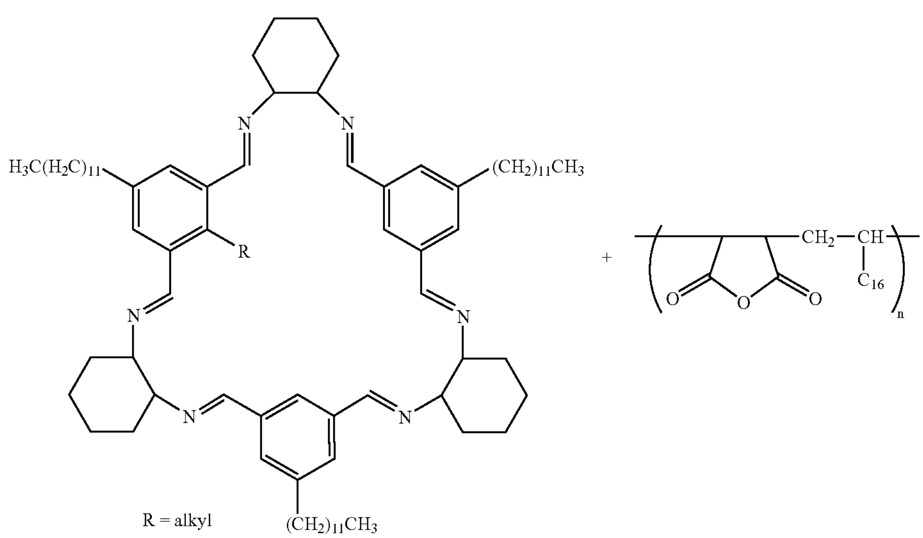 |

TABLE 6-continued
| Schemes to prepare nanofilm from macrocyclic modules which may not readily couple | |
|---|---|
| Reagents | Scheme |
| macrocyclic module polymerizable amphiphile | 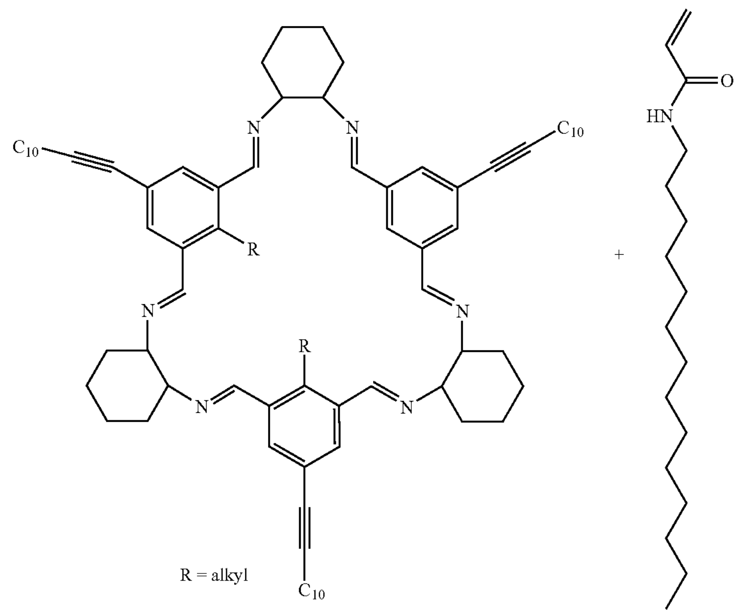 |
| macrocyclic module polymerizable monomer | 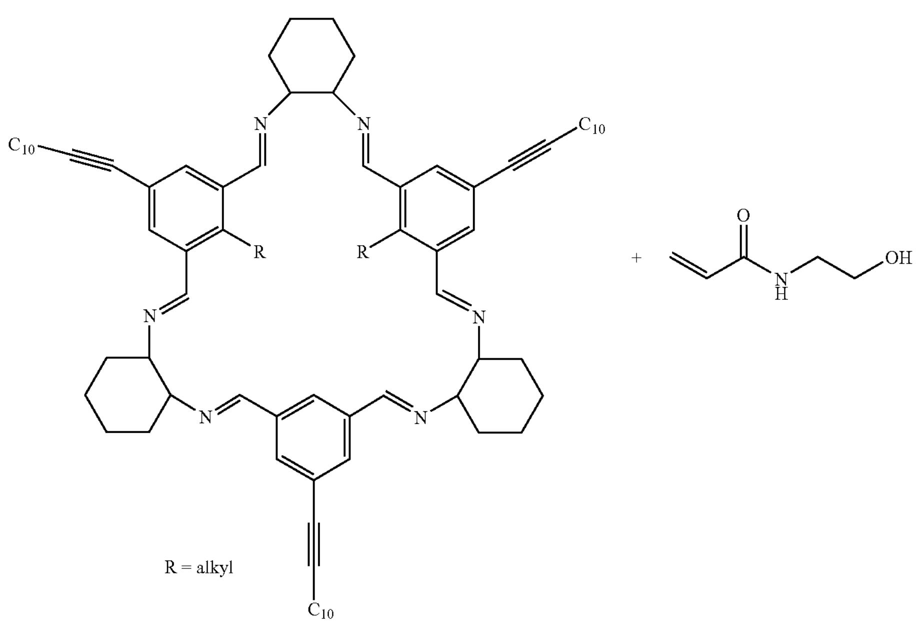 |

TABLE 6-continued
| Schemes to prepare nanofilm from macrocyclic modules which may not readily couple | |
| --- | --- |
| Reagents | Scheme |
| macrocyclic module polymer amphiphile | 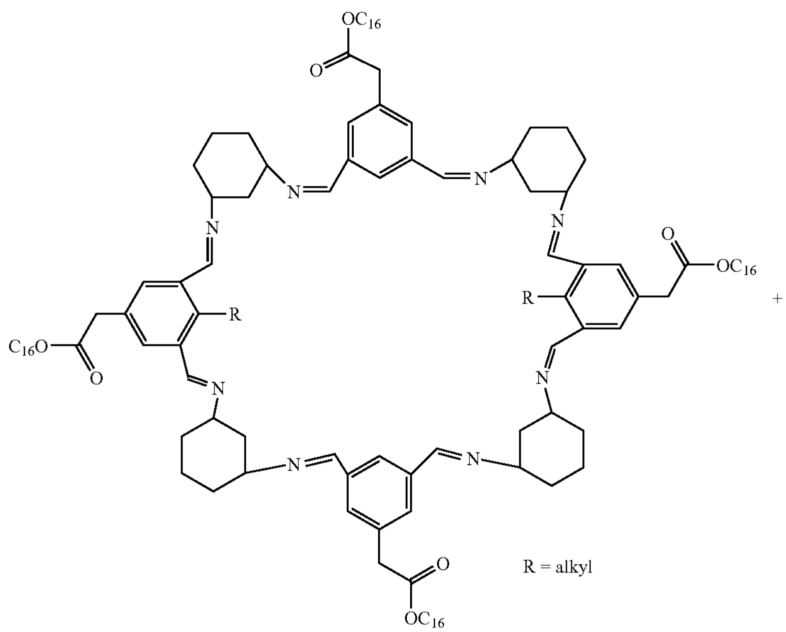  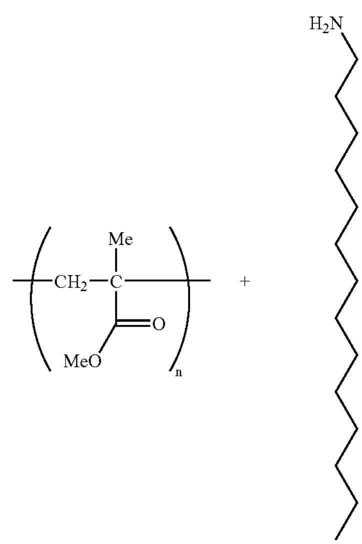 |

TABLE 6-continued
| Schemes to prepare nanofilm from macrocyclic modules which may not readily couple | |
|---|---|
| Reagents | Scheme |
| macrocyclic module<br>polymer<br>polymerizable amphiphile | 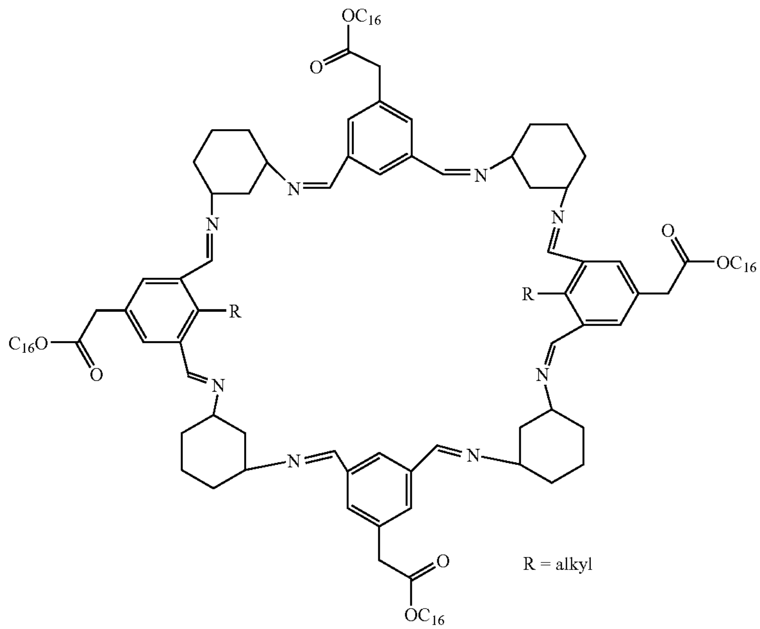  + 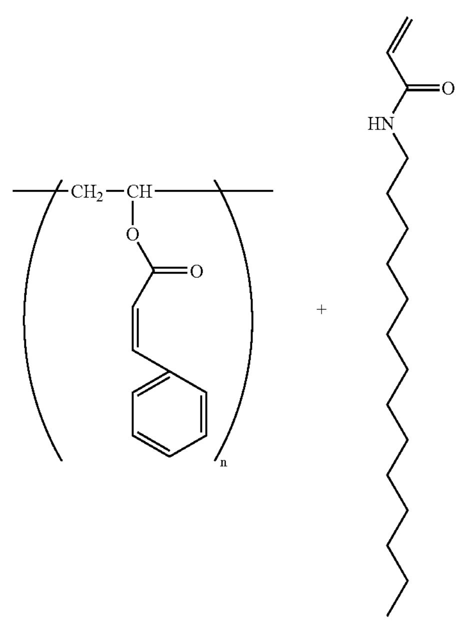  |

TABLE 6-continued
| Schemes to prepare nanofilm from macrocyclic modules which may not readily couple | |
|---|---|
| Reagents | Scheme |
| macrocyclic module<br>amphiphilic polymer<br>polymerizable amphiphile | 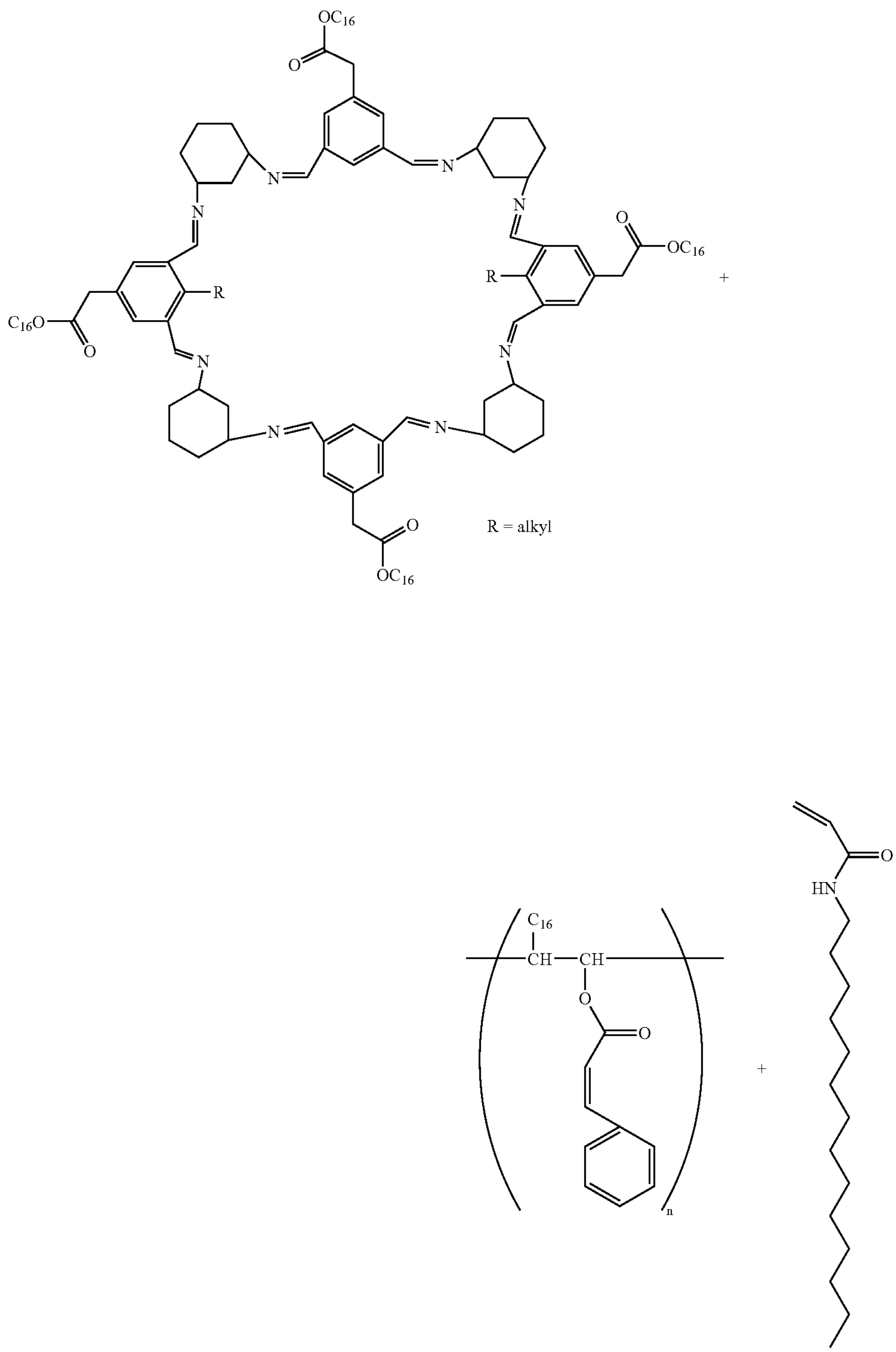 |

TABLE 6-continued

Schemes to prepare nanofilm from macrocyclic modules which may not readily couple

| Reagents | Scheme |
| --- | --- |
| macrocyclic module<br>amphiphile<br>polymerizable amphiphile | 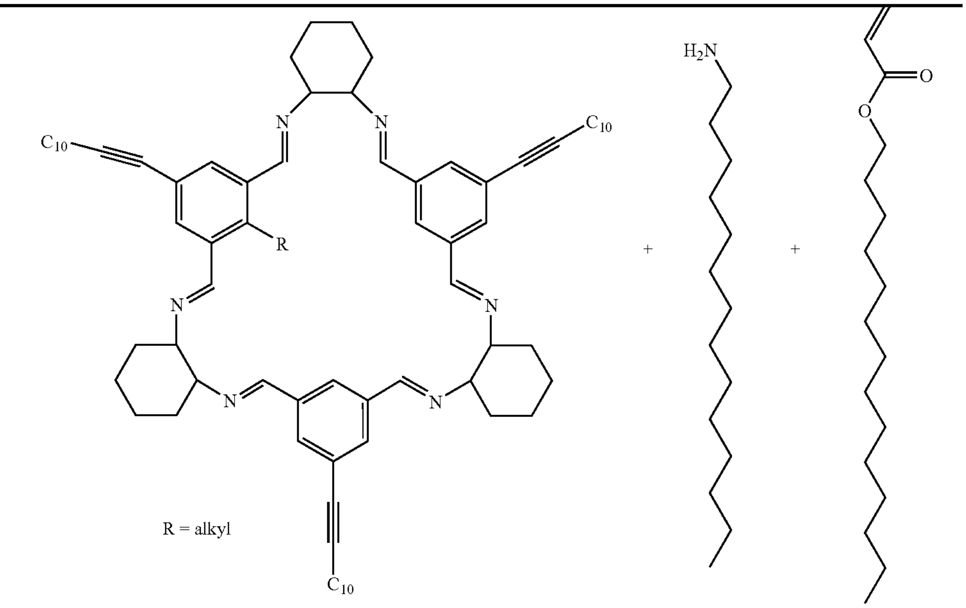 |
| macrocyclic module<br>polymerizable amphiphile<br>polymerizable monomer | 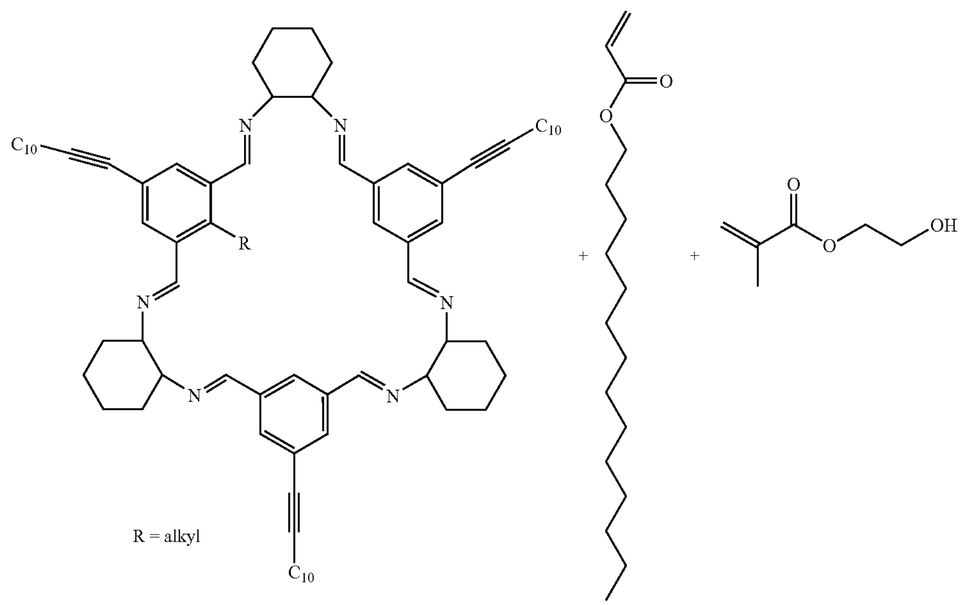 |

In Table 6, n is about 3 to about 1,000,000. Referring to Table 6, in some schemes the multicomponent mixture of macrocyclic modules may include a polymer, or an amphiphilic polymer, or mixtures thereof. In these schemes, the macrocyclic modules may not readily couple to polymeric components or to other modules, but may undergo some degree of coupling to either the polymeric components or other modules. In the schemes illustrated in Table 6, multicomponent mixtures of macrocyclic modules used to prepare nanofilm may include a polymer and/or an amphiphilic polymer, and may further include a molecule which is amphiphilic and may be polymerizable, or a monomer which is polymerizable, or mixtures thereof.

In other schemes illustrated in Table 6, multicomponent mixtures of macrocyclic modules used to prepare nanofilms may include a polymerizable amphiphile or a polymerizable monomer species, or mixtures thereof. These nanofilms may optionally include a non-polymerizable amphiphilic species.

In the schemes illustrated in Table 6, multicomponent mixtures of macrocyclic modules used to prepare nanofilm may further include amphiphilic molecules which may have a functional group that can couple to macrocyclic modules or to polymeric components.

In another aspect, this invention relates to the formation of nanofilms using multicomponent mixtures of macrocyclic modules and polymeric components, wherein the macrocyclic modules may directly couple to the polymeric components, or to other macrocyclic modules. Various schemes for the preparation of such nanofilms are illustrated in Table 7.

TABLE 7
Schemes to prepare nanofilm with macrocyclic modules which may undergo direct coupling
| Reagents | Scheme |
| --- | --- |
| macrocyclic module polymer | 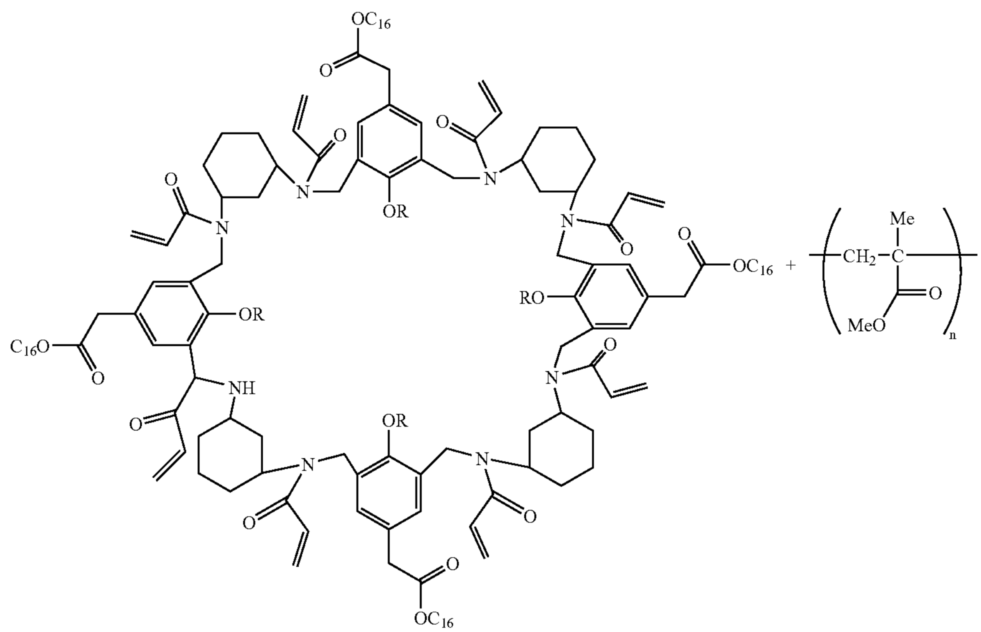 |
| macrocyclic module and amphiphilic polymer: (a) prepare nanofilm layer of components (b) couple components | 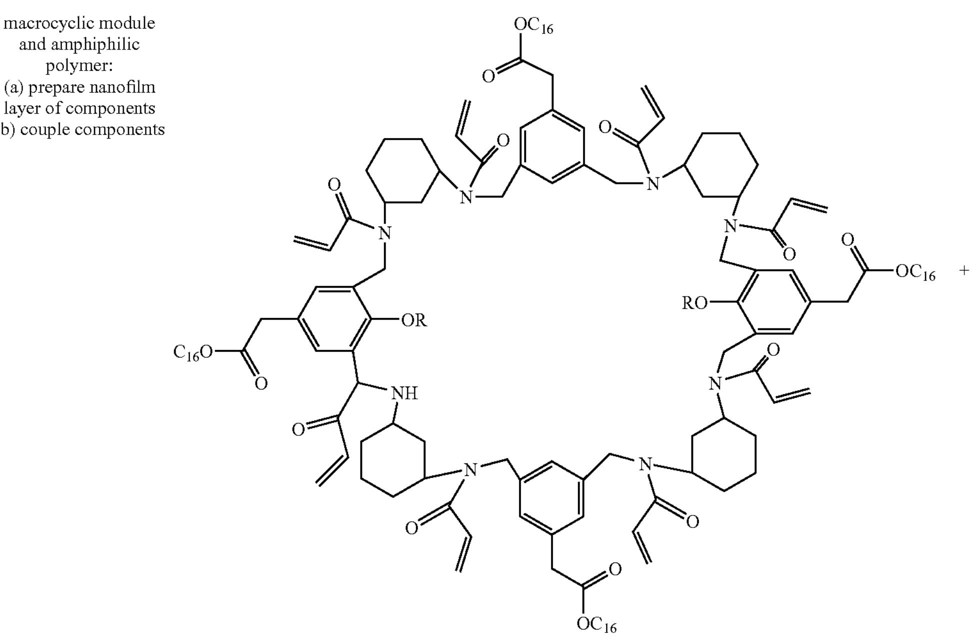 |

TABLE 7-continued
Schemes to prepare nanofilm with macrocyclic modules which may undergo direct coupling
| Reagents | Scheme |
| --- | --- |
| | 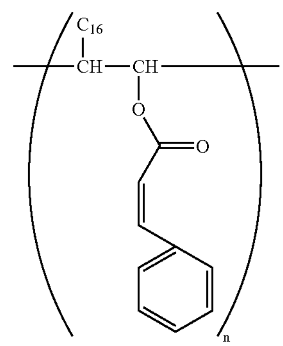 |
| macrocyclic module polymerizable amphiphile | 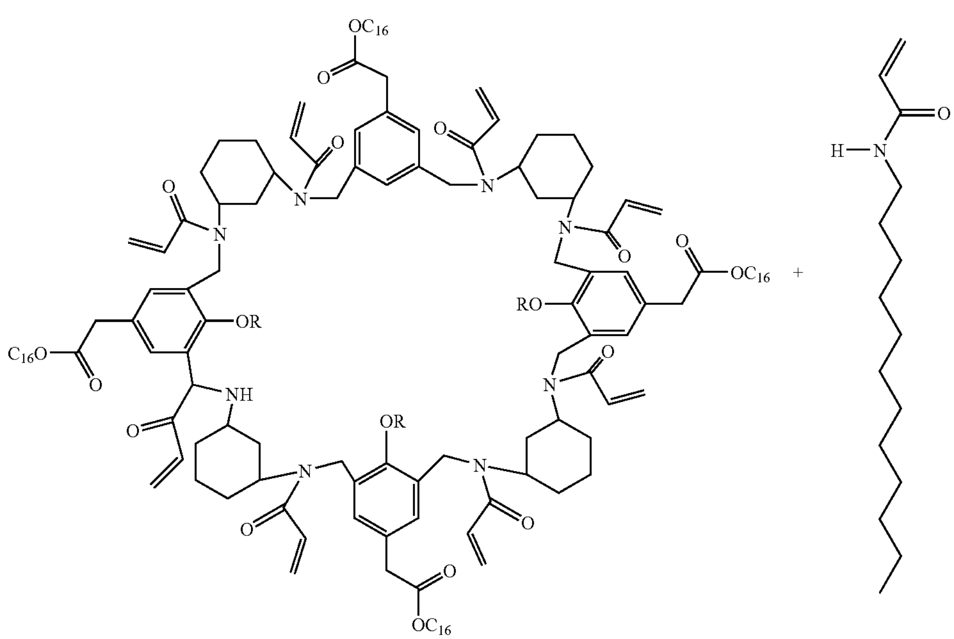 |

TABLE 7-continued
| Schemes to prepare nanofilm with macrocyclic modules which may undergo direct coupling | |
|---|---|
| Reagents | Scheme |
| macrocyclic module polymerizable monomer | 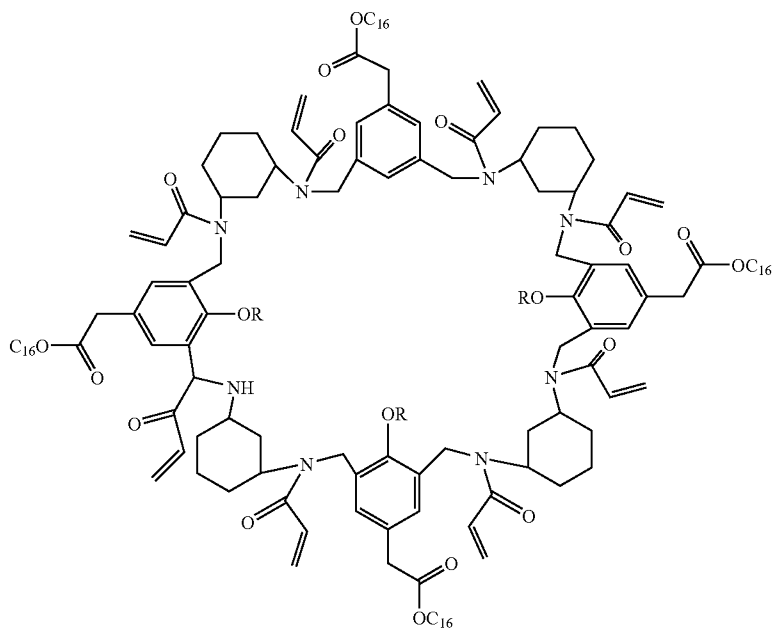 + 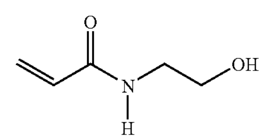 |
| macrocyclic module polymer amphiphile | 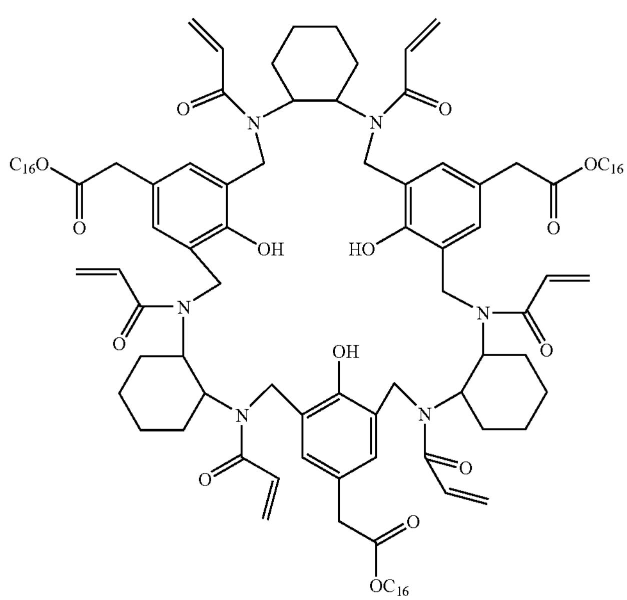 + |

TABLE 7-continued
Schemes to prepare nanofilm with macrocyclic modules which may undergo direct coupling
| Reagents | Scheme |
| --- | --- |
| | 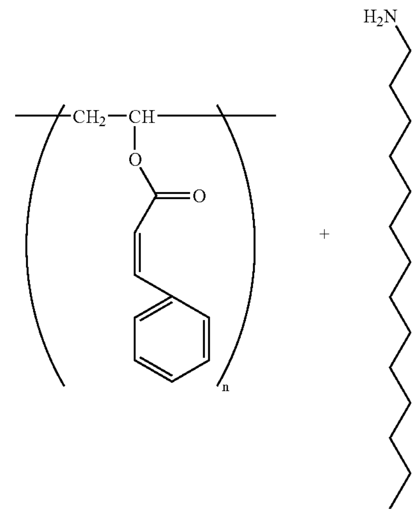 |
| macrocyclic module polymer polymerizable amphiphile | 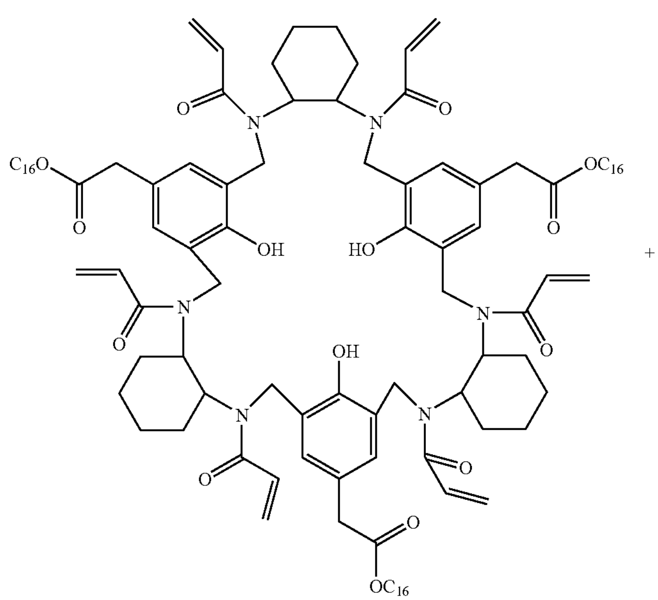 |

TABLE 7-continued
Schemes to prepare nanofilm with macrocyclic modules which may undergo direct coupling
| Reagents | Scheme |
| --- | --- |
| | 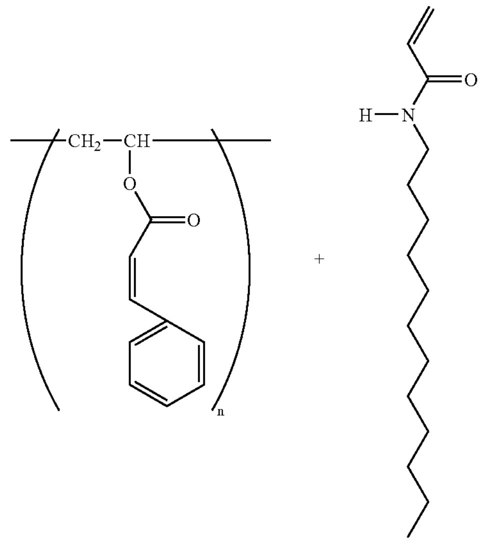 |
| macrocyclic module<br>polymer<br>amphiphilic polymer | 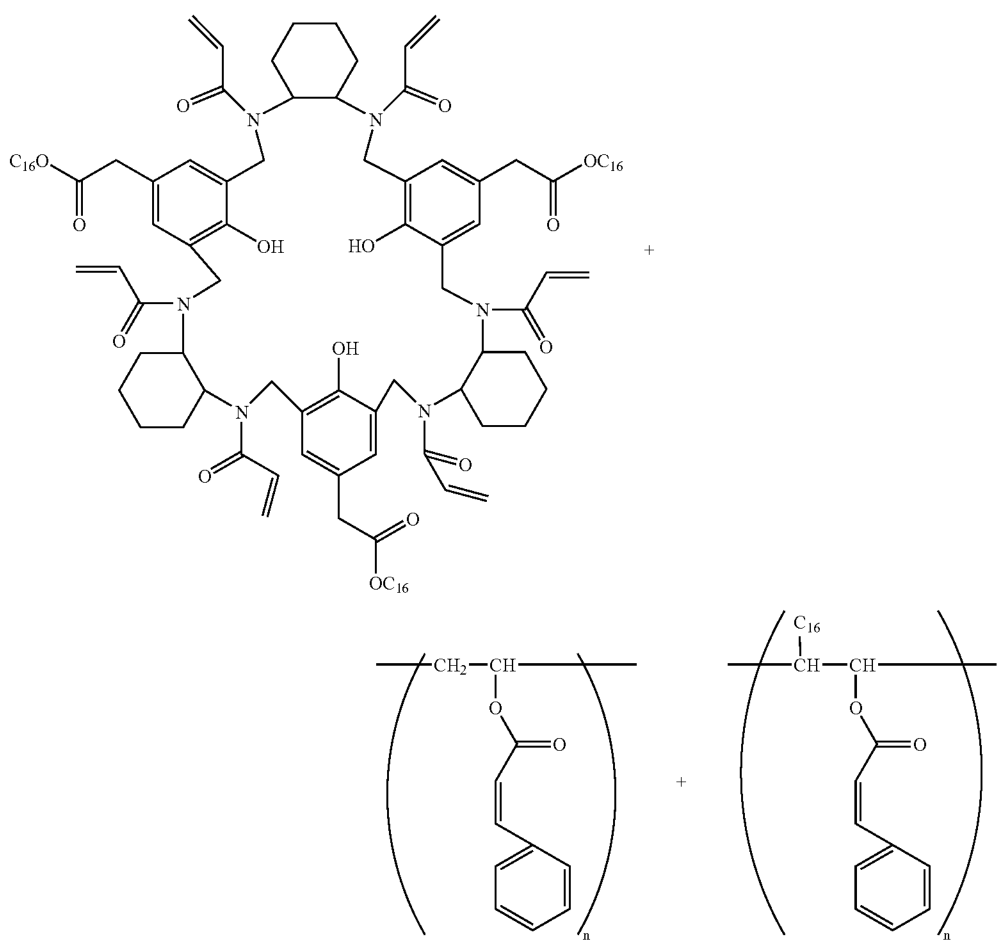 |

TABLE 7-continued
| Schemes to prepare nanofilm with macrocyclic modules which may undergo direct coupling | |
|---|---|
| Reagents | Scheme |
| macrocyclic module amphiphilic polymer polymerizable amphiphile | 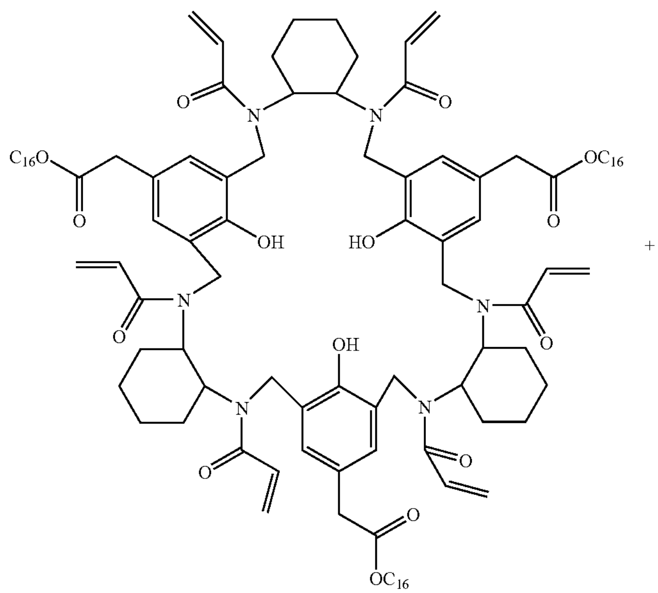 |
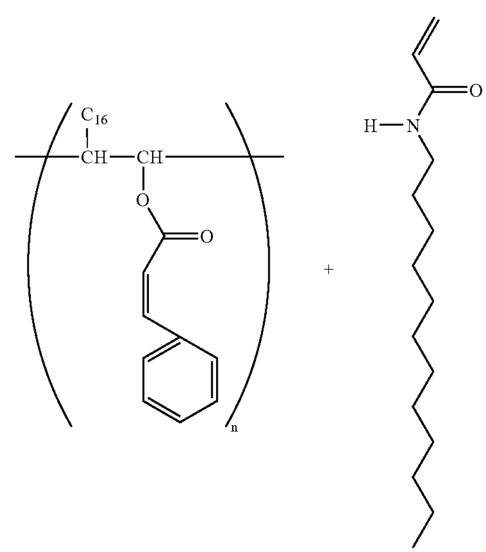

TABLE 7-continued
Schemes to prepare nanofilm with macrocyclic modules which may undergo direct coupling
| Reagents | Scheme |
| --- | --- |
| macrocyclic module polymerizable amphiphile amphiphile | 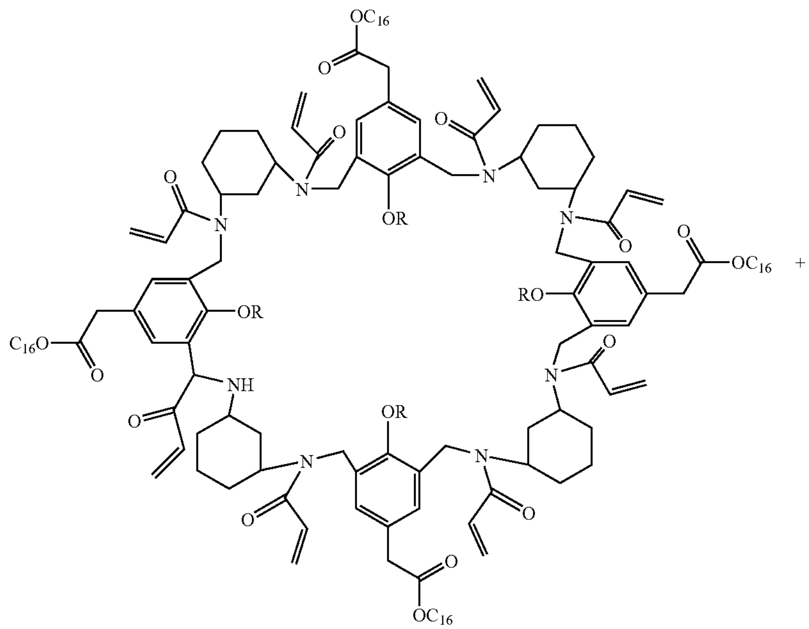  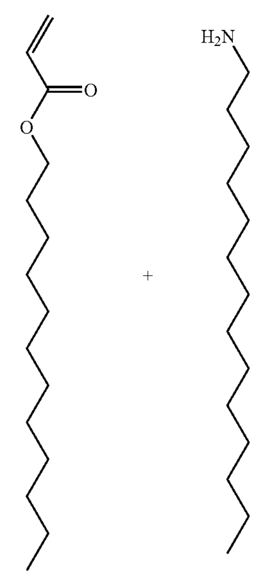  |

TABLE 7-continued
Schemes to prepare nanofilm with macrocyclic modules which may undergo direct coupling
| Reagents | Scheme |
|---|---|
| macrocyclic module polymerizable amphiphile polymerizable monomer | 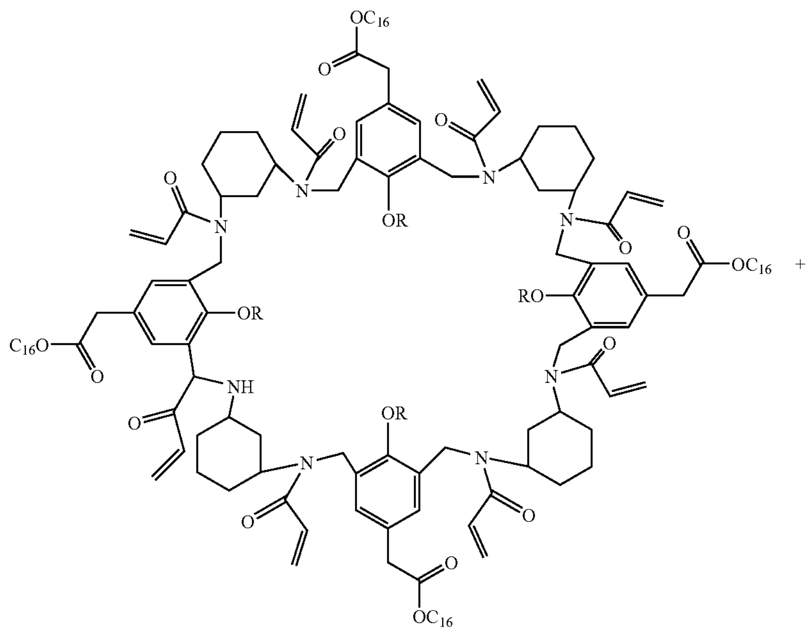 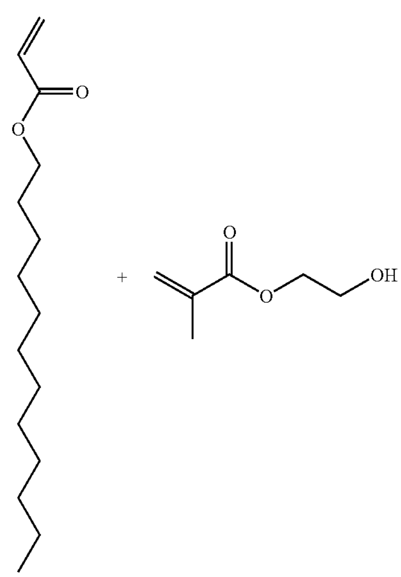 |

TABLE 7-continued
| Schemes to prepare nanofilm with macrocyclic modules which may undergo direct coupling | |
|---|---|
| Reagents | Scheme |
| macrocyclic module polymerizable monomer amphiphile | 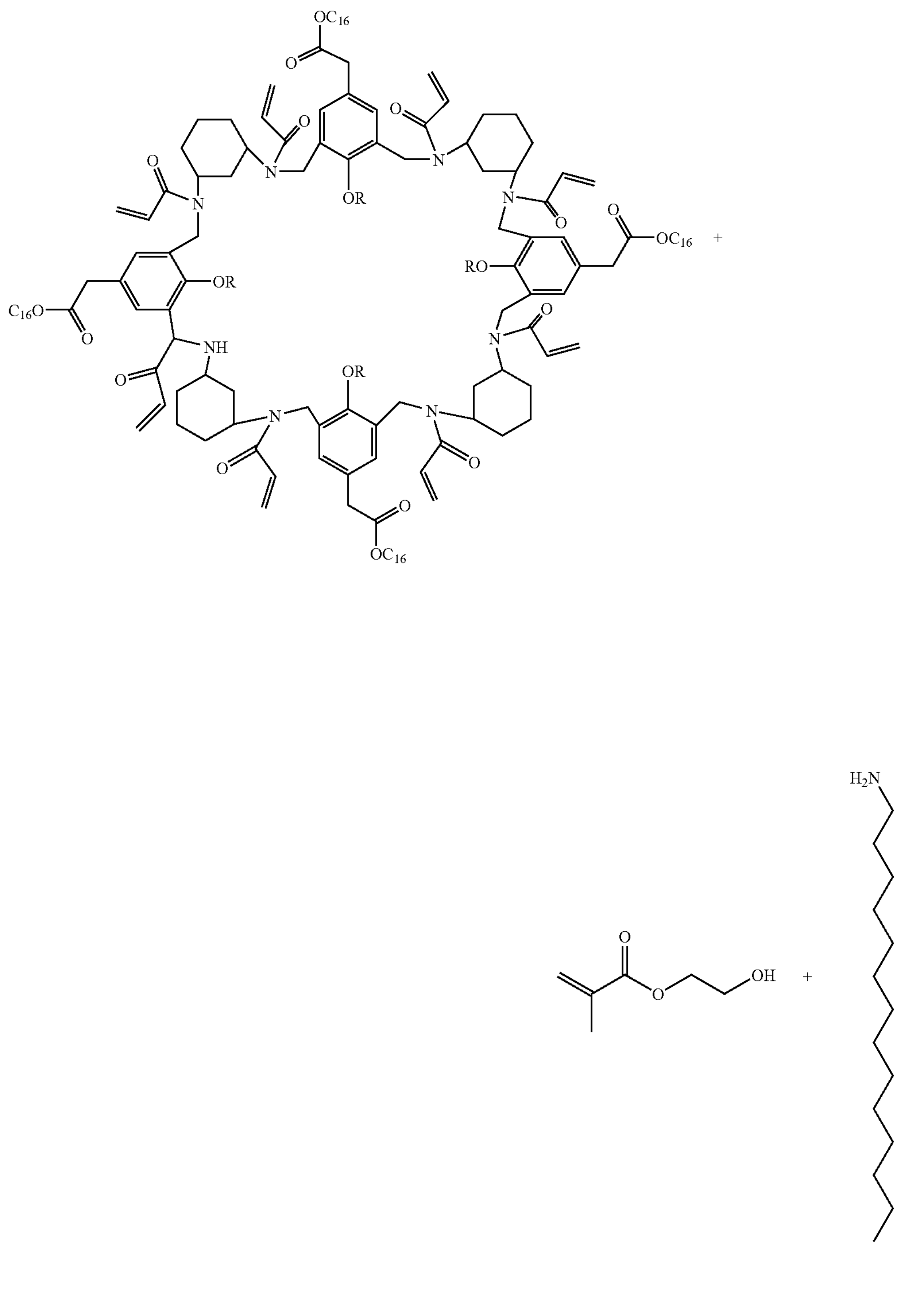 |

TABLE 7-continued

| Reagents | Scheme |
| --- | --- |
| | Schemes to prepare nanofilm with macrocyclic modules which may undergo direct coupling |
| macrocyclic module and amphiphilic polymer: (a) couple in solution (b) prepare nanofilm | 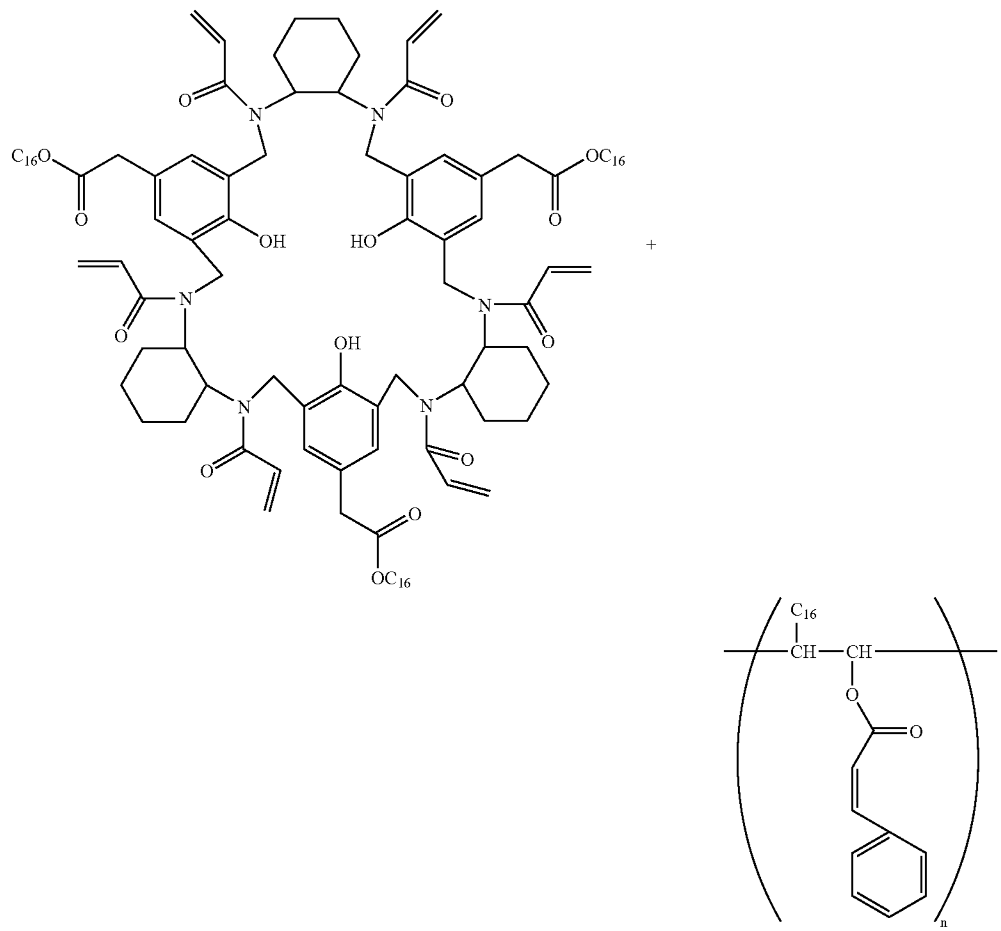 |

In Table 7, R is alkyl, and n is about 3 to about 1,000,000. Referring to Table 7, in some schemes the multicomponent mixture of macrocyclic modules may include a polymer, or an amphiphilic polymer, or mixtures thereof. In these schemes, the macrocyclic modules may in some cases couple directly to polymeric components, and may form a single phase.

In other schemes illustrated in Table 7, multicomponent mixtures of macrocyclic modules used to prepare nanofilm may include a polymer and/or an amphiphilic polymer, and may further include a molecule which is amphiphilic which may or may not be polymerizable, or a monomer which is polymerizable, or mixtures thereof.

In other schemes illustrated in Table 7, multicomponent mixtures of macrocyclic modules used to prepare nanofilms may include a polymerizable amphiphile or a polymerizable monomer species, or mixtures thereof. These nanofilms may optionally include a non-polymerizable amphiphilic species.

In the schemes illustrated in Table 7, multicomponent mixtures of macrocyclic modules used to prepare nanofilm may also include amphiphilic molecules which may have a functional group that can couple to macrocyclic modules or to polymeric components.

The type of coupling in which a macrocyclic module participates to form a nanofilm may depend on the presence of other components of the nanofilm. For example, a macrocyclic module with acrylate functional groups may couple much more rapidly to itself than to a polymeric component with less reactive groups.

A macrocyclic module may participate in more than one type of coupling. For example, a macrocyclic module which may couple directly to another macrocyclic module may also couple through a linker molecule to another macrocyclic module. Both types of coupling may occur in the same multicomponent mixture used to prepare a nanofilm.

In one type of coupling, a macrocyclic module may have functional groups which couple directly to complementary functional groups of another macrocyclic module. An example of this form is a macrocyclic module having acrylamide functional groups. In this type of coupling, the macrocyclic module may couple much more rapidly to another macrocyclic module than to any polymeric component, and form a nanofilm in which the degree of coupling between macrocyclic modules and the polymeric component is limited.

In some variations, the polymeric component may have complementary functional groups which effectively compete for the coupling groups of macrocyclic modules. In these variations, the macrocyclic module may couple as rapidly to another macrocyclic module as it does to the polymeric component, and may form a nanofilm in which the degree of coupling between the macrocyclic modules themselves is comparable to that between the macrocyclic modules and the polymeric component. In other variations, the degree of coupling between the macrocyclic modules and the polymeric component may exceed that between the macrocyclic modules themselves.

A nanofilm may be prepared by various methods where the macrocyclic modules couple directly to a polymeric component. For example, as shown in Table 7, the macrocyclic modules and polymeric component may be dissolved in organic solvent and coupled together before preparation of a nanofilm. This scheme may result in a substantially single continuous phase within the nanofilm. In another variation shown in Table 7, the macrocyclic modules may be coupled to the polymeric component during or after preparation of the nanofilm layer.

In another aspect, a nanofilm of this invention may be formed from macrocyclic modules having functional groups which may couple directly to complementary functional groups of a polymeric component. In these variations, the macrocyclic modules may not readily couple to other macrocyclic modules. Schemes for the preparation of such nanofilms are illustrated in Table 8.

TABLE 8

Schemes to prepare nanofilm from macrocyclic modules which couple to polymeric components

| Reagents | Scheme |
| --- | --- |
| macrocyclic module polymer | 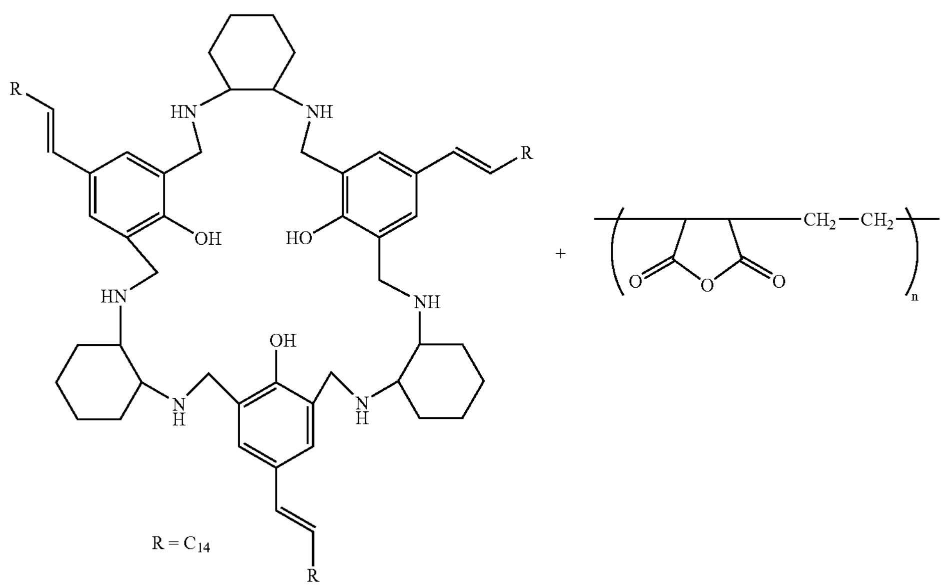 |
| macrocyclic module amphiphilic polymer | 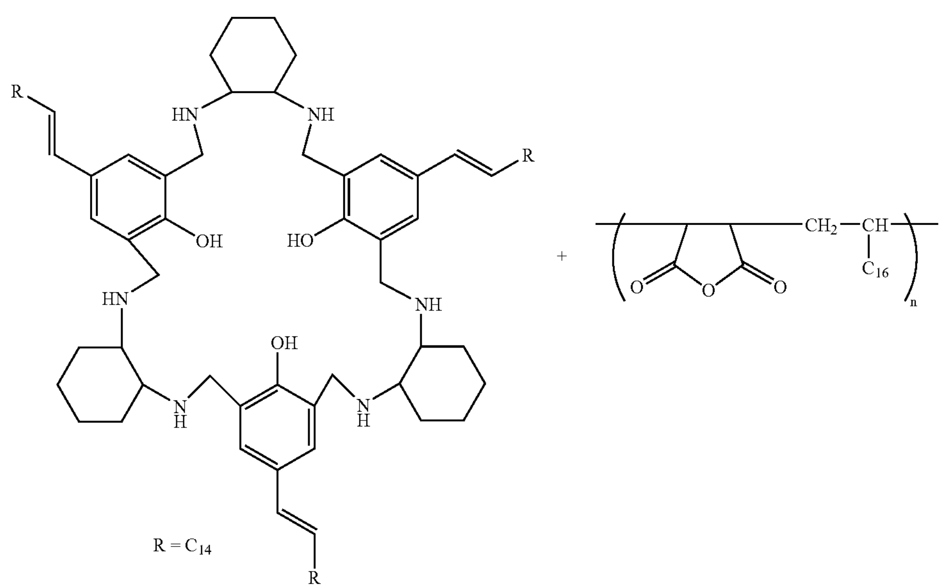 |

Referring to Table 8, in some schemes the multicomponent mixture of macrocyclic modules may include a polymer, or an amphiphilic polymer, or mixtures thereof. In these schemes, the macrocyclic modules directly couple to polymeric components, but may not readily couple to other modules.

In general, for a nanofilm prepared from macrocyclic modules which directly couple to polymeric components, a discrete product is formed from the coupling of macrocyclic modules to a polymeric component. The discrete module-polymer product may be similar in molecular architecture to a side-group branched polymer, or a graft polymer. The discrete product may have a predominantly single continuous phase.

In one example in Table 8, secondary amine linkages between synthons of a macrocyclic module may couple to a carboxylic acid side group of a copolymer such as the diacid form of poly(ethylene-co-maleic anhydride). In these schemes, macrocyclic modules couple to polymeric components, and both may be miscible in water. The coupling between the macrocyclic module and the polymeric component may also be indirect, and involve a linker molecule.

In the schemes illustrated in Table 8, multicomponent mixtures of macrocyclic modules used to prepare nanofilm may also include amphiphilic molecules which may have a functional group that can couple to macrocyclic modules or to polymeric components.

Nanofilms of Amphiphiles and Polymeric Components

In one aspect, this invention relates to the introduction of polymeric components into nanofilms comprising amphiphiles. Various types of coupling may be used to prepare a nanofilm comprising amphiphiles and polymeric components.

In some variations, an amphiphile may contain a polymerizable functional group, such as an acrylate group. In these variations, a polymeric component of a nanofilm may be formed in-situ with the nanofilm by using a multicomponent mixture which includes a polymerizable amphiphile, and which may also optionally include a polymerizable monomer.

In other variations, an amphiphilic molecule which does not have a polymerizable functional group may be used. In these variations, amphiphiles may be mixed with polymer, amphiphilic polymer, polymerizable monomer, polymerization amphiphile, or mixtures thereof to form a nanofilm having polymeric components.

In forming a nanofilm from multicomponent mixtures of amphiphiles, the phase and domain behavior of the mixture may influence the composition and properties of the nanofilm. Various schemes for the preparation of nanofilms with polymeric components and amphiphiles are illustrated in Table 9.

TABLE 9

Schemes to prepare nanofilm with amphiphiles

| Reagents | Scheme |
|---|---|
| polymerizable amphiphile<br>polymer | 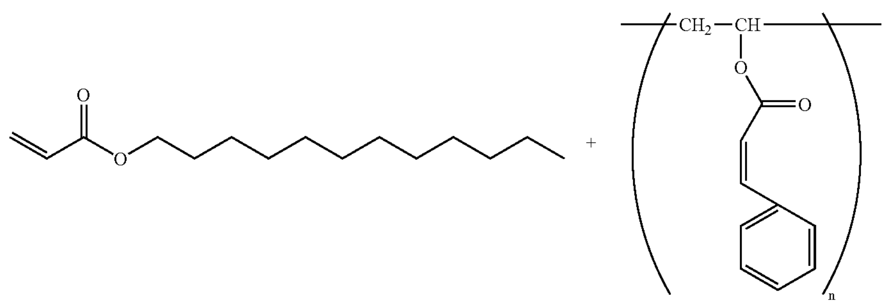 |
| polymerizable amphiphile<br>amphiphilic polymer | 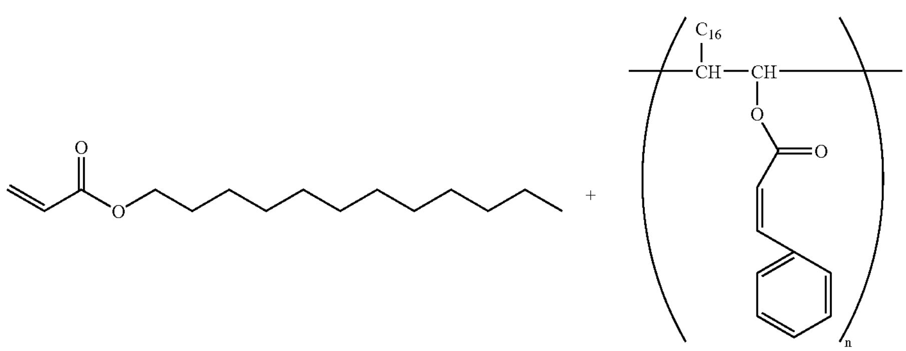 |
| polymerizable amphiphile<br>polymerizable monomer | 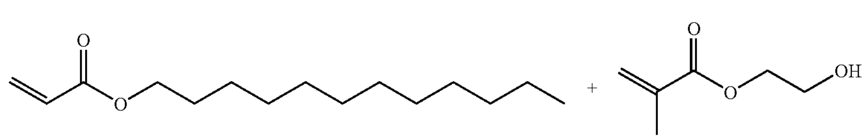 |

TABLE 9-continued
Schemes to prepare nanofilm with amphiphiles
| Reagents | Scheme |
| --- | --- |
| polymerizable amphiphile<br>polymer<br>amphiphilic polymer | 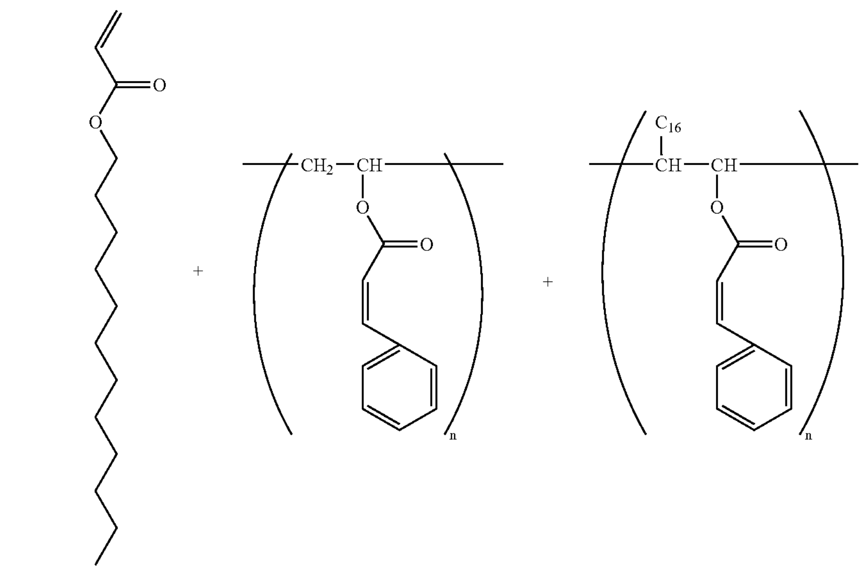 |
| polymerizable amphiphile<br>amphiphilic polymer<br>polymerizable monomer | 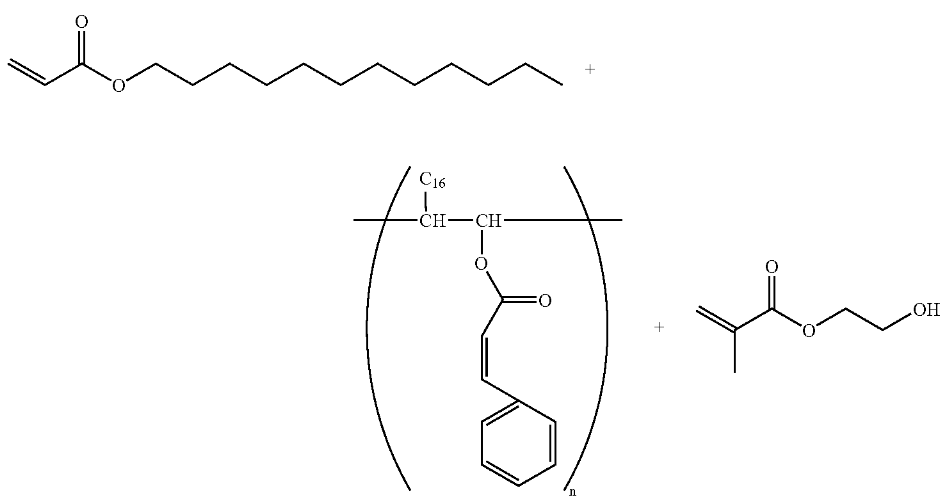 |
| amphiphile<br>polymerizable amphiphile | 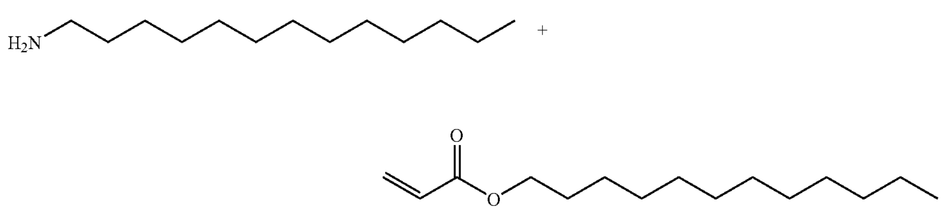 |

TABLE 9-continued
| Schemes to prepare nanofilm with amphiphiles | |
|---|---|
| Reagents | Scheme |
| amphiphile polymer<br>polymerizable amphiphile | 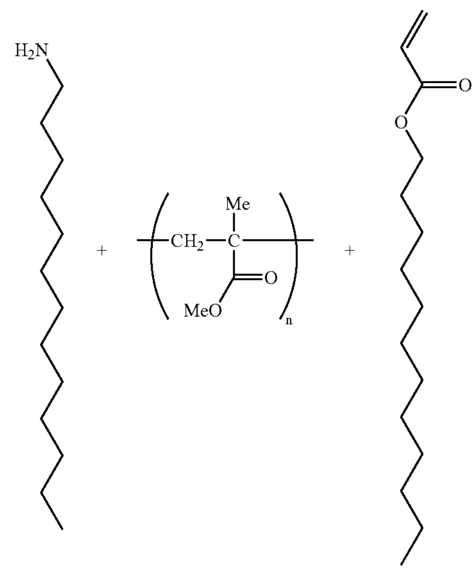 |
| amphiphile<br>amphiphilic polymer<br>polymerizable amphiphile | 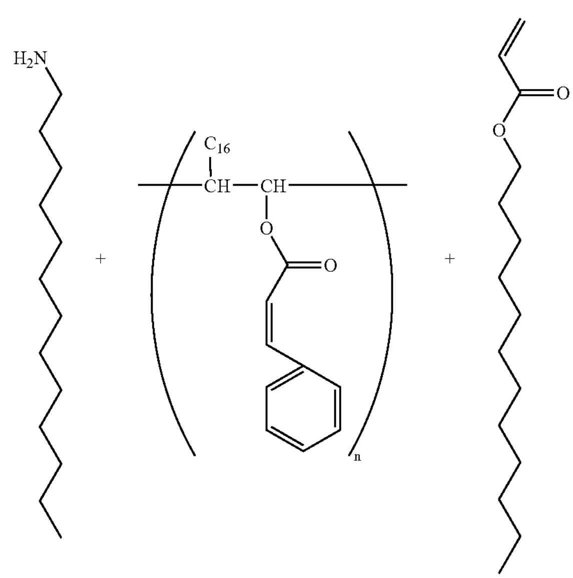 |

TABLE 9-continued

Schemes to prepare nanofilm with amphiphiles

| Reagents | Scheme |
| --- | --- |
| amphiphile<br>polymerizable monomer<br>polymerizable amphiphile | 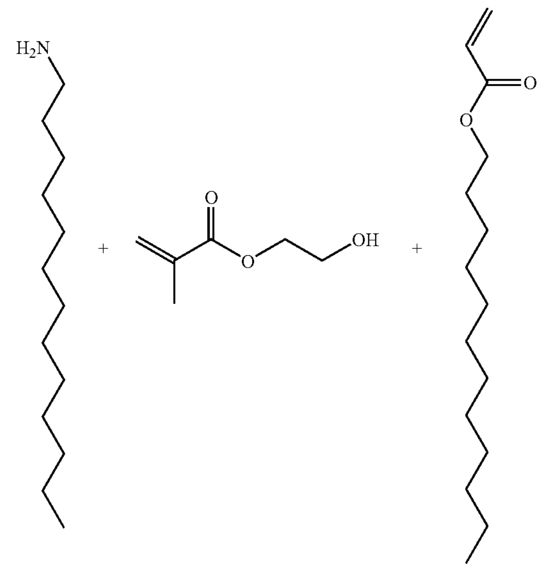 |
| polymer amphiphile | 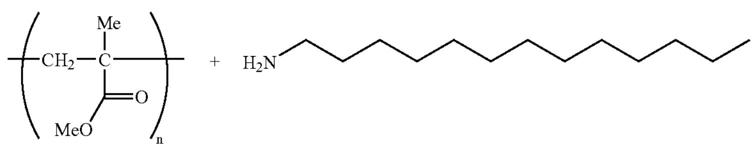 |
| amphiphilic polymer<br>amphiphile | 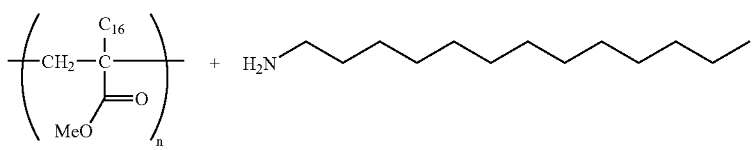 |
| amphiphile<br>polymerizable monomer | 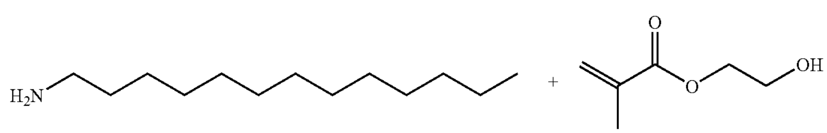 |

Referring to Table 9, in some schemes a nanofilm is prepared with polymerizable amphiphiles. In forming a nanofilm from polymerizable amphiphiles, a polymeric component may be formed in-situ from the polymerizable amphiphiles. The mixtures used to form such nanofilms may further include a polymer, or an amphiphilic polymer, a polymerizable monomer, an amphiphile, or mixtures thereof.

In some schemes illustrated in Table 9, a nanofilm may be prepared from a polymer, an amphiphilic polymer, or a polymerizable monomer. The nanofilms may optionally include an amphiphile.

Nanofilms of Polymeric Components

In one aspect, this invention relates variously to nanofilms prepared from polymeric components. The polymeric components may be directly linked to each other, or may be linked via linker molecules.

In a non-limiting example, a LB film of PGM may be crosslinked with ethylene diamine to form a nanofilm. In another example, a LB film of polyethylene imine (PEI) may be crosslinked with diethylene glycol diglycidyl ether:

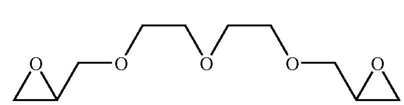

to form a nanofilm. Other possible combinations of the polymeric components included herein with appropriate linkers will be apparent to those of skill in the art.

Nanofilm Composition and Characteristics

The characteristics of a nanofilm having one or more polymeric components may be substantially different than those of nanofilm prepared from macrocyclic modules alone. A nanofilm having polymeric components may be advantageously flexible and pliable compared to nanofilm prepared from modules alone, making it easier to fabricate articles such as membranes for filtration and other separation processes. Various domains of a nanofilm having polymeric components may undergo plastic deformation in response to stress, while other regions may be elastomeric. Nanofilms having polymeric components may be deposited on a substrate to form a continuous, substantially unbroken supported nanofilm or membrane.

Because the physical, chemical, and physico-chemical properties of nanofilm having one or more polymeric components may be dependent, in part, on the fraction of polymeric component relative to macrocyclic modules or other components, these properties can be varied by changing the fraction of polymeric component in the nanofilm.

In general, components which are polymerizable may be used to prepare a polymeric component of a nanofilm in-situ during formation of the nanofilm. In-situ formation of a nanofilm polymeric component provides an alternative scheme in which phase and domain behavior of the multicomponent mixture may be modified. Schemes involving polymerizable species in a multicomponent mixture may be used to prepare, among other compositions, nanofilm having smaller domains of phase separated polymeric components as compared to nanofilm prepared with polymer or amphiphilic polymer components alone. Multicomponent mixtures involving a polymerizable amphiphile may be used to prepare nanofilm with fewer openings of micrometer dimension through which transport of species can occur, as compared to nanofilm prepared with polymer or amphiphilic polymer components alone.

In further variations of a nanofilm having one or more polymeric components, the polymeric molecules may not be coupled to other components of the nanofilm. The ability of a polymeric component to make a nanofilm flexible or pliable may not require coupling to macrocyclic modules or other components.

The area fraction of a component of a nanofilm is the fraction of the total nanofilm area that the individual component represents. The nanofilm area fraction of a component is calculated from the mole fraction (Mf) of the component in the initial mixture of components used to form the nanofilm, and the mean molecular area (MMA) of the component obtained by extrapolation of the high-surface pressure region of the pressure-area Langmuir isotherm of the pure component to zero surface pressure. The area fraction of a component in the nanofilm is the product (Mf)(MMA) for the component, divided by the sum of the products (Mf)(MMA) for all components: area fraction=$(Mf_1)(MMA_1)/[(Mf)(MMA)_1+(Mf)_2(MMA)_2+\ldots(Mf)_n(MMA)_n]$, where n is the number of components.

In general, area fraction can be measured where all nanofilm components are immiscible in water or are amphiphilic, and all nanofilm components are found in the initial mixture of components. The uncertainty in measurement of area fraction may be up to about 20%, which includes uncertainty due to extrapolation of Langmuir isotherms, and for polymeric components which are polymers in the initial mixture of components, uncertainty due to molecular weight polydispersity of the polymer.

In some variations, the nanofilm area fraction of a component may not always be measured by the above formula. For example, the area fraction of a component which was not in the initial mixture of components used to form the nanofilm, but entered the nanofilm later, would not be measured by the formula above. The area fraction of a component may also not be measured by the formula above when the component does not form a stable Langmuir film for which MMA can be measured, or when a polymerizable component is used in the initial mixture which may have an MMA different from the polymer it produces.

A nanofilm may have any area fraction of polymeric components. In some variations, a nanofilm may have an area fraction of polymeric components from about 0.005 (0.5%) to about 0.98 (98%). In other variations, a nanofilm may have an area fraction of polymeric components from about 0.005 to about 0.7, often from about 0.005 to about 0.5, sometimes from about 0.005 to about 0.3, sometimes from about 0.005 to about 0.2, sometimes from about 0.005 to about 0.1, sometimes from about 0.005 to about 0.05, sometimes from about 0.005 to about 0.02, sometimes from about 0.50 to about 0.98.

A nanofilm may have an area fraction or weight percent of polymeric components sufficient to make it flexible and pliable so that it may be deposited on a substrate as a homogeneous film with little mechanical breakage, or to reduce the surface modulus of the nanofilm. Flexibility of a nanofilm having polymeric components may be demonstrated by depositing the nanofilm on various substrates to form a continuous, substantially unbroken film on the substrate, or by reducing surface modulus of the nanofilm.

A nanofilm may have any molar ratio of polymeric components, as measured against the other components. In some variations, the molar ratio of polymeric components may be, for example, about 0.005 to about 0.995, for example about 0.010 to about 0.990, for example, about 0.01 to about 0.50, for example about 0.01 to about 0.20, for example, about 0.20 to about 0.50, for example about 0.50 to about 0.99, for example, about 0.1 to about 0.9, as measured against the other components. In certain embodiments, the molar ratio of polymeric component: module is about 0.1:0.9, about 0.2:0.8, about 0.5:0.5, about 0.25:0.75, or about 0.90:0.10.

The thickness of nanofilms described herein, whether through coupled or non coupled components, is exceptionally small, often being less than about 30 nanometers, sometimes less than about 20 nanometers, and sometimes from about 1-15 nanometers. The thickness of a nanofilm depends partly on the structure and nature of the groups on the modules or other species which impart amphiphilic character to the modules, and partly on the nature of the polymeric or other components. The thickness may be dependent on temperature, and the presence of solvent on the surface or located within the nanofilm. The thickness may be modified if the groups on the modules or other components which impart amphiphilic character, in particular the lipophilic moiety, to the component are removed or modified after the components have been coupled, or at other points during or after the process of preparation of a nanofilm. The thickness of a nanofilm may also depend on the structure and nature of the surface attachment groups on the components. The thickness of nanofilms may be less than about 300, 250, 200, 150, 100, 90, 80, 70, 60, 50, 40, 30, 20, 10 or 5 Å.

The nanofilm composition may include uniquely structured regions in which modules and/or other components are coupled. Coupling of modules and/or other components provides a nanofilm in which unique structures may be formed. Nanofilm structures define pores through which atoms, molecules, or particles of only up to a certain size and composition may pass. One variation of a nanofilm structure includes an area of nanofilm able to face a fluid medium, either liquid or gaseous, and provide pores or openings through which atoms, ions, small molecules, biomolecules, or other species are able to pass. The dimensions of the pores defined by nanofilm structures may be exemplified by quantum mechanical calculations and evaluations, and physical tests, as further described in the following Examples.

The dimensions of the pores defined by nanofilm structures are described by actual atomic and chemical structural features of the nanofilm. The approximate diameters of pores formed in the structure of a nanofilm are from about 1-150 Å, or more. In some embodiments, the dimensions of the pores are about 1-10 Å, about 3-15 Å, about 10-15 Å, about 15-20 Å, about 20-30 Å, about 30-40 Å, about 40-50 Å, about 50-75 Å, about 75-100 Å, about 100-125 Å, about 125-150 Å, about 150-300 Å, about 600-1000 Å. The approximate dimensions of pores formed in the structure of a nanofilm are useful to understand the porosity of the nanofilm. On the other hand, the porosity of conventional membranes is normally quantified by empirical results such as molecular weight cut-off, which reflects complex diffusive and other transport characteristics.

In one variation, a nanofilm structure may comprise an array of coupled modules which provides an array of pores of substantially uniform size. The pores of uniform size may be defined by the individual modules themselves. Each module defines a pore of a particular size, depending on the conformation and state of the module. For example, the conformation of the coupled module of the nanofilm may be different from the nascent, pure macrocyclic module in a solvent, and both may be different from the conformation of the amphiphilic module oriented on a surface before coupling. A nanofilm structure including an array of coupled modules can provide a matrix or lattice of pores of substantially uniform dimension based on the structure and conformation of the coupled modules.

Modules of various composition and structure may be prepared which define pores of different sizes. A nanofilm prepared from coupled modules may be made from any one of a variety of modules. Thus, nanofilms having pores of various dimensions are provided, depending on the particular module used to prepare the nanofilm.

In other instances, nanofilm structures define pores in the matrix of coupled modules or other components. Pores defined by nanofilm structures may have a wide range of dimensions, for example, dimensions capable of selectively blocking the passage of small molecules or large molecules. For example, nanofilm structures may be formed from the coupling of two or more modules, in which an interstitial pore is defined by the combined structure of the linked modules. A nanofilm may have an extended matrix of pores of various dimensions and characteristics. Interstitial pores may be, for example, less than about 5 Å, less than about 10 Å, about 3-15 Å, about 10-15 Å, about 15-20 Å, about 20-30 Å, about 30-40 Å, about 40-50 Å, about 50-75 Å, about 75-100 Å, about 100-125 Å, about 125-150 Å, about 150-300 Å, about 300-600 Å, about 600-1000 Å. In some variations, the other components may act as a “filler” to limit the porosity of the nanofilm. In other variations, the other components will provide porosity to the nanofilm, depending on the type and extent of cross-linking between the components.

The coupling process may result in a nanofilm in which regions of the nanofilm are not precisely monomolecular layers. Various types of local structures are possible which do not prevent use of the nanofilm in a variety of applications. Local structural features may include amphiphilic components or species, including polymeric species, which are flipped over relative to their neighbors, or turned in a different orientation, having their hydrophobic and hydrophilic facets oriented differently than neighboring species. Local structural features may also include overlaying or stacking of molecules in which the nanofilm is two or more molecular layers thick, local regions in which the interlinking of the modules or other components is not complete so that some of the available coupling groups are not coupled to other species, or local regions in which there is an absence of a particular molecule or component. Other local structural features may include grain boundaries and orientational faults. In one variation, the nanofilm has a thickness of up to 30 nanometers due to the layering of nanofilm structures.

The nanofilms disclosed herein may be substantially uniform with respect to the orientation of their amphiphilic components, but may in some embodiments comprise regions of local structural features as indicated hereinabove. Local structural features may comprise, for example, greater than about 30%, less than about 30%, less than about 20%, less than about 15%, less than about 10%, less than about 5%, less than about 3%, less than about 1% of the surface area of the nanofilm.

Phase and Domain Behaviour of Nanofilm

In some variations of a nanofilm having one or more polymeric components, the nanofilm may have domains in which a polymeric component or components are intermixed at the atomic level with macrocyclic modules or other species, and solubilized with each other. In these variations, the macrocyclic modules or other species may be miscible with the polymeric component.

In other variations of a nanofilm having one or more polymeric components, the polymeric molecules, macrocyclic modules, or other components may be located in finite-sized aggregates. Above some critical concentration in a particular solvent, polymeric molecules, macrocyclic modules, or other components may collect into finite-sized aggregates. These finite-sized aggregates may persist at the air-water interface in formation of a nanofilm. The structure of the aggregates may be affected by the geometry and shape of the molecules, among other factors, or the capability of the molecules to couple in particular orientations with other species. The structure of the aggregates may be highly dynamic with motion and exchange of the molecules at various rates. In these variations, the self assembled aggregates of one species may be interspersed in a continuous phase of another species, where the other species is not aggregated. Different molecules or components may form separate aggregates, or be combined in an aggregate structure. Coupling between macrocyclic modules or other components and the polymeric molecules may occur at a surface, edge, or point of the self assembled aggregates.

In further variations of a nanofilm having one or more polymeric components, the polymeric molecules may reside in domains that are substantially polymeric, which may be interspersed with domains composed substantially of other species. In these variations, a polymeric component may be immiscible or phase separated from macrocyclic modules or other components. Phase separation may occur when the aggregation of polymeric molecules is not limited to a small finite size, but may continue until regions of polymeric molecules are separated from regions of other molecules. The form of a polymeric component in these variations may be a solid, gel, or liquid-like polymer melt, or an amorphous composition, in the form of layers, beads, discs or mixtures thereof, and can be homogeneous or heterogeneous in structure or composition. Polymeric components of such nanofilms may form hard and soft domains typical of thermoplastic elastomers, or a polymeric component may form a soft domain relative to a hard domain of macrocyclic modules. A polymeric component may form regions which are amorphous, glassy, semicrystalline, or crystalline, or have subregions with those characteristics. A region of a polymeric component may exhibit rubberlike elasticity or viscoelastic states. Different polymeric components may form separate phases, or may be miscible with each other while remaining immiscible with macrocyclic modules or other components. Coupling between macrocyclic modules or other components and polymeric molecules may occur at or near the interface between the phases, and may contribute to adhesion of the phases.

A nanofilm may also be prepared with mixtures of different macrocyclic modules, or with mixtures of macrocyclic modules, polymeric components, and other species. A nanofilm may have an array of coupled modules and other species in which the positional ordering of the modules and other species is random, or is non-random with regions in which one type of species is predominant. In these variations, the polymeric component may be intermixed, aggregated, or phase separated from the macrocyclic modules and other species, as described above. Nanofilms made from mixtures of different modules, or with mixtures of macrocyclic modules and other amphiphilic molecules may also have interspersed arrays of pores of various sizes.

Methods of Preparing Nanofilms

In Langmuir film methods, a monolayer of oriented amphiphilic species, for example amphiphilic modules, amphiphilic polymers, and/or amphiphiles, is formed on the surface of a liquid subphase. In one example, the amphiphilic components may be dissolved in a solvent and deposited on an air-subphase interface in a Langmuir trough to form the monolayer. Typically, movable plates or barriers are used to compress the monolayer and decrease its surface area to form a more dense monolayer. At various degrees of compression, having corresponding surface pressures, the monolayer may reach various condensed states. Surfaces which may be used to orient amphiphiles include interfaces such as gas-liquid, air-water, immiscible liquid-liquid, liquid-solid, or gas-solid interfaces. The thickness of the oriented layer may be substantially a monomolecular layer thickness.

Surface pressure versus film area isotherms are obtained by the Wilhelmy balance method to monitor the state of the film. Extrapolation of the isotherm to zero surface pressure reveals the average surface area per component, or mean molecular area, before the components are coupled. The isotherm gives an empirical indication of the state of the thin film. Surface-oriented macrocyclic modules and/or other components in a nanofilm layer may be in an expanded state, a liquid state, or a liquid-expanded state, or may be condensed, collapsed, or a solid phase or close-packed state.

Nanofilms may be prepared by various alternative methods. For example, linker molecules may be added to the solution containing the modules and/or other components, which is subsequently deposited on the surface of the Langmuir subphase. Alternatively, the linker molecules may be added to the water subphase of the Langmuir trough, and subsequently transfer to the layer phase containing macrocyclic module and/or other components for coupling.

In one variation of this invention, a water-soluble polymeric component may be added to the subphase of a Langmuir trough. In other variations, a polymeric component may be dissolved in water or solvent and spread on an interface. One or more polymeric components may be co-spread on an interface with macrocyclic modules, and optionally with linker molecules. In other variations, one or more polymeric components may be co-spread on an interface with macrocyclic modules and/or linker molecules, and/or other amphiphilic molecules.

In some instances, macrocyclic modules and/or other components may be added to the subphase of the Langmuir trough, and subsequently transfer to the interface.

Other variations will be apparent to those of skill in the art.

In general, coupling of the components of a nanofilm may be initiated by chemical, thermal, photochemical, electrochemical, and irradiative methods. In some variations of this invention, the type of coupling of the components of a nanofilm may depend on the type of initiation and the chemical process involved. For example, in forming a nanofilm from a multicomponent mixture, species in the mixture which are polymerizable may produce polymeric components by non-selective chain or addition polymerization. The type of the coupling of macrocyclic modules to polymerizable species or polymeric components depends on the functional groups of the modules. For example, free radical polymerization of unsaturated polymeric components, amphiphiles, or monomers may couple polymeric components to benzene synthons of macrocyclic modules, or to other reactive or unsaturated sites.

Functional groups added to the modules or other components to impart amphiphilic character may in some embodiments be removed during or after formation of the nanofilm. In one embodiment, groups which impart amphiphilic character to a polymeric component may be removed after formation of the nanofilm. In another embodiment, groups which impart amphiphilic character to macrocyclic modules may be removed after formation of the nanofilm. The method of removal depends on the functional group. The groups attached to the modules which impart amphiphilic character to the component may include functional groups which can be used to remove the groups at some point during or after the process of formation of a nanofilm. Acid or base hydrolysis may be used to remove groups attached to the component via a carboxylate or amide linkage. An unsaturated group located in the functional group which imparts amphiphilic character to the module may be oxidized and cleaved by hydrolysis. Photolytic cleavage of the functional group which imparts amphiphilic character to the module may also be done. Examples of cleavable functional groups include

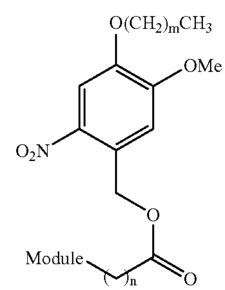

where n is zero to four, which is cleavable by light activation, and

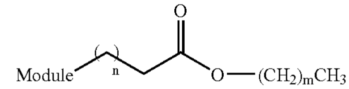

where n is zero to four, and m is 7 to 27, which is cleavable by acid or base catalyzed hydrolysis.

Examples of functional groups added to the components to impart amphiphilic character to the modules include alkyl groups, alkoxy groups, —NHR, —OC(O)R, —C(O)OR, —NHC(O)R, —C(O)NHR, —CH═CHR, and —C≡CR, where the carbon atoms of an alkyl group may be interrupted by one or more —S—, double bond, triple bond or —SiRR'— group(s), or substituted with one or more fluorine atoms, or any combination thereof, where R and R' are independently hydrogen or alkyl.

In alternative variations, the multicomponent mixtures of macrocyclic modules and/or other components may include additives, dispersants, surfactants, excipients, compatiblizers, emulsifiers, suspension agents, plasticizers, or other species which modify the properties of the components. For example, compatiblizers may be used to reduce domain sizes and form more continuous phase dispersion of the components of a nanofilm.

In some instances, the nanofilm may be derivatized to provide biocompatability or reduce fouling of the nanofilm by attachment or adsorption of biomolecules.

Nanofilms may be deposited on a substrate by various methods, such as Langmuir-Schaefer, Langmuir-Blodgett, or other methods used with Langmuir systems. In one variation, a nanofilm is deposited on a substrate in a Langmuir tank by locating the substrate in the subphase beneath the air-water interface, and lowering the level of the subphase until the nanofilm lands gently on the substrate and is therefore deposited. A description of Langmuir films and substrates is given in U.S. Pat. Nos. 6,036,778, 4,722,856, 4,554,076, and 5,102,798, and in R. A. Hendel et al., Vol. 119, *J. Am. Chem. Soc.* 6909-18 (1997). A description of films on substrates is given in Munir Cheryan, *Ultrafiltration and Microfiltration Handbook* (1998). A description of polymers on surfaces is given in Jacob N. Israelachvili, *Intermolecular and Surface Forces* (1991).

Other methods to prepare a nanofilm having polymeric components include forced removal of solvent to prepare a film, such as spin coating methods and spray coating methods, as well as coating and deposition methods including interfacial, dip coating, knife-edge coating, grafting, casting, phase inversion, or electroplating or other plating methods.

Nanofilms deposited on a substrate may be cured or annealed by chemical, thermal, photochemical, electrochemical, irradiative or drying methods during or after deposition on a substrate. For example, chemical methods include reactions with vapor phase reagents such as ethylenediamine or solution phase reagents. A nanofilm treated by any method to attach or couple it to a substrate may be said to be cured.

The deposition may result in non-covalent or weak attachment of the nanofilm to the substrate through physical interactions and weak chemical forces such as van der Waals forces and weak hydrogen bonding. The nanofilm may in some embodiments be bound to the substrate through ionic or covalent interaction, or other type of interaction.

The substrate may be any surface of any material. Substrates may be porous or non-porous, and may be made from polymeric and inorganic substances. Examples of porous substrates are plastics or polymers, track-etch polycarbonate, track-etch polyester, polyethersulfone, polysulfone, gels, hydrogels, cellulose acetate, polyamide, PVDF, polyethylene terephthalate or polybutylene terephthalate, polyvinyl chloride, polyvinylidene chloride, polytetrafluoroethylene, polyethylene or polypropylene, ceramics, anodic alumina, laser ablated and other porous polyimides, and UV etched polyacrylate. Examples of non-porous substrates are silicon, germanium, glass, metals such as platinum, nickel, palladium, aluminum, chromium, niobium, tantalum, titanium, steel, or gold, glass, silicates, aluminosilicates, non-porous polymers, and mica. Further examples of substrates include diamond and indium tin oxide. Preferred substrates include silicon, gold, $SiO_2$, polyethersulfone, and track etch polycarbonate. In some embodiments, the substrate is $SiO_2$. In other embodiments, the substrate is polycarbonate track etch membrane.

Substrates may have any physical shape or form including films, sheets, plates, or cylinders, and may be particles of any shape or size.

A nanofilm deposited on a substrate may serve as a membrane. Any number of layers of nanofilm may be deposited on the substrate to form a membrane. In some variations, nanofilm is deposited on both sides of a substrate.

A layer or layers of various spacing materials may be deposited or attached in between layers of a nanofilm, and a spacing layer may also be used in between the substrate and the first deposited layer of nanofilm. Examples of spacing layer compositions include polymeric compositions, hydrogels (acrylates, poly vinyl alcohols, polyurethanes, silicones), thermoplastic polymers (polyolefins, polyacetals, polycarbonates, polyesters, cellulose esters), polymeric foams, thermosetting polymers, hyperbranched polymers, biodegradable polymers such as polylactides, liquid crystalline polymers, polymers made by atom transfer radical polymerization (ATRP), polymers made by ring opening metathesis polymerization (ROMP), polyisobutylenes and polyisobutylene star polymers, and amphiphilic polymers. Other examples of spacing layer compositions include inorganics, such as inorganic particles such as inorganic microspheres, colloidal inorganics, inorganic minerals, silica spheres or particles, silica sols or gels, clays or clay particles, and the like. Examples of amphiphilic molecules include amphiphiles containing polymerizable groups such as diynes, enes, or amino-esters. The spacing layers may serve to modify barrier properties of the nanofilm, or may serve to modify transport, flux, or flow characteristics of the membrane or nanofilm. Spacing layers may serve to modify functional characteristics of the membrane or nanofilm, such as strength, modulus, or other properties. In some variations, the polymeric components of a nanofilm may provide a spacing layer between the nanofilm and a substrate.

In some variations, a nanofilm having polymeric components may be deposited on a surface and adhere to the surface to a degree sufficient for many applications, such as filtration and membrane separations, without coupling to the surface. Nanofilm having polymeric components may be advantageously cohesive to a substrate, which may include some coupling interactions.

In other variations, a nanofilm may be coupled to a substrate surface. Surface attachment groups may be provided on a polymeric component of a nanofilm, which may be used to couple the nanofilm to the substrate. Coupling of some, but not all of the surface attachment groups may be done to attach the nanofilm to the substrate. Optionally, surface attachment groups may be provided on the macrocyclic modules and/or other components of a nanofilm.

Examples of functional groups which may be used as surface attachment groups to couple a nanofilm to a substrate include amine groups, carboxylic acid groups, carboxylic ester groups, alcohol groups, glycol groups, vinyl groups, styrene groups, epoxide groups, thiol groups, magnesium halo or Grignard groups, acrylate groups, acrylamide groups, diene groups, aldehyde groups, and mixtures thereof.

A substrate may have functional groups which couple to the functional groups of a nanofilm. The functional groups of the substrate may be surface groups or linking groups bound to the substrate, which may be formed by reactions which bind the surface groups or linking groups to the substrate. Surface groups may also be created on the substrate by a variety of treatments such as cold plasma treatment, surface etching methods, solid abrasion methods, or chemical treatments. Some methods of plasma treatment are given in Inagaki, *Plasma Surface Modification and Plasma Polymerization*, Technomic, Lancaster, Pa., 1996. In some embodiments, the substrate is derivatized with APTES. In other embodiments, the substrate is derivatized with methylacryloxymethyltrimethoxysilane (MAOMTMOS). In other embodiments, the substrate is derivatized with acryloxypropyltrimethoxysilane (AOPTMOS).

Surface attachment groups of the nanofilm and the surface may be blocked with protecting groups until needed. Non-limiting examples of suitable functional groups for coupling the nanofilm to the substrate and the resulting linkages may be found in Tables 2 and 4. The functional groups on the nanofilm may be from any component of the nanofilm, for example, the macrocyclic modules, the polymer component, or the amphiphilic component.

Surface attachment groups may be connected to a nanofilm by spacer groups. Likewise, substrate functional groups may be connected to the substrate by spacer groups. Spacer groups for surface attachment groups may be polymeric. Examples of polymeric spacers include polyethylene oxides, polypropylene oxides, polysaccharides, polylysines, polypeptides, poly(amino acids), polyvinylpyrrolidones, polyesters, polyvinylchlorides, polyvinylidene fluorides, polyvinylalcohols, polyurethanes, polyamides, polyimides, polysulfones, polyethersulfones, polysulfonamides, and polysulfoxides. Examples of polymeric spacer structures include linear, branched, comb and dendrimeric polymers, random and block copolymers, homo- and heteropolymers, flexible and rigid chains. Spacer groups for surface attachment groups may also include bifunctional linker groups or heterobifunctional linker groups used to couple biomolecules and other chemical species.

In one variation, a photoreactive group such as a benzophenone is bound to the substrate. The photoreactive group may be activated with light, for example, ultraviolet light, to provide a reactive species which couples to a nanofilm. The photoreactive species may couple to any atom or group of atoms of the nanofilm.

Surface attachment of modules may also be achieved through ligand-receptor mediated interactions, such as biotin-streptavidin. For example, the substrate may be coated with streptavidin, and biotin may be attached to the modules, for example, through linker groups such as PEG or alkyl groups.

Membranes and Filtration Function

The nanofilms described herein may be useful, for example, as membranes. The membrane may be brought into contact with a fluid or solution, separating a species or component from that fluid or solution, for example, for purposes of filtration. Normally, a membrane is a substance which acts as a barrier to block the passage of some species, while allowing restricted or regulated passage of other species. In general, permeants may traverse the membrane if they are smaller than a cut-off size, or have a molecular weight smaller than a so-called cut-off molecular weight. The membrane may be called impermeable to species which are larger than the cut-off molecular weight. The cut-off size or molecular weight is a characteristic property of the membrane. Selective permeation is the ability of the membrane to cut-off, restrict, or regulate passage of some species, while allowing smaller species to pass. Thus, the selective permeation of a membrane may be described functionally in terms of the largest species able to pass the membrane under given conditions. The size or molecular weight of various species may also be dependent on the conditions in the fluid to be separated, which may determine the form of the species. For example, species may have a sphere of hydration or solvation in a fluid, and the size of the species in relation to membrane applications may or may not include the water of hydration or the solvent molecules. Thus, a membrane is permeable to a species of a fluid if the species can traverse the membrane in the form in which it normally would be found in the fluid. Permeation and permeability may be affected by interaction between the species of a fluid and the membrane itself. While various theories may describe these interactions, the empirical measurement of pass/no-pass information relating to a nanofilm, membrane, or module is a useful tool to describe permeation properties. A membrane is impermeable to a species if the species cannot pass through the membrane.

Pores may be provided in the nanofilms described herein, for example, pores may be supplied in the structure of the nanofilm. Pores may be supplied in the structure of the macrocyclic modules. Pores may in some cases be supplied from the packing of the macrocyclic modules and the polymeric components. The type and degree of crosslinking between components may influence pore size. The nanofilms described herein comprising one or more polymeric components may advantageously have reduced numbers of micrometer-sized or macroscopic openings which affect use in filtration and selective permeation.

The nanofilms may have molecular weight species cut offs of, for example, greater than about 15 kDa, greater than about 10 kDa, greater than about 5 kDa, greater that about 1 kDa, greater than about 800 Da, greater than about 600 Da, greater than about 400 Da, greater than about 200 Da, greater than about 100 Da, greater than about 50 Da, greater than about 20 Da, less than about 15 kDa, less than about 10 kDa, less than about 5 kDa, less that about 1 kDa, less than about 800 Da, less than about 600 Da, less than about 400 Da, less than about 200 Da, less than about 100 Da, less than about 50 Da, less than about 20 Da, about 13 kDa, about 190 Da, about 100 Da, about 45 Da, about 20 Da.

"High permeability" indicates a clearance of, for example, greater than about 70%, greater than about 80%, greater than about 90% of the solute. "Medium permeability" indicates a clearance of, for example, less than about 50%, less than about 60%, less than about 70% of the solute. "Low permeability" indicates a clearance of less than, for example, about 10%, less than about 20%, less than about 30% of the solute. A membrane is impermeable to a species if it has a very low clearance (for example, less than about 5%, less than about 3%) for the species, or if it has very high rejection for the species (for example, greater than about 95%, greater than about 98%). The passage or exclusion of a solute is measured by its clearance, which reflects the portion of solute that actually passes through the membrane. For example, the no pass symbol in Tables 16-17 indicates that the solute is partly excluded by the module, sometimes less than 90% rejection, often at least 90% rejection, sometimes at least 98% rejection. The pass symbol indicates that the solute is partly cleared by the module, sometimes less than 90% clearance, often at least 90% clearance, sometimes at least 98% clearance.

Examples of processes in which nanofilms may be useful include processes involving liquid or gas as a continuous fluid phase, filtration, clarification, fractionation, pervaporation, reverse osmosis, dialysis, hemodialysis, affinity separation, oxygenation, and other processes. Filtration applications may include ion separation, desalinization, gas separation, small molecule separation, separation of enantiomers, ultrafiltration, microfiltration, hyperfiltration, water purification, sewage treatment, removal of toxins, removal of biological species such as bacteria, viruses, or fungus.

Synthons and Macrocyclic Modules

Synthons

As used herein, the term "synthon" refers to a molecule used to make a macrocyclic module. A synthon may be substantially one isomeric configuration, for example, a single enantiomer. A synthon may be substituted with functional groups which are used to couple a synthon to another synthon or synthons, and which are part of the synthon. A synthon may be substituted with an atom or group of atoms which are used to impart hydrophilic, lipophilic, or amphiphilic character to the synthon or to species made from the synthon. The synthon before being substituted with functional groups or groups used to impart hydrophilic, lipophilic, or amphiphilic character may be called the core synthon. As used herein, the term "synthon" refers to a core synthon, and also refers to a synthon substituted with functional groups or groups used to impart hydrophilic, lipophilic, or amphiphilic character.

As used herein, the term "cyclic synthon" refers to a synthon having one or more ring structures. Examples of ring structures include aryl, heteroaryl, and cyclic hydrocarbon structures including bicyclic ring structures and multicyclic ring structures. Examples of core cyclic synthons include, but are not limited to, benzene, cyclohexadiene, cyclopentadiene, naphthalene, anthracene, phenylene, phenanthracene, pyrene, triphenylene, phenanthrene, pyridine, pyrimidine, pyridazine, biphenyl, bipyridyl, cyclohexane, cyclohexene, decalin, piperidine, pyrrolidine, morpholine, piperazine, pyrazolidine, quinuclidine, tetrahydropyran, dioxane, tetrahydrothiophene, tetrahydrofuran, pyrrole, cyclopentane, cyclopentene, triptycene, adamantane, bicyclo[2.2.1]heptane, bicyclo[2.2.1]heptene, bicyclo[2.2.2]octane, bicyclo[2.2.2]octene, bicyclo[3.3.0]octane, bicyclo[3.3.0]octene, bicyclo[3.3.1]nonane, bicyclo[3.3.1]nonene, bicyclo[3.2.2]nonane, bicyclo[3.2.2]nonene, bicyclo[4.2.2]decane, 7-azabicyclo[2.2.1]heptane, 1,3-diazabicyclo[2.2.1]heptane, and spiro[4.4]nonane. A core synthon comprises all isomers or arrangements of coupling the core synthon to other synthons. For example, the core synthon benzene includes synthons such as 1,2- and 1,3-substituted benzenes, where the linkages between synthons are formed at the 1,2- and 1,3-positions of the benzene ring, respectively. For example, the core synthon benzene includes 1,3-substituted synthons such as

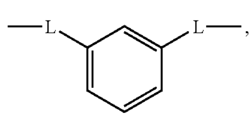

where L is a linkage between synthons and the 2, 4, 5, 6 positions of the benzene ring may also have substituents. A condensed linkage between synthons involves a direct coupling between a ring atom of one cyclic synthon to a ring atom of another cyclic synthon, for example, where synthons M—X and M—X couple to form M—M, where M is a cyclic synthon and X is halogen; as for example when M is phenyl resulting in the condensed linkage

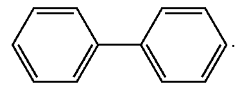

Macrocyclic Modules

A macrocyclic module is a closed ring of coupled synthons. To make a macrocyclic module, synthons may be substituted with functional groups to couple the synthons to form a macrocyclic module. Synthons may also be substituted with functional groups which will remain in the structure of the macrocyclic module. Functional groups which remain in the macrocyclic module may be used to couple the macrocyclic module to other macrocyclic modules or other components.

A macrocyclic module may contain from three to about twenty-four cyclic synthons. In the closed ring of a macrocyclic module, a first cyclic synthon may be coupled to a second cyclic synthon, the second cyclic synthon may be coupled to a third cyclic synthon, the third cyclic synthon may be coupled to a fourth cyclic synthon, if four cyclic synthons are present in the macrocyclic module, the fourth to a fifth, and so on, until an $n^{th}$ cyclic synthon may be coupled to its predecessor, and the $n^{th}$ cyclic synthon may be coupled to the first cyclic synthon to form a closed ring of cyclic synthons. In one variation, the closed ring of the macrocyclic module may be formed with a linker molecule.

A macrocyclic module may be an amphiphilic macrocyclic module when hydrophilic and lipophilic functional groups exist in the structure. The amphiphilic character of a macrocyclic module may arise from atoms in the synthons, in the linkages between synthons, or in functional groups coupled to the synthons or linkages.

In some variations, one or more of the synthons of a macrocyclic module may be substituted with one or more lipophilic moieties, while one or more of the synthons may be substituted with one or more hydrophilic moieties, thereby forming an amphiphilic macrocyclic module. Lipophilic and hydrophilic moieties may be coupled to the same synthon or linkage in an amphiphilic macrocyclic module. Lipophilic and hydrophilic moieties may be coupled to the macrocyclic module before or after formation of the closed ring of the macrocyclic module. For example, lipophilic or hydrophilic moieties may be added to the macrocyclic module after formation of the closed ring by substitution of a synthon or linkage.

The amphiphilicity of a macrocyclic module may be characterized in part by its ability to form a stable Langmuir film. A Langmuir film may be formed on a Langmuir trough at a particular surface pressure measured in milliNewtons per meter (mN/m) with a particular barrier speed measured in millimeters per minute (mm/min), and the isobaric creep or change in film area at constant surface pressure can be measured to characterize stability of the film. For example, a stable Langmuir film of macrocyclic modules on a water subphase may have an isobaric creep at 5-15 mN/m such that the majority of the film area is retained over a period of time of about one hour. Examples of stable Langmuir films of macrocyclic modules on a water subphase may have isobaric creep at 5-15 mN/m such that about 70% of the film area is retained over a period of time of about 30 minutes, sometimes about 70% of the film area is retained over a period of time of about 40 minutes, sometimes about 70% of the film area is retained over a period of time of about 60 minutes, and sometimes about 70% of the film area is retained over a period of time of about 120 minutes. Other examples of stable Langmuir films of macrocyclic modules on a water subphase may have isobaric creep at 5-15 mN/m such that about 80% of the film area is retained over a period of time of about thirty minutes, sometimes about 85% of the film area is retained over a period of time of about thirty minutes, sometimes about 90% of the film area is retained over a period of time of about thirty minutes, sometimes about 95% of the film area is retained over a period of time of about thirty minutes, and sometimes about 98% of the film area is retained over a period of time of about thirty minutes.

In one aspect, an individual macrocyclic module may include a pore in its structure. Each macrocyclic module may define a pore of a particular size, depending on the conformation and state of the module. Various macrocyclic modules may be prepared which define pores of different sizes.

A macrocyclic module may have flexibility in its structure. Flexibility may permit a macrocyclic module to more easily form linkages with other macrocyclic modules and/or other components by coupling reactions. Flexibility of a macrocyclic module may also play a role in regulating passage of species through the pore of the macrocyclic module. For example, flexibility may affect the dimension of the pore of an individual macrocyclic module since various conformations may be available to the structure. For example, the macrocyclic module may have a certain pore dimension in one conformation when no substituents are located at the pore, and the same macrocyclic module may have a different pore dimension in another conformation when one or more substituents of that macrocycle are located at the pore. Likewise, a macrocyclic module may have a certain pore dimension in one conformation when one group of substituents are located at the pore, and have a different pore dimension in a different conformation when a different group of substituents are located at the pore. For example, the "one group" of substituents located at the pore may be three alkoxy groups arranged in one regioisomer, while the "different group" of substituents may be two alkoxy groups arranged in another regioisomer. The effect of the "one group" of substituents located at the pore and the "different group" of substituents located at the pore is to provide a macrocyclic module composition which may regulate transport and filtration, in conjunction with other regulating factors.

In making macrocyclic modules from synthons, the synthons may be used as a substantially pure single isomer, for example, as a pure single enantiomer.

In making macrocyclic modules from synthons, one or more coupling linkages are formed between adjacent synthons. The linkage formed between synthons may be the product of the coupling of one functional group on one synthon to a complementary functional group on a second synthon. For example, a hydroxyl group of a first synthon may couple with an acid group or acid halide group of a second synthon to form an ester linkage between the two synthons. Another example is an imine linkage, —CH═N—, resulting from the reaction of an aldehyde, —CH═O, on one synthon with an amine, $—NH_2$, on another synthon. Examples of suitable complementary functional groups and linkages between synthons are shown in Table 2, wherein "synthon" may substitute for "module".

The functional groups of synthons used to form linkages between synthons or other macrocyclic modules may be separated from the synthon by a spacer. A spacer can be any atom or group of atoms which couples the functional group to the synthon, and does not interfere with the linkage-forming reaction. A spacer is part of the functional group, and becomes part of the linkage between synthons. An example of a spacer is a methylene group, $—CH_2—$. The spacer may be said to extend the linkage between synthons. For example, if one methylene spacer were inserted in an imine linkage, —CH═N—, the resulting imine linkage may be $—CH_2CH═N—$.

A linkage between synthons may also contain one or more atoms provided by an external moiety other than the two functional groups of the synthons. An external moiety may be a linker molecule which may couple with the functional group of one synthon to form an intermediate which couples with a functional group on another synthon to form a linkage between the synthons, such as, for example, to form a closed ring of synthons from a series of coupled synthons. An example of a linker molecule is formaldehyde. For example, amino groups on two synthons may undergo Mannich reaction in the presence of formaldehyde as the linker molecule to produce the linkage $—NHCH_2NH—$. Examples of suitable functional groups and linker molecules are shown in Table 4, wherein "synthon" may substitute for "module."

A macrocyclic module may include functional groups for coupling the macrocyclic module to a solid surface, substrate, or support. Examples of functional groups of macrocyclic modules which can be used to couple to a substrate or surface include amine, carboxylic acid, carboxylic ester, benzophenone and other light activated crosslinkers, alcohol, glycol, vinyl, styryl, olefin styryl, epoxide, thiol, magnesium halo or Grignard, acrylate, acrylamide, diene, aldehyde, and mixtures thereof. These functional groups may be coupled to the closed ring of the macrocyclic module, and may optionally be attached by a spacer group. Examples of solid surfaces include metal surfaces, ceramic surfaces, polymer surfaces, semiconductor surfaces, silicon wafer surfaces, alumina surfaces, and so on. Examples of functional groups of macrocyclic modules which can be used to couple to a substrate or surface further include those described in the left hand column of Tables 2-4. Methods of initiating coupling of the modules to the substrate include chemical, thermal, photochemical, electrochemical, and irradiative methods.

Examples of spacer groups include polyethylene oxides, polypropylene oxides, polysaccharides, polylysines, polypeptides, poly(amino acids), polyvinylpyrrolidones, polyesters, polyvinylchlorides, polyvinylidene fluorides, polyvinylalcohols, polyurethanes, polyamides, polyimides, polysulfones, polyethersulfones, polysulfonamides, and polysulfoxides.

In one embodiment, the macrocyclic module composition comprises: from three to about twenty-four cyclic synthons coupled to form a closed ring; at least two functional groups for coupling the closed ring to complementary functional groups on at least two other closed rings; wherein each functional group and each complementary functional group comprises a functional group containing atoms selected from the group consisting of C, H, N, O, Si, P, S, B, Al, halogens, and metals from the alkali and alkaline earth groups. The composition may comprise at least two closed rings coupled through said functional groups. The composition may comprise at least three closed rings coupled through said functional groups.

In another embodiment, the macrocyclic module composition comprises: from three to about twenty-four cyclic synthons coupled to form a closed ring defining a pore; the closed ring having a first pore dimension in a first conformation when a first group of substituents is located at the pore and a second pore dimension in a second conformation when a second group of substituents is located at the pore; wherein each substituent of each group comprises a functional group containing atoms selected from the group consisting of C, H, N, O, Si, P, S, B, Al, halogens, and metals from the alkali and alkaline earth groups.

In another embodiment, the macrocyclic module composition comprises: (a) from three to about twenty-four cyclic synthons coupled to form a closed ring defining a pore; (b) at least one functional group coupled to the closed ring at the pore and selected to transport a selected species through the pore, wherein the at least one functional group comprises a functional group containing atoms selected from the group consisting of C, H, N, O, Si, P, S, B, Al, halogens, and metals from the alkali and alkaline earth groups; (c) a selected species to be transported through the pore. The selected species may, in one example, be selected from the group of ovalbumin, glucose, creatinine, $H_2PO_4^-$, $HPO_4^{-2}$, $HCO_3^-$, urea, $Na^+$, $Li^+$, and $K^+$.

In some embodiments, the cyclic synthons are each independently selected from the group consisting of benzene, cyclohexadiene, cyclohexene, cyclohexane, cyclopentadiene, cyclopentene, cyclopentane, cycloheptane, cycloheptene, cycloheptadiene, cycloheptatriene, cyclooctane, cyclooctene, cyclooctadiene, cyclooctatriene, cyclooctatetraene, naphthalene, anthracene, phenylene, phenanthracene, pyrene, triphenylene, phenanthrene, pyridine, pyrimidine, pyridazine, biphenyl, bipyridyl, decalin, piperidine, pyrrolidine, morpholine, piperazine, pyrazolidine, quinuclidine, tetrahydropyran, dioxane, tetrahydrothiophene, tetrahydrofuran, pyrrole, triptycene, adamantane, bicyclo[2.2.1]heptane, bicyclo[2.2.1]heptene, bicyclo[2.2.2]octane, bicyclo[2.2.2]octene, bicyclo[3.3.0]octane, bicyclo[3.3.0]octene, bicyclo[3.3.1]nonane, bicyclo[3.3.1]nonene, bicyclo[3.2.2]nonane, bicyclo[3.2.2]nonene, bicyclo[4.2.2]decane, 7-azabicyclo[2.2.1]heptane, 1,3-diazabicyclo[2.2.1]heptane, and spiro[4.4]nonane.

In some embodiments, each coupled cyclic synthon is independently coupled to two adjacent synthons by a linkage selected from the group consisting of (a) a condensed linkage, and (b) a linkage selected from the group consisting of —NRC(O)—, —OC(O)—, —O—, —S—S—, —S—, —NR—, —(CRR')$_p$—, —$CH_2$NH—, —C(O)S—, —C(O)O—, —C≡C—, —C≡C—C≡C—, —CH(OH)—, —HC═CH—, —NHC(O)NH—, —NHC(O)O—, —$NHCH_2NH$—, —$NHCH_2CH(OH)CH_2NH$—, —N═CH($CH_2$)$_p$CH═N—, —$CH_2CH(OH)CH_2$—, —N═CH($CH_2$)$_h$CH═N— where h is 1-4, —CH═N—NH—, —OC(O)O—, —OP(O)(OH)O—, —$CH(OH)CH_2NH$—, —CH(OH)$CH_2$—, —CH(OH)C($CH_3$)$_2$C(O)O—,

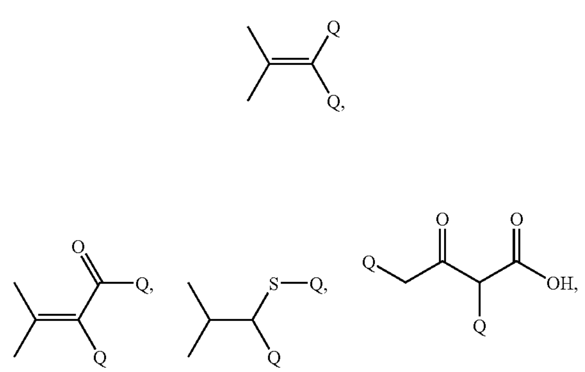

-continued

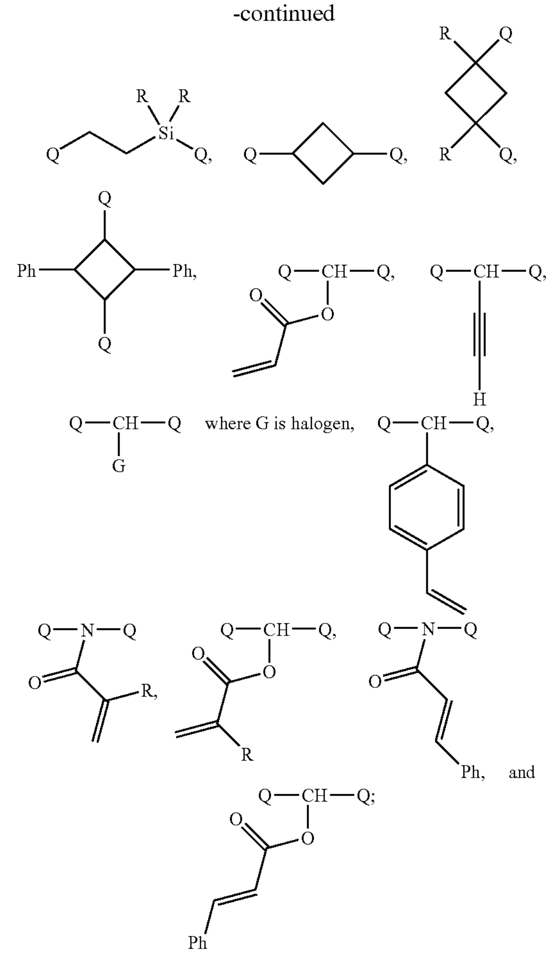

wherein p is 1-6; wherein R and R' are each independently selected from the group of hydrogen and alkyl; wherein the linkage is independently configured in either of two possible configurations, forward and reverse, with respect to the synthons it couples together, if the two configurations are different structures; wherein Q is one of the synthons connected by the linkage.

In one variation, a macrocyclic module may be a closed ring composition of the formula:

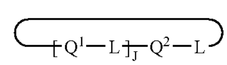

wherein: the closed ring comprises a total of from three to twenty-four synthons Q; J is 2-23; $Q^1$ are synthons each independently selected from the group consisting of (a) aryl synthons, (b) heteroaryl synthons, (c) saturated cyclic hydrocarbon synthons, (d) unsaturated cyclic hydrocarbon synthons, (e) saturated bicyclic hydrocarbon synthons, (f) unsaturated bicyclic hydrocarbon synthons, (g) saturated multicyclic hydrocarbon synthons, and (h) unsaturated multicyclic hydrocarbon synthons; wherein ring positions of each $Q^1$ which are not coupled to a linkage L are independently substituted with hydrogen or a functional group containing atoms selected from the group of C, H, N, O, Si, P, S, B, Al, halogens, and metals from the alkali and alkaline earth groups; $Q^2$ is a synthon independently selected from the group consisting of (a) aryl synthons, (b) heteroaryl synthons, (c) saturated cyclic hydrocarbon synthons, (d) unsaturated cyclic hydrocarbon synthons, (e) saturated bicyclic hydrocarbon synthons, (f) unsaturated bicyclic hydrocarbon synthons, (g) saturated multicyclic hydrocarbon synthons, and (h) unsaturated multicyclic hydrocarbon synthons; wherein ring positions of $Q^2$ which are not coupled to an L are independently substituted with hydrogen or a functional group containing atoms selected from the group consisting of C, H, N, O, Si, P, S, B, Al, halogens, and metals from the alkali and alkaline earth groups; L are linkages between the synthons each independently selected from the group consisting of synthon-synthon, —NRC(O)—, —OC(O)—, —O—, —S—S—, —S—, —NR—, —$(CRR')_p$—, —$CH_2NH$—, —C(O)S—, —C(O)O—, —C≡C—, —C≡C—C≡C—, —CH(OH)—, —HC═CH—, —NHC(O)NH—, —NHC(O)O—, —$NHCH_2NH$—, —$NHCH_2CH(OH)CH_2NH$—, —N═$CH(CH_2)_p$CH═N—, —$H_2CH(OH)CH_2$—, —N═$CH(CH_2)_h$CH═N— where h is 1-4, —CH═N—NH—, —OC(O)O—, —OP(O)(OH)O—, —CH(OH)$CH_2NH$—, —CH(OH)$CH_2$—, —CH(OH)$C(CH_3)_2$C(O)O—,

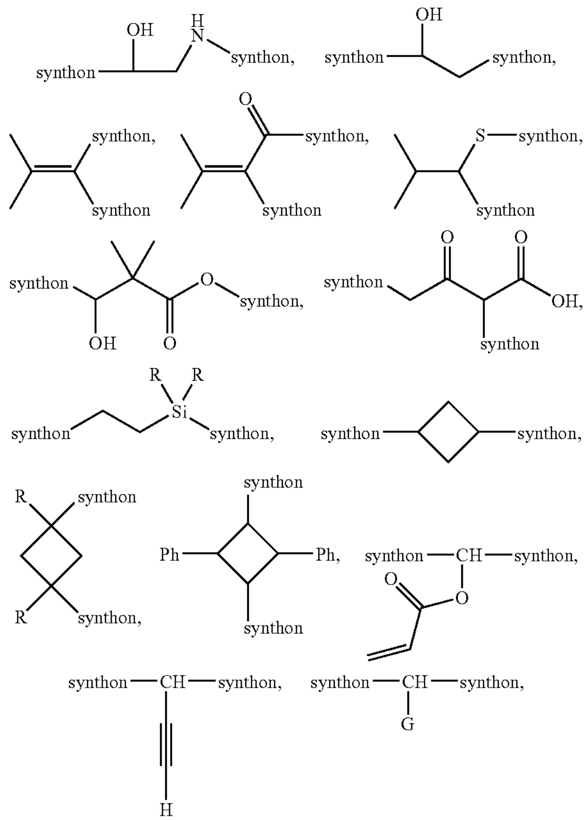

where G is halogen,

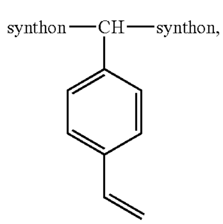

-continued

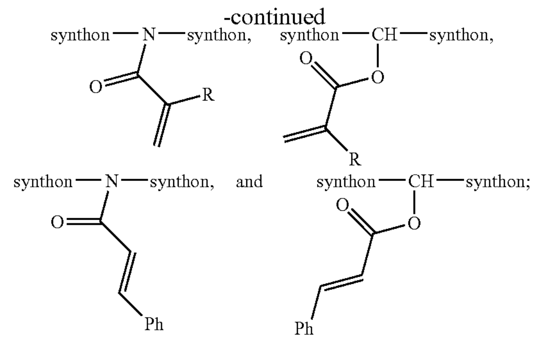

wherein p is 1-6; wherein R and R' are each independently selected from the group of hydrogen and alkyl; wherein the linkages L are each independently configured with respect to the $Q^1$ and $Q^2$ synthons, each L having either of its two possible configurations with respect to the synthons it couples together, the forward and reverse configurations of the linkage with respect to the immediately adjacent synthons to which it couples, for example, $Q^1_a$—NHC(O)—$Q^1_b$ and $Q^1_a$—C(O)NH—$Q^1_b$, if the two configurations are isomerically different structures. Synthons $Q^1$, when independently selected, may be any cyclic synthon as described, so that the J synthons $Q^1$ may be found in the closed ring in any order, for example, cyclohexyl-1,2-phenyl-piperidinyl-1,2-phenyl-1,2-phenyl-cyclohexyl, and so on, and the J linkages L may also be independently selected and configured in the closed ring. The macrocyclic modules represented and encompassed by the formula include all stereoisomers of the synthons involved, so that a wide variety of stereoisomers of the macrocyclic module are included for each closed ring composition of synthons.

In other embodiments, the macrocyclic module may comprise a closed ring composition of the formula:

$$\left(-\left[Q^1-L\right]_J-Q^2-L-\right)$$

wherein: J is 2-23; $Q^1$ are synthons each independently selected from the group consisting of (a) phenyl synthons coupled to linkages L at 1,2-phenyl positions, (b) phenyl synthons coupled to linkages L at 1,3-phenyl positions, (c) aryl synthons other than phenyl synthons, (d) heteroaryl synthons other than pyridinium synthons, (e) saturated cyclic hydrocarbon synthons, (f) unsaturated cyclic hydrocarbon synthons, (g) saturated bicyclic hydrocarbon synthons, (h) unsaturated bicyclic hydrocarbon synthons, (i) saturated multicyclic hydrocarbon synthons, and (j) unsaturated multicyclic hydrocarbon synthons; wherein ring positions of each $Q^1$ which are not coupled to a linkage L are independently substituted with hydrogen or a functional group containing atoms selected from the group of C, H, N, O, Si, P, S, B, Al, halogens, and metals from the alkali and alkaline earth groups; $Q^2$ is a synthon independently selected from the group consisting of (a) aryl synthons other than phenyl synthons and naphthalene synthons coupled to linkages L at 2,7-naphthyl positions, (b) heteroaryl synthons other than pyridine synthons coupled to linkages L at 2,6-pyridino positions, (c) saturated cyclic hydrocarbon synthons other than cyclohexane synthons coupled to linkages L at 1,2-cyclohexyl positions, (d) unsaturated cyclic hydrocarbon synthons other than pyrrole synthons coupled to linkages L at 2,5-pyrrole positions, (e) saturated bicyclic hydrocarbon synthons, (f) unsaturated bicyclic hydrocarbon synthons, (g) saturated multicyclic hydrocarbon synthons, and (h) unsaturated multicyclic hydrocarbon synthons; wherein ring positions of $Q^2$ which are not coupled to an L are independently substituted with hydrogen or a functional group containing atoms selected from the group consisting of C, H, N, O, Si, P, S, B, Al, halogens, and metals from the alkali and alkaline earth groups; L are linkages between the synthons each independently selected from the group consisting of (a) a condensed linkage, and (b) a linkage selected from the group consisting of —NRC(O)—, —OC(O)—, —O—, —S—S—, —S—, —NR—, —(CRR')$_p$—, —$CH_2$NH—, —C(O)S—, —C(O)O—, —C≡C—, —C≡C—C≡C—, —CH(OH)—, —HC═CH—, —NHC(O)NH—, —NHC(O)O—, —$NHCH_2NH$—, —$NHCH_2CH(OH)CH_2NH$—, —N═CH($CH_2$)$_p$CH═N—, —$CH_2CH(OH)CH_2$—, —N═CH($CH_2$)$_h$CH═N— where h is 1-4, —CH═N—NH—, —OC(O)O—, —OP(O)(OH)O—, —CH(OH)$CH_2$NH—, —CH(OH)$CH_2$—, —CH(OH)C($CH_3$)$_2$C(O)O—,

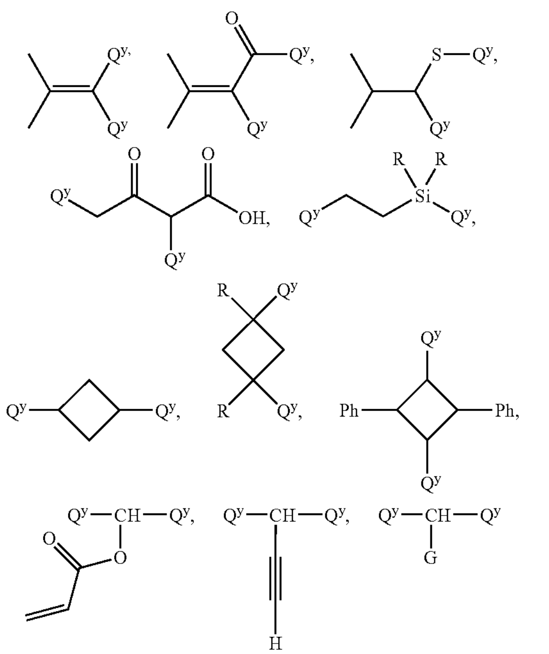

where G is halogen,

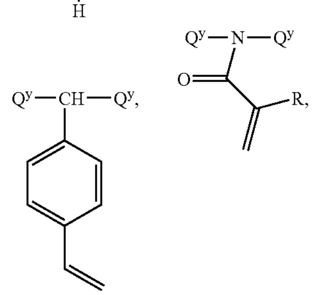

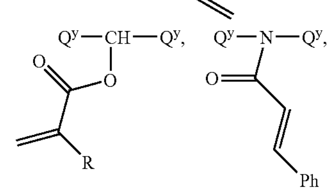

and

-continued

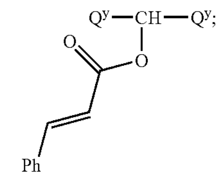

wherein p is 1-6; wherein R and R' are each independently selected from the group of hydrogen and alkyl; wherein linkages L are each independently configured in either of two possible configurations, forward and reverse, with respect to the synthons it couples together, if the two configurations are different structures; wherein y is 1 or 2, and $Q^y$ are each independently one of the $Q^1$ or $Q^2$ synthons connected by the linkage.

In another embodiment, the macrocyclic module may comprise a closed ring composition of the formula:

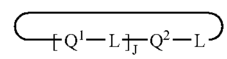

wherein: J is 2-23; $Q^1$ are synthons each independently selected from the group consisting of (a) phenyl synthons coupled to linkages L at 1,2-phenyl positions, (b) phenyl synthons coupled to linkages L at 1,3-phenyl positions, and (c) cyclohexane synthons coupled to linkages L at 1,2-cyclohexyl positions; wherein ring positions of each $Q^1$ which are not coupled to a linkage L are independently substituted with hydrogen or a functional group containing atoms selected from the group of C, H, N, O, Si, P, S, B, Al, halogens, and metals from the alkali and alkaline earth groups; $Q^2$ is a cyclohexane synthon coupled to linkages L at 1,2-cyclohexyl positions; wherein ring positions of $Q^2$ which are not coupled to an L are independently substituted with hydrogen or a functional group containing atoms selected from the group consisting of C, H, N, O, Si, P, S, B, Al, halogens, and metals from the alkali and alkaline earth groups; L are linkages between the synthons each independently selected from the group consisting of (a) a condensed linkage, and (b) a linkage selected from the group consisting of —NRC(O)—, —OC(O)—, —O—, —S—S—, —S—, —NR—, —(CRR')$_p$—, —$CH_2$NH—, —C(O)S—, —C(O)O—, —C≡C—, —C≡C—C≡C—, —CH(OH)—, —HC═CH—, —NHC(O)NH—, —NHC(O)O—, —$NHCH_2NH$—, —$NHCH_2CH(OH)CH_2NH$—, —N═CH($CH_2$)$_p$CH═N—, —$CH_2CH(OH)CH_2$—, —N═CH($CH_2$)$_h$CH═N— where h is 1-4, —CH═N—NH—, —OC(O)O—, —OP(O)(OH)O—, —CH(OH)$CH_2$NH—, —CH(OH)$CH_2$—, —CH(OH)C($CH_3$)$_2$C(O)O—,

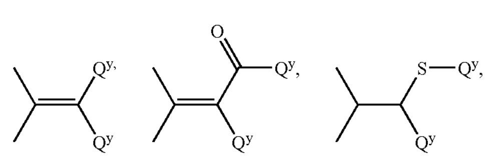

-continued

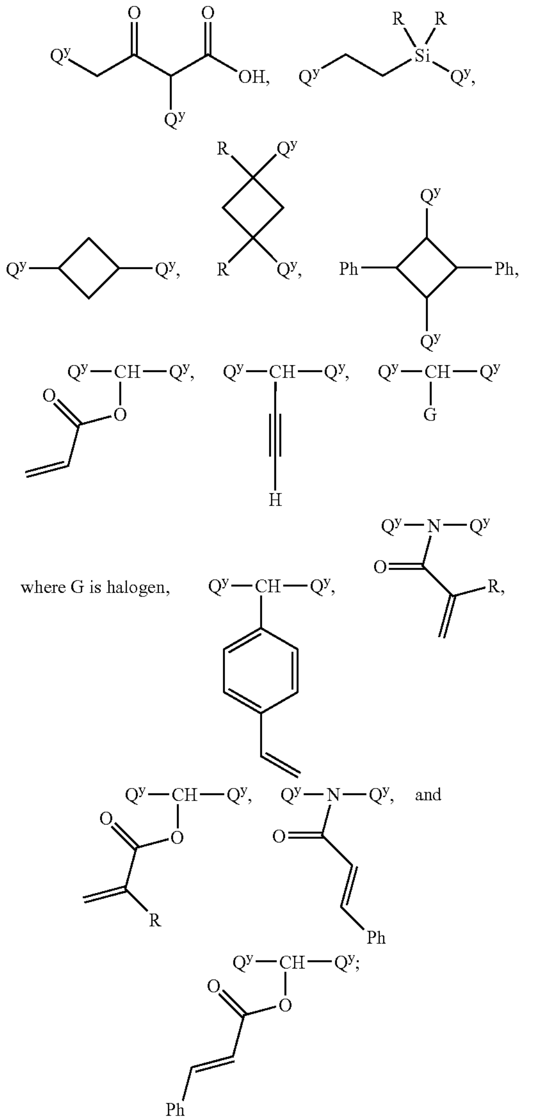

wherein p is 1-6; wherein R and R' are each independently selected from the group of hydrogen and alkyl; wherein linkages L are each independently configured in either of two possible configurations, forward and reverse, with respect to the synthons it couples together, if the two configurations are different structures; wherein y is 1 or 2, and $Q^y$ are each independently one of the $Q^1$ or $Q^2$ synthons connected by the linkage.

In another embodiment, the macrocyclic module comprises a closed ring composition of the formula:

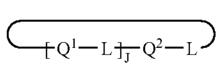

wherein: J is 2-23; $Q^1$ are synthons each independently selected from the group consisting of (a) phenyl synthons coupled to linkages L at 1,4-phenyl positions, (b) aryl synthons other than phenyl synthons, (c) heteroaryl synthons, (d) saturated cyclic hydrocarbon synthons, (e) unsaturated cyclic hydrocarbon synthons, (f) saturated bicyclic hydrocarbon synthons, (g) unsaturated bicyclic hydrocarbon synthons, (h) saturated multicyclic hydrocarbon synthons, and (i) unsaturated multicyclic hydrocarbon synthons; wherein at least one of $Q^1$ is a phenyl synthon coupled to linkages L at 1,4-phenyl positions, and wherein ring positions of each $Q^1$ which are not coupled to a linkage L are independently substituted with hydrogen or a functional group containing atoms selected from the group of C, H, N, O, Si, P, S, B, Al, halogens, and metals from the alkali and alkaline earth groups; $Q^2$ is a synthon independently selected from the group consisting of (a) aryl synthons other than phenyl synthons and naphthalene synthons coupled to linkages L at 2,7-naphthyl positions, (b) heteroaryl synthons, (c) saturated cyclic hydrocarbon synthons other than cyclohexane synthons coupled to linkages L at 1,2-cyclohexyl positions, (d) unsaturated cyclic hydrocarbon synthons, (e) saturated bicyclic hydrocarbon synthons, (f) unsaturated bicyclic hydrocarbon synthons, (g) saturated multicyclic hydrocarbon synthons, and (h) unsaturated multicyclic hydrocarbon synthons; wherein ring positions of $Q^2$ which are not coupled to an L are independently substituted with hydrogen or a functional group containing atoms selected from the group consisting of C, H, N, O, Si, P, S, B, Al, halogens, and metals from the alkali and alkaline earth groups; L are linkages between the synthons each independently selected from the group consisting of (a) a condensed linkage, and (b) a linkage selected from the group consisting of —NRC(O)—, —OC(O)—, —O—, —S—S—, —S—, —NR—, —$(CRR')_p$—, —$CH_2NH$—, —C(O)S—, —C(O)O—, —C≡C—, —C≡C—C≡C—, —CH(OH)—, —HC=CH—, —NHC(O)NH—, —NHC(O)O—, —$NHCH_2NH$—, —$NHCH_2CH(OH)CH_2NH$—, —N=CH$(CH_2)_p$CH=N—, —$CH_2CH(OH)CH_2$—, —N=CH$(CH_2)_h$CH=N— where h is 1-4, —CH=N—NH—, —OC(O)O—, —OP(O)(OH)O—, —$CH(OH)CH_2NH$—, —CH(OH)$CH_2$—, —CH(OH)C$(CH_3)_2$C(O)O—,

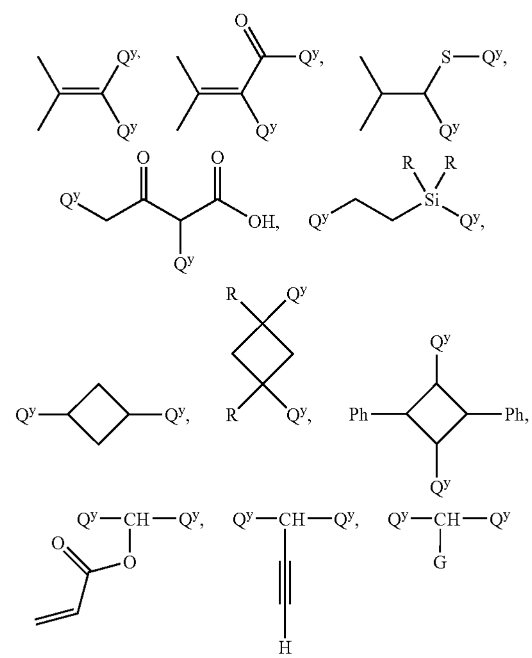

-continued where G is halogen, 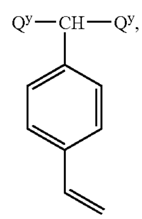 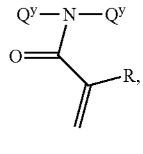

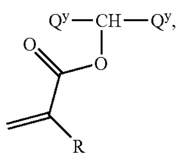 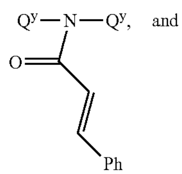 and

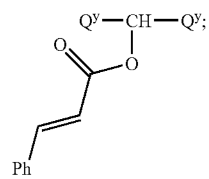

wherein p is 1-6; wherein R and R' are each independently selected from the group of hydrogen and alkyl; wherein linkages L are each independently configured in either of two possible configurations, forward and reverse, with respect to the synthons it couples together, if the two configurations are different structures; wherein y is 1 or 2, and $Q^y$ are each independently one of the $Q^1$ or $Q^2$ synthons connected by the linkage.

In some embodiments, the functional groups are each independently selected from the group consisting of hydrogen, an activated acid, —OH, —C(O)OH, —C(O)H, —C(O)OCH$_3$, —C(O)Cl, —NRR, —NRRR$^+$, —MgX, —Li, —OLi, —OK, —ONa, —SH, —C(O)(CH$_2$)$_2$C(O)OCH$_3$, —NH-alkyl-C(O)CH$_2$CH(NH$_2$)CO$_2$-alkyl, —CH═CH$_2$, —CH═CHR, —CH═CR$_2$, 4-vinylaryl, —C(O)CH═CH$_2$, —NHC(O)CH═CH$_2$, —C(O)CH═CH(C$_6$H$_5$),

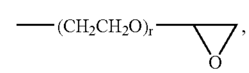, 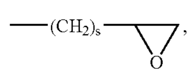,

—OH, —OC(O)(CH$_2$)$_2$C(O)OCH$_3$, —OC(O)CH═CH$_2$,

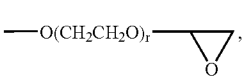, and 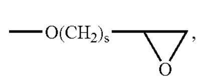,

—P(O)(OH)(OX), —P(═O)(O$^-$)O(CH$_2$)$_s$NR$_3$$^+$;

wherein R are each independently selected from the group consisting of hydrogen and 1-6C alkyl; X is selected from the group consisting of Cl, Br, and I; r is 1-50; and s is 1-4.

In other embodiments, the macrocylic module may comprise a closed ring composition of the formula:

Q is

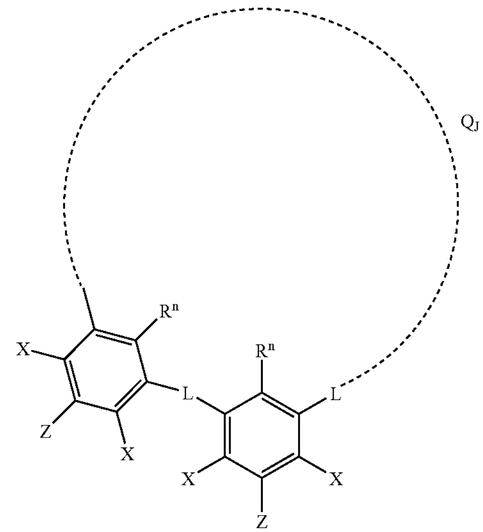

wherein:

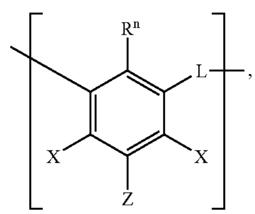,

J is from 1-22, and n is from 1-24; X and R″ are each independently selected from the group consisting of hydrogen or a functional group containing atoms selected from the group consisting of C, H, N, O, Si, P, S, B, Al, halogens, and metals from the alkali and alkaline earth groups; Z are each independently hydrogen or a lipophilic group; L are linkages between synthons each independently selected from the group consisting of (a) a condensed linkage, and (b) a linkage selected from the group consisting of —N═CR—, —NRC(O)—, —OC(O)—, —O—, —S—S—, —S—, —NR—, —(CRR')$_p$—, —CH$_2$NH—, —C(O)S—, —C(O)O—, —C≡C—, —C≡C—C≡C—, —CH(OH)—, —HC═CH—, —NHC(O)NH—, —NHC(O)O—, —NHCH$_2$NH—, —NHCH$_2$CH(OH)CH$_2$NH—, —N═CHCH$_2$CH═N—, —N═CH(CH$_2$)$_h$CH═N— where h is 1-4, —CH═N—NH—, —OC(O)O—, —P(O)(OH)$_2$O—, —CH(OH)CH$_2$NH—, —CH(OH)CH$_2$—, —CH(OH)C(CH$_3$)$_2$C(O)O—,

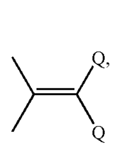 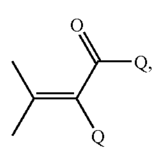 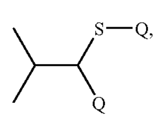

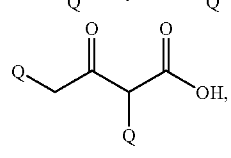 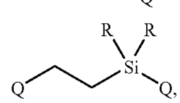

-continued

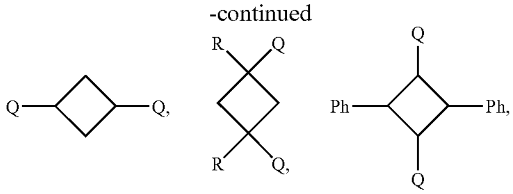

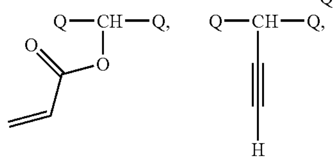

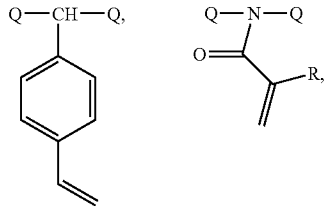

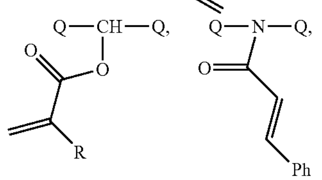

and

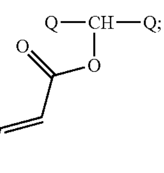

wherein p is 1-6; wherein R and R' are each independently selected from the group of hydrogen and alkyl; wherein linkages L are each independently configured in either of two possible configurations, forward and reverse, with respect to the synthons it couples together, if the two configurations are different structures.

In another embodiment, the macrocyclic module may comprise a closed ring composition of the formula:

Q is

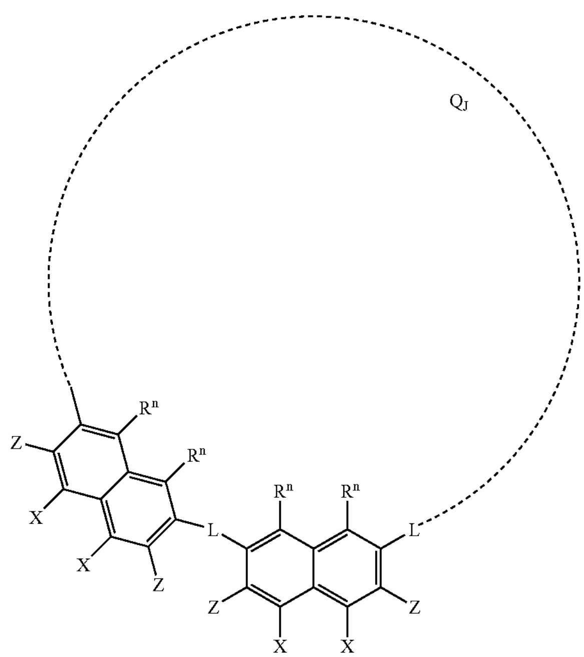

-continued wherein:

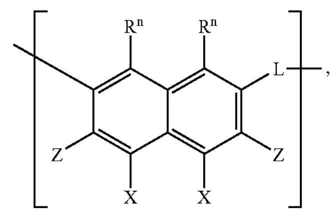

J is from 1-22, and n is from 1-48; X and R" are each independently selected from the group consisting of functional groups containing atoms selected from the group consisting of C, H, N, O, Si, P, S, B, Al, halogens, and metals from the alkali and alkaline earth groups; Z are each independently hydrogen or a lipophilic group; L are linkages between the synthons each independently selected from the group consisting of (a) a condensed linkage, and (b) a linkage selected from the group consisting of —NRC(O)—, —OC(O)—, —O—, —S—S—, —S—, —NR—, —(CRR')$_p$—, —$CH_2$NH—, —C(O)S—, —C(O)O—, —C≡C—, —C≡C—C≡C—, —CH(OH)—, —HC═CH—, —NHC(O)NH—, —NHC(O)O—, —$NHCH_2NH$—, —$NHCH_2CH(OH)CH_2NH$—, —N═CH($CH_2$)$_p$CH═N—, —$CH_2CH(OH)CH_2$—, —N═CH($CH_2$)$_h$CH═N— where h is 1-4, —CH═N—NH—, —OC(O)O—, —OP(O)(OH)O—, —CH(OH)$CH_2$NH—, —CH(OH)$CH_2$—, —CH(OH)C($CH_3$)$_2$C(O)O—,

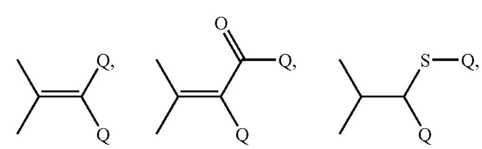

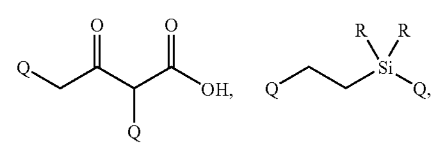

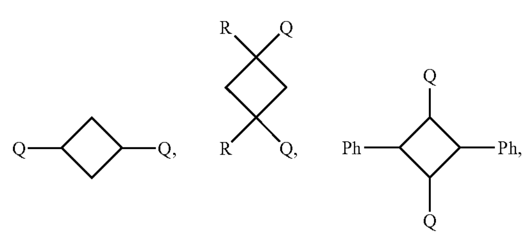

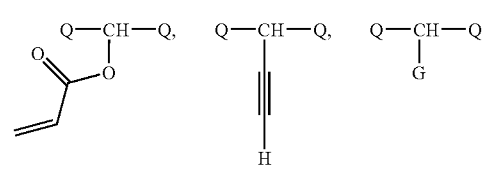

-continued where G is halogen, 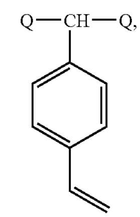 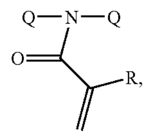

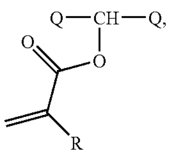 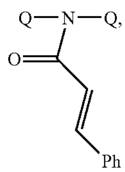 and 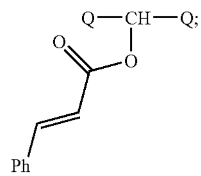

wherein p is 1-6; wherein R and R' are each independently selected from the group of hydrogen and alkyl; wherein linkages L are each independently configured in either of two possible configurations, forward and reverse, with respect to the synthons it couples together, if the two configurations are different structures.

In some embodiments, X and R″ are each independently selected from the group consisting of hydrogen, an activated acid, —OH, —C(O)OH, —C(O)H, —C(O)$OCH_3$, —C(O)Cl, —NRR, —$NRRR^+$, —MgX, —Li, —OLi, —OK, —ONa, —SH, —C(O)$(CH_2)_2$C(O)$OCH_3$, —NH-alkyl-C(O)$CH_2CH(NH_2)CO_2$-alkyl, —CH═$CH_2$, —CH═CHR, —CH═$CR_2$, 4-vinylaryl, —C(O)CH═$CH_2$, —NHC(O)CH═$CH_2$, —C(O)CH═CH($C_6H_5$),

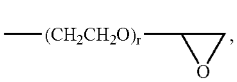, 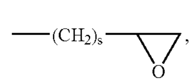,

—OH, —OC(O)$(CH_2)_2$C(O)$OCH_3$, —OC(O)CH═$CH_2$,

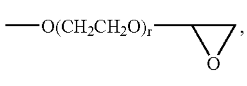, and 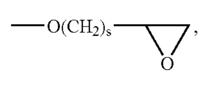,

—P(O)(OH)(OX), —P(═O)($O^-$)O$(CH_2)_s$$NR_{3+}$;

wherein R are each independently selected from the group consisting of hydrogen and 1-6C alkyl; X is selected from the group consisting of Cl, Br, and I; r is 1-50; and s is 1-4.

In another embodiment, the macrocyclic module comprises the formula:

Q is

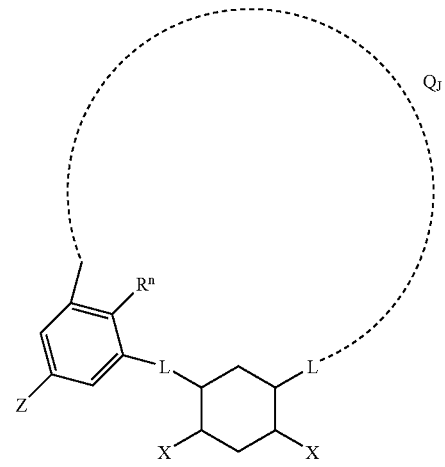

wherein:

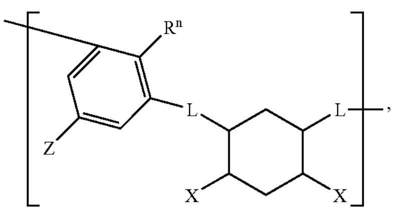

J is from 1-11, and n is from 1-12; X and R″ are each independently selected from the group consisting of hydrogen, an activated acid, —OH, —C(O)OH, —C(O)H, —C(O)$OCH_3$, —C(O)Cl, —NRR, —$NRRR^+$, —MgX, —Li, —OLi, —OK, —ONa, —SH, —C(O)$(CH_2)_2$C(O)$OCH_3$, —NH-alkyl-C(O)$CH_2CH(NH_2)CO_2$-alkyl, —CH═$CH_2$, —CH═CHR, —CH═$CR_2$, 4-vinylaryl, —C(O)CH═$CH_2$, —NHC(O)CH═$CH_2$, —C(O)CH═CH($C_6H_5$),

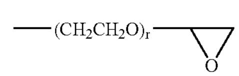, 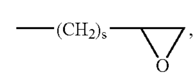,

—OH, —OC(O)$(CH_2)_2$C(O)$OCH_3$, —OC(O)CH═$CH_2$,

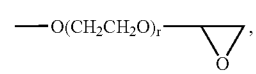, and 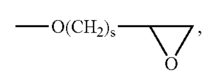,

—P(O)(OH)(OX), —P(═O)($O^-$)O$(CH_2)_s$$NR_3^+$; wherein R are each independently selected from the group consisting of hydrogen and 1-6C alkyl; X is selected from the group consisting of Cl, Br, and I; r is 1-50; and s is 1-4; Z are each independently hydrogen or a lipophilic group; L are linkages between synthons each independently selected from the group consisting of (a) a condensed linkage, and (b) a linkage selected from the group consisting of —NRC(O)—, —OC(O)—, —O—, —S—S—, —S—, —NR—, —$(CRR')_p$—, —$CH_2$NH—, —C(O)S—, —C(O)O—, —C≡C—, —C≡C—C≡C—, —CH(OH)—, —HC═CH—, —NHC(O)NH—, —NHC(O)O—, —$NHCH_2$NH—, —$NHCH_2$CH(OH)$CH_2$NH—, —N═CH$(CH_2)_p$CH═N—, —$CH_2$CH(OH)$CH_2$—, —N═CH$(CH_2)_h$CH═N— where h is 1-4, —CH═N—NH—, —OC(O)O—, —OP(O)(OH)O—, —CH(OH)CH$_2$NH—, —CH(OH)CH$_2$—, —CH(OH)C(CH$_3$)$_2$C(O)O—,

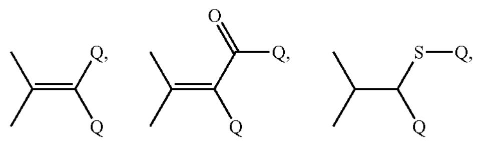

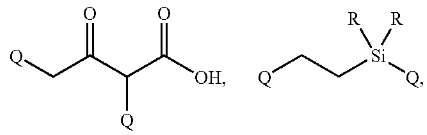

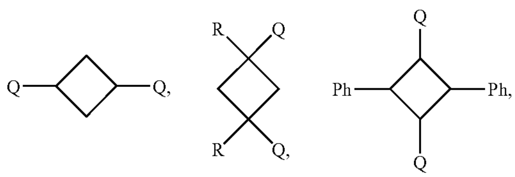

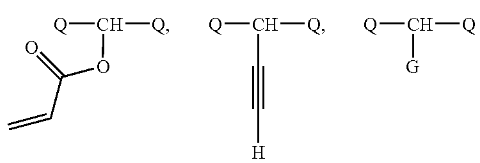

where G is halogen,

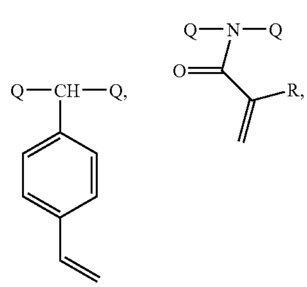

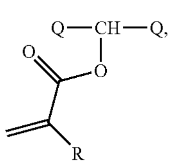

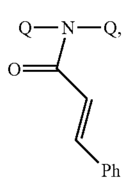

and

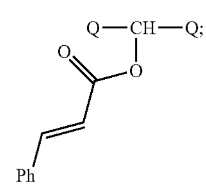

wherein p is 1-6; wherein R and R' are each independently selected from the group of hydrogen and alkyl; wherein linkages L are each independently configured in either of two possible configurations, forward and reverse, with respect to the synthons it couples together, if the two configurations are different structures.

In another embodiment, the macrocyclic module has the formula:

Q is

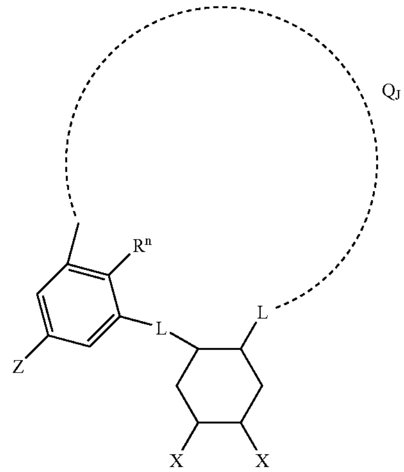

wherein:

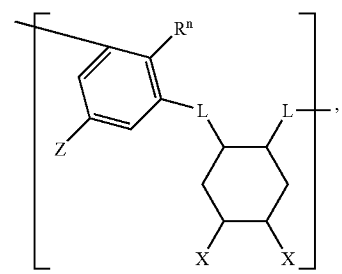

J is from 1-11, and n is from 1-12; X and R" are each independently selected from the group consisting of hydrogen, an activated acid, —OH, —C(O)OH, —C(O)H, —C(O)OCH$_3$, —C(O)Cl, —NRR, —NRRR$^+$, —MgX, —Li, —OLi, —OK, —ONa, —SH, —C(O)(CH$_2$)$_2$C(O)OCH$_3$, —NH-alkyl-C(O)CH$_2$CH(NH$_2$)CO$_2$-alkyl, —CH═CH$_2$, —CH═CHR, —CH═CR$_2$, 4-vinylaryl, —C(O)CH═CH$_2$, —NHC(O)CH═CH$_2$, —C(O)CH═CH(C$_6$H$_5$),

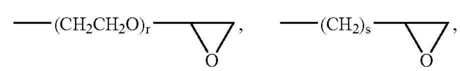

—OH, —OC(O)(CH$_2$)$_2$C(O)OCH$_3$, —OC(O)CH═CH$_2$,

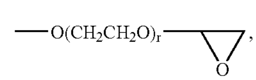

and

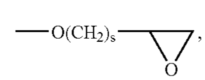

—P(O)(OH)(OX), —P(═O)(O$^-$)O(CH$_2$)$_s$NR$_3$$^+$; wherein R are each independently selected from the group consisting of hydrogen and 1-6C alkyl; X is selected from the group consisting of Cl, Br, and I; r is 1-50; and s is 1-4; Z are each independently hydrogen or a lipophilic group; L are linkages between the synthons each independently selected from the group consisting of (a) a condensed linkage, and (b) a linkage selected from the group consisting of —NRC(O)—, —OC(O)—, —O—, —S—S—, —S—, —NR—, —(CRR')$_p$—, —CH$_2$NH—, —C(O)S—, —C(O)O—, —C≡C—, —C≡C—C≡C—, —CH(OH)—, —HC═CH—, —NHC(O)NH—, —NHC(O)O—, —NHCH$_2$NH—, —NHCH$_2$CH(OH)CH$_2$NH—, —N═CH(CH$_2$)$_p$CH═N—, —CH$_2$CH (OH)$CH_2$—, —N═CH$(CH_2)_h$CH═N— where h is 1-4, —CH═N—NH—, —OC(O)O—, —OP(O)(OH)O—, —CH(OH)$CH_2$NH—, —CH(OH)$CH_2$—, —CH(OH)C$(CH_3)_2$C(O)O—,

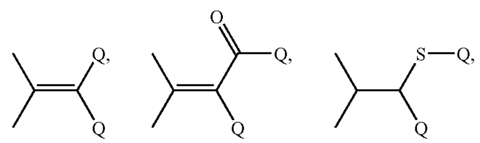

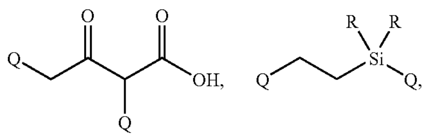

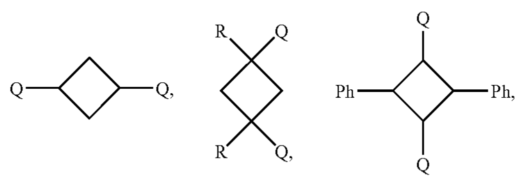

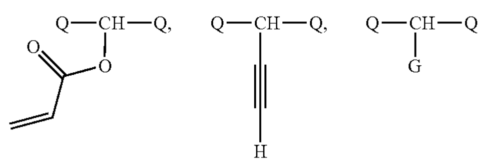

where G is halogen,

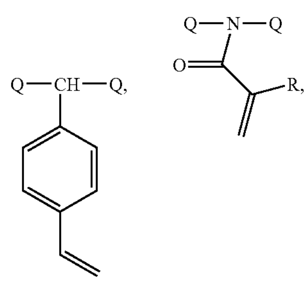

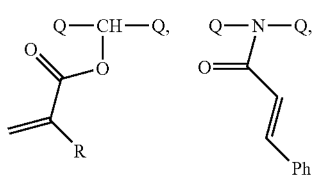

and

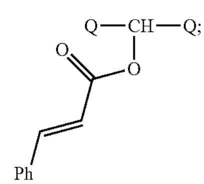

wherein p is 1-6; wherein R and R' are each independently selected from the group of hydrogen and alkyl; wherein linkages L are each independently configured in either of two possible configurations, forward and reverse, with respect to the synthons it couples together, if the two configurations are different structures.

In another embodiment, the macrocyclic module comprises the formula:

Q is

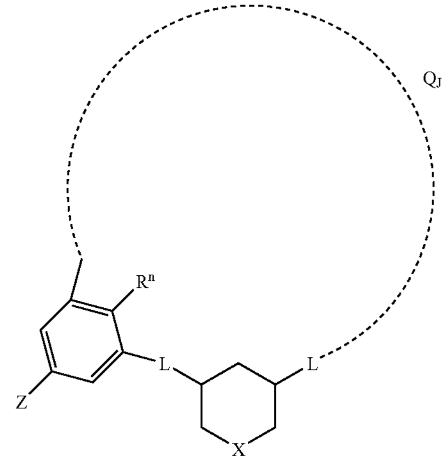

wherein:

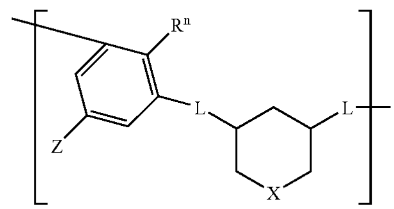

J is from 1-11, and n is from 1-12; X is —$NX^1$— or —$CX^2X^3$, where $X^1$ is selected from the group consisting of an amino acid residue, —$CH_2C(O)CH_2CH(NH_2)CO_2$-alkyl, and —C(O)CH═$CH_2$; $X^2$ and $X^3$ are each independently selected from the group consisting of hydrogen, —OH, —$NH_2$, —SH, —$(CH_2)_t$OH, —$(CH_2)_t NH_2$ and —$(CH_2)_t$SH, wherein t is 1-4, and $X^2$ and $X^3$ are not both hydrogen; $R^n$ are each independently selected from the group consisting of hydrogen, an activated acid, —OH, —C(O)OH, —C(O)H, —C(O)$OCH_3$, —C(O)Cl, —NRR, —$NRRR^+$, —MgX, —Li, —OLi, —OK, —ONa, —SH, —C(O)$(CH_2)_2$C(O)$OCH_3$, —NH-alkyl-C(O)$CH_2CH(NH_2)CO_2$-alkyl, —CH═$CH_2$, —CH═CHR, —CH═$CR_2$, 4-vinylaryl, —C(O)CH═$CH_2$, —NHC(O)CH═$CH_2$, —C(O)CH═CH$(C_6H_5)$,

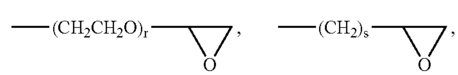

—OH, —OC(O)$(CH_2)_2$C(O)$OCH_3$, —OC(O)CH═$CH_2$,

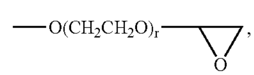

and

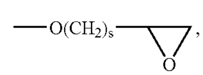

—P(O)(OH)(OX), —P(═O)($O^-$)O$(CH_2)_s NR_3^+$; wherein R are each independently selected from the group consisting of hydrogen and 1-6C alkyl; X is selected from the group consisting of Cl, Br, and I; r is 1-50; and s is 1-4; Z are each independently hydrogen or a lipophilic group; L are linkages between synthons each independently selected from the group consisting of (a) a condensed linkage, and (b) a linkage selected from the group consisting of —NRC(O)—, —OC(O)—, —O—, —S—S—, —S—, —NR—, —$(CRR')_p$—, —CH$_2$NH—, —C(O)S—, —C(O)O—, —C≡C—, —C≡C—C≡C—, —CH(OH)—, —HC═CH—, —NHC(O)NH—, —NHC(O)O—, —NHCH$_2$NH—, —NHCH$_2$CH(OH)CH$_2$NH—, —N═CH(CH$_2$)$_p$CH═N—, —CH$_2$CH(OH)CH$_2$—, —N═CH(CH$_2$)$_h$CH═N— where h is 1-4, —CH═N—NH—, —OC(O)O—, —OP(O)(OH)O—, —CH(OH)CH$_2$NH—, —CH(OH)CH$_2$—, —CH(OH)C(CH$_3$)$_2$C(O)O—,

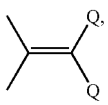
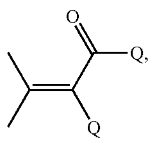
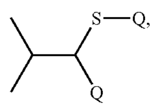

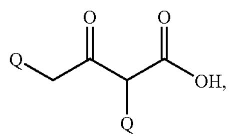
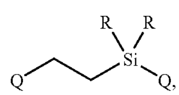

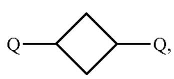
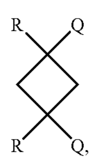
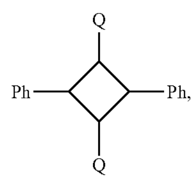

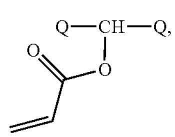
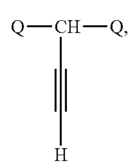
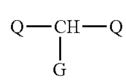

where G is halogen,

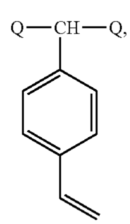
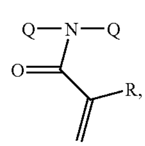

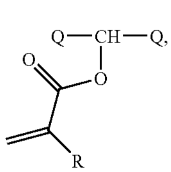
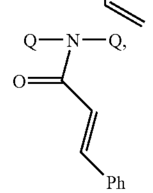
and
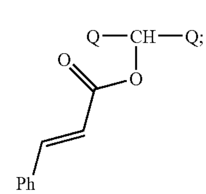

wherein p is 1-6; wherein R and R' are each independently selected from the group of hydrogen and alkyl; wherein linkages L are each independently configured in either of two possible configurations, forward and reverse, with respect to the synthons it couples together, if the two configurations are different structures.

In another embodiment, the macrocyclic module has the formula:

Q is

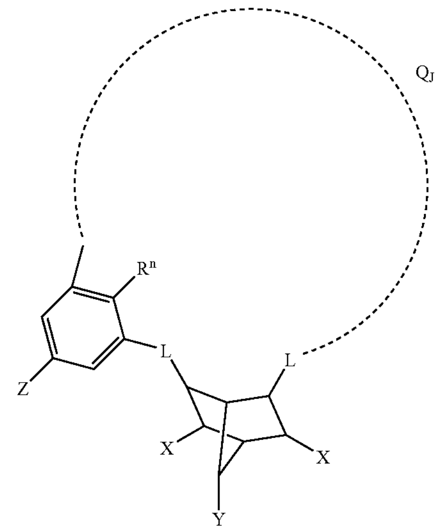

wherein:

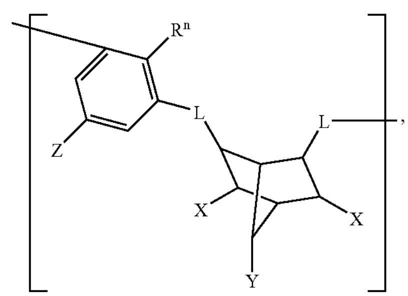

J is from 1-11, and n is from 1-12; X and R" are each independently selected from the group consisting of hydrogen, an activated acid, —OH, —C(O)OH, —C(O)H, —C(O)OCH$_3$, —C(O)Cl, —NRR, —NRRR$^+$, —MgX, —Li, —OLi, —OK, —ONa, —SH, —C(O)(CH$_2$)$_2$C(O)OCH$_3$, —NH-alkyl-C(O)CH$_2$CH(NH$_2$)CO$_2$-alkyl, —CH═CH$_2$, —CH═CHR, —CH═CR$_2$, 4-vinylaryl, —C(O)CH═CH$_2$, —NHC(O)CH═CH$_2$, —C(O)CH═CH(C$_6$H$_5$),

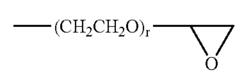
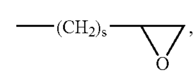

—OH, —OC(O)(CH$_2$)$_2$C(O)OCH$_3$, —OC(O)CH═CH$_2$,

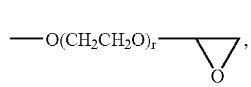
and
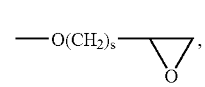

—P(O)(OH)(OX), —P(═O)(O$^-$)O(CH$_2$)$_s$NR$_3$$^+$; wherein R are each independently selected from the group consisting of hydrogen and 1-6C alkyl; X is selected from the group consisting of Cl, Br, and I; r is 1-50; and s is 1-4; Z and Y are each independently hydrogen or a lipophilic group; L are linkages between the synthons each independently selected from the group consisting of (a) a condensed linkage, and (b) a linkage selected from the group consisting of —NRC(O)—, —OC(O)—, —O—, —S—S—, —S—, —NR—, —(CRR')$_p$—, —CH$_2$NH—, —C(O)S—, —C(O)O—, —C≡C—, —C≡C—C≡C—, —CH(OH)—, —HC═CH—, —NHC(O)NH—, —NHC(O)O—, —$NHCH_2NH$—, —$NHCH_2CH(OH)CH_2NH$—, —N═$CH(CH_2)_p$CH═N—, —$CH_2CH(OH)CH_2$—, —N═$CH(CH_2)_h$CH═N— where h is 1-4, —CH═N—NH—, —OC(O)O—, —OP(O)(OH)O—, —$CH(OH)CH_2NH$—, —$CH(OH)CH_2$—, —$CH(OH)C(CH_3)_2C(O)O$—,

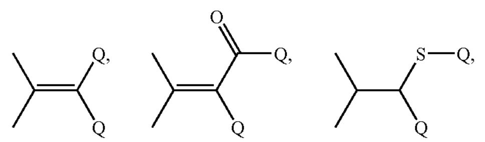

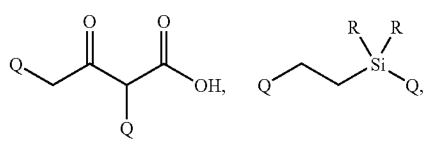

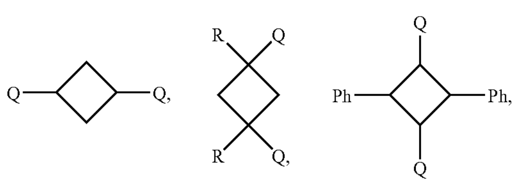

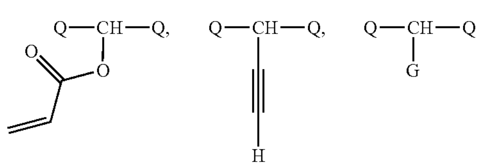

where G is halogen,

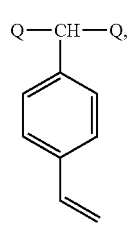

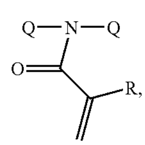

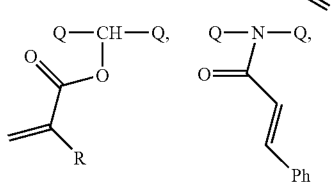

and

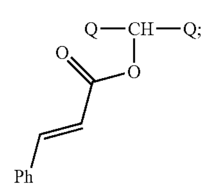

wherein p is 1-6; wherein R and R' are each independently selected from the group of hydrogen and alkyl; wherein linkages L are each independently configured in either of two possible configurations, forward and reverse, with respect to the synthons it couples together, if the two configurations are different structures.

In another embodiment, the macrocyclic module has the formula:

Q is

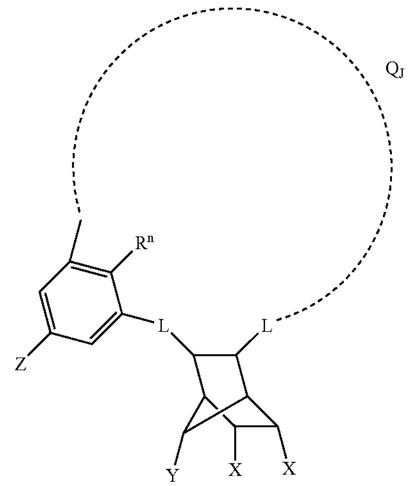

wherein:

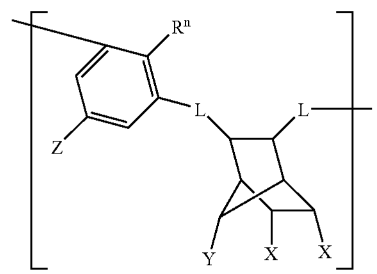

,

J is from 1-11, and n is from 1-12; X and R″ are each independently selected from the group consisting of hydrogen, an activated acid, —OH, —C(O)OH, —C(O)H, —$C(O)OCH_3$, —C(O)Cl, —NRR, —$NRRR^+$, —MgX, —Li, —OLi, —OK, —ONa, —SH, —$C(O)(CH_2)_2C(O)OCH_3$, —NH-alkyl-$C(O)CH_2CH(NH_2)CO_2$-alkyl, —CH═$CH_2$, —CH═CHR, —CH═$CR_2$, 4-vinylaryl, —C(O)CH═$CH_2$, —NHC(O)CH═$CH_2$, —C(O)CH═$CH(C_6H_5)$,

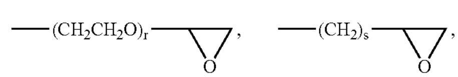

—OH, —$OC(O)(CH_2)_2C(O)OCH_3$, —OC(O)CH═$CH_2$,

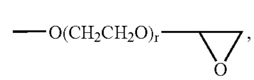

and

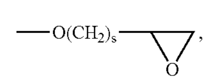

—P(O)(OH)(OX), —P(═O)($O^-$)$O(CH_2)_sNR_{3+}$; wherein R are each independently selected from the group consisting of hydrogen and 1-6C alkyl; X is selected from the group consisting of Cl, Br, and I; r is 1-50; and s is 1-4; Z and Y are each independently hydrogen or a lipophilic group; L are linkages between synthons each independently selected from the group consisting of (a) a condensed linkage, and (b) a linkage selected from the group consisting of —NRC(O)—, —OC(O)—, —O—, —S—S—, —S—, —NR—, —$(CRR')_p$—, —$CH_2NH$—, —C(O)S—, —C(O)O—, —C≡C—, —C≡C—C≡C—, —CH(OH)—, —HC═CH—, —NHC(O)NH—, —NHC(O)O—, —$NHCH_2NH$—, —$NHCH_2CH$ $(OH)CH_2NH$—, —$N{=}CH(CH_2)_pCH{=}N$—, —$CH_2CH(OH)CH_2$—, —$N{=}CH(CH_2)_hCH{=}N$— where h is 1-4, —CH=N—NH—, —OC(O)O—, —OP(O)(OH)O—, —$CH(OH)CH_2NH$—, —$CH(OH)CH_2$—, —$CH(OH)C(CH_3)_2C(O)O$—,

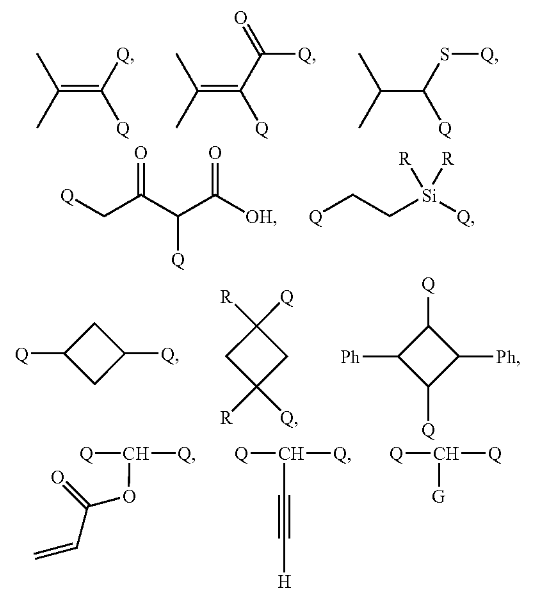

where G is halogen,

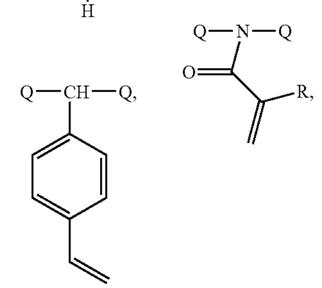

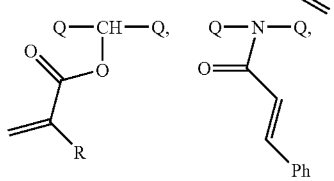

and

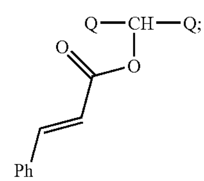

wherein p is 1-6; wherein R and R' are each independently selected from the group of hydrogen and alkyl; wherein linkages L are each independently configured in either of two possible configurations, forward and reverse, with respect to the synthons it couples together, if the two configurations are different structures.

In some embodiments, the nanofilm may be coupled to a solid support selected from the group of Wang resins, hydrogels, aluminas, metals, ceramics, polymers, silica gels, sepharose, sephadex, agarose, inorganic solids, semiconductors, and silicon wafers.

In one embodiment, the nanofilm retains at least 85% of film area after thirty minutes on a Langmuir trough at 5-15 mN/m. In other embodiments, the nanofilm retains at least 95% of film area after thirty minutes on a Langmuir trough at 5-15 mN/m. In another embodiment, the nanofilm retains at least 98% of film area after thirty minutes on a Langmuir trough at 5-15 mN/m.

In one embodiment, a method for making a macrocyclic module composition comprises: (a) providing a plurality of a first cyclic synthon; (b) contacting a plurality of a second cyclic synthon with the first cyclic synthons; (c) isolating the macrocyclic module composition. The method may further comprise contacting a linker molecule with the mixture in (a) or (b).

In another embodiment, a method for making a macrocyclic module composition comprises: (a) providing a plurality of a first cyclic synthon; (b) contacting a plurality of a second cyclic synthon with the first cyclic synthons; (c) contacting a plurality of the first cyclic synthon with the mixture from (b).

In another embodiment, a method for making a macrocyclic module composition comprises: (a) providing a plurality of a first cyclic synthon; (b) contacting a plurality of a second cyclic synthon with the first cyclic synthons; (c) contacting a plurality of a third cyclic synthon with the mixture from (b).

The method may further comprise contacting a linker molecule with the mixture in (a) or (b) or (c). The method may further comprise supporting a cyclic synthon or coupled synthons on a solid phase.

In another embodiment, a method for making a macrocyclic module composition comprises: (a) contacting a plurality of cyclic synthons with a metal complex template; and (b) isolating the macrocyclic module composition.

In another embodiment, a method of preparing a composition for transporting a selected species through the composition comprises: selecting a first cyclic synthon, wherein the first cyclic synthon is substituted with at least one functional group comprising a functional group containing atoms selected from the group consisting of C, H, N, O, Si, P, S, B, Al, halogens, and metals from the alkali and alkaline earth groups; selecting from two to about twenty-three additional cyclic synthons; incorporating the first cyclic synthon and the additional cyclic synthons into a macrocyclic module composition comprising: from three to about twenty-four cyclic synthons coupled to form a closed ring defining a pore; wherein the at least one functional group of the first cyclic synthon is located at the pore of the macrocyclic module composition and is selected to transport the selected species through the pore.

Macrocyclic Module Pores

An individual macrocyclic module may include a pore in its structure. The size of the pore may determine the size of molecules or other species which can pass through the macrocyclic module. The size of a pore in a macrocyclic module may depend on the structure of the synthons used to make the macrocyclic module, the linkages between synthons, the number of synthons in a module, the structure of any linker molecules used to make the macrocyclic module, and other structural features of the macrocyclic module whether inherent in the preparation of the macrocyclic module or added in later steps or modifications. Stereoisomerism of macrocyclic modules may also be used to regulate the size of a pore of a macrocyclic module by variation of the stereoisomer of each synthon used to prepare the closed ring of the macrocyclic module.

The dimension of a pore in a macrocyclic module may be varied by changing the combination of synthons used to form the macrocyclic module, or by varying the number of synthons in the closed ring. The dimension of a pore may also be varied by substituents on the synthons or linkages. The pore may therefore be made large enough or small enough to achieve an effect on transport of species through the pore. Species which may be transported through the pore of a macrocyclic module include atoms, molecules, biomolecules, ions, charged particles, and photons.

The size of a species may not be the sole determinant of whether it will be able to pass through a pore of a macrocyclic module. Groups or moieties located in or near the pore structure of a macrocyclic module may regulate or affect transport of a species through the pore by various mechanisms. For example, transport of a species through the pore may be affected by groups of the macrocyclic module which interact with the species, by ionic or other interaction, such as chelating groups, or by complexing the species. For example, a charged group such as a carboxylate anion or ammonium group may couple an oppositely-charged species and affect its transport. Substituents of synthons in a macrocyclic module may affect the passage of a species through the pore of the macrocyclic module. Groups of atoms which render the pore of a macrocyclic module more or less hydrophilic or lipophilic may affect transport of a species through the pore. An atom or group of atoms may be located within or proximate to a pore to sterically slow or block the passage of a species through the pore. For example, hydroxyl or alkoxy groups may be coupled to a cyclic synthon and located in the pore of the structure of the macrocyclic module, or may be coupled to a linkage between synthons and located in the pore. A wide range of functional groups may be used to sterically slow or block the passage of a species through the pore, including functional groups containing atoms selected from the group consisting of C, H, N, O, Si, P, S, B, Al, halogens, and metals from the alkali and alkaline earth groups. Blocking and slowing passage of a species through the pore may involve reducing the dimension of the pore by steric blocking, as well as slowing the passage of species by creating a path through the pore which is not linear, and providing interaction between the functional group and the species to slow transport. The stereochemical structure of the portion of the macrocyclic module which defines the pore and its interior may also affect transport. Any groups or moieties which affect transport of a species through the pore of a macrocyclic module may be introduced as part of the synthons used to prepare the macrocyclic module, or may be added later by various means. For example, S7-1 could be reacted with $ClC(O)(CH_2)_2C(O)OCH_2CH_3$ to convert the phenol groups to succinyl ester groups. Further, molecular dynamical motion of the synthons and linkages of a partly flexible macrocyclic module may affect transport of a species through the pore of the module. Transport behavior may not be described solely by the structure of the macrocyclic module itself since the presence of the species which is to be transported through the pore affects the flexibility, conformation, and dynamical motions of a macrocyclic module. In general, solvent may also affect transport of solutes through a pore.

The following examples further describe and demonstrate variations within the scope of the present invention. All examples described in this specification, both in the description above and the examples below, are given solely for the purpose of illustration and are not to be construed as limiting the present invention. While there have been described illustrative variations of this invention, those skilled in the art will recognize that they may be changed or modified without departing from the spirit and scope of this invention, and it is intended to cover all such changes, modifications, and equivalent arrangements that fall within the true scope of the invention as set forth in the appended claims.

All documents referenced herein, including applications for patent, patent references, publications, articles, books, and treatises, are specifically incorporated by reference herein in their entirety.

EXAMPLES

Reagents were obtained from Aldrich Chemical Company and VWR Scientific Products. The Langmuir trough used was a KSV minitrough (KSV Instruments, Trumbull, Conn.). Interfacial rheometry was performed using a CIR-100 Interfacial Rheometer (Rheometric Scientific, Piscataway, N.J.) with a KSV Langmuir two-barrier rheology microtrough having a width of 85 mm (KSV Instruments, Trumbull, Conn.). Rates of surface compression are reported as the linear rate of barrier movement. Atomic force microscopy (AFM) images were obtained with a PicoSPM (Molecular Imaging, Pheonix, Ariz.). Contact Mode images were typically recorded under flowing nitrogen with an Si point probe tip.

Example 1

Derivatization of $SiO_2$ Substrates with (3-aminopropyl) triethoxysilane (APTES): $SiO_2$ substrates were first sonicated in a piranha solution (3:1 ratio of $H_2SO_4$:30% $H_2O_2$) for 15 minutes. This was followed by a 15 min sonication in Milli-Q water (>18 MΩ-cm). The derivatization step was done in a glove bag under a $N_2$ atmosphere. 0.05 mL APTES and 0.05 mL pyridine were added to 9 mL of toluene. Immediately following mixing, the freshly cleaned $SiO_2$ substrates were immersed in the APTES solution for 10 min. Substrates were washed with copious amounts of toluene and then dried with $N_2$. Deposited APTES films showed a range of thickness values from 0.8 to 1.3 nm.

Example 2

Deposition of Hexamer 1dh/PMAOD nanofilm on APTES modified $SiO_2$ substrate: A 50%:50% area fraction solution of Hexamer 1dh: poly(maleic anhydride-alt-1-octadecene) (PMAOD) (Aldrich, 30,000-50,000 MW) was spread onto a pH 9 water subphase. After 10 minutes the film was compressed to 12 mN/m at a rate of 3 mm/min. Upon compression a layer of nanofilm was deposited onto an APTES-modified substrate on the upstroke using a vertical dip. The deposition rate was typically 0.25 or 0.5 mm/min. Following deposition, the nanofilm was heated at 70° C. under $N_2$ for about 6 hours.

Figure 1B:
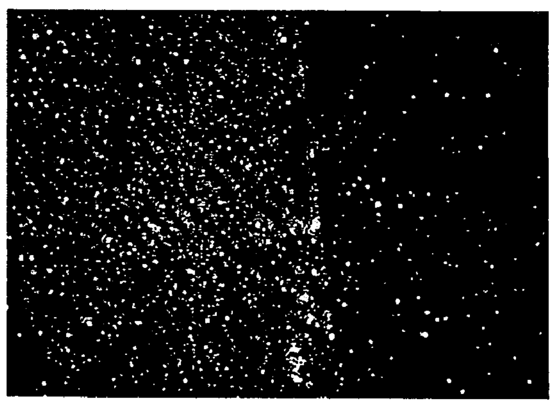
Figure 1C:
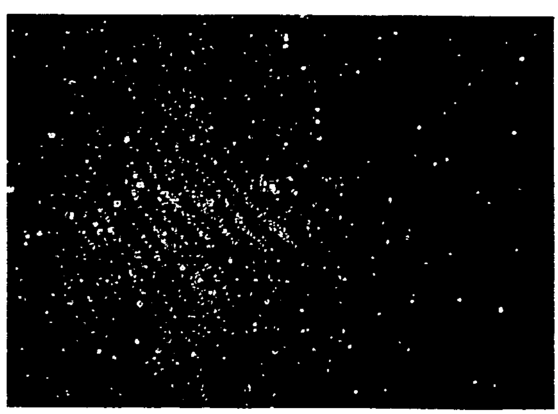
Figure 2A:
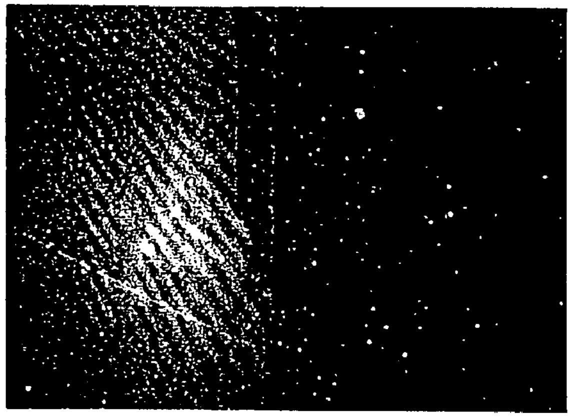
FIG. 2 (A-C) illustrates examples of ellipsometric images of a nanofilm of Hexamer 1dh and PMAOD after sonication in various solvents.
Figure 2B:
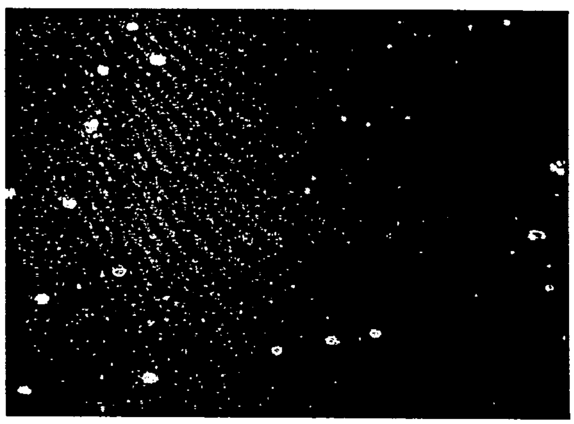
Figure 2C:

Imaging ellipsometry, illustrated in FIG. 1A, revealed an APTES coating on the substrate having a thickness of 0.94 nm. The thickness of the coating and deposited nanofilm, illustrated on the left in FIG. 1B, was 1.94 nm, while the thickness of the APTES coating of the substrate, illustrated on the right in FIG. 1B, was 0.82 nm. Thus, the thickness of the uncured nanofilm itself was 1.1 nm. A smooth, physically homogeneous, continuous and unbroken nanofilm was deposited. After heating, the thickness of the coating and cured nanofilm was 1.57 nm, illustrated on the left in FIG. 1C, while the APTES coating of the substrate, illustrated on the right in FIG. 1C, was 0.53 nm. Thus, the thickness of the nanofilm itself was virtually unchanged at 1.0 nm. After sonication in $CHCl_3$ (FIG. 2A), acetone (FIG. 2B), and water (FIG. 2C), each for five minutes, the thickness of the nanofilm itself was virtually unchanged at 0.9 nm, 1.0 nm, and 1.0 nm, respectively. Thus, ellipsometric measurements determined that the loss of nanofilm material from the substrate upon sonication was minimal.

Example 3

Deposition of Hexamer 1dh/PMAOD/DEM nanofilm on APTES modified $SiO_2$ substrate: A 0.1:0.9 mole fraction solution of Hexamer 1dh: PMAOD was spread onto a pH 9 diethyl malonimidate (DEM) subphase (0.5 mg/mL in aqueous solution). After 10 minutes the film was compressed to 12 mN/m at a rate of 2 mm/min. Upon compression a layer of nanofilm was deposited onto the APTES modified substrate on the upstroke using a vertical dip. The deposition rate was typically 0.5 or 1.0 mm/min. Following deposition, the nanofilm was cured at 80° C. under $N_2$ for 14-19 hours to attach the nanofilm to the surface. A nanofilm thickness of 1.1 nm was measured by ellipsometry before curing the nanofilm, and 0.9-1.0 nm after curing. A smooth, physically homogeneous, continuous and unbroken nanofilm was deposited. After sonication in $CHCl_3$ at room temperature a nanofilm thickness of 0.7-0.9 nm was measured by ellipsometry.

Example 4

Deposition of Hexamer 1dh/PMAOD/DEM nanofilm on APTES modified $SiO_2$ substrate: A nanofilm of Hexamer 1dh and PMAOD was prepared as in Example 3, except at deposition surface pressure of 25 mN/m. A smooth, physically homogeneous, continuous and unbroken nanofilm was deposited for DEM subphase concentrations of 0.5 mg/mL and 2.0 mg/mL. After sonication in $CHCl_3$ at room temperature a thickness of 1.2 nm was measured by ellipsometry for nanofilm on bare $SiO_2$ substrate, and a thickness of 1.4-1.6 nm was measured by ellipsometry for nanofilm on APTES modified $SiO_2$ substrate.

Example 5

Surface rheology of a sample of nanofilm of Hexamer 1dh and DEM having polymeric component PMAOD is shown in Table 10. Referring to Table 10, as the area fraction of Hexamer 1dh decreased, corresponding to an increase in polymeric component PMAOD, the surface moduli of the nanofilm substantially decreased. G' indicates storage modulus and G" indicates loss modulus.

TABLE 10

Rheology of nanofilm of Hexamer 1dh and DEM having polymeric component PMAOD

| SURFACE MODULI | AREA FRACTION OF HEXAMER (ϕ) | | | | | |
|---|---|---|---|---|---|---|
| G', G" | 0.0 | 0.6 | 0.8 | 0.9 | 0.95 | 1.0 |
| G' @ 10 mN/m | 0.2 | 5.9 | 15.1 | 5.0 | 6.1 | 13.3 |
| G" @ 10 mN/m | 7.5 | 88.2 | 163.1 | 97.3 | 151.4 | 257.4 |
| G' @ 20 mN/m | 6.6 | 45.3 | 65.8 | 58.8 | 57.5 | 147.4 |
| G" @ 20 mN/m | 154.7 | 412.8 | 474.6 | 501.7 | 570.7 | 1269.9 |
| G' @ 30 mN/m | 35.05 | — | — | — | 153.5 | 418.5 |
| G" @ 30 mN/m | 391.1 | — | — | — | 859.6 | 2707.2 |

As shown in Table 10, G" typically exceeds G' in the viscous nanofilm. The data in Table 10 indicate that for a nanofilm of Hexamer 1dh and DEM, introducing an area fraction of polymeric component PMAOD of about 5% into the nanofilm reduced the moduli of the nanofilm by more than 50%. The polymeric component makes the nanofilm more flexible and less brittle. In other words, the data in Table 10 indicate that for a nanofilm having an area fraction of polymeric component PMAOD of about 5%, the surface loss modulus of the nanofilm at a surface pressure from 5-30 mN/m is less than about 50% of the surface loss modulus of the same nanofilm composition made without the polymeric components.

To prepare the nanofilms used in Table 10, chloroform solutions of Hexamer 1dh and PMAOD were mixed in proportions corresponding to Table 10, and allowed to equilibrate at room temperature for approximately one hour. Subsequently, 10 μl of the chloroform mixture were spread at the liquid-air interface of a 50 mM $NaHCO_3$ buffer (pH 9) containing 0.5 mg/ml DEM. After allowing 15 minutes for evaporation of the spreading solvent, the nanofilm was compressed to a surface pressure of 10 mN/m. The viscoelastic properties of the nanofilm were then measured using a CIR-100 interfacial rheometer (Camtel Ltd, Herts, UK). A sinusoidal torque of amplitude 0.02 μN*m and frequency 1 Hz was applied to the nanofilm, and the in-phase and out-of-phase components of the resulting strain were measured, giving the elastic and viscous components, respectively. For the data in Table 10, the response was averaged over about 40 minutes.

Figure 3A:
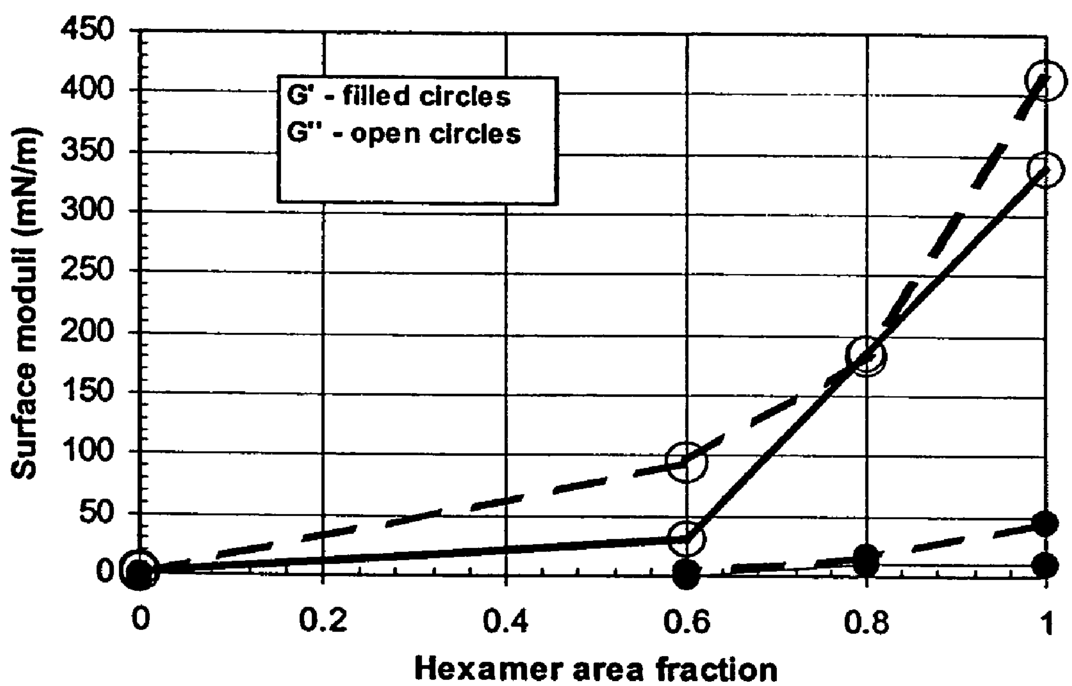
FIG. 3 (A-D) illustrates examples of the surface rheometric storage and loss moduli for a nanofilm of Hexamer 1dh and PMAOD.

Surface rheology of a sample of nanofilm of Hexamer 1dh and DEM having polymeric component PMAOD is shown in FIG. 3A. Nanofilms used in FIG. 3A were prepared with a 2.0 mg/ml DEM subphase. The dashed line curves in FIG. 3A were obtained with a subphase heated to 33° C., while the solid line curves were obtained with a subphase at room temperature 22° C. The data in FIG. 3A indicate that for a nanofilm of Hexamer 1dh and DEM, introducing an area fraction of PMAOD of about 20% into the nanofilm reduced the loss modulus (G") of the nanofilm by about one-half at 10 mN/m surface pressure. The data in FIG. 3A also indicate that the modulus of the nanofilm is generally higher for the higher subphase temperature.

Figure 3B:
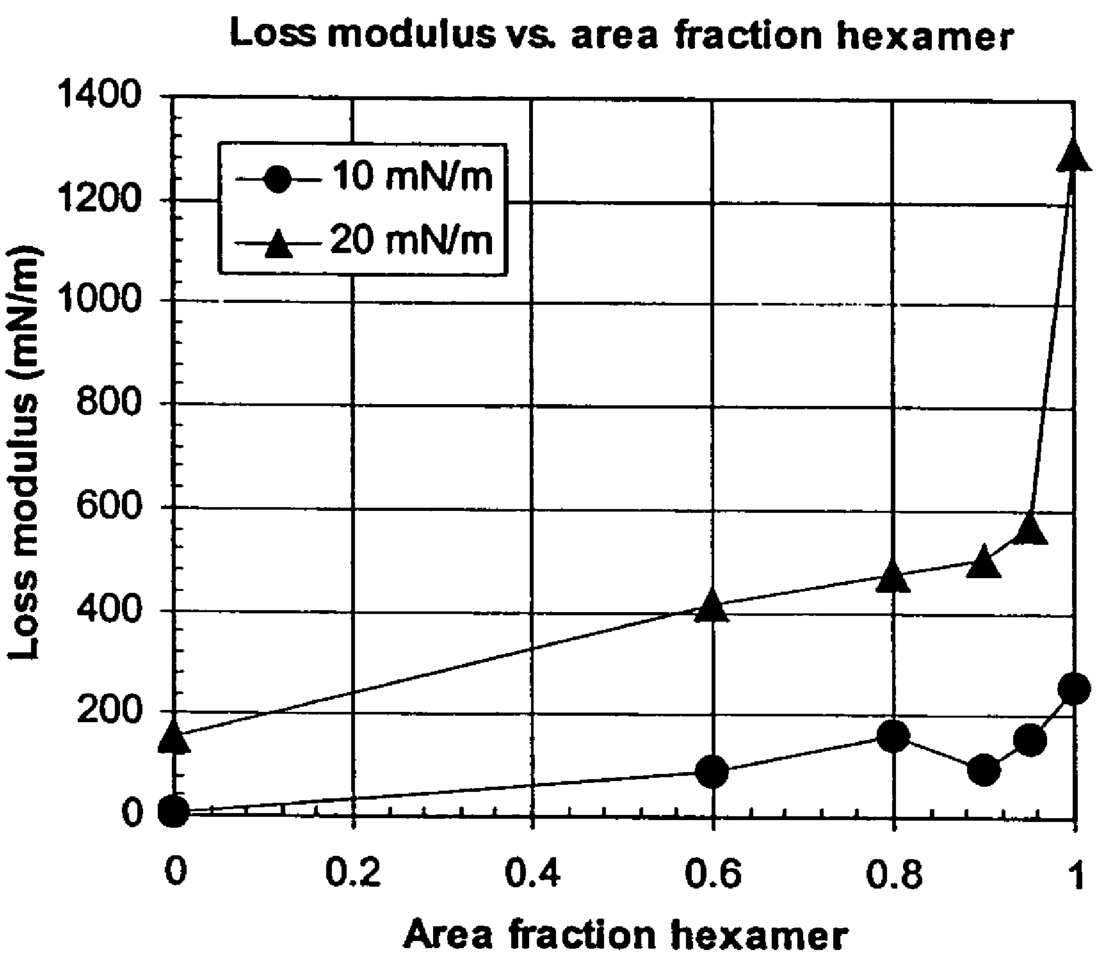
Figure 3C:
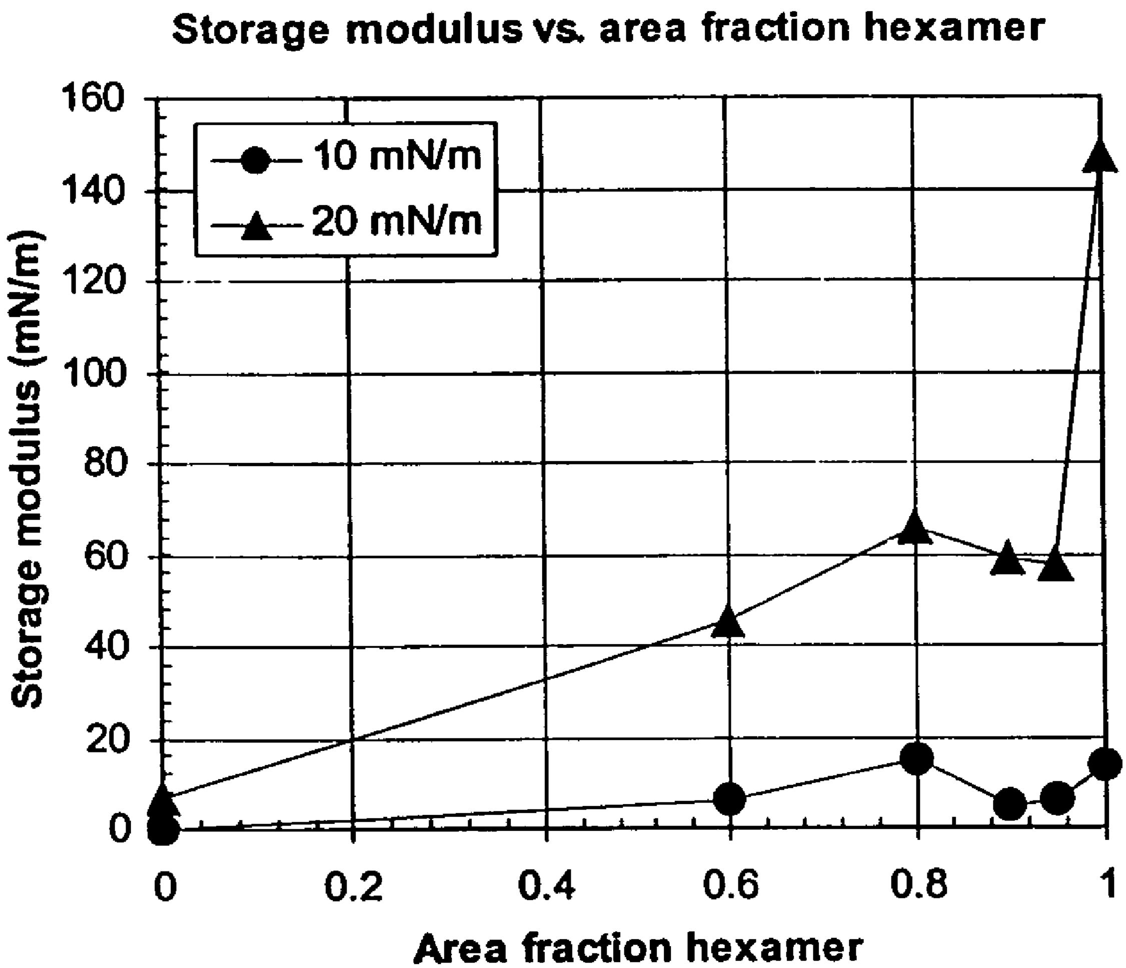
Figure 3D:
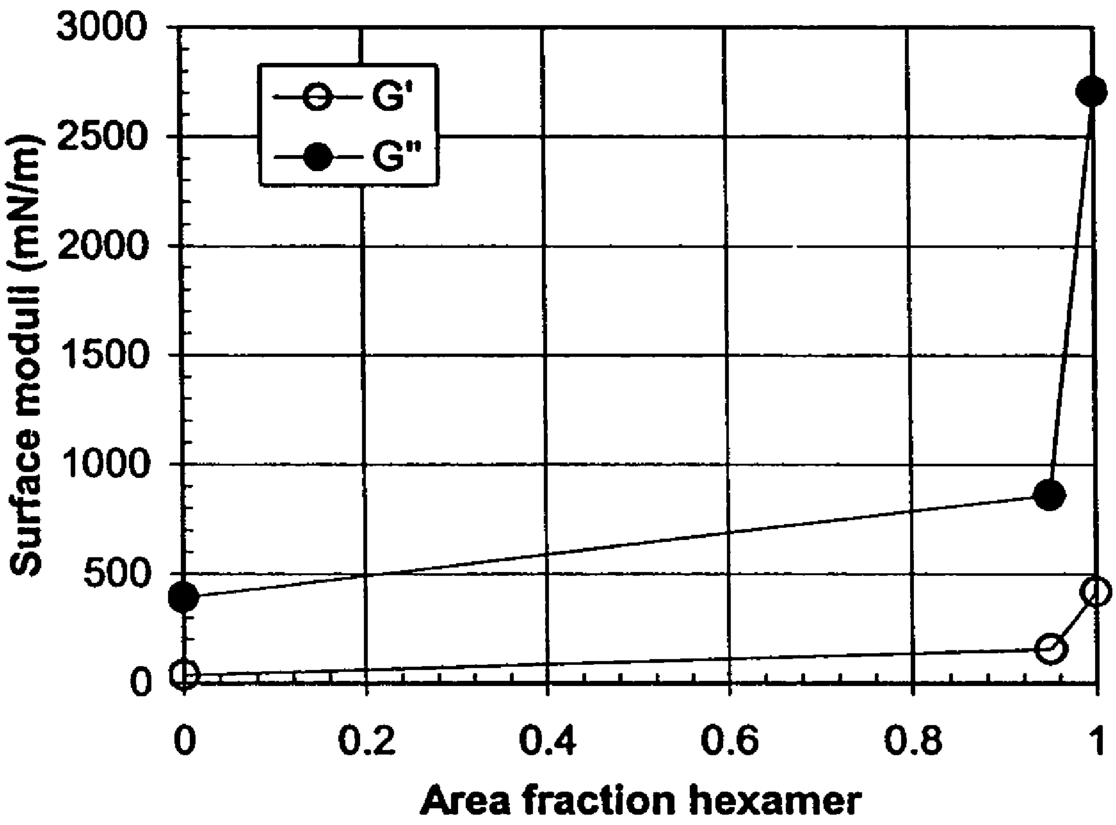
Figure 4A:
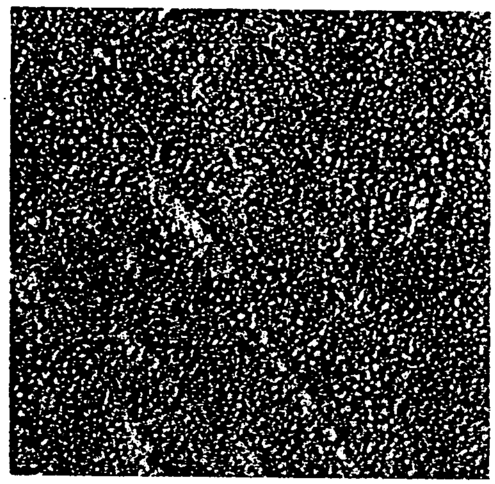
FIG. 4 (A-D) illustrates examples of scanning electron micrographs of a nanofilm of Hexamer 1dh and PMAOD on a polycarbonate substrate.
Figure 4B:
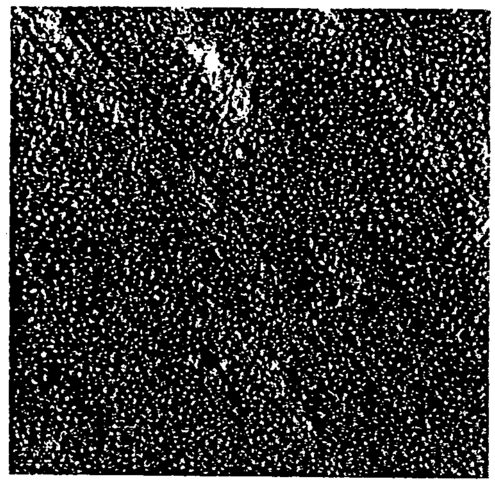
Figure 4C:
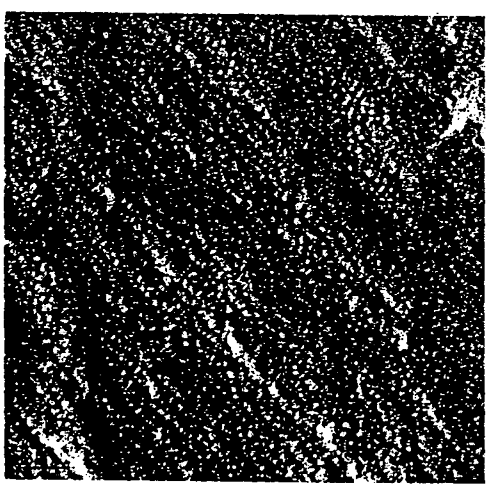
Figure 4D:
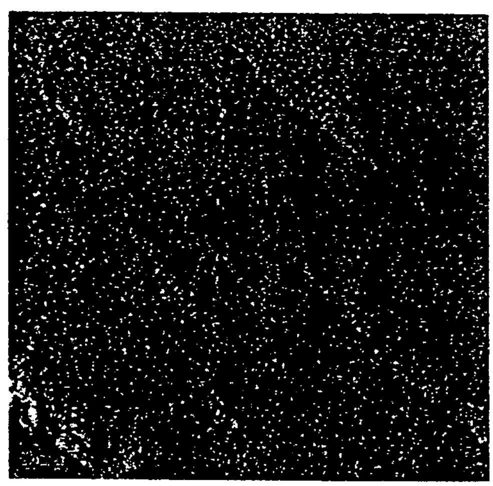

Surface rheology of a sample of nanofilm of Hexamer 1dh and DEM having polymeric component PMAOD is shown in FIGS. 3B-D. Nanofilms used in FIGS. 3B-D were prepared with a 2.0 mg/ml DEM subphase at room temperature. The data in FIGS. 3B-D indicate that for a nanofilm of Hexamer 1dh and DEM, introducing an area fraction of polymeric component PMAOD of about 5% into the nanofilm reduced the storage and loss moduli of the nanofilm by more than one-half at 20 mN/m surface pressure or greater.

Example 6

Hexamer 1dh, PMAOD and DEM on polycarbonate track etch membrane (PCTE): A nanofilm of Hexamer 1dh, PMAOD, and DEM can be made to span the pores of a 0.01 μm PCTE. A solution of Hexamer 1dh and PMAOD having 0.1 mole fraction hexamer: 0.9 mole fraction PMAOD was spread onto a subphase of 0.5 mg/ml DEM. One layer of the resulting nanofilm was deposited by vertical dip at 2 mm/min at a surface pressure of 12 mN/m and deposition rate 1 mm/min onto a PCTE having holes of 10 nm diameter. The sample was not heated. The PCTE substrates were not plasma treated, and the attachment of the nanofilm to the PCTE was not necessarily by covalent binding, but may have been by weaker types of binding or coupling.

The scanning electron micrographs of this nanofilm are shown in FIG. 4. FIG. 4A shows an area in the center of the nanofilm in which no holes in the nanofilm were visible. FIG. 4B shows an area far from the edge of the nanofilm in which no holes in the nanofilm were visible. FIG. 4C shows an area next to that in FIG. 4D which was near the edge of the nanofilm and in which a few holes of various sizes may have been visible in the nanofilm. In FIG. 4D is shown an area near the edge of the nanofilm in which a few holes of various sizes may have been visible in the nanofilm. The holes observed in the nanofilm in FIGS. 4A-4D may have been as large as 30 nm in diameter.

Figure 5A:
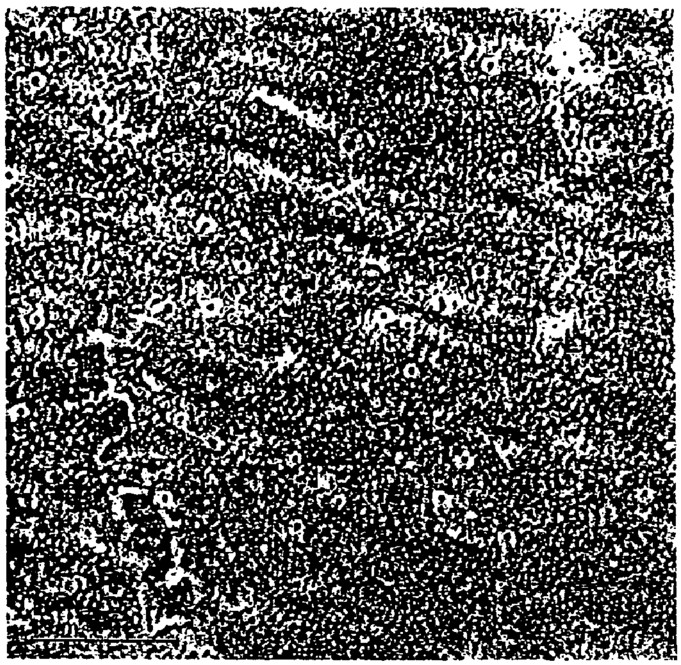
FIG. 5 (A-B) illustrates examples of scanning electron micrographs of a polycarbonate substrate.

By comparison, the scanning electron micrograph of a PCTE substrate having holes of 10 nm diameter is shown in FIG. 5A, which illustrates the pattern of holes in the substrate.

Figure 5B:
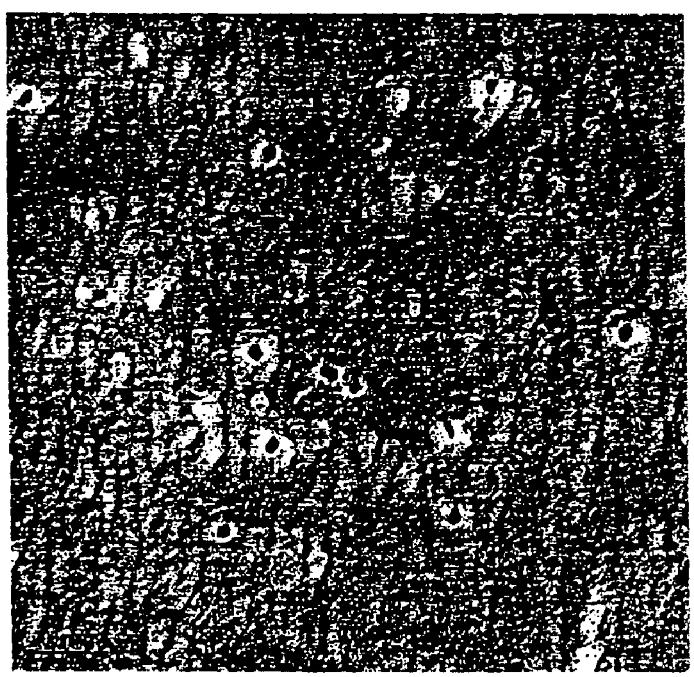

The scanning electron micrograph of the same PCTE substrate after plasma treatment is shown in FIG. 5B, which illustrates that the holes may be widened as compared to the PCTE substrate used in FIG. 5A.

Example 7

Figure 6:
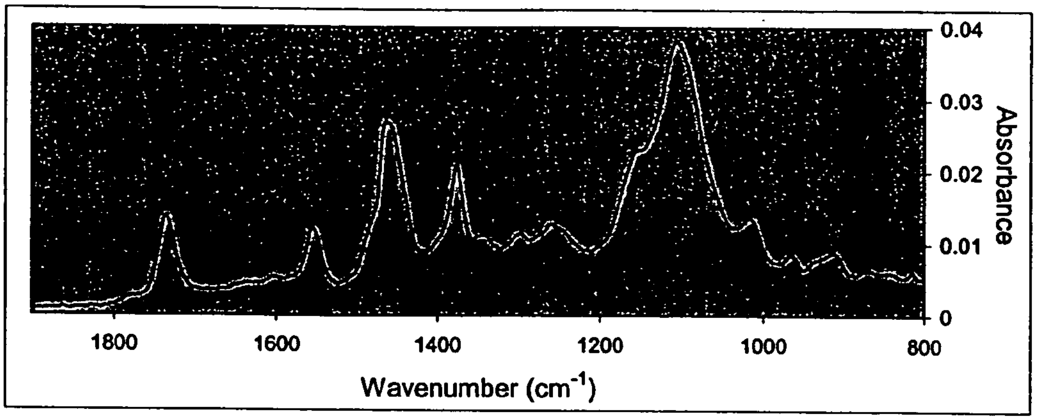
FIG. 6 illustrates an example of an attenuated total reflectance Fourier transform infrared (FTIR-ATR) spectrum of CHCl3 rinsings of a nanofilm of PMAOD.

The FTIR-ATR spectrum of $CHCl_3$ rinsings from PMAOD Langmuir thin film deposited on a $SiO_2$ substrate from an aqueous subphase is shown in FIG. 6. The absorbance at 1737 $cm^{-1}$ (acid carbonyl) resulted from, the hydrolysis of the anhydride group to form a diacid.

Example 8

Figure 7:
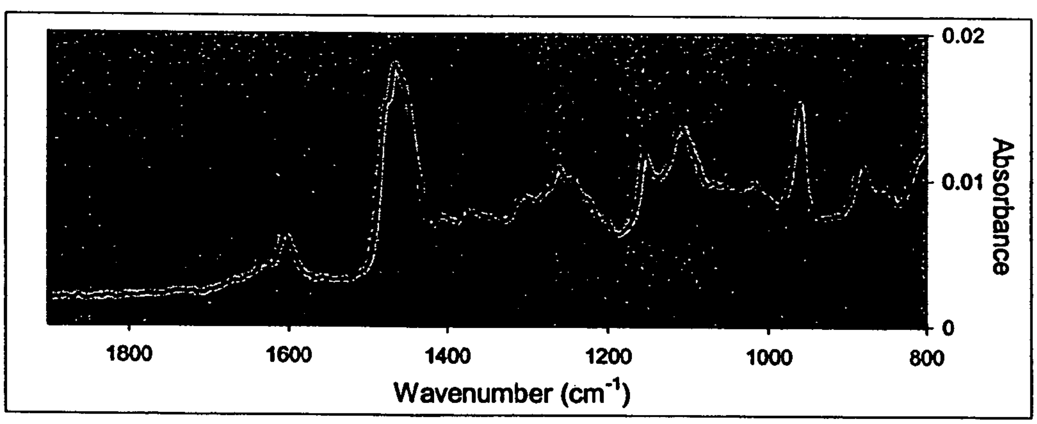
FIG. 7 illustrates an example of an FTIR-ATR spectrum of Hexamer 1dh.

The FTIR-ATR spectrum of Hexamer 1dh is shown in FIG. 7. The dominant absorbance at 1450 $cm^{-}$ was from the —$CH_2$— stretching of the alkyl chains of the hexamer.

Example 9

Figure 8:
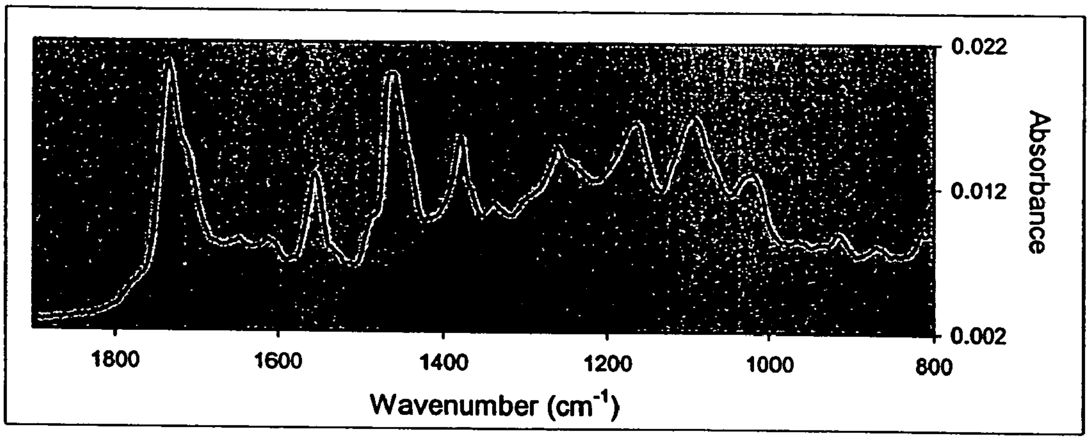
FIG. 8 illustrates an example of an FTIR-ATR spectrum of CHCl3 rinsings of a nanofilm of Hexamer 1dh and PMAOD.

The FTIR-ATR spectrum of $CHCl_3$ rinsings from a nanofilm of Hexamer 1dh and PMAOD deposited on a $SiO_2$ substrate from a pH 9 aqueous subphase is shown in FIG. 8. The peak at 1737 $cm^{-1}$ revealed that the diacid form was present. The broadening of this peak and the formation of a shoulder at 1713 $cm^{-1}$ showed that ester and amide bond formation occurred. Ester formation (shoulder at 1713 $cm^{-1}$) appeared to be favored over an amide carbonyl absorbance (1630-1680 $cm^{-1}$). In the PMAOD spectrum (FIG. 6), the ratio of the areas of the peak appearing at 1450 $cm^{-1}$ to the peak at 1737 $cm^{-1}$ was about 3:1. The ratio for the same peaks observed in FIG. 8 was less than one, and indicated ester or amide formation because of the increase in absorbance in the carbonyl region. This indicated coupling of the module via the phenol and secondary amine groups to the PMAOD polymer.

Example 10

Figure 9:
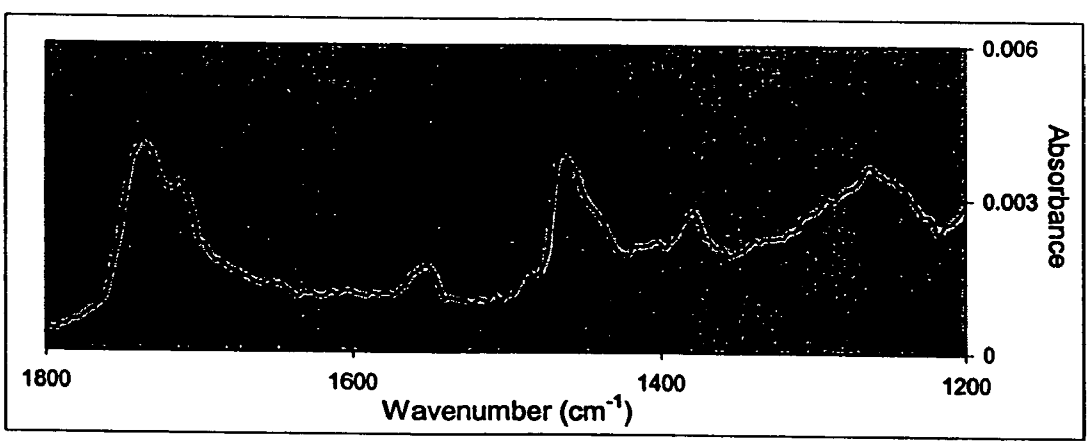
FIG. 9 illustrates an example of an FTIR-ATR spectrum of CHCl3 rinsings of a nanofilm of Hexamer 1dh prepared on a water subphase containing diethyl malonimidate (DEM).

The FTIR-ATR spectrum of $CHCl_3$ rinsings from a Hexamer 1dh Langmuir film deposited on a $SiO_2$ substrate from a pH 9 DEM subphase is shown in FIG. 9. Absorbances at 1737 $cm^{-1}$ and 1713 $cm^{-1}$ were observed. The carbonyl absorbance showed that amide linkages may have formed, indicating coupling of between the module and the cross-linker.

Example 11

Figure 10:
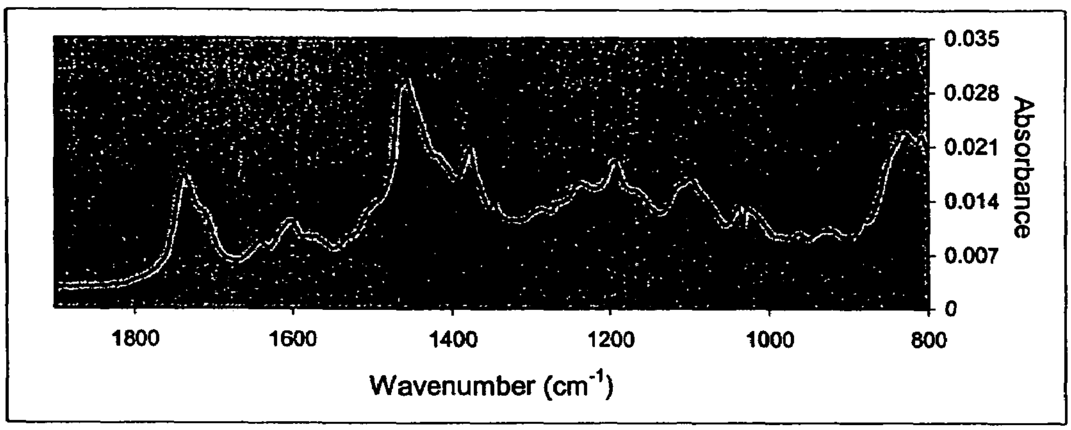
FIG. 10 illustrates an example of an FTIR-ATR spectrum of CHCl3 rinsings of a nanofilm of Hexamer 1dh and PMAOD prepared on a water subphase containing DEM.

The FTIR-ATR spectrum of $CHCl_3$ rinsings from a nanofilm made from Hexamer 1dh and PMAOD deposited on a $SiO_2$ substrate from a pH 9 DEM subphase is shown in FIG. 10. The carbonyl region resembles that in FIG. 8, which would be expected as the DEM can react with the amine functionality of the hexamer to form amide cross-links. In addition, ester formation is possible between PMAOD and the hexamer. This indicated coupling between the module and the polymer, and between the module and the cross-linker.

Example 12

Figure 11:
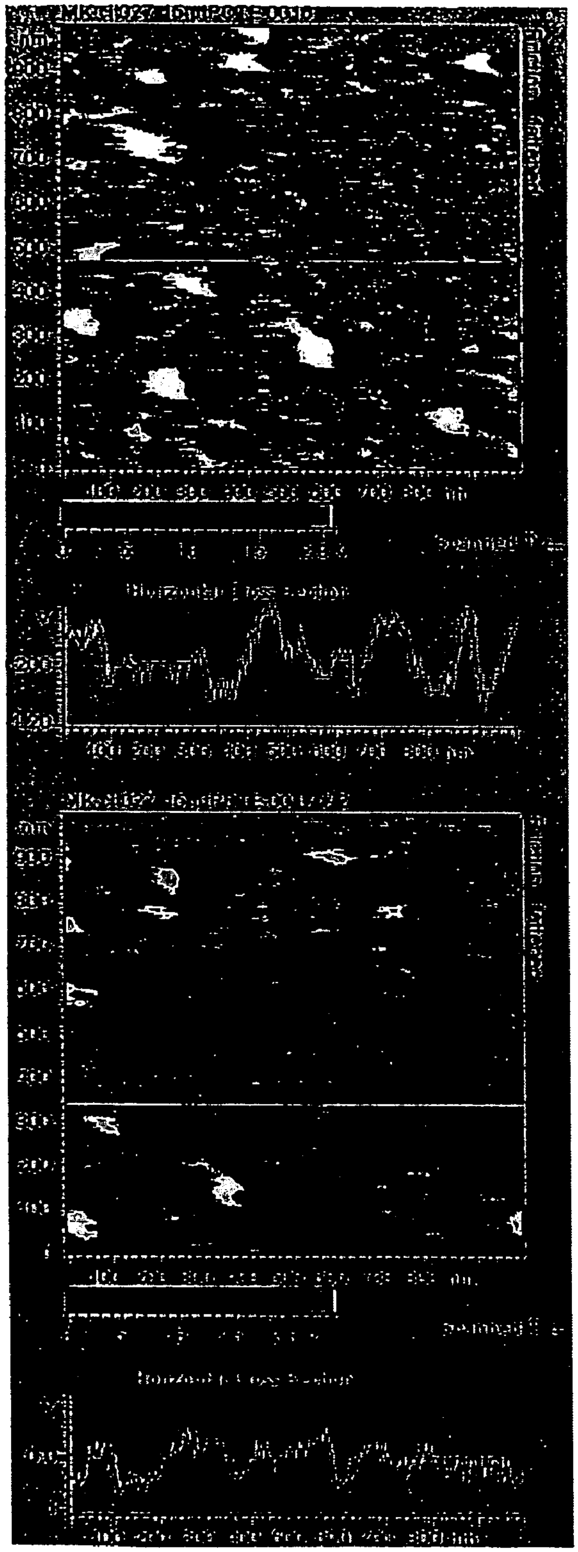
FIG. 11 illustrates examples of atomic force microscopy (AFM) images of a polycarbonate substrate.

Contact Mode AFM images of plasma treated PCTE are shown in FIG. 11. The surface of this substrate was partially smoothed using the AFM tip, as shown in the bottom panel of FIG. 11.

Example 13

Figure 12A:
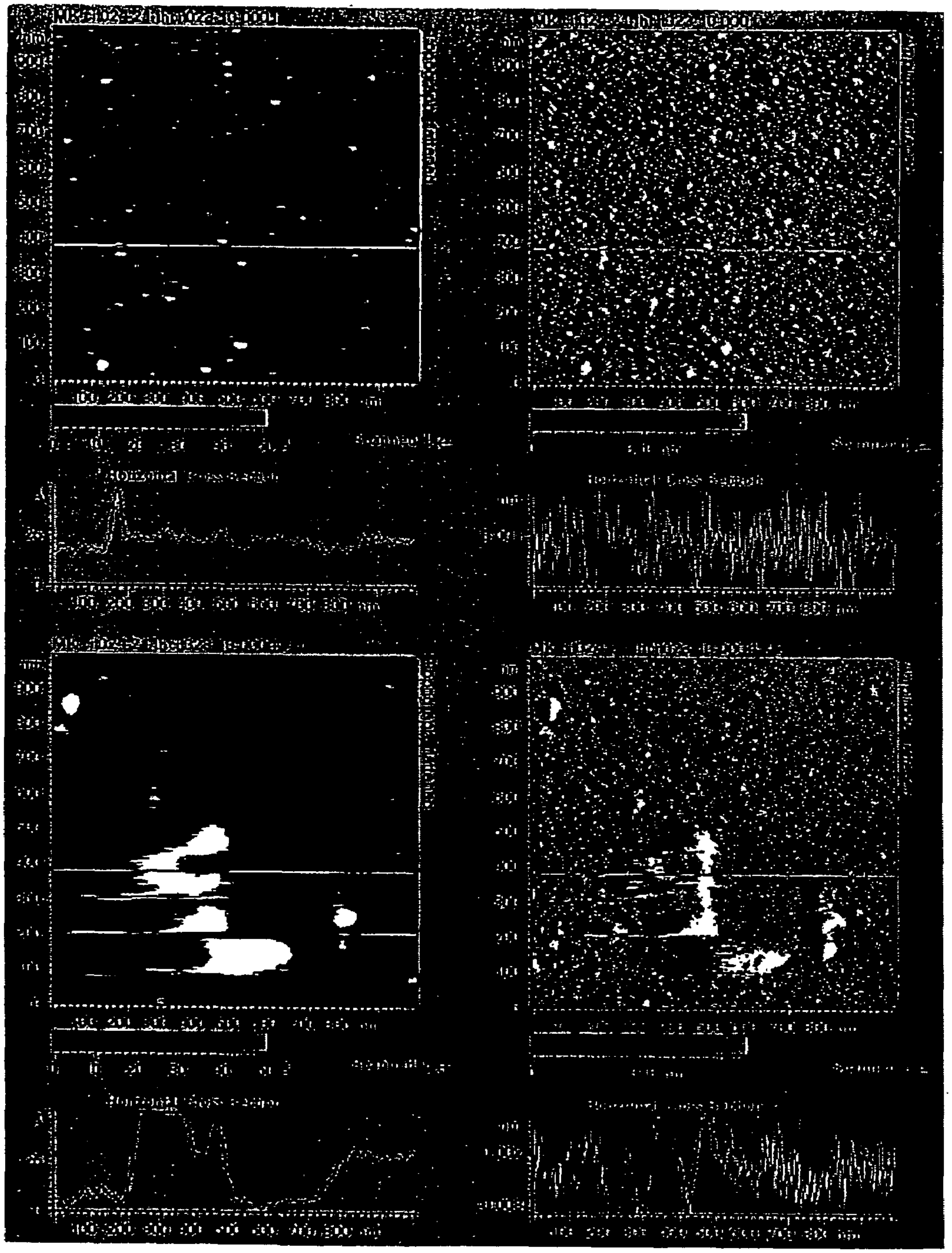
FIG. 12 (A-B) illustrates examples of AFM images of a nanofilm of Hexamer 1dh and PMAOD on a (3-aminopropyl) triethoxysilane (APTES) modified $SiO_2$ substrate.
Figure 12B:
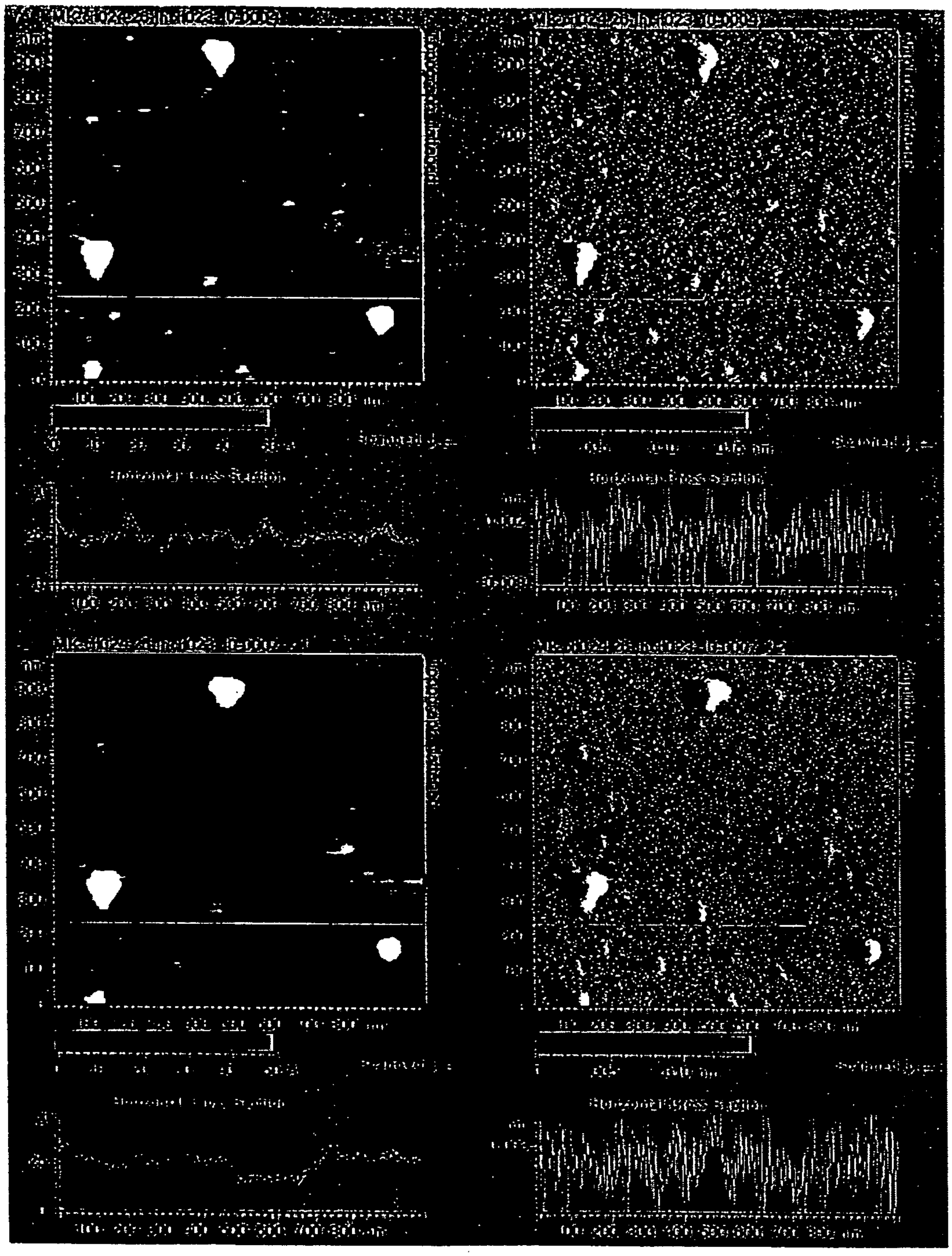

A nanofilm of 0.8:0.2 mole fraction Hexamer 1dh: PMAOD which were pre-mixed in solution was prepared, and deposited by vertical dip onto APTES coated $SiO_2$ substrate. The nanofilm was cured at 70° C. under $N_2$ for 15 hours. The Contact Mode AFM images of the nanofilm obtained under flowing $N_2$ are shown in FIG. 12A. Referring to FIG. 12A, the top panels show the images of a continuous nanofilm, while the bottom panels show the images of the same nanofilm after a piece of the nanofilm about 250 $nm^2$ in area was removed by scraping with the AFM tip. The thickness of the film observed at the edge of the hole created by the tip was 2-3 nm. A second nanofilm of the same composition was cured at 70° C. under $N_2$ for 39 hours. The Contact Mode AFM images of the second nanofilm obtained under flowing $N_2$ are shown in FIG. 12B. Referring to FIG. 12B, the top panels show the images of a continuous nanofilm, while the bottom panels show the images of the same nanofilm after an attempt to scrape away a piece of the nanofilm with the AFM tip. The nanofilm could not be scraped away, showing that the longer-cured nanofilm was more strongly attached to the substrate by annealing.

Example 14

Figure 13:
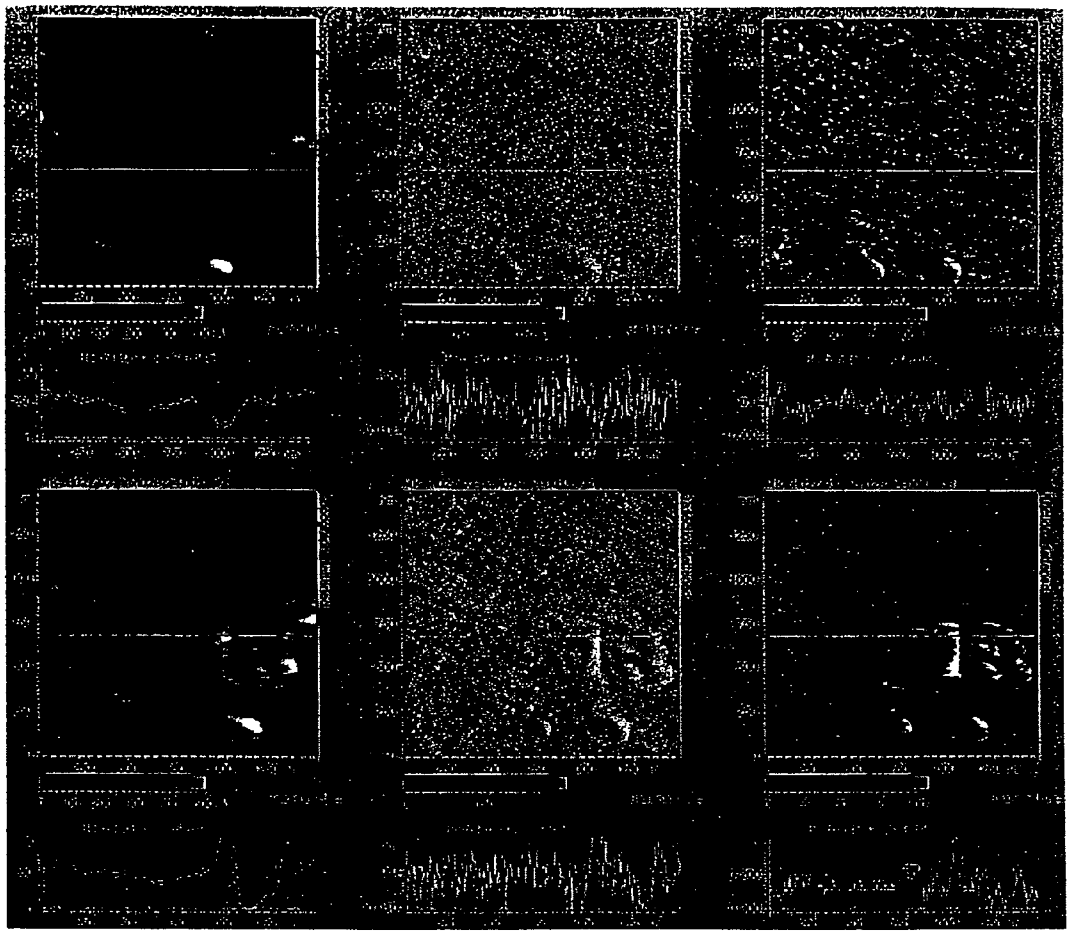
FIG. 13 illustrates examples of AFM images of a nanofilm of Hexamer 1dh and PMAOD prepared on a water subphase containing DEM deposited on a polycarbonate substrate.

The Contact Mode AFM image of a nanofilm made from Hexamer 1dh and PMAOD and DEM, having 0.10 mole fraction of Hexamer 1dh:0.90 mole fraction PMAOD is shown in FIG. 13. The nanofilm was deposited by vertical dip onto PCTE having a random array of holes 0.01 μm in diameter. A depression in the nanofilm made with the AFM tip is clearly visible.

Example 15

Figure 14:
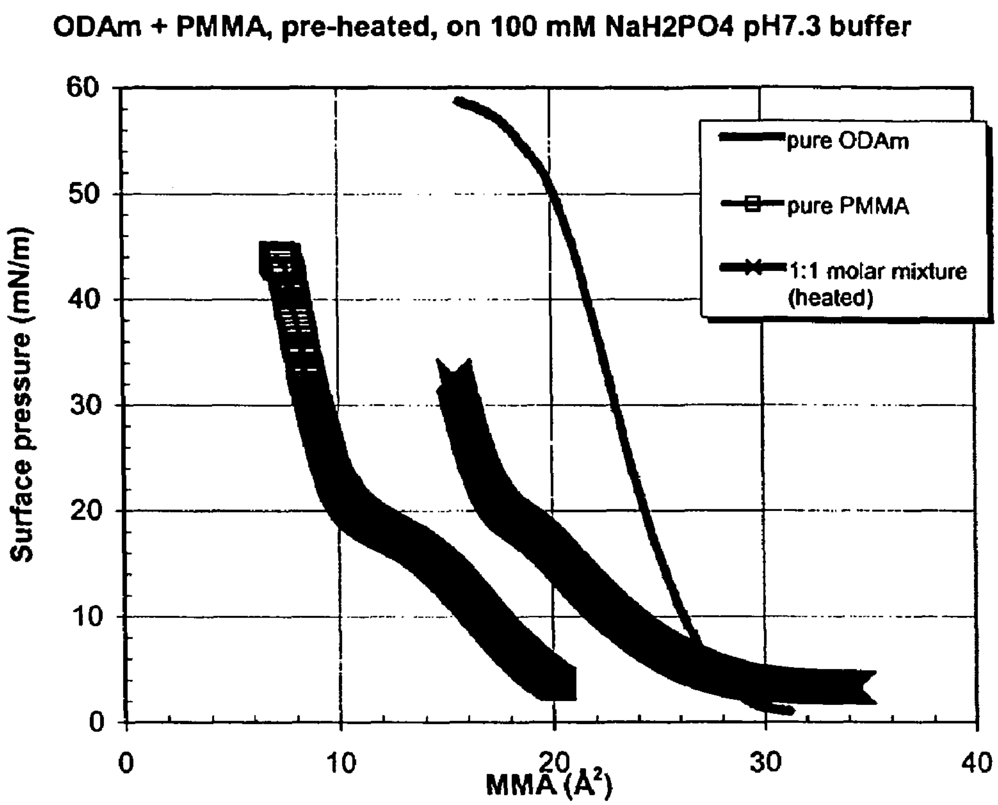
FIG. 14 illustrates examples of surface pressure-area isotherms of a nanofilm of octadecylamine (ODA) and polymethylmethacrylate (PMMA).

A nanofilm was made from an amphiphile, octadecylamine (ODA), and an amphiphilic polymer, polymethylmethacrylate (PMMA) (Polysciences, Warrington Pa., MW 100,000, polydispersity 1.1), from a chloroform solution of the two components heated to 55° C. for 18 hours, then spread at the liquid-air interface of a 100 mM $NaH_2PO_4$ buffer (pH 7.3) at room temperature. Isotherms of this nanofilm and its components made with a 1:1 mixture of ODA:PMMA, illustrated in FIG. 14, showed that the isotherms of ODA and PMMA each retained substantially the same shape in the nanofilm. In general, the isotherms of FIG. 14 indicate that ODA and PMMA were immiscible in the nanofilm.

Example 16

Figure 15:
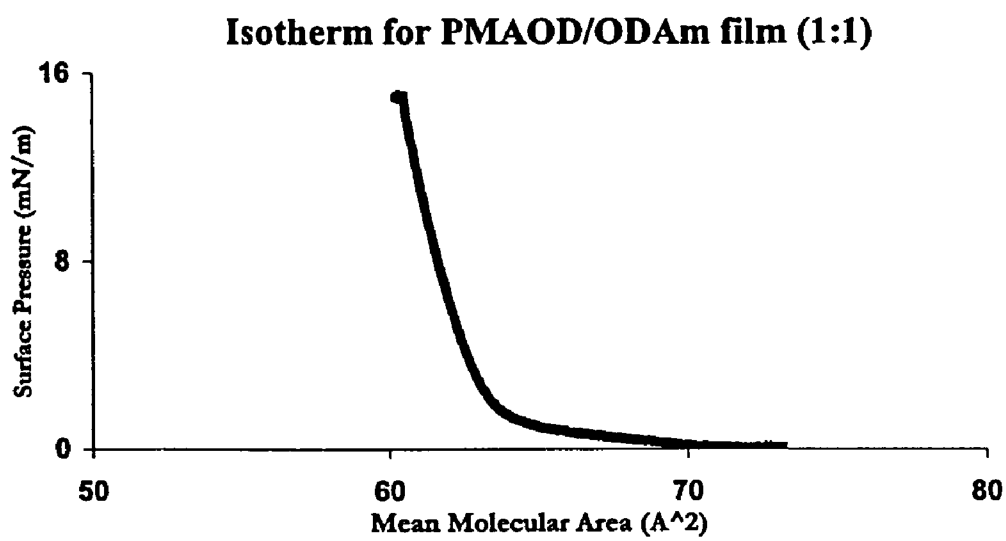
FIG. 15 illustrates examples of surface pressure-area isotherms of a nanofilm of ODA and PMAOD.

A nanofilm was made from an amphiphile, ODA, and an amphiphilic polymer, PMAOD, by spreading a 1:1 molar ratio of ODA:PMAOD in chloroform at the liquid-air interface. The isotherm of this nanofilm, illustrated in FIG. 15, exhibited a different shape than either of the components alone, and a much higher mean molecular area than either of the components alone. In general, the isotherm of FIG. 15 indicates that ODA and PMAOD were miscible in the nanofilm.

Example 17

Figure 16:
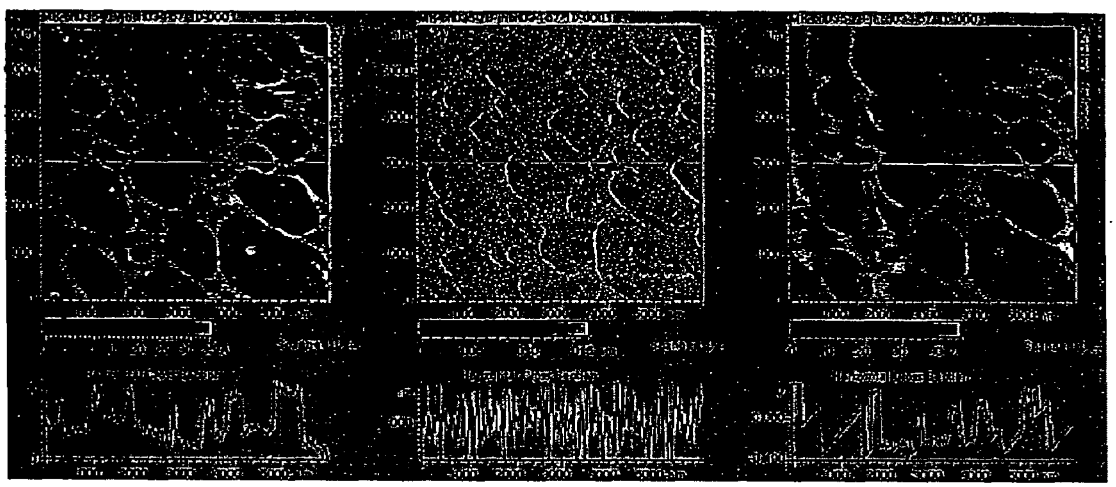
FIG. 16 illustrates examples of AFM images of a nanofilm of Hexamer 1dh and PMMA on a silicon substrate.

A solution of Hexamer 1dh and PMMA was spread at the liquid-air interface over a water subphase to form a nanofilm having 0.6 area fraction Hexamer 1dh. One layer of the resulting nanofilm was deposited by vertical dip at a surface pressure of 20 mN/m onto an APTES coated silicon substrate. The Contact Mode AFM image of the deposited nanofilm is shown in FIG. 16 and illustrates a phase separated nanofilm composition, which confirms that the Hexamer 1dh/PMMA mixture is immiscible. The height of the continuous phase was about 1 nm above the discontinuous phase. Deformations were made with the AFM probe tip in each of the continuous phase and the discontinuous phase to confirm that the two phases are composed of nanofilm and were not part of the substrate. By comparison, the ellipsometric image of a Langmuir-Blodgett deposition of PMMA alone showed a homogeneous, continuous and unbroken film of about 0.6-1.0 nm thickness.

Example 18

Figure 17:
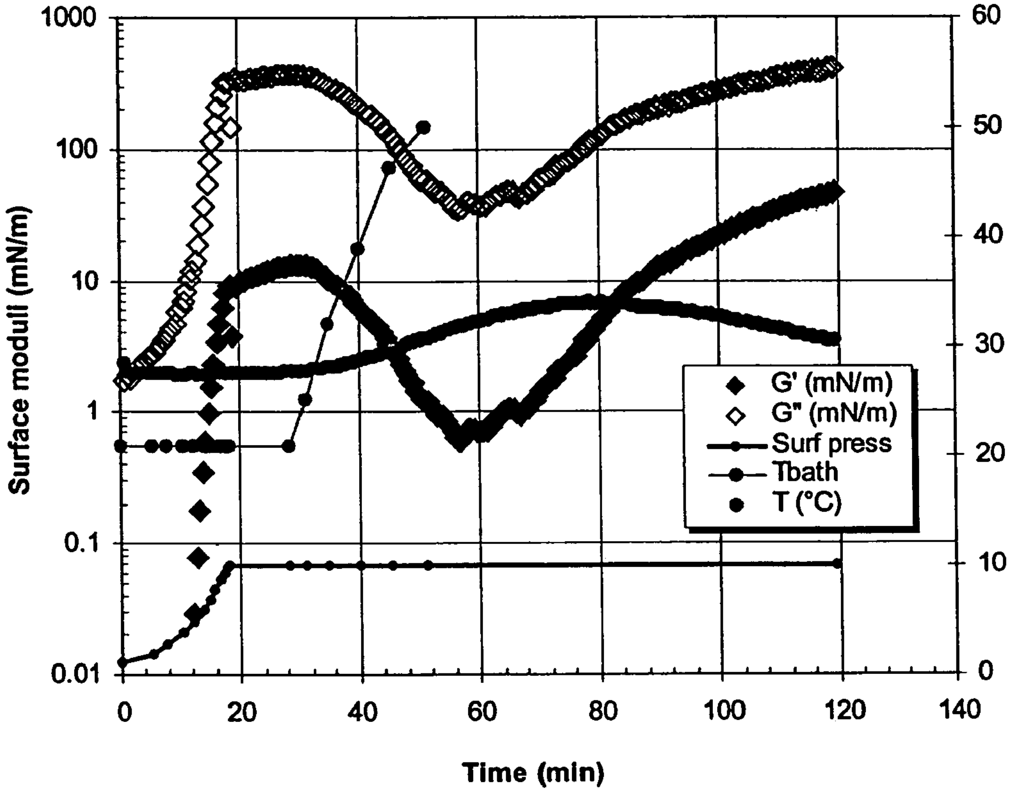
FIG. 17 illustrates examples of the surface rheometric storage and loss moduli for a nanofilm of Hexamer 1dh and PMAOD made on a subphase containing 2 mg/ml DEM.

A solution of Hexamer 1dh and PMAOD was spread at the liquid-air interface over a water subphase containing 2 mg/ml DEM to form a nanofilm. Surface rheology of this nanofilm is shown in FIG. 17. Referring to FIG. 17, storage and loss surface moduli of the nanofilm are illustrated over time as the temperature of the subphase was raised. $T_{bath}$ indicates the temperature of the surrounding circulation bath, and T° C. indicates the temperature of the subphase.

Example 19

A solution of Hexamer 1dh and poly(2-hydroxyethyl methacrylate) (PHEMA) was spread at the liquid-air interface over a water subphase containing 2 mg/ml DEM to form a nanofilm.

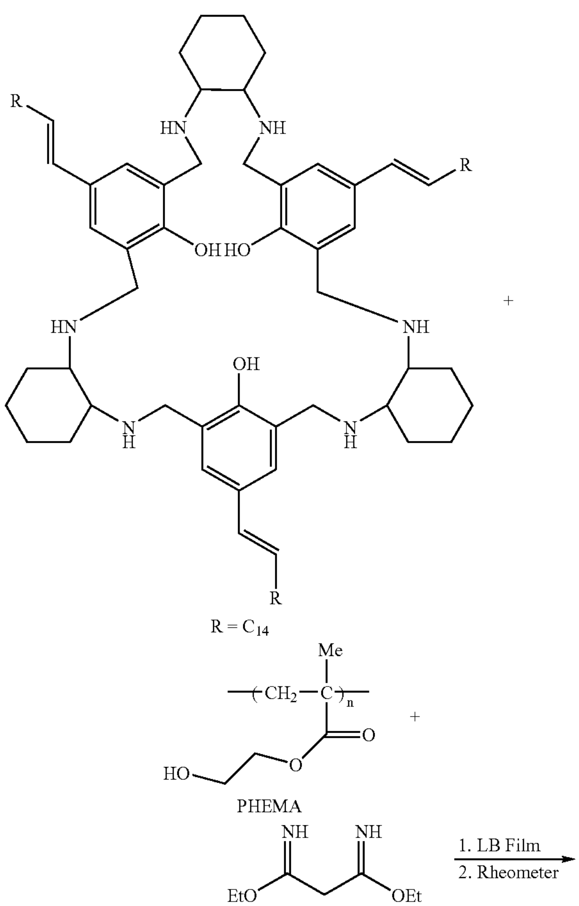

Surface rheology of this nanofilm is shown in Table 11. Referring to Table 11, storage and loss surface moduli of the nanofilm are illustrated as the mole fraction of the components was varied.

TABLE 11

Rheology of nanofilm of Hexamer 1dh and DEM having polymeric component PHEMA

| mol fraction | 10 mN/m | | 20 mN/m | | 30 mN/m | |
|---|---|---|---|---|---|---|
| Hexamer 1dh | G' | G" | G' | G" | G' | G" |
| 0 | 0.07* | 14* | — | — | — | — |
| 0.5 | 32 | 649 | 138 | 1233 | 291 | 1660 |
| 0.75 | 5.8 | 172 | 64 | 660 | 172 | 1206 |
| 100 | 13.3 | 257 | 147 | 1297 | 419 | 2707 |

*Obtained at 5 mN/m.

The data in Table 11 indicate that for a nanofilm of Hexamer 1dh, PHEMA and DEM, introducing a mole fraction of polymeric component PHEMA of about 25% into the nanofilm reduced the loss modulus (G") of the nanofilm by more than 50% at 30 mN/m surface pressure. In Table 11, the increase of both loss and storage surface moduli of the nanofilm as the mole fraction of PHEMA increases from 0.25 to 0.5 indicates coupling of PHEMA to the cross-linker.

Example 20

Figure 18:
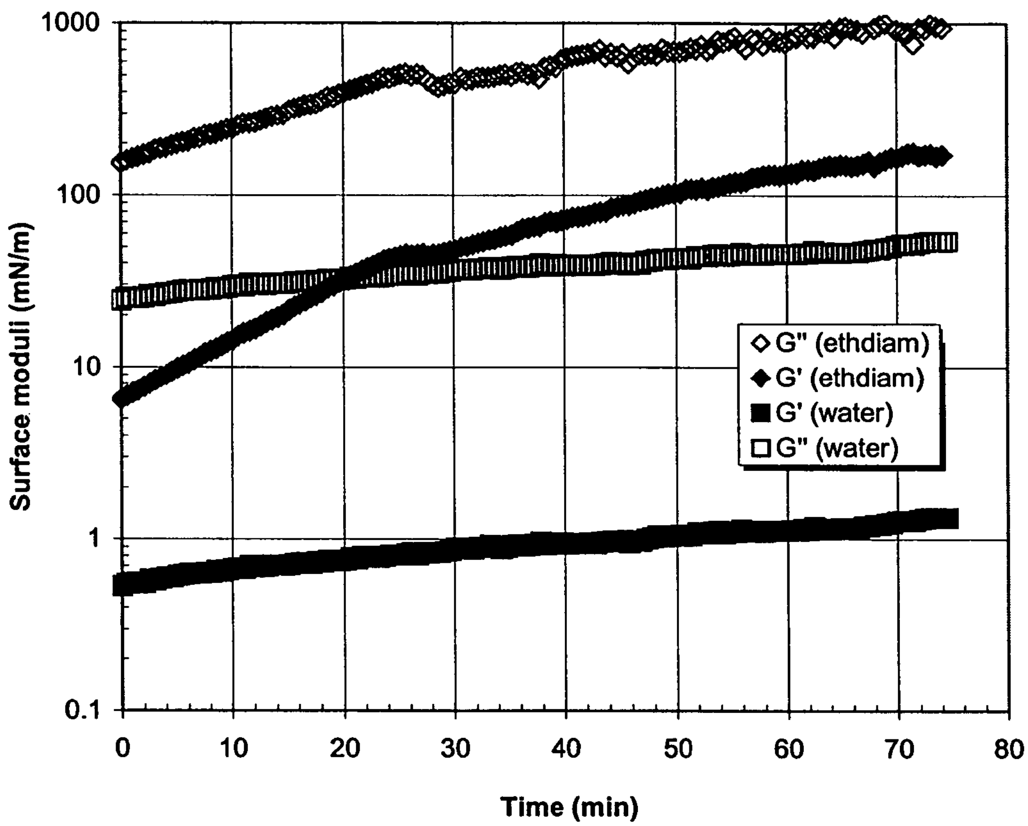
FIG. 18 illustrates examples of the surface rheometric storage and loss moduli for a nanofilm of polyglycidyl methacrylate (PGM) made on a subphase containing 1% ethylene diamine compared with a nanofilm of PGM made on a basic subphase.

Rheological characterization of polyglycidyl methacrylate (PGM) monolayers on a subphase containing 1% (by volume) ethylene diamine was performed according to the following protocol. 10 μl of a chloroform solution of PGM (1 mg/mL) was spread at the liquid-air interface of a 1% ethylene diamine subphase. After allowing 15 minutes for evaporation of the spreading solvent, the film was compressed to a surface pressure of 10 mN/m. The viscoelastic properties of the film were then measured at 30° C. using the CIR-100 interfacial rheometer (Camtel LTD, Herts, UK). Briefly, a sinusoidal torque of amplitude 0.02 μN·m and frequency 1 Hz was applied to the film, and the in-phase and out-of-phase components of the resulting strain were measured, giving the elastic and viscous components, respectively. The response was measured for approximately 70 minutes, and the data were then averaged. Subsequently, a control experiment was performed with PGM on basic subphases (pH=10.5 and 12) to determine whether pH played any roll in the high viscosities observed for experiments performed on the ethylene diamine subphases. The Rheology data in FIG. 18 indicates that the PGM films made on an ethylene diamine subphase have an almost 2 orders of magnitude increase in surface moduli, as compared to PGM on a basic subphase. Therefore, ethylene diamine appears to be cross-linking the PGM into a nanofilm. When spread on a pure $H_2O$ subphase, PGM makes a Langmuir film with a collapse pressure of approximately 10 mN/m (data not shown).

Example 21

Without intending to be bound by any one particular theory, one method to approximate pore size of a macrocyclic module is quantum mechanical (QM) and molecular mechanical (MM) computations. In this example, macrocyclic modules having two types of synthons, "A" and "B," were used and all linkages between synthons were assumed to be the same. For the purposes of QM and MM computations, the root mean square deviations in the pore areas were computed over dynamic runs.

For QM, each module was first optimized using the MM+ force field approach of Allinger (JACS, 1977, 99:8127) and Burkert, et al., (Molecular Mechanics, ACS Monograph 177, 1982). They were then re-optimized using the AM1Hamiltonian (Dewar, et al., JACS, 1985, 107:3903; Dewar, et al., JACS, 1986, 108:8075; Stewart, J. Comp. Aided Mol. Design, 1990, 4:1). To verify the nature of the potential energy surface in the vicinity of the optimized structures, the associated Hessian matrices were computed using numerical double-differencing.

For MM, the OPLS-AA force field approach (Jorgensen, et al., JACS, 1996, 118:11225) was used. For imine linkages, the dihedral angle was confined to 180°±10°. The structures were minimized and equilibrated for one picosecond using 0.5 femtosecond time steps. Then a 5 nanosecond dynamics run was carried out with a 1.5 femtosecond time step. Structures were saved every picosecond. The results are shown in Tables 12 and 13.

Macrocyclic module pore areas derived from QM and MM computations for various linkages and macrocyclic module pore size are shown in Table 12. In Table 12, the macrocyclic modules had alternating synthons "A" and "B." Synthon "A" is a benzene synthon coupled to linkages L at 1,3-phenyl positions, and Synthon "B" is shown in the left-hand column of the table.

Further macrocyclic module pore areas derived from QM and MM computations for various linkages and macrocyclic module pore size are shown in Table 13. In Table 13, the macrocyclic modules had alternating synthons "A" and "B." In Table 13, Synthon "A" is a naphthalene synthon coupled to linkages L at 2,7-naphthyl positions, and Synthon "B" is shown in the left-hand column of the table.

TABLE 13

| | Pore areas for various macrocyclic modules (Å$^2$) | |
|---|---|---|
| SYNTHON B | HEXAMER QM | HEXAMER MM |
| Trans-1,2-cyclohexane | imine (trans) 23.5 Å$^2$ | imine (trans) 25.4 ± 4.9 Å$^2$ |
| Endo-endo-1,3-bicycloheptane | imine (trans) 30.1 Å$^2$ | imine (trans) 30.0 ± 3.6 Å$^2$ |

Figure 19A:
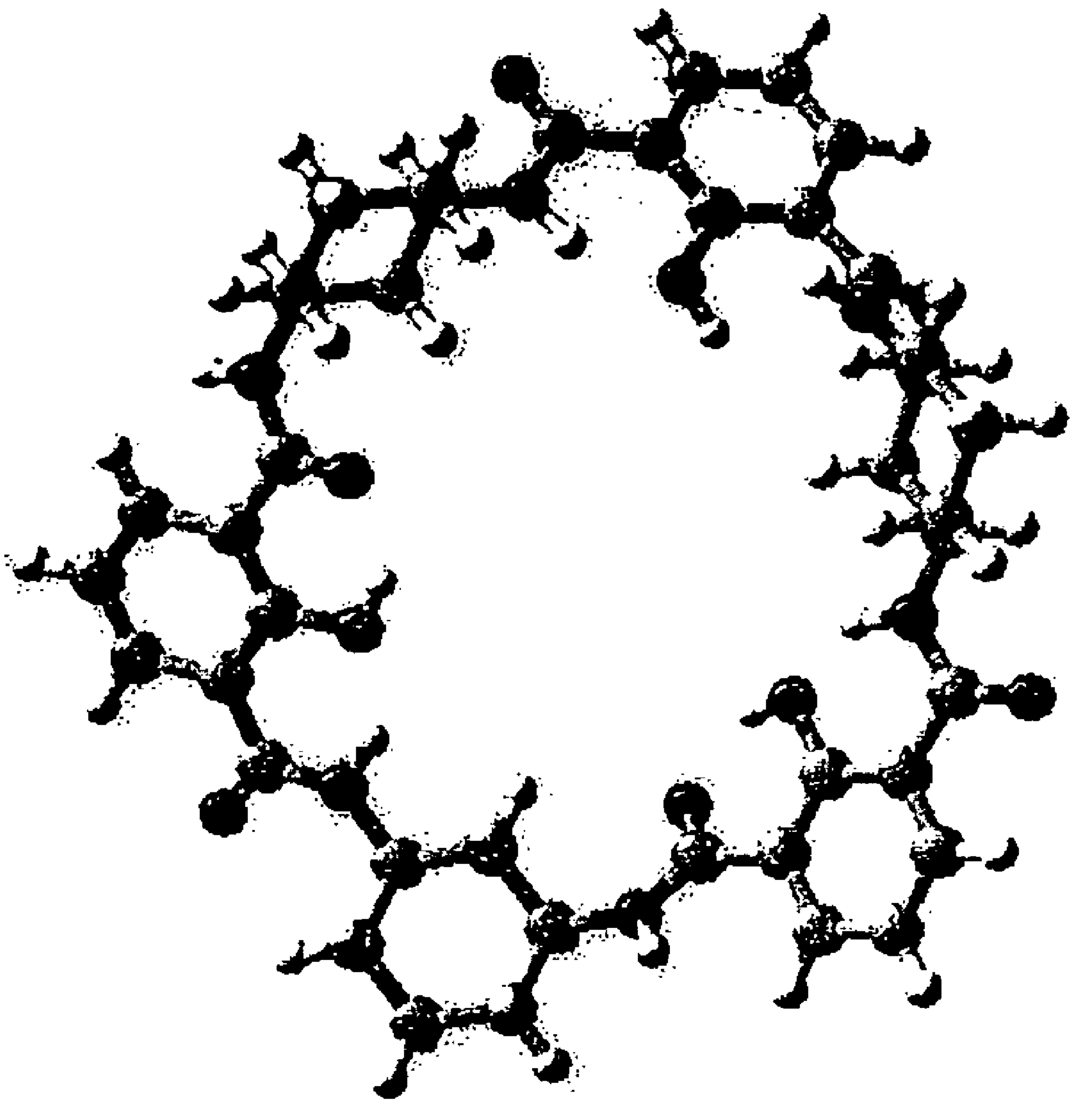
FIGS. 19A and 19B show representations of examples of the structure of embodiments of a hexamer macrocyclic module.
Figure 19B:
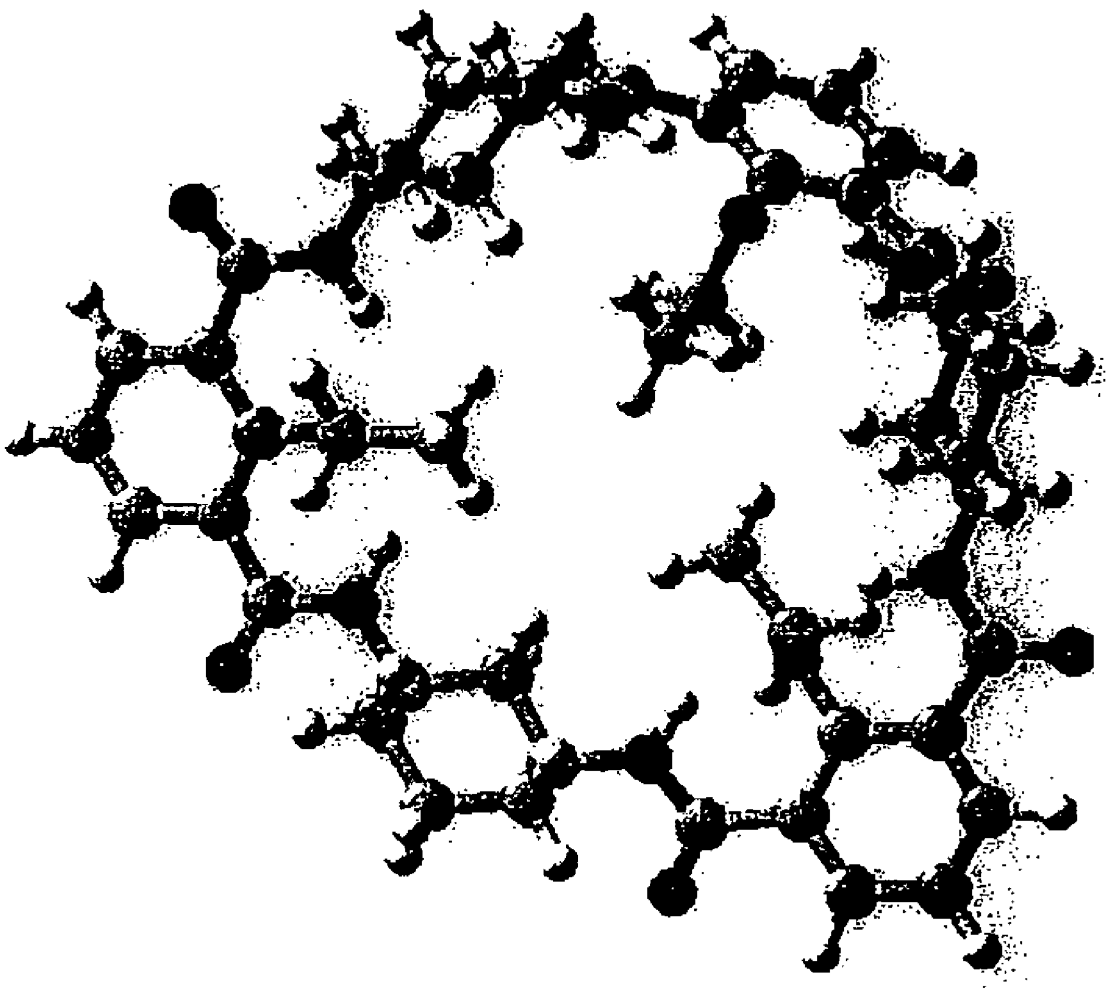

An example of the energy-minimized conformations of some hexamer macrocyclic modules having groups of substituents are shown in FIGS. 19A and 19B. Referring to FIG.

TABLE 12

| | | | Pore areas for various macrocyclic modules (Å$^2$) | | | |
|---|---|---|---|---|---|---|
| SYNTHON B | TETRAMER QM | TETRAMER MM | HEXAMER QM | HEXAMER MM | OCTAMER QM | OCTAMER MM |
| trans-1,2-cyclohexane | | | imine (trans) 14.3 Å$^2$ | Imine (trans) 13.2 ± 1.4 Å$^2$ | | |
| trans-1,2-cyclohexane | | | Acetylene 14.3 Å$^2$ | | | |
| trans-1,2-cyclohexane | | | Amine 23.1 Å$^2$ | Amine 13.9 ± 1.9 Å$^2$ | | |
| trans-1,2-cyclohexane | | | Amide 19.7 Å$^2$ | Amide 17.5 ± 2.0 Å$^2$ | | |
| trans-1,2-cyclohexane | | | Ester 18.9 Å$^2$ | Ester 19.6 ± 2.0 Å$^2$ | | |
| Equatorial-1,3-cyclohexane | | | imine (trans) 18.1 Å$^2$ | Imine (trans) 21.8 ± 1.6 Å$^2$ | imine (trans) 66.2 Å$^2$ | Imine (trans) 74.5 ± 7.7 Å$^2$ |
| Equatorial-1,3-cyclohexane | | | Amine 14.7 Å$^2$ | Amine 19.9 ± 2.6 Å$^2$ | | |
| Equatorial-1,3-cyclohexane | | | Amide 24.8 Å$^2$ | Amide 21.7 ± 1.8 Å$^2$ | | |
| Equatorial-1,3-cyclohexane | | | Ester 22.9 Å$^2$ | Ester 22.8 ± 2.4 Å$^2$ | | |
| Equatorial-3-amino-cyclohexene | imine (trans) oxygen-oxygen distance 2.481 Å | imine (trans) oxygen-oxygen distance 3.7 ± .3 Å | imine (trans) 18.4 Å$^2$ | Imine (trans) 21.0 ± 1.5 Å$^2$ | imine (trans) 56.7 Å$^2$ | Imine (trans) 60.5$^+$ − 8.3 Å$^2$ |
| trans-1,2-pyrrolidine | | | imine (trans) 10.4 Å$^2$ | Imine (trans) 9.2 ± 1.4 Å$^2$ | | |
| Equatorial-1,3-piperidene | | | imine (trans) 19.2 Å$^2$ | Imine (trans) 20.9 ± 1.1 Å$^2$ | | |
| Endo-exo-1,2-bicycloheptane | | | imine (trans) 11.1 Å$^2$ | Imine (trans) 14.1 ± +−11 Å$^2$ | | |
| Endo-endo-1,3-bicycloheptane | | | imine (trans) 18.8 Å$^2$ | Imine (trans) 20.7 ± 1.4 Å$^2$ | | |
| Endo-exo-1,3-bicycloheptane | | | Imine 19.5 Å$^2$ | Imine 10.1 ± +4.9 Å$^2$ | | |
| Equatorial-1,3-cyclohexane | | | Amine 9.8 Å$^2$ | Amine 9.9 ± 2.4 Å$^2$ | | |
| Endo-endo-1,3-bicyclooctene | | | imine (trans) 18.9 Å$^2$ | Imine (trans) 21.6 ± 1.5 Å$^2$ | | |
| Endo-exo-1,3-bicyclooctene | | | imine (trans) 15.6 Å$^2$ | Imine (trans) 18.7 ± 1.6 Å$^2$ | | |
| Equatorial-3,9-decalin | | | imine (trans) 35.4 Å$^2$ | Imine (trans) 40.0 ± 2.2 Å$^2$ | | |

19A, a Hexamer 1-h-$(OH)_3$ is shown having a group of —OH substituents. Referring to FIG. 19B, a Hexamer 1-h-$(OEt)_3$ is shown having a group of —OEt substituents. The differences in pore structure and area between these two examples, which also reflect conformational and flexibility differences, are evident. This macrocyclic module results in a composition which may be used to regulate pores. Selection of ethoxy synthon substituents over hydroxy synthon substituents for this hexamer composition is a method which may be used for transporting selected species.

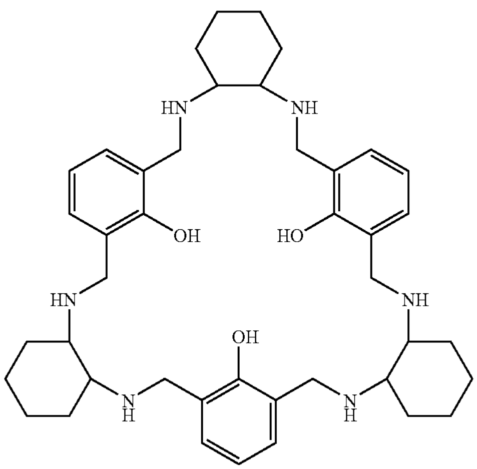

Hexamer 1-h-(OH)3

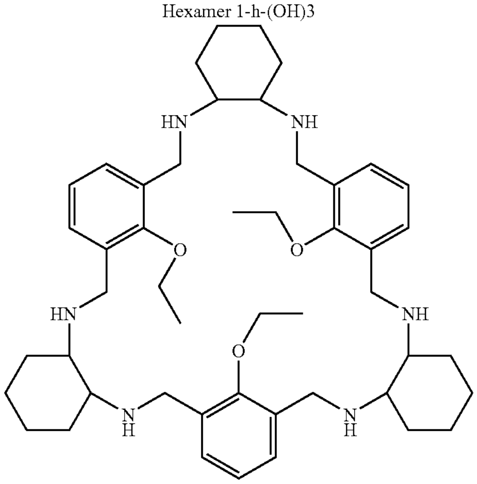

Hexamer 1-h-$(OEt)_3$

Example 22

The pore size of macrocyclic modules was determined experimentally using a voltage-clamped bilayer procedure. A quantity of a macrocyclic module was inserted into a lipid bilayer formed by phosphatidylcholine and phosphatidylethanolamine. On one side of the bilayer was placed a solution containing the cationic species to be tested. On the other side was a solution containing a reference cationic species known to be able to pass through the pore of the macrocyclic module. Anions required for charge balance were selected which could not pass through the pores of the macrocyclic module. When a positive electrical potential was applied to the solution on the side of the lipid bilayer containing the test species, if the test species passed through the pores in the macrocyclic modules, a current was detected. The voltage was then reversed to detect current due to transport of the reference species through the pores, thereby confirming that the bilayer is a barrier to transport and that the pores of the macrocyclic modules provide transport of species.

Using the above technique, a hexameric macrocyclic module comprised of 1 R,2R-(−)-transdiaminocyclohexane and 2,6-diformal-4-(1-dodec-1-ynyl)phenol synthons, having imine groups as the linkages (the first module in Table 1) was tested for transport of various ionic species. The results are shown in Table 14.

TABLE 14

Voltage-clamped bilayer test for macrocyclic module pore size

| Ionic species | Calculated van der Waals radius of ionic species (Å) | Calculated van der Waals radius of ionic species with one water shell (Å) | Does ionic species pass through pore? |
|---|---|---|---|
| $Na^+$ | 1.0 | 2.2 | Yes |
| $K^+$ | 1.3 | 2.7 | Yes |
| $Ca^{2+}$ | 1.0 | 2.7 | Yes |
| $NH_4^+$ | 1.9 | 2.9 | Yes |
| $Cs^+$ | 1.7 | 3.0 | Yes |
| $MeNH_3^+$ | 2.0 | 3.0 | Yes |
| $EtNH_3^+$ | 2.6 | 3.6 | No |
| $NMe_4^+$ | 2.6 | 3.6 | No |
| Aminoguanidinium | 3.1 | 4.1 | No |
| $NEt_4^+$ | 3.9 | 4.4 | No |
| Choline | 3.8 | 4.8 | No |
| Glucosamine | 4.2 | 5.2 | No |

The results in Table 14 show that the cut-off for passage through the pore in the selected module is a van der Waals radius of between 2.0 and 2.6 Å. In Table 12, the QM and MM computed pore sizes are given as areas. Using the equation for area of a circle, $A=\pi r^2$, the computed area of the pore in the first module of Table 12, 14.3 Å$^2$, gives a value for r of 2.13 Å. Ions having van der Waals radii of less than 2.13 Å would be expected to traverse the pore and those with larger radii would not, and that is what was observed. $CH_3NH_3^+$, having a radius of 2.0 Å, passed through the pore while $CH_3CH_2NH_3^+$, with a radius of 2.6 Å, did not. Without being held to a particular theory, and recognizing that several factors influence pore transport, the observed ability of hydrated ions to pass through the pore may be due to partial dehydration of the species to enter the pore, transport of water molecules and ions through the pore separately or with reduced interaction during transport, and re-coordination of water molecules and ions after transport. The details of pore structure, composition, and chemistry, the flexibility of the macrocyclic module, and other interactions may affect the transport process.

Example 23

Pore properties of 1,2-imine-linked and 1,2-amine-linked hexamer macrocyclic modules are illustrated in Table 15. Referring to Table 15, the bilayer clamp data indicates that the passage and exclusion of certain species through the pore of the modules correlates with the computational size of the pores. Further, these surprising data show that a very small change in the placement of atoms and/or structural features can lead to a discrete change in transport properties and allow regulation of transport through the pore by variation of synthons and linkages, among other factors.

TABLE 15

Voltage-clamped bilayer test for macrocyclic module pore size

| Solute species | Radius of Solute | Radius of solute with $H_2O$ (radius of $2^{nd}$ hydration shell in parentheses) | Hexamer 1a (1,2-imine) Radius = 3.3 Å | Hexamer 1jh (1,2-imine) Radius = 3.9 Å |
|---|---|---|---|---|
| $Li^+$ | 0.6 | 2.0 (5.6) | No | Yes |
| $Na^+$ | 1.0 | 2.2 | Yes | Yes |
| $K^+$ | 1.3 | 2.7 | Yes | Yes |
| $Ca^{2+}$ | 1.0 | 2.7 | Yes | Yes |
| $Mg^{2+}$ | 0.7 | 2.8 (5.5) | No | Yes |
| $NH_4^+$ | 1.9 | 2.9 | Yes | Yes |
| $Cs^+$ | 1.7 | 3 | Yes | Yes |
| $MeNH_3^+$ | 2 | 3 | Yes | Yes |
| $EtNH_3^+$ | 2.6 | 3.6 | No | Yes |
| $NMe_4^+$ | 2.6 | 3.6 | No | Yes |
| Amino-guanidine | 3.1 | 4.1 | No | Yes |
| Choline | 3.8 | 4.8 | No | Yes |
| $NEt_4^+$ | 3.9 | 4.4 | No | No |
| Glucosamine | 4.2 | 5.2 | No | No |
| $NPr_4^+$ | — | — | — | No |

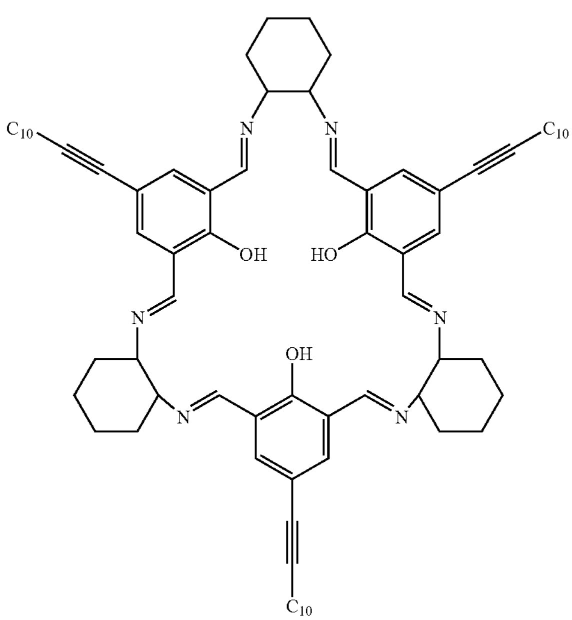

Hexamer 1a-1,2-imine

TABLE 15-continued

| Voltage-clamped bilayer test for macrocyclic module pore size | | | | |
|---|---|---|---|---|
| Solute species | Radius of Solute | Radius of solute with $H_2O$ (radius of $2^{nd}$ hydration shell in parentheses) | Hexamer 1a (1,2-imine) Radius = 3.3 Å | Hexamer 1jh (1,2-imine) Radius = 3.9 Å |

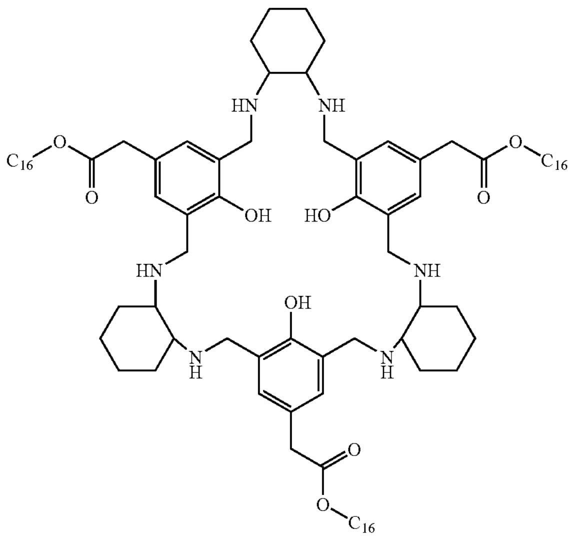

Hexamer 1jh-1,2-amine

Example 24

The filtration function of a membrane may be described in terms of its solute rejection profile. The filtration function of some nanofilm membranes is exemplified in Tables 16-17.

TABLE 16

| Example filtration function of a G-membrane | | |
|---|---|---|
| SOLUTE | MOLECULAR WEIGHT | PASS/NO PASS |
| Albumin | 68 kDa | NP |
| Ovalbumin | 44 kDa | P |
| Myoglobin | 17 kDa | P |
| $\beta_2$-Microglobulin | 12 kDa | P |
| Insulin | 5.2 kDa | P |
| Vitamin $B_{12}$ | 1350 Da | P |
| Urea, $H_2O$, ions | <1000 Da | P |

TABLE 17

| Example filtration function of a T-membrane | | |
|---|---|---|
| SOLUTE | MOLECULAR WEIGHT | PASS/NO PASS |
| $\beta_2$-Microglobulin | 12 kDa | NP |
| Insulin | 5.2 kDa | NP |
| Vitamin $B_{12}$ | 1350 Da | NP |
| Glucose | 180 Da | NP |
| Creatinine | 131 Da | NP |
| $H_2PO_4^-$, $HPO_4^{2-}$ | ≈97 Da | NP |
| $HCO_3$ | 61 Da | NP |

TABLE 17-continued

| Example filtration function of a T-membrane | | |
|---|---|---|
| SOLUTE | MOLECULAR WEIGHT | PASS/NO PASS |
| Urea | 60 Da | NP |
| K+ | 39 Da | P |
| Na+ | 23 Da | P |

The passage or exclusion of a solute is measured by its clearance, which reflects the portion of solute that actually passes through the membrane. The no pass symbol in Tables 16-17 indicates that the solute is partly excluded by the nanofilm, sometimes less than 90% rejection, often at least 90% rejection, sometimes at least 98% rejection. The pass symbol indicates that the solute is partly cleared by the nanofilm, sometimes less than 90% clearance, often at least 90% clearance, sometimes at least 98% clearance.

Example 25

Selective filtration and relative clearance of solutes is exemplified in Table 18. In Table 18, the heading “high permeability” indicates a clearance of greater than about 70-90% of the solute. The heading “medium permeability” indicates a clearance of less than about 50-70% of the solute. The heading “low permeability” indicates a clearance of less than about 10-30% of the solute.

TABLE 18

| Clearance of solutes by nanofilms | | | |
|---|---|---|---|
| Nanofilm | high permeability | medium permeability | low permeability |
| Hexamer 1a | $H_2O$, $Na^+$, $K^+$, $Cs^+$ | $Ca^{2+}$, $Mg^{2+}$, phosphate | Glucose, $Li^+$, urea, creatinine |
| water nanofilm | $H_2O$ | Glucose, $Na^+$, $K^+$, phosphate | $Ca^{2+}$, $Mg^{2+}$, $Li^+$, urea, creatinine |
| ion nanofilm | $H_2O$, $Na^+$, $K^+$, phosphate | Glucose | $Ca^{2+}$, $Mg^{2+}$, $Li^+$, urea, creatinine |
| glucose nanofilm | $H_2O$, $Na^+$, $K^+$, Glucose | Phosphate | $Ca^{2+}$, $Mg^{2+}$, $Li^+$, urea, creatinine |
| G nanofilm | $H_2O$, $Na^+$, $K^+$, phosphate, Glucose, $Ca^{2+}$, $Mg^{2+}$, $Li^+$, urea, creatinine | Vitamin $B_{12}$, Insulin, $\beta_2$ Micro-globulin | Myglobin, Ovalbumin, Albumin, |
| gas nanofilm | He, $H_2$ | — | $H_2O$ and larger, liquids in general |
| anion nanofilm | $Cl^-$ | $HCO_3^-$, Phosphate | — |

Example 26

The approximate diameter of various species to be considered in a filtration process are illustrated in Table 19:

| solute | molecular weight (Da) | diameter (Å) |
|---|---|---|
| virus | $10^6$ | 133 |
| immunoglobulin G (IgG) | $10^5$ | 60 |
| albumin | $50 \times 10^4$ | 50 |
| $\beta_2$-Microglobulin | $10^3$ | 13 |
| urea | 60 | — |
| $Na^+$ | 23 | — |

Synthon and Macrocyclic Module Synthesis Methods

All chemical structures illustrated and described in this specification, both in the description above and the examples below, as well as in the figures, are intended to encompass and include all variations and isomers of the structure which are foreseeable, including all stereoisomers and constitutional or configurational isomers when the illustration, description, or figure is not explicitly limited to any particular isomer.

Methods for Preparing Cyclic Synthons

To avoid the need to separate single configurational or enantiomeric isomers from complex mixtures resulting from non-specific reactions, stereospecific or at least stereoselective coupling reactions may be employed in the preparation of the synthons of this invention. The following are examples of synthetic schemes for several classes of synthons useful in the preparation of macrocyclic modules of this invention. In general, the core synthons are illustrated, and lipophilic moieties are not shown on the structures, however, it is understood that all of the following synthetic schemes might encompass additional lipophilic or hydrophilic moieties used to prepare amphiphilic and other modified macrocyclic modules. Species are numbered in relation to the scheme in which they appear; for example, "S1-1" refers to the structure 1 in Scheme 1.

An approach to preparing synthons of 1,3-Diaminocyclohex-5-ene is shown in Scheme 1. Enzymatically assisted partial hydrolysis of the

SCHEME 1

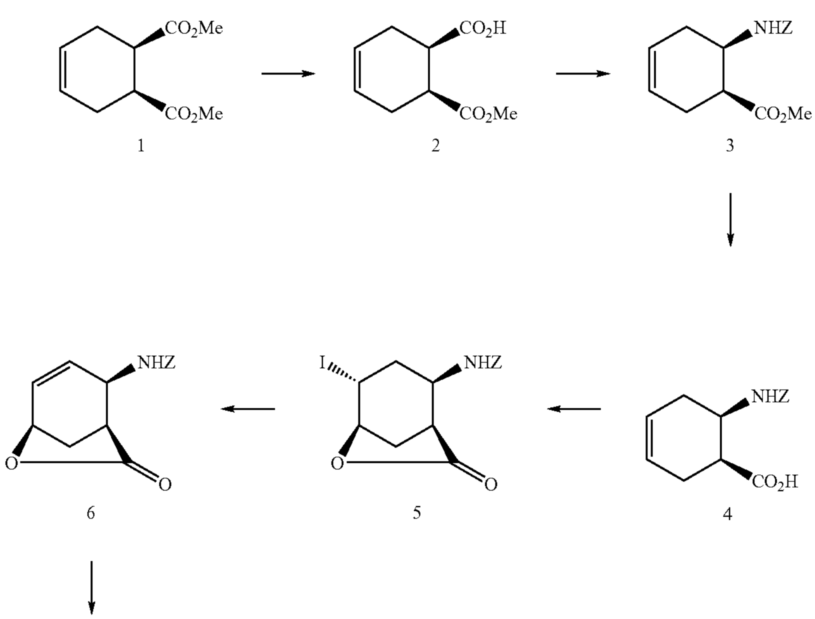

-continued

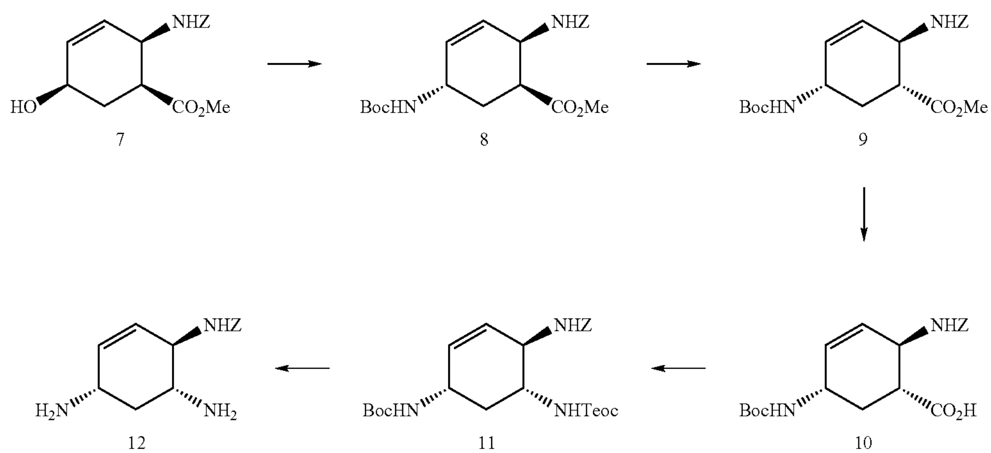

symmetrical diester S1-1 is used to give enantiomerically pure S1-2. S1-2 is subjected to the Curtius reaction and then quenched with benzyl alcohol to give protected amino acid S1-3. Iodolactonization of carboxylic acid S1-4 followed by dehydrohalogenation gives unsaturated lactone S1-6. Opening of the lactone ring with sodium methoxide gives alcohol S1-7, which is converted with inversion of configuration to S1-8 in a one-pot reaction involving mesylation, $SN_2$ displacement with azide, reduction and protection of the resulting amine with di-tert-butyl dicarbonate. Epimerization of S1-8 to the more stable diequatorial configuration followed by saponification gives carboxylic acid S1-10. S1-10 is subjected to the Curtius reaction. A mixed anhydride is prepared using ethyl chloroformate followed by reaction with aqueous $NaN_3$ to give the acyl azide, which is thermally rearranged to the isocyanate in refluxing benzene. The isocyanate is quenched with 2-trimethylsilylethanol to give differentially protected tricarbamate S1-11. Reaction with trifluoroacetic acid (TFA) selectively deprotects the 1,3-diamino groups to provide the desired synthon S1-12.

In another variation, an approach to preparing synthons of 1,3-Diaminocyclohexane is shown in Scheme 1a.

Some aspects of these preparations are given in Suami et al., *J. Org. Chem.* 1975, 40, 456 and Kavadias et al. *Can. J. Chem.* 1978, 56, 404.

In another variation, an approach to preparing synthons of 1,3-substituted cyclohexane is shown in Scheme 1b.

SCHEME 1b

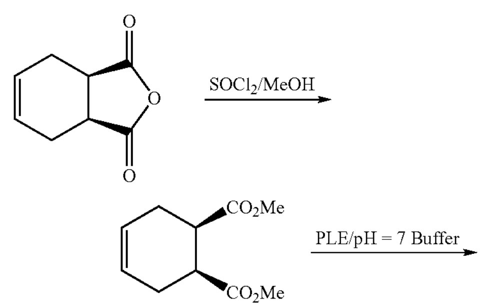

SCHEME 1a

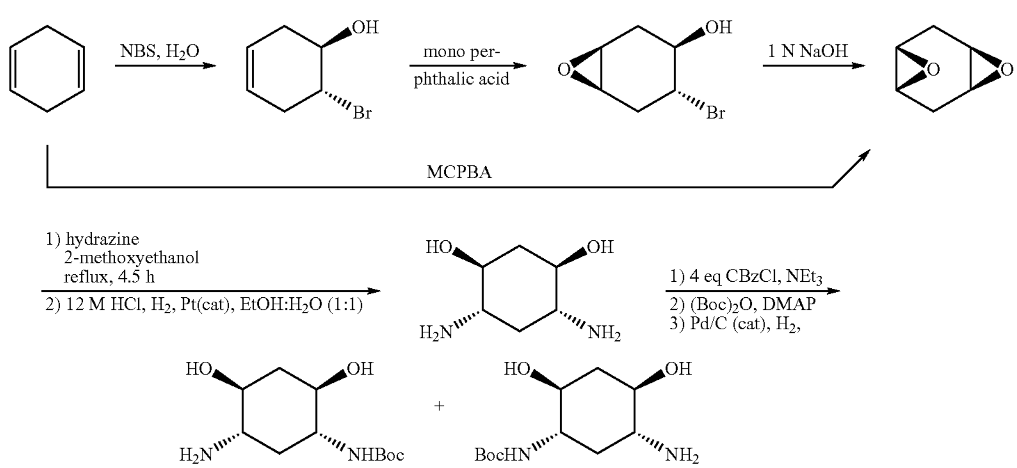

-continued

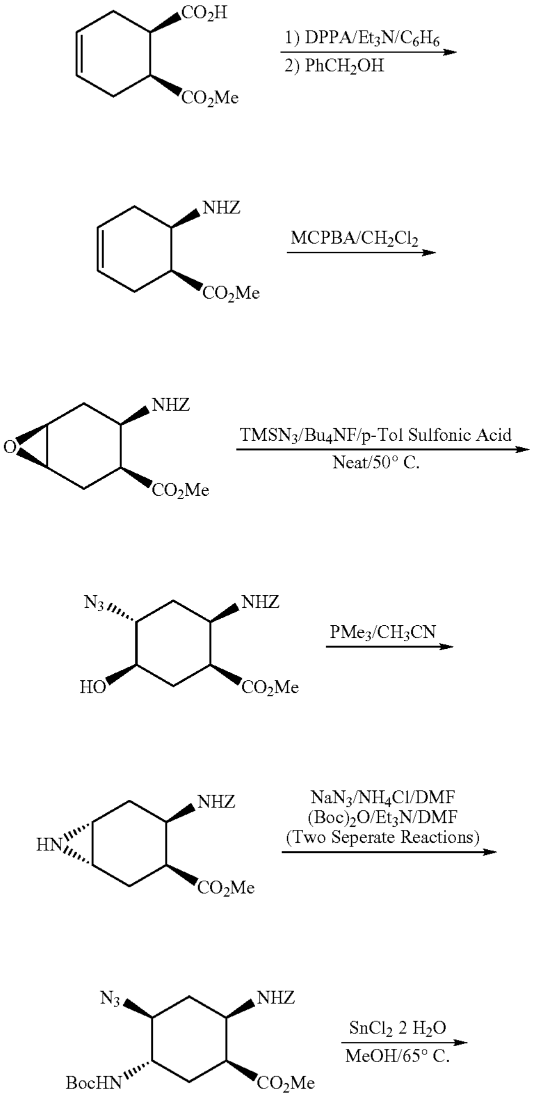

-continued

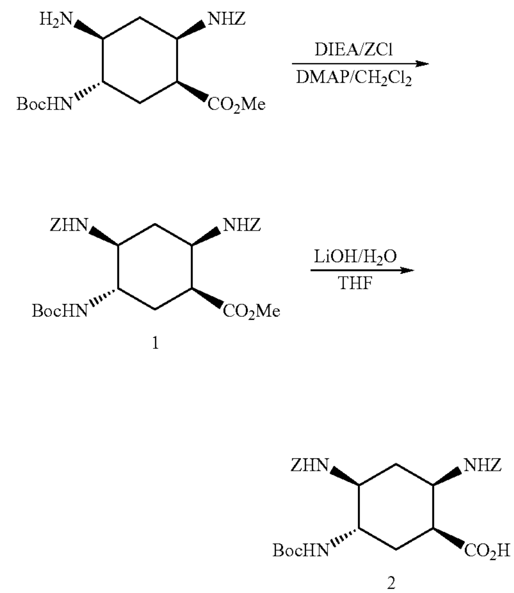

This synthon will remain "Z-protected" until the macrocyclic module has been cyclized. Subsequent deprotection to yield a macrocyclic module with amine functional groups is done by a hydrogenation protocol.

Norbornanes (bicycloheptanes) may be used to prepare synthons of this invention, and stereochemically controlled multifunctionalization of norbornanes can be achieved. For example, Diels-Alder cycloaddition may be used to form norbornanes incorporating various functional groups having specific, predictable stereochemistry. Enantiomerically enhanced products may also be obtained through the use of appropriate reagents, thus limiting the need for chiral separations.

An approach to preparing synthons of 1,2-Diaminonorbornane is shown in Scheme 2.

SCHEME 2

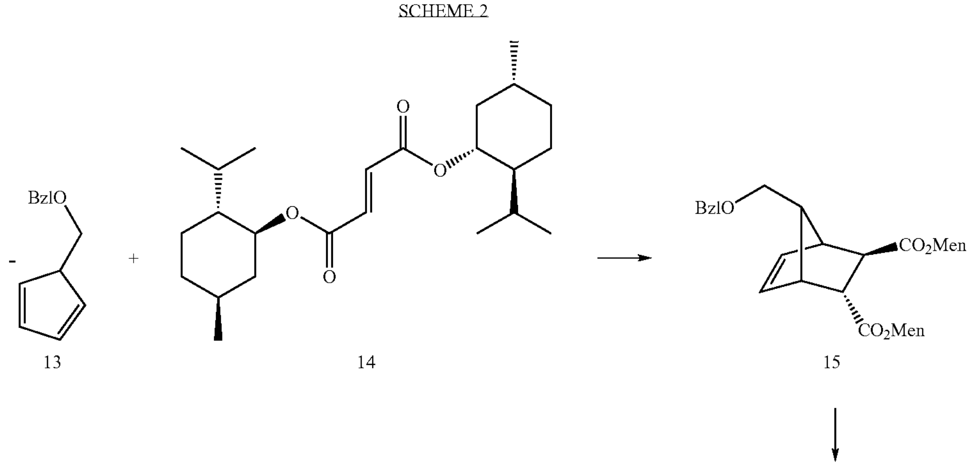

-continued

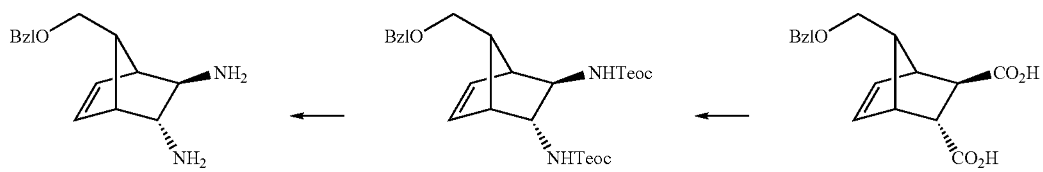

18 17 16

5-(Benzyloxy-methyl)-1,3-cyclopentadiene (S2-13) is reacted with diethylaluminum chloride Lewis acid complex of di-(l)-menthyl fumarate (S2-14) at low temperature to give the diastereomerically pure norbornene S2-15. Saponification with potassium hydroxide in aqueous ethanol gives the diacid S2-16, which is subjected to a tandem Curtius reaction with diphenylphosphoryl azide (DPPA), the reaction product is quenched with 2-trimethylsilylethanol to give the biscarbamate S2-17. Deprotection with TFA gives diamine S2-18.

Another approach to this synthon class is outlined in Scheme 3. Opening of anhydride S3-19 with methanol in the presence of quinidine gives the enantiomerically pure ester acid S3-20. Epimerization of the ester group with sodium methoxide (NaOMe) gives S3-21. A Curtius reaction with DPPA followed by quenching with trimethylsilylethanol gives carbamate S3-22. Saponification with NaOH gives the acid S3-23, which undergoes a Curtius reaction, then quenched with benzyl alcohol to give differentially protected biscarbamate S3-24. Compound S3-24 can be fully deprotected to provide the diamine or either of the carbamates can be selectively deprotected.

An approach to preparing synthons of endo,endo-1,3-Diaminonorbornane is shown in Scheme 4. 5-Trimethylsilyl-1,3-cyclopentadiene (S4-25) is reacted with the diethylaluminum chloride Lewis acid complex of di-(l)-menthyl fumarate at low temperature to give nearly diastereomerically pure norbornene S4-26. Crystallization of S4-26 from alcohol results in recovery of greater than 99% of the single diastereomer. Bromolactonization followed by silver mediated rearrangement gives mixed diester S4-28 with an alcohol moiety at the 7-position. Protection of the alcohol with benzyl bromide and selective deprotection of the methyl ester gives the free carboxylic acid S4-30. A Curtius reaction results in trimethylsilylethyl carbamate norbornene S4-31. Biscarbo-

SCHEME 3

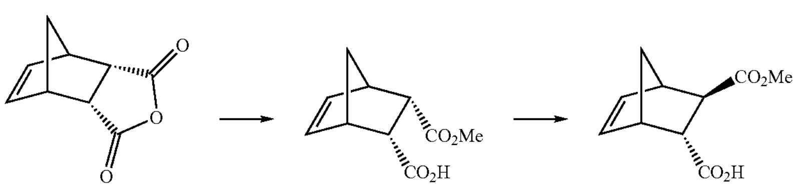

19 20 21

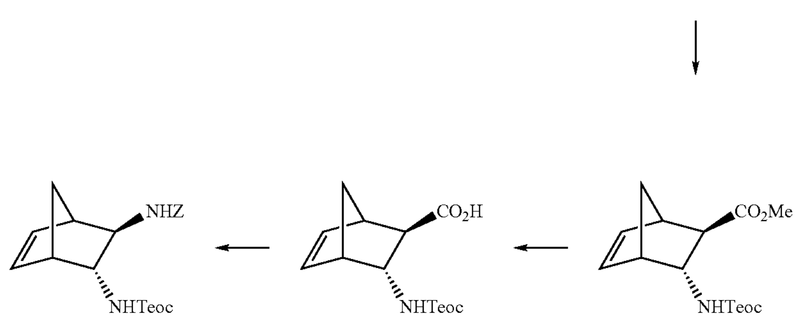

24 23 22 nylation of the olefin in methanol, followed by a single-step deprotection and dehydration gives the mono-anhydride S4-33. Quinidine mediated opening of the anhydride with methanol gives S4-34. Curtius transformation of S4-34 gives the biscarbamate S4-35, which is deprotected with TFA or tetrabutylammonium fluoride (TBAF) to give diamine S4-36.

alcohol to generate S5-40. Transformation of the alcohol S5-40 to the inverted t-butyl carbamate protected amine S5-41 is accomplished in a one-pot reaction by azide displacement of the mesylate S5-40 followed by reduction to the amine, which is protected with di-tert-butyl dicarbonate. Hydrogenolytic cleavage of the benzyl ester and epimeriza-

SCHEME 4

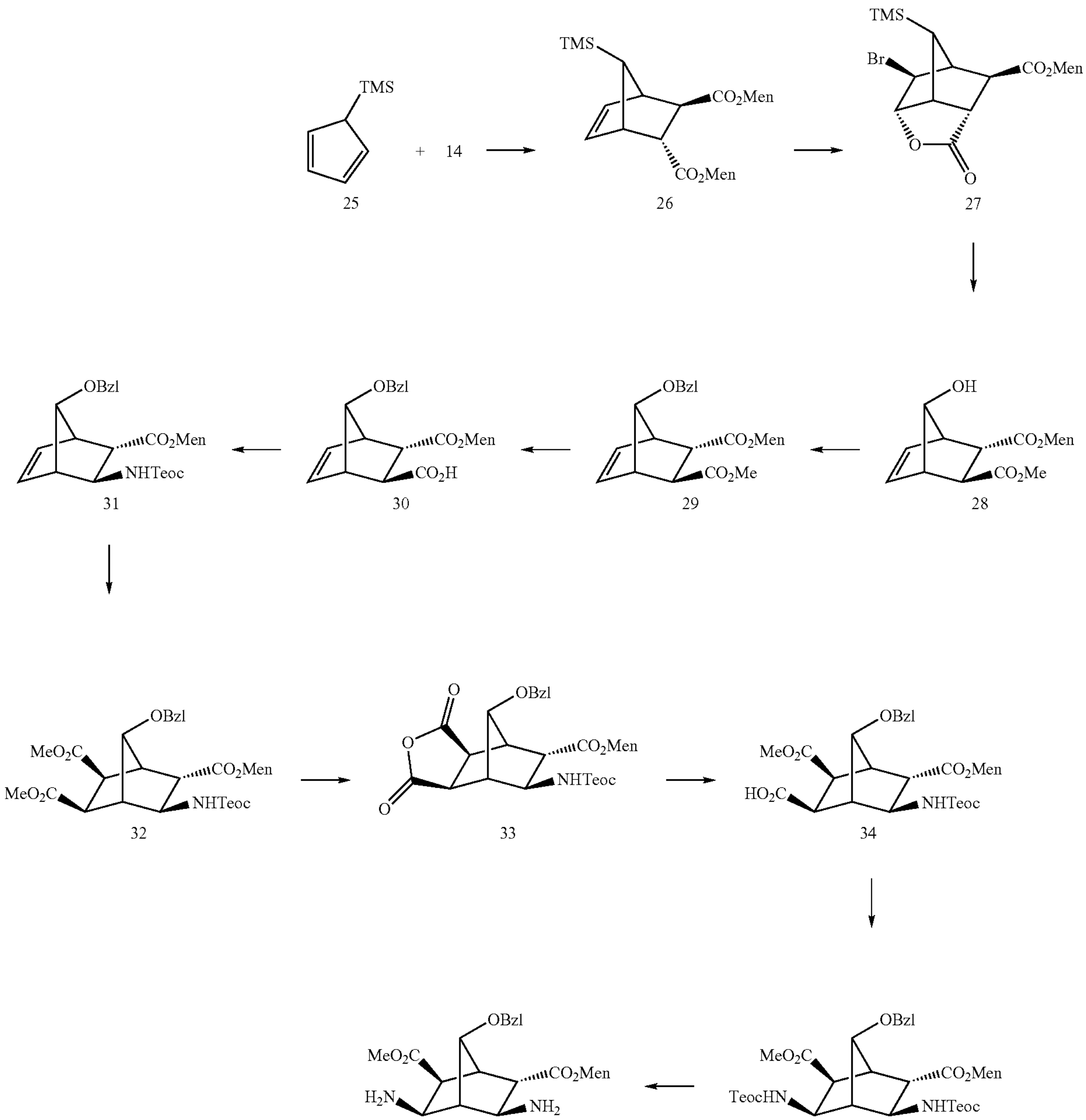

Another approach to this class of synthons is outlined in Scheme 5. Benzyl alcohol opening of S3-19 in the presence of quinidine gives S5-37 in high enantiomeric excess. Iodolactonization followed by $NaBH_4$ reduction gives lactone S5-39. Treatment with NaOMe liberates the methyl ester and the free tion of the methyl ester to the exo configuration is followed by protection of the free acid with benzyl bromide to give S5-44. Saponification of the methyl ester followed by a trimethylsilylethanol quenched Curtius reaction

SCHEME 5

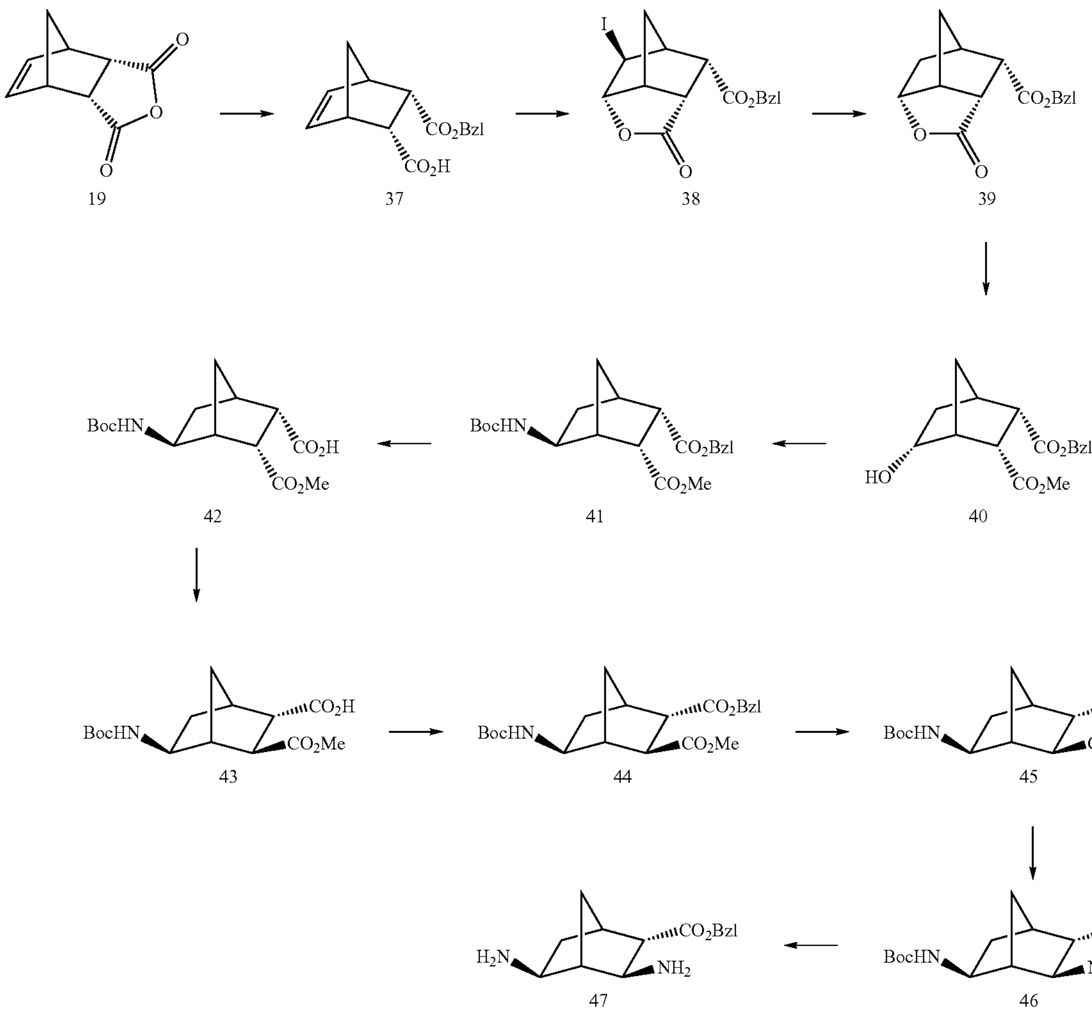

gives the biscarbamate S5-46, which is cleaved with TFA to give the desired diamine S5-47.

An approach to preparing synthons of exo,endo-1,3-Diaminonorbornane is shown in Scheme 6. p-Methoxybenzyl alcohol opening of norbornene anhydride S3-19 in the presence of quinidine gives monoester S6-48 in high enantiomeric excess. Curtius reaction of the free acid gives protected all endo monoacid-monoamine S6-49. Biscarbonylation and anhydride formation gives exo-monoanhydride S6-51. Selective methanolysis in the presence of quinine gives S6-52. A trimethylsilylethanol quenched Curtius reaction gives biscarbamate S6-53. Epimerization of the two esters results in the more sterically stable S6-54. Cleavage of the carbamate groups provides synthon S6-55.

SCHEME 6

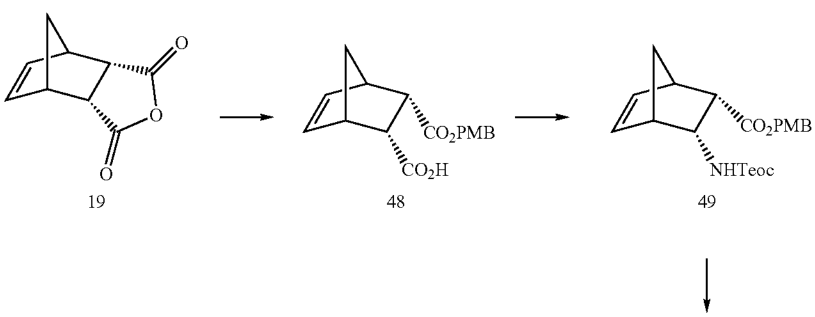

-continued

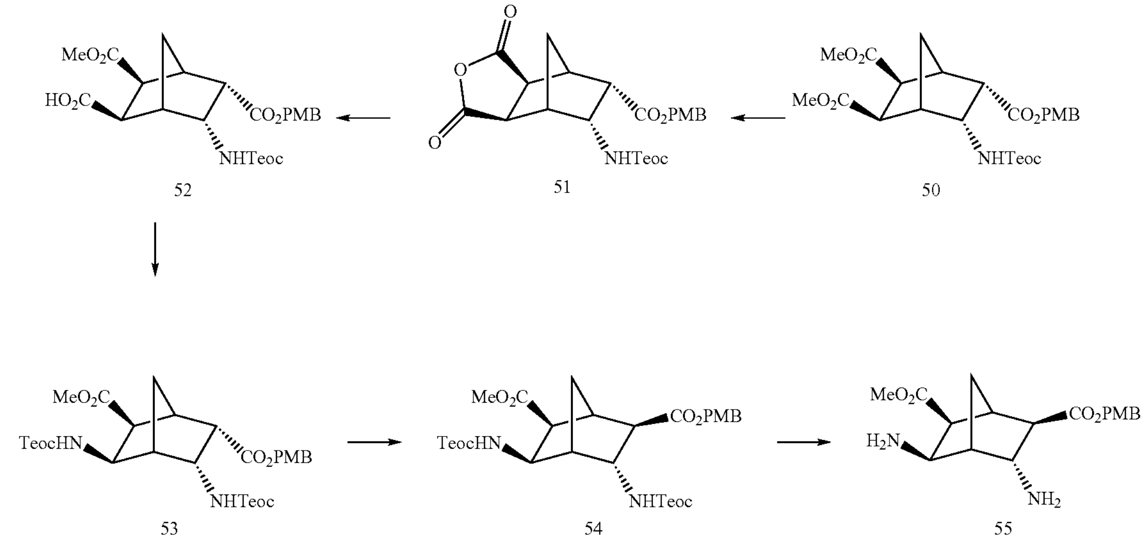

Methods to Prepare Macrocyclic Modules

Synthons may be coupled to one another to form macrocyclic modules. In one variation, the coupling of synthons may be accomplished in a concerted scheme. Preparation of a macrocyclic module by the concerted route may be performed using, for example, at least two types of synthons, each type having at least two functional groups for coupling to other synthons. The functional groups may be selected so that a functional group of one type of synthon can couple only to a functional group of the other type of synthon. When two types of synthons are used, a macrocyclic module may be formed having alternating synthons of different types. Scheme 7 illustrates a concerted module synthesis.

Referring to Scheme 7, 1,2-Diaminocyclohexane, S7-1, is a synthon having two amino functional groups for coupling to other synthons, and 2,6-diformyl-4-dodec-1-ynylphenol, S7-2, is a synthon having two formyl groups for coupling to other synthons. An amino group may couple with a formyl group to form an imine linkage. In Scheme 7, a concerted product hexamer macrocyclic module is shown.

In one variation, a mixture of tetramer, hexamer, and octamer macrocyclic modules may be formed in the concerted scheme. The yields of these macrocyclic modules can be varied by changing the concentration of various synthons in the reagent mixture, and among other factors, by changing the solvent, temperature, and reaction time.

SCHEME 7

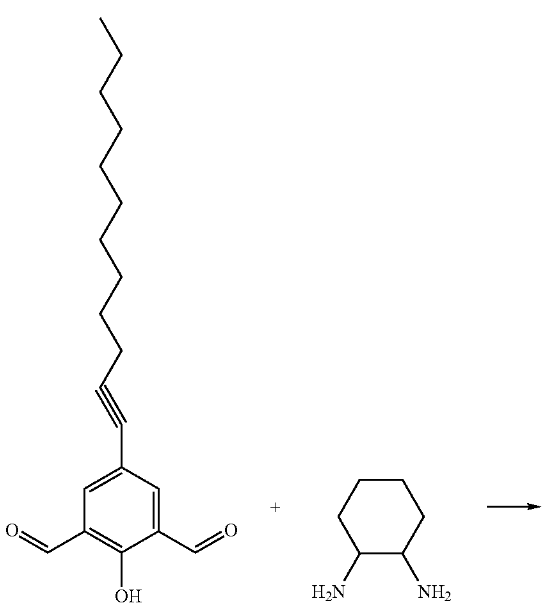

1 2

-continued

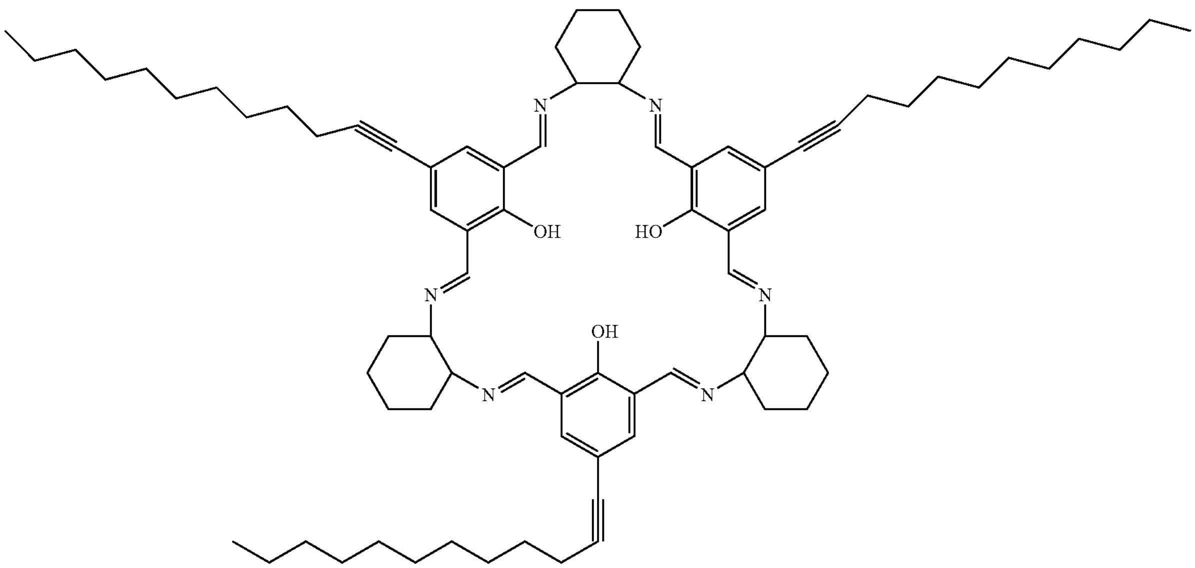

Hexamer 1a
3

The imine groups of S7-3 can be reduced, e.g. with sodium borohydride, to give amine linkages. If the reaction is carried out using 2,6-di(chlorocarbonyl)-4-dodec-1-ynylphenol instead of 2,6-diformyl-4-dodec-1-ynylphenol, the resulting module will contain amide linkages. Similarly, if 1,2-dihydroxycyclohexane is reacted with 2,6-di(chlorocarbonyl)-4-dodec-1-ynylphenol, the resulting module will contain ester linkages.

In some variations, the coupling of synthons may be accomplished in a stepwise scheme. In an example of the stepwise preparation of macrocyclic modules, a first type of synthon is substituted with one protected functional group and one unprotected functional group. A second type of synthon is substituted with an unprotected functional group that will couple with the unprotected functional group on the first synthon. The product of contacting the first type of synthon with the second type of synthon may be a dimer, which is made of two coupled synthons. The second synthon may also be substituted with another functional group which is either protected, or which does not couple with the first synthon when the dimer is formed. The dimer may be isolated and purified, or the preparation may proceed as a one-pot method. The dimer may be contacted with a third synthon having two functional groups, only one of which may couple with the remaining functional group of either the first or second synthons to form a trimer, which is made of three coupled synthons. Such stepwise coupling of synthons may be repeated to form macrocyclic modules of various ring sizes. To cyclize or close the ring of the macrocyclic module, the $n^{th}$ synthon which was coupled to the product may be substituted with a second functional group which may couple with the second functional group of a previously coupled synthon that has not been coupled, which may be deprotected for that step. The stepwise method may be carried out with synthons on solid phase support. Scheme 8 illustrates a stepwise preparation of module SC8-1.

Compound S8-2 is reacted with S8-3, in which the phenol is protected as the benzyl ether and the nitrogen is shown as protected with a group “P,” which can be any of a large number of protecting groups well-known in the art, in the presence of methanesulfonyl chloride (Endo, K.; Takahashi, H. *Heterocycles,* 1999, 51, 337), to give S8-4. Removal of the N-protecting group give the free amine S8-5, which can be coupled with synthon S8-6 using any standard peptide coupling reaction such as BOP/HOBt to give S8-7. Deprotection/coupling is repeated, alternating synthons S8-3 and S8-6 until a linear construct with eight residues is obtained. The remaining acid and amine protecting groups on the 8-mer are removed and the oligomer is cyclized, see e.g., Caba, J. M., et al., *J. Org. Chem.,* 2001, 66:7568 (PyAOP cyclization) and Tarver, J. E. et al., *J. Org. Chem.,* 2001, 66:7575 (active ester cyclization). The R group is H or an alkyl group linked via a functional group to the benzene ring, and X is N, O, or S. Examples of solid supports include Wang resin, hydrogels, silica gels, sepharose, sephadex, agarose, and inorganic solids. Using a solid support might simplify the procedure by obviating purification of intermediates along the way. The final cyclization may be done in a solid phase mode. A “safety-catch linker” approach (Bourne, G. T., et al., *J. Org. Chem.,* 2001, 66:7706) may be used to obtain cyclization and resin cleavage in a single operation.

SCHEME 8
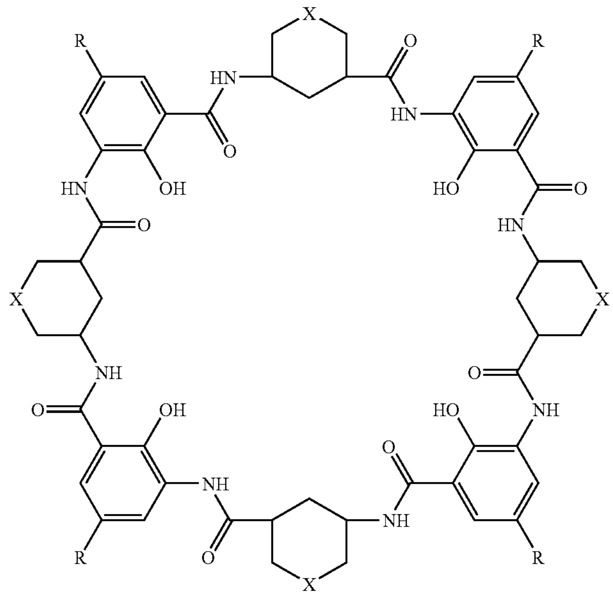
Octamer 3
1
1
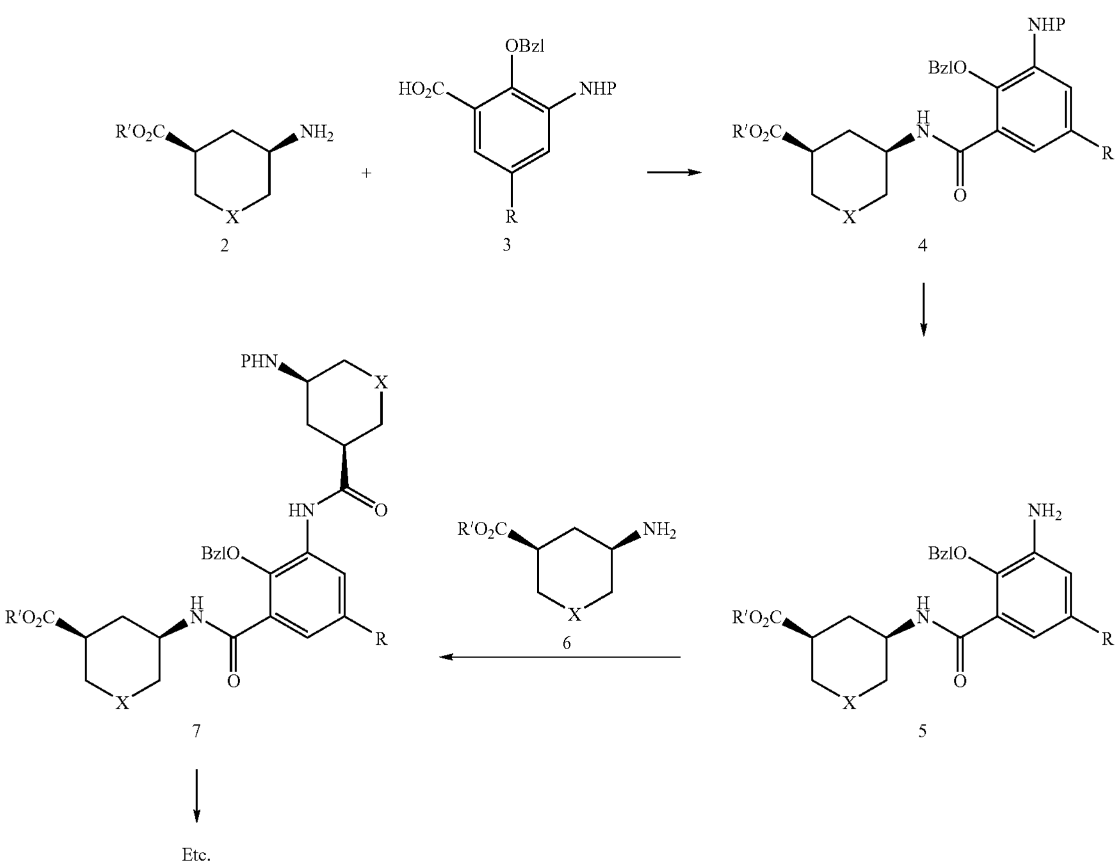

In another variation, a concerted method involves contacting two or more different synthons and a linker molecule as shown in Scheme 9, where R may be an alkyl group or other lipophilic group.

SCHEME 9

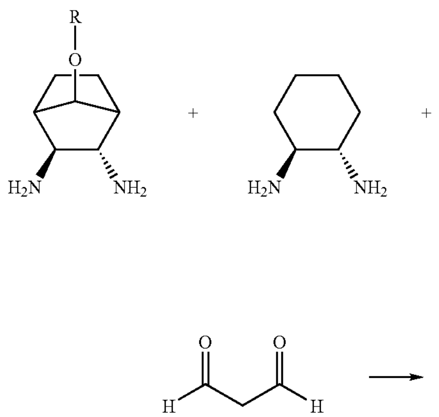

-continued

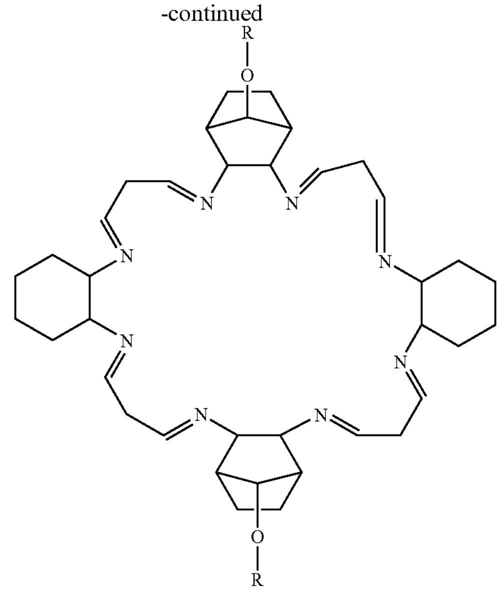

Tetramer - monobicycloheptane

In another variation, a stepwise linear method involves various synthons and a solid phase support as shown in Scheme 10.

SCHEME 10

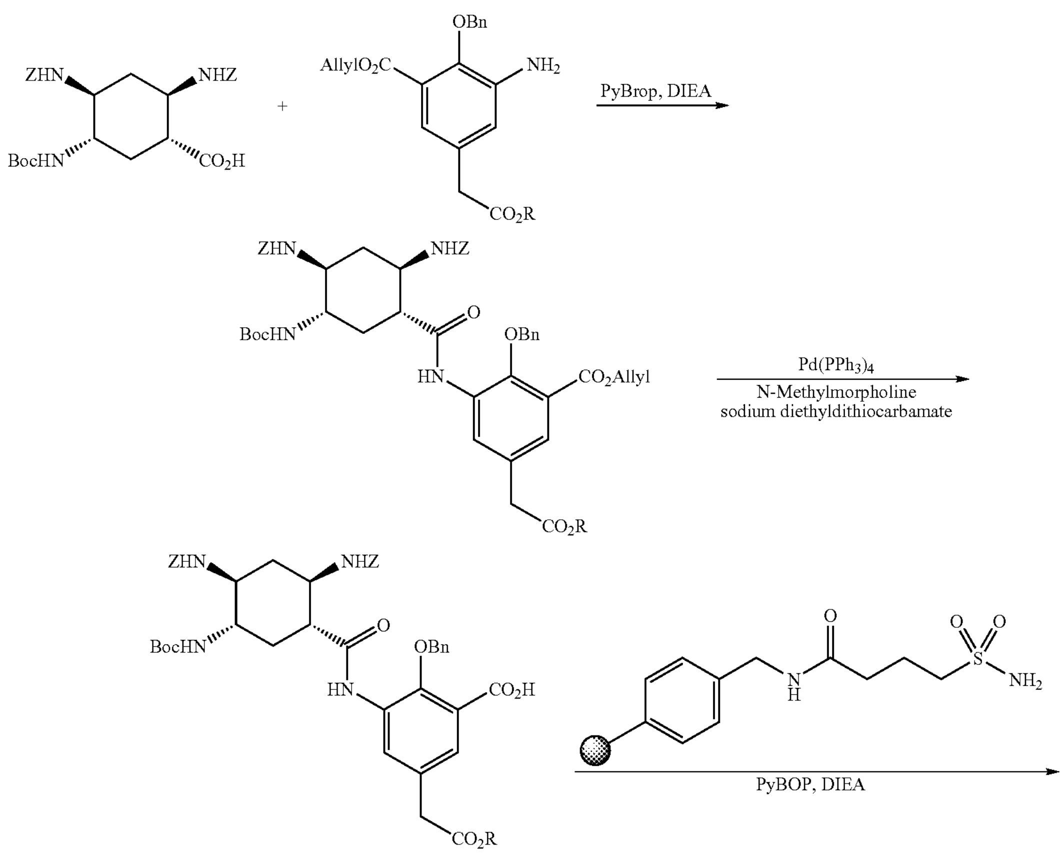

-continued
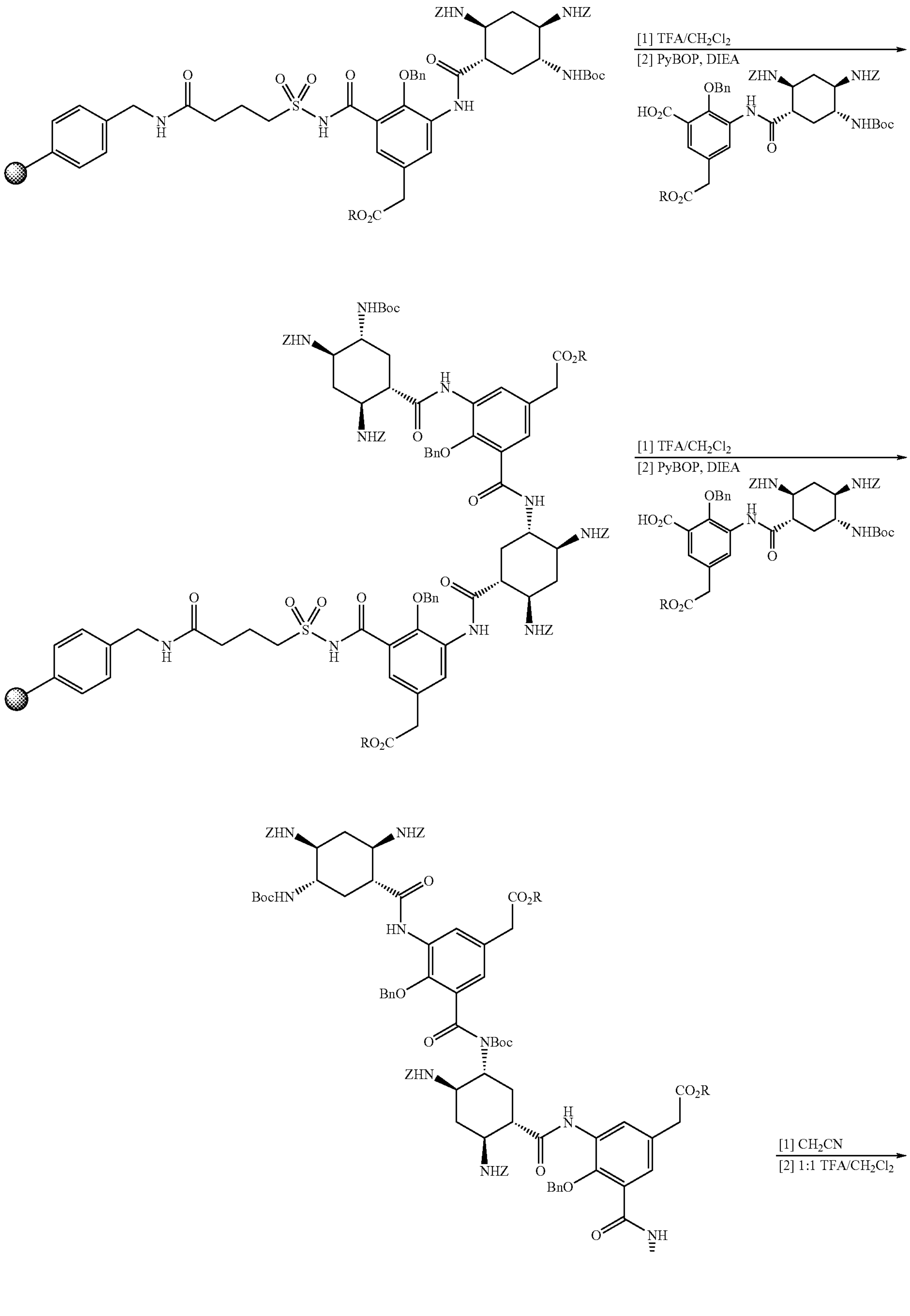

-continued
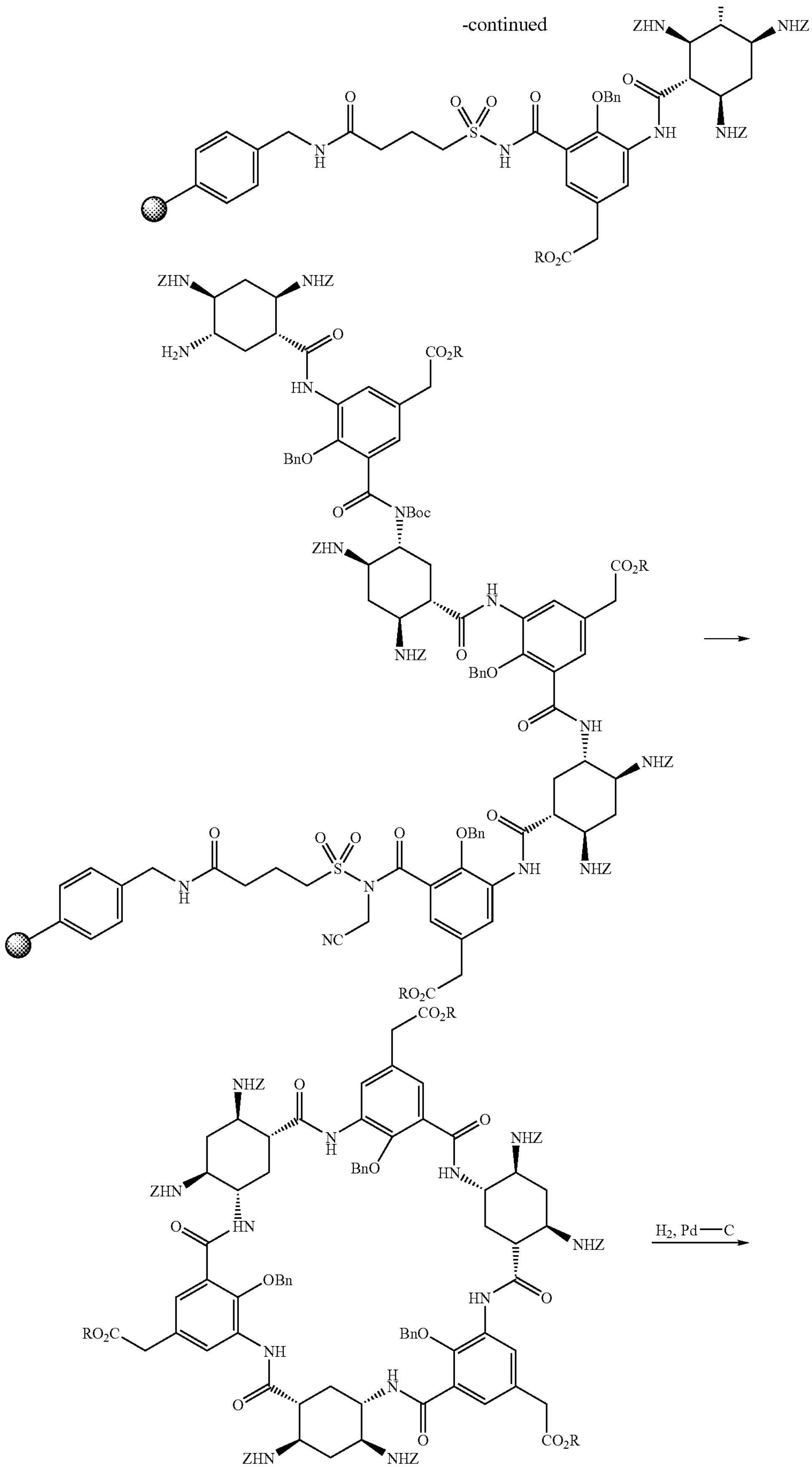

-continued

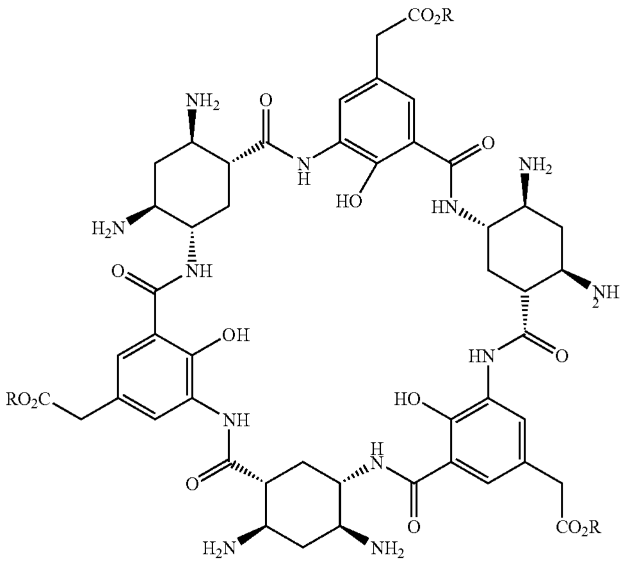

Hexamer 3j-R-amine

In another variation, a stepwise convergent method involves synthon trimers and a solid phase support as shown in Scheme 11. This method can also be done without the solid phase support using trimers in solution.

SCHEME 11

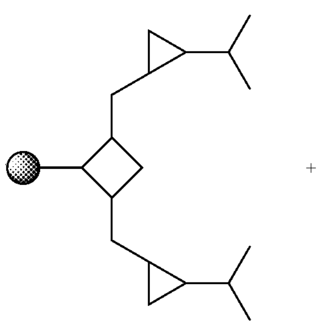

Linear trimer on resin

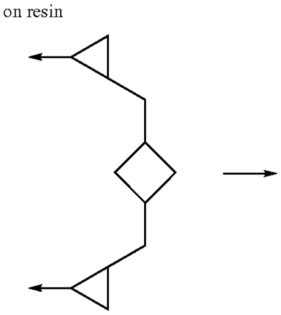

Linear trimer in solution

-continued

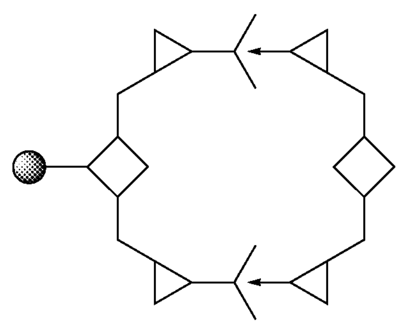

Cyclized hexamer on resin

In another variation, a template method involves synthons brought together by a template as shown in Scheme 12. Some aspects of this approach (and an Mg2+ template) are given in Dutta et al. Inorg. Chem. 1998, 37, 5029.

SCHEME 12
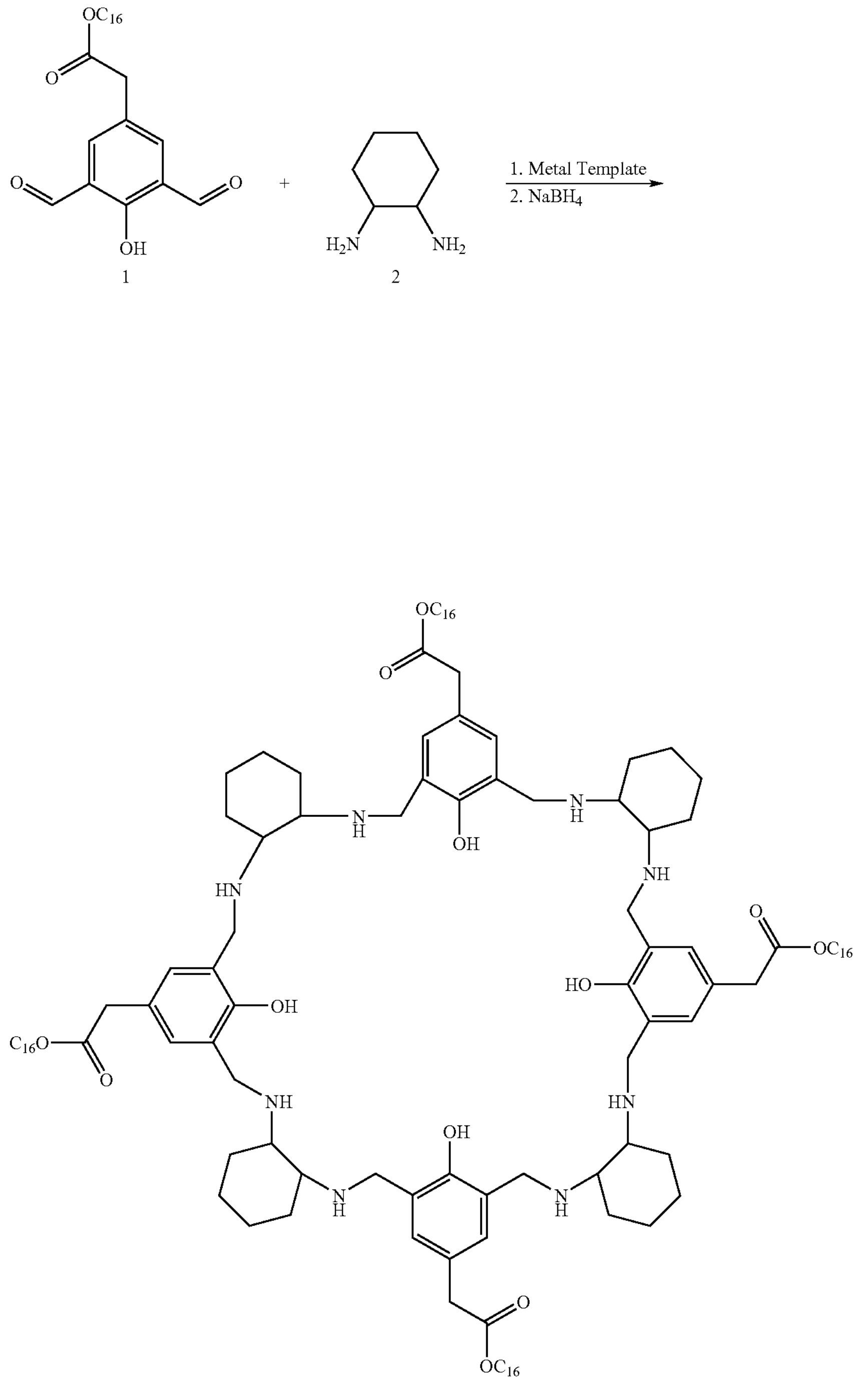
Octmaer 4jh
In another variation, a linker molecule method involves cyclizing synthons in solution as shown in Scheme 13.

SCHEME 13

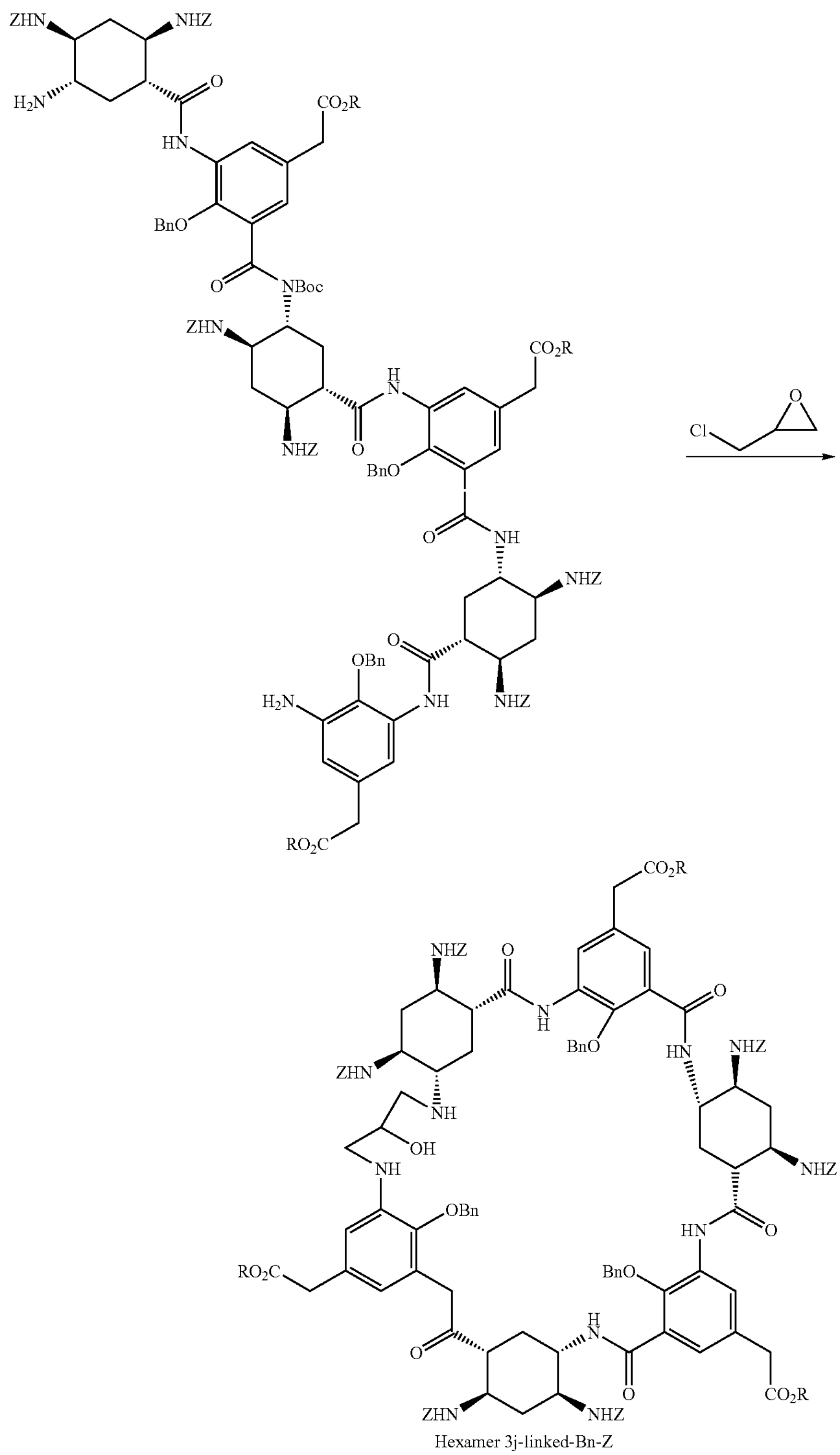

Hexamer 3j-linked-Bn-Z

Reagents for the following examples were obtained from Aldrich Chemical Company and VWR Scientific Products. All reactions were carried out under nitrogen or argon atmosphere unless otherwise noted. Solvent extracts of aqueous solutions were dried over anhydrous $Na_2SO_4$. Solutions were concentrated under reduced pressure using a rotary evaporator. Thin layer chromatography (TLC) was done on Analtech Silica gel GF (0.25 mm) plates or on Machery-Nagel Alugram Sil G/UV (0.20 mm) plates. Chromatograms were visualized with either UV light, phosphomolybdic acid, or $KMnO_4$. All compounds reported were homogenous by TLC unless otherwise noted. HPLC analyses were performed on a Hewlett Packard 1100 system using a reverse phase C-18 silica column. Enantiomeric excess was determined by HPLC using a reverse phase (l)-leucine silica column from Regis Technologies. All $^1$[H] and $^{13}$[C] NMR spectra were collected at 400 MHz on a Varian Mercury system. Electrospray mass spectra were obtained by Synpep Corp., or on a Thermo Finnigan LC-MS system.

Example 27

2,6-Diformyl-4-bromophenol

Hexamethylenetetramine (73.84 g, 526 mmol) was added to TFA (240 mL) with stirring. 4-Bromophenol (22.74 g, 131 mmol) was added in one portion and the solution heated in an oil bath to 120° C. and stirred under argon for 48 h. The reaction mixture was then cooled to ambient temperature. Water (160 mL) and 50% aqueous $H_2SO_4$ (80 mL) were added and the solution stirred for an additional 2 h. The reaction mixture was poured into water (1600 mL) and the resulting precipitate collected on a Büchner funnel. The precipitate was dissolved in ethyl acetate (EtOAc) and the solution was dried over $MgSO_4$. The solution was filtered and the solvent removed on a rotary evaporator. Purification by column chromatography on silica gel (400 g) using a gradient of 15-40% ethyl acetate in hexanes resulted in a isolation of the product as a yellow solid (18.0 g, 60%).

$^1$H NMR (400 MHz, $CDCl_3$) δ 11.54 (s, 1H, OH), 10.19 (s, 2H, CHO), 8.08 (s, 2H, ArH).

Example 28

2,6-Diformyl-4-(dodecyn-1-yl)phenol 2,6-Diformyl-4-bromophenol (2.50 g, 10.9 mmol), 1-dodecyne (2.00 g, 12.0 mmol), CuI (65 mg, 0.33 mmol), and bis(triphenylphosphine)palladium)II) dichloride were suspended in degassed acetonitrile (MeCN) (5 mL) and degassed benzene (1 mL). The yellow suspension was sparged with argon for 30 min and degassed $Et_3N$ (1 mL) was added. The resulting brown suspension was sealed in a pressure vial, warmed to 80° C. and held there for 12 h. The mixture was then partitioned between EtOAc and $KHSO_4$ solution. The organic layer was separated, washed with brine, dried ($MgSO_4$) and concentrated under reduced pressure. The dark yellow oil was purified by column chromatography on silica gel (25% $Et_2O$ in hexanes) to give 1.56 g (46%) of the title compound.

$^1$H NMR (400 MHz, $CDCl_3$) δ 11.64 (s, 1H, OH), 10.19 (s, 2H, CHO), 7.97 (s, 2H, ArH), 2.39 (t, 2H, J=7.2 Hz, propargylic), 1.59 (m, 3H, aliphatic), 1.43, (m, 2H, aliphatic), 1.28 (m, 11H, aliphatic), 0.88 (t, 3H, J=7.0 Hz, $CH_3$).

$^{13}$C NMR (400 MHz, $CDCl_3$) δ 192.5, 162.4, 140.3, 122.8, 116.7, 91.4, 77.5, 31.9, 29.6, 29.5, 29.3, 29.1, 28.9, 28.5, 22.7, 19.2, 14.1.

MS (FAB): Calcd. for $C_{20}H_{27}O_3$ 315.1960; found 315.1958 $[M+H]^+$.

Example 29

2,6-Diformyl-4-(dodecen-1-yl)phenol 2,6-Diformyl-4-bromophenol (1.00 g, 4.37 mmol), 1-dodecene (4.8 mL, 21.7 mmol), 1.40 g tetrabutylammonium bromide (4.34 mmol), 0.50 g $NaHCO_3$ (5.95 mmol), 1.00 g LiCl (23.6 mmol) and 0.100 g palladium diacetate ($Pd(OAc)_2$) (0.45 mmol) were combined in 30 mL degassed anhydrous dimethylformamide (DMF). The mixture was sparged with argon for 10 min and then sealed in a pressure vial which was warmed to 82° C. and held for 40 h. The crude reaction mixture was partitioned between $CH_2Cl_2$ and 0.1 M HCl solution. The organic layer was washed with 0.1 M HCl (2×), brine (2×), and saturated aqueous $NaHCO_3$ (2×), dried over $MgSO_4$ and concentrated under reduced pressure. The dark yellow oil was purified by column chromatography on silica gel (25% hexanes in $Et_2O$) to give 0.700 g (51%) of the title compound as primarily the Z isomer.

$^1$H NMR (400 MHz, $CDCl_3$) δ 11.50 (s, 1H, OH), 10.21 (s, 2H, CHO), 7.95 (s, 2H, ArH), 6.38 (d, 1H, vinyl), 6.25 (m, 1H, vinyl), 2.21 (m, 2H, allylic), 1.30-1.61 (m, 16H, aliphatic), 0.95 (t, 3H, J=7.0 Hz, $CH_3$).

MS (FAB): Calcd. for $C_{20}H_{27}O_3$ 315.20; found 315.35 $[M-H]^-$.

Example 30

(1R,6S)-6-Methoxycarbonyl-3-cyclohexene-1-carboxylic Acid (S1-2)

S1-1 (15.0 g, 75.7 mmol) was suspended in pH 7 phosphate buffer (950 mL). Pig liver esterase (2909 units) was added, and the mixture stirred at ambient temperature for 72 h with the pH maintained at 7 by addition of 2M NaOH. The reaction mixture was washed with ethyl acetate (200 mL), acidified to pH 2 with 2M HCl, and extracted with ethyl acetate (3×200 mL). The extracts were combined, dried, and evaporated to afford 13.8 g (99%) of S1-2.

$^1$H NMR ($CDCl_3$) δ 2.32 (dt, 2H, $2_{ax}$- and $5_{ax}$-H's), 2.55 (dt, 2H, $2_{eq}$- and $5_{eq}$-H's), 3.00 (m, 2H, 1- and 6-H's), 3.62 (s, 3H, $CO_2Me$), 5.61 (m, 2H, 3- and 4-H's).

Example 31

Methyl (1S,6R)-6-Benzyloxycarbonylaminocyclohex-3-enecarboxylate (S1-3)

S1-2 (10.0 g, 54.3 mmol) was dissolved in benzene (100 mL) under $N_2$. Triethylamine (13.2 g, 18.2 mL, 130.3 mmol) was added followed by DPPA (14.9 g, 11.7 mL, 54.3 mmol). The solution was refluxed for 20 h. Benzyl alcohol (5.9 g, 5.6 mL, 54.3 mmol) was added and reflux continued for 20 h. The solution was diluted with EtOAc (200 mL), washed with saturated aqueous $NaHCO_3$ (2×50 mL), water (20 mL), and saturated aqueous NaCl (20 mL), dried and evaporated to give 13.7 g (87%) of S1-3.

$^1$H NMR: ($CDCl_3$) δ 2.19 (dt, 1H, $5_{ax}$-H), 2.37 (tt, 2H, $2_{ax}$- and $5_{eq}$-H's), 2.54 (dt, 1H, $2_{eq}$-H), 2.82 (m, 1H, 1-H), 3.65 (s, 3H, $CO_2Me$), 4.28 (m, 1H, 6-H), 5.08 (dd, 2H, $CH_2Ar$), 5.42 (d, 1H, NH), 5.62 (ddt, 2H, 3- and 4-H's), 7.35 (m, 5H, Ar H's).

Example 32

(1S,6R)-6-Benzyloxycarbonylaminocyclohex-3-enecarboxylic acid (S1-4)

S1-3 (23.5 g, 81.3 mmol) was dissolved in MeOH (150 mL) and the solution cooled to 0° C. 2M NaOH (204 mL, 0.41 mol) was added, the mixture allowed to come to ambient temperature and then it was stirred for 48 h. The reaction mixture was diluted with water (300 mL), acidified with 2M HCl, and extracted with dichloromethane (250 mL), dried, and evaporated. The residue was recrystallized from diethyl ether to give 21.7 (97%) of S1-4.

$^1$H NMR: ($CDCl_3$) δ 2.20 (d, 1H, $5_{ax}$-H), 2.37 (d, 2H, $2_{ax}$- and $5_{eq}$-H's), 2.54 (d, 1H, $2_{eq}$-H), 2.90 (br s, 1H, 1-H), 4.24 (br s, 1H, 6-H), 5.08 (dd, 2H, $CH_2Ar$), 5.48 (d, 1H, NH), 5.62 (dd, 2H, 3- and 4-H's), 7.35 (m, 5H, Ar H's).

Example 33

(1S,2R,4R,5R)-2-Benzyloxycarbonylamino-4-iodo-7-oxo-6-oxabicyclo[3.2.1]octane (S1-5)

S1-4 (13.9 g, 50.5 mmol) was dissolved in dichloromethane (100 mL) under $N_2$, 0.5 M $NaHCO_3$ (300 mL), KI (50.3 g, 303.3 mmol), and iodine (25.6 g, 101 mmol) were added and the mixture stirred at ambient temperature for 72 h. The mixture was diluted with dichloromethane (50 mL) and the organic phase separated. The organic phase was washed with saturated aqueous $Na_2S_2O_3$ (2×50 mL), water (30 mL), and saturated aqueous NaCl (20 mL), dried and evaporated to afford 16.3 g (80%) of S1-5.

$^1$H NMR: ($CDCl_3$) δ 2.15 (m, 1H, $8_{ax}$-H), 2.42 (m, 2H, $3_{ax}$- and $8_{eq}$-H's), 2.75 (m, 2H, 1- and $3_{eq}$-H's), 4.12 (br s, 1H, 2-H), 4.41 (t, 1H, 4-H), 4.76 (dd, 1H, 5-H), 4.92 (d, 1H, NH), 5.08 (dd, 2H, $CH_2Ar$), 7.35 (m, 5H, Ar H's).

Example 34

(1S,2R,5R)-2-Benzyloxycarbonylamino-7-oxo-6-oxabicyclo[3.2.1]oct-3-ene (S1-6)

S1-5 (4.0 g, 10 mmol) was dissolved in benzene (50 mL) under $N_2$. 1,8-Diazabicyclo[5.4.0]undec-7-ene (DBU) (1.8 g, 12 mmol) was added and the solution refluxed for 16 h. The precipitate was filtered and the filtrate was diluted with EtOAc (200 mL). The filtrate was washed with 1M HCl (20 mL), saturated aqueous $Na_2S_2O_3$ (20 mL), water (20 mL), and saturated aqueous NaCl (20 mL), dried and evaporated to give 2.2 g (81%) S1-6.

$^1$H NMR: ($CDCl_3$) δ 2.18 (d, 1H, $8_{ax}$-H), 2.39 (m, 1H, $8_{eq}$-H), 3.04 (t, 1H, 1-H), 4.70 (m, 1H, 5-H), 4.82 (t, 1H, 2-H), 5.15 (dd, 3H, $CH_2Ar$ and NH), 5.76 (d, 1H, 4-H), 5.92 (m, 1H, 3-H), 7.36 (s, 5H, Ar H's).

Example 35

(1S,2R,5R)-Methyl 2-Benzyloxycarbonylamino-5-hydroxycyclohex-3-enecarboxylate (S1-7)

S1-6 (9.0 g, 33 mmol) was suspended in MeOH (90 mL) and cooled to 0° C. NaOMe (2.8 g, 52.7 mmol) was added and the mixture stirred for 3 h during which time a solution gradually formed. The solution was neutralized with 2M HCl, diluted with saturated aqueous NaCl (200 mL), and extracted with dichloromethane (2×100 mL). The extracts were combined, washed with water (20 mL) and saturated aqueous NaCl (20 ml), dried, and evaporated. The residue was flash chromatographed (silica gel (250 g), 50:50 hexane/EtOAc) to give 8.5 g (85%) of S1-7.

$^1$H NMR: ($CDCl_3$) δ 1.90 (m, 1H, $6_{ax}$-H), 2.09 (m, 1H, $6_{eq}$-H), 2.81 (m, 1H, 1-H), 3.55 (s, 3H, $CO_2Me$), 4.15 (m, 1H, 5-H), 4.48 (t, 1H, 2-H), 5.02 (dd, 2H, $CH_2Ar$), 5.32 (d, 1H, NH), 5.64 (dt, 1H, 4-H), 5.82 (dt, 1H, 3-H), 7.28 (s, 5H, Ar H's).

Example 36

(1S,2R,5S)-Methyl 2-Benzyloxycarbonylamino-5-t-butoxycarbonylaminocyclohex-3-enecarboxylate (S1-8)

S1-7 (7.9 g, 25.9 mmol) was dissolved in dichloromethane (150 mL) and cooled to 0° C. under $N_2$. Triethylamine (6.3 g, 8.7 mL, 62.1 mmol) and methanesulfonyl chloride (7.1 g, 62.1 mmol) were added and the mixture stirred at 0° C. for 2 h. $(n\text{-}Bu)_4NN_3$ (14.7 g, 51.7 mmol) in dichloromethane (50 mL) was added and stirring continued at 0° C. for 3 h followed by 15 h at ambient temperature. The mixture was cooled to 0° C. and $P(n\text{-}Bu)_3$ (15.7 g, 19.3 mL, 77.7 mmol) and water (1 mL) were added and the mixture stirred at ambient temperature for 24 h. Di-tert-butyl dicarbonate (17.0 g, 77.7 mmol) was added and stirring continued for 24 h. The solvent was removed, the residue dissolved in 2:1 hexane/EtOAc (100 mL), the solution filtered, and evaporated. The residue was flash chromatographed (silica gel (240 g), 67:33 hexane/EtOAc) to give 5.9 g (56%) of S1-8.

$^1$H NMR: ($CDCl_3$) δ 1.40 (s, 9H, Boc H's), 1.88 (m, 1H, $6_{ax}$-H), 2.21 (m, 1H, $6_{eq}$-H), 2.95 (m, 1H, 1-H), 3.60 (s, 3H, $CO_2Me$), 4.15 (d, 1H, Boc NH), 4.50 (m, 2H, 2- and 5-H's), 5.02 (s, 2H, $CH_2Ar$), 5.38 (d, 1H, Z NH), 5.65 (m, 2H, 3- and 4-H's), 7.30 (s, 5H, Ar H's).

Example 37

(1R,2R,5S)-Methyl 2-Benzyloxycarbonylamino-5-t-butoxycarbonylaminocyclohex-3-enecarboxylate (S1-9)

S1-8 (1.1 g, 2.7 mmol) was suspended in MeOH (50 mL). NaOMe (0.73 g, 13.6 mmol) was added and the mixture refluxed for 18 h after which 0.5 M $NH_4Cl$ (50 mL) was added and the resulting precipitate collected. The filtrate was evaporated and the residue triturated with water (25 mL). The insoluble portion was collected and combined with the original precipitate to give 0.85 g (77%) of S1-9.

$^1$H NMR: ($CDCl_3$) δ 1.38 (s, 9H, Boc H's), 1.66 (m, 1H, $6_{ax}$-H), 2.22 (d, 1H, $6_{eq}$-H), 2.58 (t, 1H, 1-H), 3.59 (3, 3H, $CO_2Me$), 4.22 (br s, 1H, Boc NH), 4.50 (m, 2H, 2- and 5-H's), 4.75 (d, 1H, Z NH), 5.02 (s, 2H, $CH_2Ar$), 5.62 (s, 2H, 3- and 4-H's), 7.30 (s, 5H, Ar H's).

Example 38

(1R,2R,5S)-2-Benzyloxycarbonylamino-5-t-butoxycarbonylaninocyclohex-3-enecarboxylic acid (S1-10)

S1-9 (0.85 g, 2.1 mmol) was suspended in 50:50 MeOH/dichloromethane (5 mL) and cooled to 0° C. under $N_2$ after which 2M NaOH (2.0 mL) was added and the mixture stirred at ambient temperature for 16 h. The mixture was acidified with 2M HCl upon which a white precipitate formed. The precipitate was collected, washed with water and hexane, and dried to give 0.74 g (90%) of S1-10.

$^1$H NMR: ($CD_3OD$) δ 1.42 (s, 9H, Boc H's), 1.66 (m, 1H, $6_{ax}$-H), 2.22 (d, 1H, $6_{eq}$-H), 2.65 (t, 1H, 1-H), 4.18 (m, 1H, 5-H), 4.45 (m, 1H, 5-H), 5.04 (s, 2 H, $CH_2Ar$), 5.58 (m, 2H, 3- and 4-H's), 7.35 (s, 5H, Ar H's).

Example 39

(1R,2R,5S)-2-Benzyloxycarbonylamino-5-t-butoxycarbonylamino-1-(2-trimethylsilyl)ethoxycarbonylaminocyclohex-3-ene (S1-11)

S1-10 (3.1 g, 7.9 mmol) was dissolved in THF (30 mL) under $N_2$ and cooled to 0° C. Triethylamine (1.6 g, 2.2 mL, 15.9 mmol) was added followed by ethyl chloroformate (1.3 g, 1.5 mL, 11.8 mmol). The mixture was stirred at 0° C. for 1 h. A solution of $NaN_3$ (1.3 g, 19.7 mmol) in water (10 mL) was added and stirring at 0° C. was continued for 2 h. The reaction mixture was partitioned between EtOAc (50 mL) and water (50 mL). The organic phase was separated, dried, and evaporated. The residue was dissolved in benzene (50 mL) and refluxed for 2 h. 2-Trimethylsilylethanol (1.0 g, 1.2 mL, 8.7 mmol) was added and reflux continued for 3 h. The reaction mixture was diluted with EtOAc (200 mL), washed with saturated aqueous $NaHCO_3$ (50 mL), water (20 mL), and saturated aqueous NaCl (20 mL), dried and evaporated. The residue was flash chromatographed (silica gel (100 g), 67:33 hexane/EtOAc) to give 3.1 g (77%) of S1-11.

$^1$H NMR: ($CDCl_3$) δ −0.02 (s, 9H, TMS), 0.90 (t, 3H, $CH_2$TMS), 1.40 (s, 9H, Boc H's), 2.38 (m, 1H, $6_{eq}$-H), 3.62 (m, 1H, 1-H), 4.08 (m, 2H, $OCH_2CH_2$TMS), 4.18 (m, 1H), 4.38 (m, 1H), 4.62 (m, 1H), 5.07 (dd, 2H, $CH_2$Ar), 5.18 (m, 1H), 5.26 (m, 1H), 5.58 (d, 1H, olefinic H), 5.64 (d, 2H, olefinic H), 7.30 (s, 5, Ar H's).

Example 40

(1R,2R,5S)-2-Benzyloxycarbonylamino-1,5-diaminocyclohex-3-ene (S1-12)

S1-11 (2.5 g, 4.9 mmol) was added to TFA (10 mL) and the solution stirred at ambient temperature for 16 h after which the solution was evaporated. The residue was dissolved in water (20 mL), basified to pH 14 with KOH and extracted with dichloromethane (3×50 mL). The extracts were combined, washed with water (20 mL), dried and evaporated to give 1.1 g (85%) of S1-12.

$^1$H NMR: ($CDCl_3$) δ 1.30 (m, 1H, $6_{ax}$-H), 2.15 (br d, 1H, $6_{eq}$-H), 2.68 (m, 1H, 1-H), 3.42 (br s, 1H, 5-H), 3.95 (m, 1H, 2-H), 4.85 (d, 1H, Z NH), 5.08 (t, 2H, $CH_2$Ar), 5.45 (d, 1H, 4-H), 5.62 (d, 1H, 3-H), 7.32 (s, 5H, Ar H's). ESCI MS m/e 262 M+1.

Example 41

Isolation of S1b-2 was accomplished using the following procedure: Using Schlenk technique 5.57 g (10.0 mmol) of methyl ester compound, S1b-1, was dissolved in 250 mL of THF. In another flask LiOH (1.21 g, 50.5 mmol) was dissolved in 50 mL water and de-gassed by bubbling $N_2$ through the solution using a needle for 20 minutes. The reaction was started transferring the base solution into the flask containing S1b-1 over one minute with rapid stirring. The mixture was stirred at room temperature and work-up initiated when the starting material S1b-1 was completely consumed (Using a solvent system of 66% EtOAc/33% Hexane and developing with phosphomolybdic acid reagent (Aldrich #31,927-9) the starting material S1b-1 has an Rf of 0.88 and the product streaks with an Rf of approx. 0.34 to 0.64.). The reaction usually takes 2 days. Work-Up: The THF was removed by vacuum transfer until about the same volume is left as water added to the reaction, in this case 50 mL. During this the reaction solution forms a white mass that adheres to the stir bar surrounded by clear yellow solution. As the THF is being removed a separatory funnel is set up including a funnel to pour in the reaction solution and an Erlenmeyer flask is placed underneath the separatory funnel. Into the Erlenmeyer flask is added some anhydrous $Na_2SO_4$. This apparatus should be set up before acidification is started. (It is important to set up the separatory funnel and Erlenmeyer flask etc. before acidification of the reaction solution to enable separation of phases and extraction of the product away from the acid quickly once the solution attains a pH close to 1. If the separation is not preformed rapidly the Boc functional group will be hydrolyzed significantly reducing the yield.) Once the volatiles are sufficiently removed, $CH_2Cl_2$ (125 mL) and water (65 mL) are added and the reaction flask cooled in an ice bath. The solution is stirred rapidly and 5 mL aliquots of 1N HCl are added by syringe and the reaction solution tested with pH paper. Acid is added until the spot on the pH paper shows red (not orange) around the edge indicating a pH is 1 to 2 has been achieved (The solution being tested is a mixture of $CH_2Cl_2$ and water so the pH paper will show the accurate measurement at the edge of the spot and not the center.) and the phases are separated by quickly pouring the solution into the separatory funnel. As the phases separate the stopcock is turned to release the $CH_2Cl_2$ phase (bottom) into the Erlenmeyer flask and swirl the flask to allow the drying agent to absorb water in the solution. (At this scale of this procedure 80 mL of 1N HCl was used.) Soon after phase separation the aqueous phase is extracted with $CH_2Cl_2$ (2×100 mL), dried over anhydrous $Na_2SO_4$ and the volatiles removed to produce 5.37 g/9.91 mmoles of a beautiful white microcrystals reflecting a 99.1% yield. This product can not be purified by chromatography since that process would also hydrolyze the Boc functional group on the column.

$^1$H NMR (400 MHz, $CDCl_3$) δ 7.33, 7.25 (5H, m, Ph), 6.30 (1H, d, NH), 5.97 (1H, d, NH), 5.10 (2H, m, $CH_2$Ph), 4.90 (1H, d, NH), 3.92, 3.58, 3.49 (1H, m, CHNH), 2.96, 2.48, 2.04, 1.95, 1.63 (1H, m, $CH_2$CHNH), 1.34 (9H, s, $CCH_3$).

IR (crystalline, $cm^{-1}$) 3326 br w, 3066 w, 3033 w, 2975 w, 2940 w sh, 1695 vs, 1506 vs, 1454 m sh, 1391 w, 1367 m, 1300 m sh, 1278 m sh, 1236 s, 1213 w sh, 1163 vs, 1100 w, 1053 m, 1020 m, 981 w sh, 910 w, 870 m, 846 w, 817 w, 775 w sh, 739 m, 696 m.

Example 42

Di-(l)-menthyl bicyclo[2.2.1]hept-5-ene-7-anti-(trimethylsilyl)-2-endo-3-exo-dicarboxylate (S4-26)

To a solution of S4-25 (6.09 g, 0.0155 mol) in toluene (100 mL) was added diethylaluminum chloride (8.6 mL of a 1.8 M solution in toluene) at −78° C. under nitrogen and the mixture was stirred for 1 hour. To the resulting orange solution was added S2-14 (7.00 g, 0.0466 mol) dropwise as a −78° C. solution in toluene (10 mL). The solution was kept at −78° C. for 2 hours, followed by slow warming to room temperature overnight. The aluminum reagent was quenched with a saturated solution of ammonium chloride (50 mL). The aqueous layer was separated and extracted with methylene chloride (100 mL) which was subsequently dried over magnesium sulfate. Evaporation of the solvent left a yellow solid that was purified by column chromatography (10% ethyl acetate/hexanes) to give S4-26 as a while solid (7.19 g, 0.0136 mol, 87% yield).

$^1$H NMR: ($CDCl_3$) δ −0.09 (s, 9H, $SiMe_3$), 0.74-1.95 (multiplets, 36H, menthol), 2.72 (d, 1H, α-menthyl carbonyl CH), 3.19 (bs, 1H, bridgehead CH), 3.30 (bs, 1H, bridgehead CH), 3.40 (t, 1H, α-menthyl carbonyl CH), 4.48 (d of t, 1H, α-menthyl ester CH), 4.71 (d of t, 1H, α-menthyl ester CH), 5.92 (d of d, 1H, CH═CH), 6.19 (d of d, 1H, CH═CH).

Example 43

5-exo-Bromo-3-exo-(l)-menthylcarboxybicyclo[2.2.1]heptane-7-anti-(trimethylsilyl)-2,6-carbolactone (S4-27)

A solution of bromine (3.61 g, 0.0226 mol) in methylene chloride (20 mL) was added to a stirring solution of S4-26 (4.00 g, 0.00754 mol) in methylene chloride (80 mL). Stirring was continued at room temperature overnight. The solution was treated with 5% sodium thiosulfate (150 mL), and the organic layer separated and dried over magnesium sulfate. The solvent was evaporated at reduced pressure, and the crude product purified by column chromatography (5% ethyl acetate/hexanes) to give S4-27 as a white solid (3.53 g, 0.00754 mol, 99% yield).

$^1$H NMR: ($CDCl_3$) δ −0.19 (s, 9H, $SiMe_3$), 0.74-1.91 (multiplets, 18H, menthol), 2.82 (d, 1H, α-lactone carbonyl CH), 3.14 (bs, 1H, lactone bridgehead CH), 3.19 (d of d, 1H, bridgehead CH), 3.29 (t, 1H, α-menthyl carbonyl CH), 3.80 (d, 1H, α-lactone ester), 4.74 (d of t, 1H, α-menthyl ester CH), 4.94 (d, 1H, bromo CH).

Example 44

Bicyclo[2.2.1]hept-5-ene-7-syn-(hydroxy)-2-exo-methyl-3-endo-(l)-menthyl dicarboxylate (S4-28)

S4-27 (3.00 g, 0.00638 mol) was dissolved in anhydrous methanol (150 mL), silver nitrate (5.40 g, 0.0318 mol) added and the suspension refluxed for 3 days. The mixture was cooled, filtered through Celite and the solvent evaporated to give an oily residue. Purification by column chromatography gave S4-28 as a light yellow oil (1.72 g, 0.00491 mol, 77% yield).

$^1$H NMR: ($CDCl_3$) δ 0.75-2.02 (multiplets, 18H, menthol), 2.83 (d, 1H, α-menthyl carbonyl CH), 3.03 (bs, 1H, bridgehead CH), 3.14 (bs, 1H, bridgehead CH), 3.53 (t, 1H, α-methyl carbonyl CH), 3.76 (s, 3H, $CH_3$), 4.62 (d of t, 1H, α-menthyl ester CH), 5.87 (d of d, 1H, CH═CH), 6.23 (d of d, 1H, CH═CH).

Example 45

2-exo-Methyl-3-endo-(l)-menthylbicyclo[2.2.1]hept-5-ene-7-syn-(benzyloxy) dicarboxylate (S4-29)

Benzyl bromide (1.20 g, 0.0070 mol) and silver oxide (1.62 g, 0.0070 mol) were added to a stirring solution of S4-28 (0.490 g, 0.00140 mol) in DMF (25 mL). The suspension was stirred overnight and then diluted with ethyl acetate (100 mL). The solution was washed repeatedly with water followed by 1 N lithium chloride. The organic layer was separated and dried with magnesium sulfate. The solvent was evaporated under reduced pressure and the crude product was purified by column chromatography on silica gel to give S4-29 as an oil (0.220 g, 0.000500 mol, 36% yield).

$^1$H NMR: ($CDCl_3$) δ 0.74-2.08 (multiplets, 18H, menthol), 2.83 (d, 1H, α-menthyl carbonyl CH), 3.18 (bs, 1H, bridgehead CH), 3.44 (bs, 1H, bridgehead CH), 3.52 (t, 1H, bridge CH), 3.57 (s, 3H, $CH_3$), 3.68 (t, 1H, α-methyl carbonyl CH), 4.42 (d of d, 2H, benzyl —$CH_2$—), 4.61 (d of t, 1H, α-menthyl ester CH), 5.89 (d of d, 1H, CH═CH), 6.22 (d of d, 1H, CH═CH), 7.25-7.38 (m, 5H, $C_6H_5$).

Example 46

Bicyclo[2.2.1]hept-5-ene-7-syn-(benzyloxy)-2-exo-carboxy-3-endo-(l)-menthyl carboxylate (S4-30)

S4-29 (0.220 g, 0.00050 mol) was added to a mixture of tetrahydrofuran (1.5 mL), water (0.5 mL), and methanol (0.5 mL). Potassium hydroxide (0.036 g, 0.00065 mol) was added and the solution stirred at room temperature overnight. The solvent was evaporated under reduced pressure and the residue purified by column chromatography (10% ethyl acetate/hexanes) to give S4-30 (0.050 g, 0.00012 mol, 23% yield).

$^1$H NMR: ($CDCl_3$) δ 0.73-2.01 (multiplets, 18H, menthol), 2.85 (d, 1H, α-menthyl carbonyl CH), 3.18 (bs, 1H, bridgehead CH), 3.98 (bs, 1H, bridgehead CH), 3.53 (bs, 1H, bridge CH), 3.66 (t, 1H, α-methyl carbonyl CH), 4.44 (d of d, 2 H, benzyl —$CH_2$—), 4.63 (d of t, 1H, α-menthyl ester CH), 5.90 (d of d, 1H, CH═CH), 6.23 (d of d, 1H, CH═CH), 7.25-7.38 (m, 5H, $C_6H_5$).

Mass Spec: calculated for $C_{26}H_{34}O_5$ 426.24; found 425.4 (M−1) and 851.3 (2M−1).

Example 47

Bicyclo[2.2.1]hept-5-ene-7-syn-(benzyloxy)-2-exo-(trimethylsilylethoxycarbonyl)-amino-3-endo-(l)-menthyl carboxylate (S4-31)

To a solution of S4-30 in benzene is added triethylamine and diphenylphosphoryl azide. The solution is refluxed for 24 hours then cooled to room temperature. Trimethylsilylethanol is added, and the solution refluxed for an additional 48 hours. The benzene solution is partitioned between ethyl acetate and 1 M sodium bicarbonate. The organic layers are combined, washed with 1 M sodium bicarbonate and dried over sodium sulfate. The solvent is evaporated under reduced pressure to give the crude Curtius reaction product.

Example 48

Bicyclo[2.2.1]heptane-7-syn-(benzyloxy)-2-exo-(trimethylsilylethoxycarbonyl)-amino-3-endo-(l)-menthyl-5-exo-methyl-6-exo-methyl tricarboxylate (S4-32)

S4-31, dry copper(II) chloride, 10% Pd/C, and dry methanol are added to a flask with vigorous stirring. After degassing, the flask is charged with carbon monoxide to a pressure just above 1 atm., which is maintained for 72 hours. The solids are filtered and the residue worked up in the usual way to afford the biscarbonylation product.

Example 49

Bicyclo[2.2.1]heptane-7-syn-(benzyloxy)-2-exo-(trimethylsilylethoxycarbonyl)amino-3-endo-(l)-menthylcarbox-5-exo-6-exo-dicarboxylic anhydride (S4-33)

A mixture of S4-32, formic acid, and a catalytic amount of p-toluenesulfonic acid is stirred at 90° C. overnight. Acetic anhydride is added and the reaction mixture refluxed for 6 hours. Removal of the solvents and washing with ether gives the desired anhydride.

Example 50

Bicyclo[2.2.1]heptane-7-syn-(benzyloxy)-2-exo-(trimethylsilylethoxycarbonyl)amino-3-endo-(l)-menthyl-6-exo-carboxy-5-exo-methyl dicarboxylate (S4-33)

To a solution of S4-32 in equal amounts of toluene and carbon tetrachloride is added quinidine. The suspension is cooled to −65° C. and stirred for 1 hour. Three equivalents of methanol are slowly added over 30 minutes. The suspension is stirred at −65° C. for 4 days followed by removal of the solvents under reduced pressure. The resulting white solid is partitioned between ethyl acetate and 2M HCl. The quinine is recovered from the acid layer and S4-33 obtained from the organic layer.

Example 51

Bicyclo[2.2.1]heptane-7-syn-(benzyloxy)-2-exo-(trimethylsilylethoxycarbonyl)amino-3-endo-(l)-menthyl-6-exo-(trimethylsilylethoxycarbonyl)amino-5-exo-methyl dicarboxylate (S4-35)

To a solution of S4-34 in benzene is added triethylamine and diphenylphosphoryl azide. The solution is refluxed for 24 hours. After cooling to room temperature, 2-trimethylsilylethanol is added and the solution refluxed for 48 hours. The benzene solution is partitioned between ethyl acetate and 1M sodium bicarbonate. The organic layers are combined, washed with 1M sodium bicarbonate, and dried over sodium sulfate. The solvent is evaporated under reduced pressure to give the crude Curtius reaction product.

Example 52 endo-Bicyclo[2.2.1]hept-5-ene-2-benzylcarboxylate-3-carboxylic acid (S5-37)

Compound S3-19 (4.00 g, 0.0244 mol) and quinidine (8.63 g, 0.0266 mol) were suspended in equal amounts of toluene (50 mL) and carbon tetrachloride (50 mL). The suspension was cooled to −55° C. after which benzyl alcohol (7.90 g, 0.0732 mol) was added over 15 minutes. The reaction mixture became homogenous after 3 hours and was stirred at −55° C. for an additional 96 hours. After removal of the solvents, the residue was partitioned between ethyl acetate (300 mL) and 2M hydrochloric acid (100 mL). The organic layer was washed with water (2×50 mL) and saturated aqueous sodium chloride (1×50 mL). Drying over magnesium sulfate and evaporation of the solvent gave S5-37 (4.17 g, 0.0153 mol, 63% yield).

$^1$H NMR: ($CDCl_3$) δ 1.33 (d, 1H, bridge $CH_2$), 1.48 (d of t, 1H, bridge $CH_2$), 3.18 (bs, 1H, bridgehead CH), 3.21 (bs, 1H, bridgehead CH), 3.33 (t, 2H, α-acid CH), 4.98 (d of d, 2H, $CH_2$Ph), 6.22 (d of d, 1H, CH═CH), 6.29 (d of d, 1H, CH═CH), 7.30 (m, 5H, $C_6H_5$).

Example 53

2-endo-Benzylcarboxy-6-exo-iodobicyclo[2.2.1]heptane-3,5-carbolactone (S5-38)

S5-37 (4.10 g, 0.0151 mol) was dissolved in 0.5 M sodium bicarbonate solution (120 mL) and cooled to 0° C. Potassium iodide (15.0 g, 0.090 mol) and iodine (7.66 g, 0.030 mol) were added followed by methylene chloride (40 mL). The solution was stirred at room temperature overnight. After dilution with methylene chloride (100 mL), sodium thiosulfate was added to quench the excess iodine. The organic layer was separated and washed with water (100 mL) and sodium chloride solution (100 mL). Drying over magnesium sulfate and evaporation of the solvent gave S5-38 (5.44 g, 0.0137 mol, 91% yield).

$^1$H NMR: ($CDCl_3$) δ 1.86 (d of q, 1H, bridge —$CH_2$—), 2.47 (d of t, 1H, bridge —$CH_2$—), 2.83 (d of d, 1H, α-lactone carbonyl CH), 2.93 (bs, 1H, lactone bridgehead CH), 3.12 (d of d, 1H, α-benzyl ester CH), 3.29 (m, 1H, bridgehead CH), 4.63 (d, 1H, α-lactone ester CH), 5.14 (d of d, 2H, $CH_2$Ph), 5.19 (d, 1H, iodo CH), 7.38 (m, 5H, $C_6H_5$).

Example 54

2-endo-Benzylcarboxy-bicyclo[2.2.1]heptane-3,5-carbolactone (S5-39)

S5-38 (0.30 g, 0.75 mmol) was placed in DMSO under $N_2$, $NaBH_4$ (85 mg, 2.25 mmol) added and the solution stirred at 85° C. for 2 h. The mixture was cooled, diluted with water (50 mL) and extracted with dichloromethane (3×20 mL). The extracts were combined, washed with water (4×15 mL) and saturated aqueous NaCl (10 mL), dried, and evaporated to give 0.14 g (68%) of S5-39.

Example 55

5-endo-hydroxybicyclo[2.2.1]heptane-2-endo-benzyl-3-endo-methyl dicarboxylate (S5-40)

Compound S5-39 is dissolved in methanol and sodium methoxide added with stirring. Removal of the solvent gives S5-40.

Example 56

Bicyclo[2.2.1]heptane-2-endo-benzyl-3-endo-methyl-5-exo-(t-butoxycarbonyl)amino dicarboxylate (S5-41)

In a one-pot reaction S5-40 is converted to the corresponding mesylate with methanesulfonyl chloride, sodium azide added to displace the mesylate to give exo-azide, which is followed by reduction with tributyl phosphine to give the free amine, which is protected as the t-Boc derivative to give S5-41.

Example 57

Bicyclo[2.2.1]heptane-2-endo-carboxy-3-exo-methyl-5-exo-(t-butoxycarbonyl)amino carboxylate (S5-42)

The benzyl ether protecting group is removed by catalytic hydrogenolysis of S5-41 with 10% Pd/C in methanol at room temperature for 6 hours. Filtration of the catalyst and removal of the solvent yields crude S5-42.

Example 58

Bicyclo[2.2.1]heptane-2-endo-carboxy-3-exo-methyl-5-exo-(t-butoxycarbonyl)amino carboxylate (S5-43)

Sodium is dissolved in methanol to generate sodium methoxide. S5-42 is added and the mixture stirred at 62° C. for 16 hr. The mixture is cooled and acetic acid added with cooling to neutralize the excess sodium methoxide. The mixture is diluted with water and extracted with ethyl acetate. The extract is dried and evaporated to give S5-43.

Example 59

Bicyclo[2.2.1]heptane-2-endo-benzyl-3-exo-methyl-5-exo-(t-butoxycarbonyl)amino dicarboxylate (S5-44)

Compound S5-43 is reacted with benzyl bromide and cesium carbonate in tetrahydrofuran at room temperature to give benzyl ester S5-44, which is isolated by acid work-up of the crude reaction mixture.

Example 60

Bicyclo[2.2.1]heptane-2-endo-benzyl-3-exo-carboxy-5-exo-(t-butoxycarbonyl)amino carboxylate (S5-45)

Compound S5-44 is dissolved in methanol and cooled to 0° C. under $N_2$. 2M NaOH (2 equivalents) is added dropwise, the mixture allowed to come to ambient temperature and is stirred for 5 h. The solution is diluted with water, acidified with 2M HCl and extracted with ethyl acetate. The extract is washed with water, saturated aqueous NaCl, dried and evaporated to give S5-45.

Example 61

Bicyclo[2.2.1]heptane-2-endo-benzyl-3-exo-(trimethylsilylethoxycarbonyl)amino-5-exo-(t-butoxycarbonyl)amino carboxylate (S5-46)

To a solution of S5-45 in benzene is added triethylamine and diphenylphosphoryl azide. The solution is refluxed for 24 hours and then cooled to room temperature. Trimethylsilylethanol is added and the solution refluxed for 48 hours. The solution is partitioned between ethyl acetate and 1M sodium bicarbonate. The organic layer is washed with 1M sodium bicarbonate and dried over sodium sulfate. The solvent is evaporated under reduced pressure to give crude Curtius product S5-46.

Example 62 endo-Bicyclo[2.2.1]hept-5-ene-2-(4-methoxy)benzylcarboxylate-3-carboxylic acid (S6-48)

Compound S3-19 and quinidine are suspended in equal amounts of toluene and carbon tetrachloride and cooled to −55° C. p-Methoxybenzyl alcohol is added over 15 minutes and the solution stirred at −55° C. for 96 hours. After removal of the solvents, the residue is partitioned between ethyl acetate and 2 M hydrochloric acid. The organic layer is washed with water and saturated aqueous sodium chloride. Drying over magnesium sulfate and removal of the solvent gives S6-48.

Example 63 endo-Bicyclo[2.2.1]hept-5-ene-2-(4-methoxy)benzyl-3-(trimethylsilylethoxycarbonyl)amino carboxylate (S6-49)

To a solution of S6-48 in benzene is added triethylamine and diphenylphosphoryl azide. The solution is refluxed for 24 hours, cooled to room temperature, trimethylsilylethanol is added, and the solution is refluxed for an additional 48 hours. The benzene solution is partitioned between ethyl acetate and 1 M sodium bicarbonate. The organic layers are combined, washed with 1 M sodium bicarbonate, and dried with sodium sulfate. The solvent is evaporated under reduced pressure to give crude Curtius product S6-49.

Example 64

Bicyclo[2.2.1]heptane-2-endo-(4-methoxy)benzyl-3-endo-(trimethylsilylethoxycarbonyl)amino-5-exo-methyl-6-exo-methyl tricarboxylate (S6-50)

S6-49, copper(II) chloride, 10% Pd/C, and dry methanol are added to a flask with vigorous stirring. After degassing the suspension, the flask is charged with carbon monoxide to a pressure just above 1 atm. The pressure of carbon monoxide is maintained over 72 hours. The solids are filtered off, and the crude reaction mixture worked up in the usual way to afford S6-50.

Example 65

Bicyclo[2.2.1]heptane-2-endo-(4-methoxy)benzyl-3-endo-(trimethylsilylethoxycarbonyl)amino-5-exo-6-exo-dicarboxylic anhydride (S6-51)

S6-50, formic acid, and a catalytic amount of p-toluenesulfonic acid is heated at 90° C. overnight. Acetic anhydride is added to the reaction mixture, and it is refluxed for an additional 6 hours. Removal of the solvents and washing with ether affords S6-51.

Example 66

Bicyclo[2.2.1]heptane-2-endo-(4-methoxy)benzyl-3-endo-(trimethylsilylethoxycarbonyl)amino-5-exo-carboxy-6-exo-methyl dicarboxylate (S6-52)

To a solution of S6-51 in equal amounts of toluene and carbon tetrachloride is added quinine. The suspension is cooled to −65° C. and stirred for 1 hour. Three equivalents of methanol are added slowly over 30 minutes. The suspension is stirred at −65° C. for 4 days followed by removal of the solvents. The resulting white solid is partitioned between ethyl acetate and 2 M HCl, with S6-52 worked up from the organic layer.

Example 67

Bicyclo[2.2.1]heptane-2-endo-(4-methoxy)benzyl-3-endo-(trimethylsilylethoxycarbonyl)amino-5-exo-(trimethylsilylethoxycarbonyl)amino-6-exo-methyl dicarboxylate (S6-53)

To a solution of S6-52 in benzene is added triethylamine and diphenylphosphoryl azide. The solution is refluxed for 24 hours then cooled to room temperature. 2-Trimethylsilylethanol is added, and the solution is refluxed for an additional 48 hours. The benzene solution is partitioned between ethyl acetate and 1 M sodium bicarbonate. The organic layers are combined, washed with 1 M sodium bicarbonate, and dried with sodium sulfate. The solvent is evaporated under reduced pressure to give S6-53.

Example 68

Bicyclo[2.2.1]heptane-2-exo-(4-methoxy)benzyl-3-endo-(trimethylsilylethoxycarbonyl)amino-5-exo-(trimethylsilylethoxycarbonyl)amino-6-endo-methyl dicarboxylate (S6-54)

To a solution of S6-53 in tetrahydrofuran is carefully added potassium tert-butoxide. The basic solution is refluxed for 24 hours followed by addition of acetic acid. Standard extraction methods give the double epimerized product S6-54.

Example 69

Preparation of hexamer:

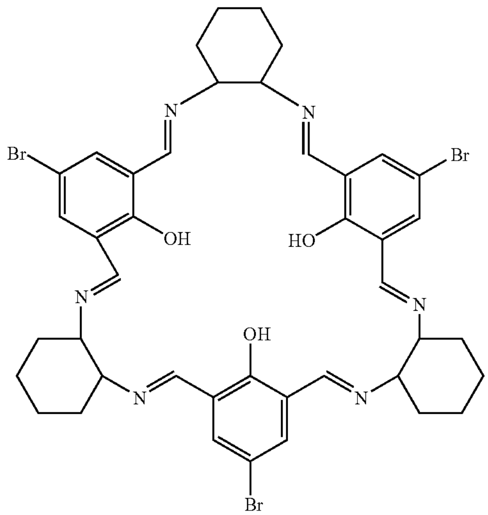

Hexamer 1a-Br

To 0.300 g (1R,2R)-(−)-trans-1,2-diaminocyclohexane (2.63 mmol) in 5 mL $CH_2Cl_2$ at 0° C. was added 0.600 g of 2,6-diformyl-4-bromophenol (2.62 mmol) in 5 mL of $CH_2Cl_2$. The yellow solution was allowed to warm to room temperature and stirred for 48 hours. The reaction solution was decanted, and added to 150 mL of methanol. After standing for 30 minutes, the yellow precipitate was collected, washed with methanol, and air-dried (0.580 g; 72% yield).

$^1$H NMR (400 MHz, $CDCl_3$) δ 14.31 (s, 3H, OH), 8.58 (s, 3H, CH═N), 8.19 (s, 3H, CH═N), 7.88 (d, 3H, J=2.0 Hz, ArH), 7.27 (d, 3H, J=2.0 Hz, ArH), 3.30-3.42 (m, 6H, $CH_2$—CH—N), 1.41-1.90 (m, 24H, aliphatic).

MS (FAB): Calcd for $C_{42}H_{46}N_6O_3Br_3$ 923.115; found 923.3 $[M+H]^+$.

Example 70

Preparation of hexamer:

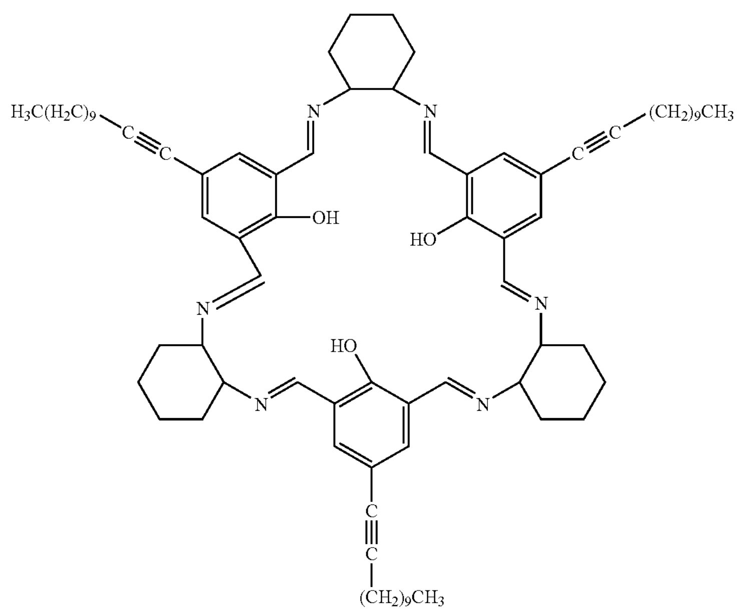

Hexamer 1a

To 0.300 g (1R,2R)-(−)-trans-1,2-diaminocyclohexane (2.63 mmol) in 6 mL $CH_2Cl_2$ at 0° C. was added 0.826 g of 2,6-diformyl-4-(1-dodec-1-yne)phenol (2.63 mmol) in 6 mL of $CH_2Cl_2$. The orange solution was stirred at 0° C. for 1 hour and then allowed to warm to room temperature after which stirring was continued for 16 hours. The reaction solution was decanted and added to 150 mL of methanol. A sticky yellow solid was obtained after decanting the methanol solution. Chromatographic cleanup of the residue gave a yellow powder.

$^1$H NMR (400 MHz, $CDCl_3$) δ 14.32 (s, 3H, OH), 8.62 (s, 3H, CH═N), 8.18 (s, 3H, CH═N), 7.84 (d, 3H, J=2.0 Hz, ArH), 7.20 (d, 3H, J=2.0 Hz, ArH), 3.30-3.42 (m, 6H, $CH_2$—CH—N), 2.25 (t, 6H, J=7.2 Hz, propargylic), 1.20-1.83 (m, 72H, aliphatic), 0.85 (t, 9H, J=7.0 Hz, $CH_3$).

$^{13}$C NMR (400 MHz, $CDCl_3$) δ 163.4, 161.8, 155.7, 136.9, 132.7, 123.9, 119.0, 113.9, 88.7, 79.7, 75.5, 73.2, 33.6, 33.3, 32.2, 29.8, 29.7, 29.6, 29.4, 29.2, 29.1, 24.6, 24.5, 22.9, 19.6, 14.4.

MS (FAB): Calcd for $C_{78}H_{109}N_6O_3$ 1177.856; found: 1177.8 $[M+H]^+$.

Example 71

Preparation of hexamer:

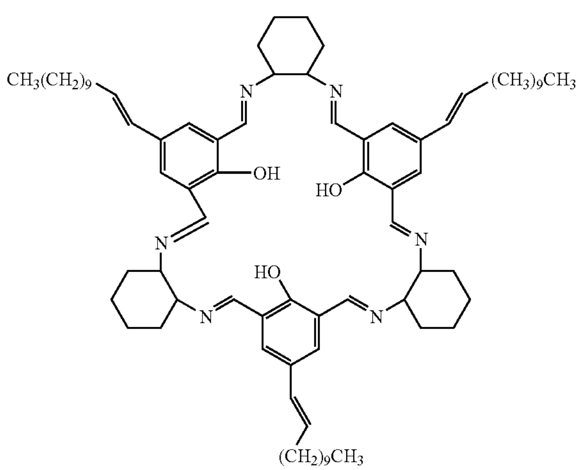

Hexamer 1d-C12

To 0.240 g of 2,6-diformyl-4-(1-dodecene)phenol (0.76 mmol) in 10 mL of benzene was added a 10 mL benzene solution of (1R,2R)-(−)-trans-1,2-diaminocyclohexane (0.087 g, 0.76 mmol). The solution was stirred at room temperature for 48 hours shielded from the light. The orange solution was taken to dryness and chromatographed (silica, 50/50 acetone/$Et_2O$) to give a yellow sticky solid (33% yield).

$^1$H NMR (400 MHz, $CDCl_3$) δ 14.12 (s, 3H, OH), 8.62 (s, 3H, CH═N), 8.40 (s, 3H, CH═N), 7.82 (d, 3H, J=2.0 Hz, ArH), 7.28 (d, 3H, J=2.0 Hz, ArH), 6.22 (d, 3H, vinyl), 6.05 (d, 3H, vinyl), 3.30-3.42 (m, 6H, $CH_2$—CH—N), 1.04-1.98 (m, 87H, aliphatic).

MS (FAB): Calcd for $C_{78}H_{115}N_6O_3$ 1183.90; found: 1184.6 $[M+H]^+$.

Example 72

Preparation of tetramer:

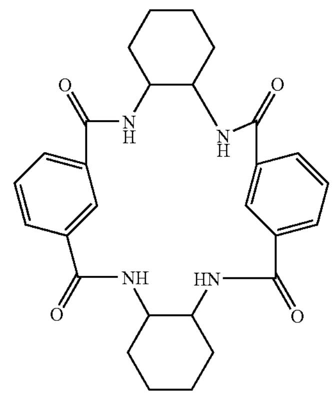

Tetramer 2-phenyl

Preparation of hexamer:

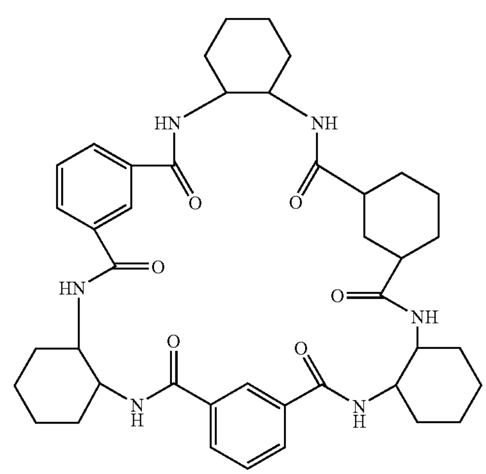

Hexamer 6-phenyl

Triethylamine (0.50 mL, 3.59 mmol) and (1R,2R)-(−)-trans-1,2-diaminocyclohexane (0.190 g, 1.66 mmol) were combined in 150 mL EtOAc and purged with $N_2$ for 5 minutes. To this solution was added 0.331 g isophthalolyl chloride (1.66 mmol) dissolved in 100 mL EtOAc dropwise over six hours. The solution was filtered and the filtrate taken to dryness. TLC (5% methanol/$CH_2Cl_2$) shows the product mixture to be primarily composed of two macrocyclic compositions. Chromatographic separation (silica, 5% methanol/$CH_2Cl_2$) gave the above tetramer (0.020 g, 5% yield) and hexamer (about 10%).

Tetramer:

$^1H$ NMR (400 MHz, $CDCl_3$) δ 7.82 (s, 1H), 7.60 (br s, 2H), 7.45 (br s, 2 H), 7.18 (br s, 1H), 3.90 (br s, 2H), 2.22 (d, 2H), 1.85 (m, 4H), 1.41 (m, 4H).

MS (ESI): Calcd for $C_{28}H_{33}N_4O_4$ 489.25; found 489.4 $[M+H]^+$.

Hexamer:

MS (ESI): Calcd for $C_{42}H_{49}N_6O_6$ 733.37; found 733.5 $[M+H]^+$.

Example 73

Preparation of macrocyclic modules from benzene and cyclohexane cyclic synthons:

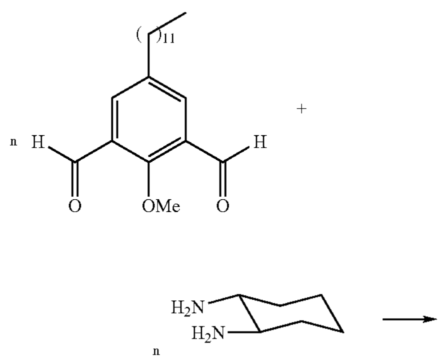

-continued

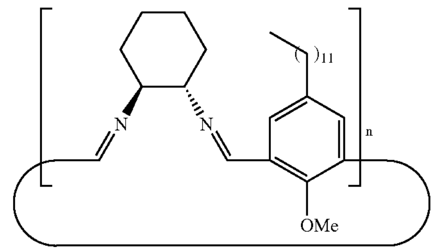

n = 2, Tetramer 1f-methoxy
n = 3, Hexamer 1f-methoxy
n = 4, Octamer 1f-methoxy

To a 5 mL dichloromethane solution of 4-dodecyl-2,6-diformyl anisole (24 mg; 0.072 mmol) was added a 5 mL dichloromethane solution of (1R,2R)-(−)-trans-1,2-diaminocyclohexane (8.5 mg; 0.074 mmol). This solution was stirred at room temperature for 16 hours and then added to the top of a short silica column. Elution with diethyl ether and then removal of solvent led to the isolation of 22 mg of an off-white solid. Positive ion electrospray mass spectrometry demonstrated the presence of the tetramer (m/z 822, $MH^+$), hexamer (m/z 1232, $MH^+$), and the octamer (m/z 1643, $MH^+$) in the off-white solid. Calculated molecular weights were as follows: tetramer+H ($C_{54}H_{85}N_4O_2$, 821.67); hexamer+H ($C_{81}H_{127}N_6O_3$, 1232.00); octamer+H ($C_{108}H_{169}N_8O_4$, 1643.33).

Example 74

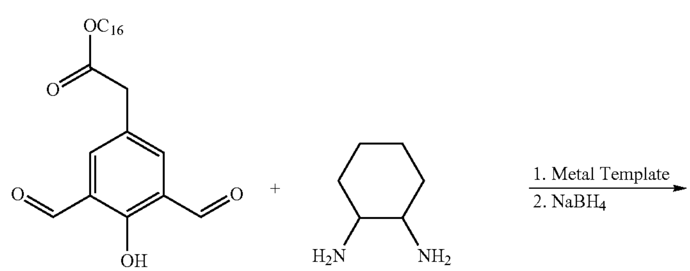

1

4

-continued

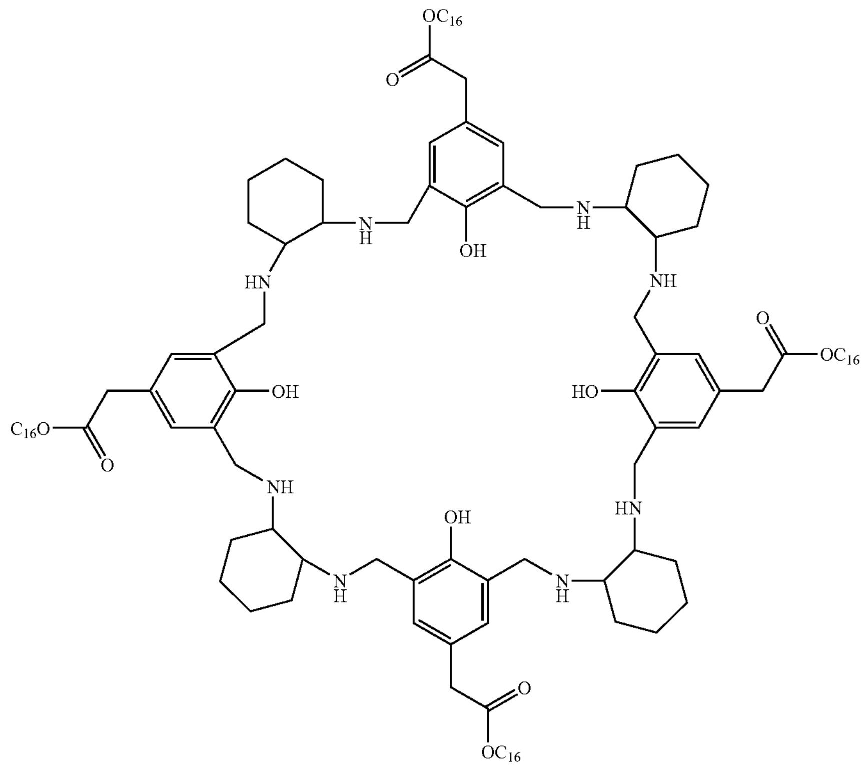

Octamer 4jh

Templated Imine Octamer. To a 3 neck 100 mL round bottomed flask with stirbar, fitted with condenser and addition funnel under argon, amphiphilic dialdehyde phenol 1 (500 mg, 1.16 mmol) was added. Next, $Mg(NO_3)_2.6H_2O$ (148 mg, 0.58 mmol) 2 and $Mg(OAc)_2$. $4H_2O$ (124 mg, 0.58 mmol) were successively added. The flask was put under vacuo and backfilled with argon 3×. Anhydrous methanol was transferred to the flask via syringe under argon and the resulting suspension stirred. The mixture was then refluxed for 10 min affording a homogeneous solution. The reaction was allowed to cool to room temperature under positive argon pressure. (1R,2R)-(−)-trans-1,2-diaminocyclohexane 4 was added to the addition funnel followed by cannula transfer of anhydrous MeOH (11.6 mL) under argon. The diamine/MeOH solution was added to the stirred homogeneous metal template/dialdehyde solution drop wise over a period of 1 h affording an orange oil. The addition funnel was replaced with a glass stopper and the mixture was refluxed for 3 days. The solvent was removed in vacuo affording a yellow crystalline solid that was used without further purification.

Amine Octamer. To a 50 mL schlenk flask with stirbar under argon Imine Octamer (314 mg, 0.14 mmol) was added. Next anhydrous THF (15 mL) and MeOH (6.4 mL) were added via syringe under argon and the suspension stirred at room temperature. To the homogeneous solution, $NaBH_4$ (136 mg, 3.6 mmol) was added in portions and the mixture stirred at room temperature for 12 h. The solution was filtered, followed by addition of 19.9 mL $H_2O$. The pH was adjusted to ca. 2 by addition of 4 M HCl, then 6.8 mL of an ethylenediamine tetraacetic acid disodium salt dihydrate (0.13 M in $H_2O$) was added and the mixture stirred for 5 min. To the solution, 2.0% ammonium hydroxide was added and stirring continued for an additional 5 min. The solution was extracted with ethyl acetate (3×100 mL) the organic layer separated, dried over $Na_2SO_4$ and the solvent removed via rotoevaporation affording a pale yellow solid. Recrystallization from chloroform and hexanes afforded the Amine Octamer. Molecular weight was confirmed by ESIMS M+H=experimental=2058.7 m/z, calcd=2058.7 m/z.

Example 75

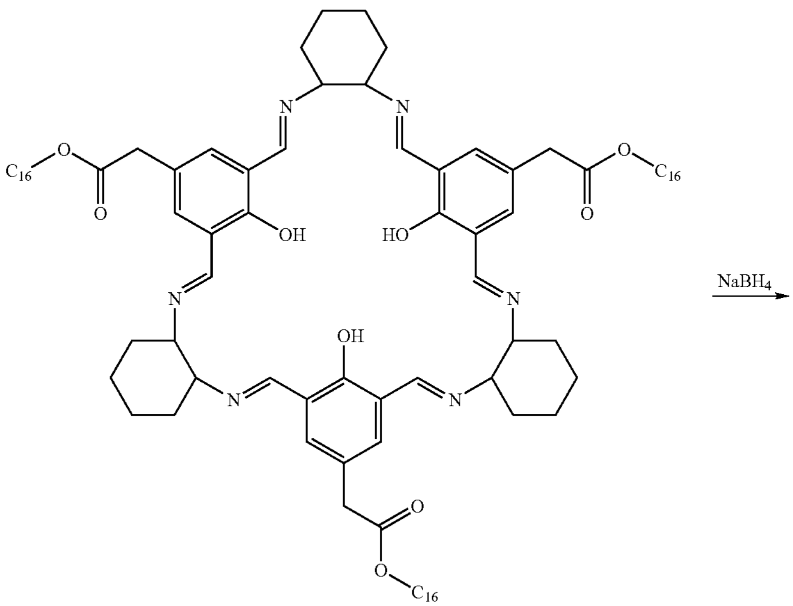

Hexamer 1j-1,2-imine

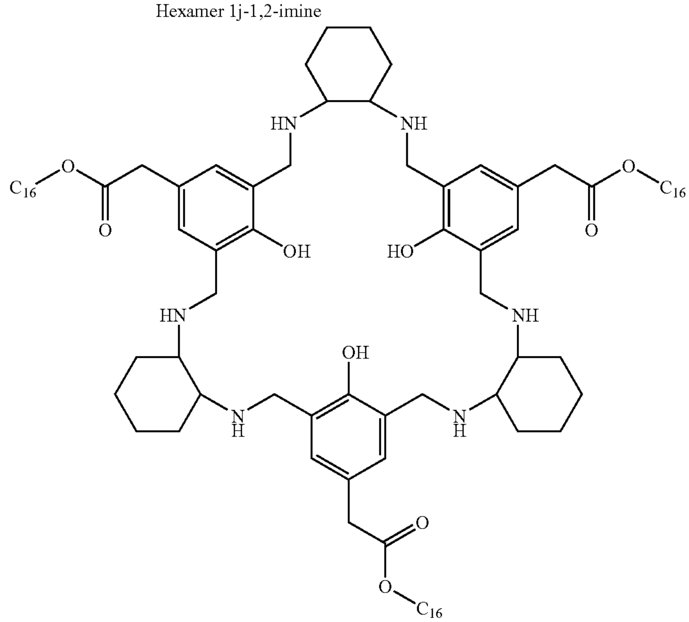

Hexamer 1jh-1,2-amine

Hexamer 1j. The two substrates, (−)-R,R-1,2-trans-diaminocyclohexane (0.462 mmol, 0.053 g) and 2,6-diformyl-4-hexadecyl benzylphenol carboxylate (0.462 mmol, 0.200 g) were added to a 10 mL vial containing a magnetic stirbar followed by the addition of 2 mL of $CH_2Cl_2$. The yellow solution was stirred at room temperature. After 24 h the reaction solution was plugged through silica gel with diethyl ether, and the solvent removed via roto-evaporation. (232 mg; 98% yield). $^1$H NMR (400 MHz, $CDCl_3$): δ 14.11 (s, 3H, OH), 8.67 (s, 3H, CH═N), 8.23 (s, 3H, CH═N), 7.70 (s, 3H, ArH), 7.11 (s, 3H, ArH), 4.05-3.90 (t, 6H, 3J=6.6 Hz, $CH_2C(O)OCH_2(CH_2)_{14}CH_3$), 3.44 (s, 6H, $CH_2C(O)OCH_2(CH_2)_{14}CH_3$), 3.30-3.42 (m, 6H, $CH_2$—CH—N), 1.21-1.90 (m, 108H, aliphatic) 0.92-0.86 (t, 9H, 3J=6.6 Hz. ESIMS (+) Calcd for $C_{96}H_{151}N_6O_9$: 1533; Found: 1534 [M+H]+.

Hexamer 1jh. To a 100 mL pear-shaped flask with magnetic stirbar under argon, Hexamer 1j (0.387 mmol, 0.594 g) was added and dissolved in THF:MeOH (7:3, 28:12 mL, respectively). Next, $NaBH_4$ (2.32 mmol, 0.088 g) was added slowly in portions at room temperature for 6.5 h. The solvent was removed by roto-evaporation, the residue dissolved in 125 mL ethyl acetate and washed 3×50 mL of $H_2O$. The organic layer was separated, dried over $Na_2SO_4$ and the solvent removed by roto-evaporation. The resulting residue was recrystallized from $CH_2Cl_2$ and MeOH affording a white solid (0.440 g; 74% yield). $^1$H NMR (400 MHz, $CDCl_3$): δ 6.86 (s, 6H, ArH), 4.10-4.00 (t, 6H, 3J=6.6 Hz, $CH_2C(O)OCH_2(CH_2)_{14}CH_3$), 3.87-3.69 (dd, 6H, 3J=13.7 Hz, 3J (CNH)=42.4 Hz $CH_2$—CH—N), 3.43 (s, 6H, $CH_2C(O)OCH_2(CH_2)_{14}CH_3$), 2.40-2.28 (m, 6H, aliphatic), 2.15-1.95 (m, 6H, aliphatic), 1.75-1.60 (m, 6H, aliphatic), 1.60-1.55 (m, 6H, aliphatic) 1.37-1.05 (m, 84H, aliphatic) 0.92-0.86 (t, 9H, 3J=6.8 Hz. ESIMS (+) Calcd for $C_{96}H_{163}N_6O_9$: 1544; Found: 1545 [M+H]+.

Example 76

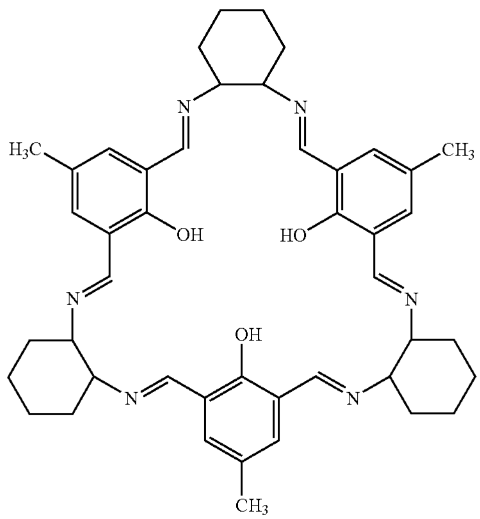

Hexamer 1a-Me-1,2-imine

Hexamer 1A-Me. A solution of 2-hydroxy-5-methyl-1,3-benzenedicarboxaldehye (53 mg, 0.32 mmol) in dichloromethane (0.6 mL) was added to a solution of (1R,2R)-(−)-1,2-diaminocyclohexane (37 mg, 0.32 mmol) in dichloromethane (0.5 mL). The mixture was stirred at ambient temperature for 16 h, added dropwise to methanol (75 mL) and chilled (4° C.) for 4 h. The precipitate was collected to afford 71 mg (92%) of hexamer 1A-Me. $^1$H NMR ($CDCl_3$): δ 13.88 (s, 3H, OH), 8.66 (s, 3H, ArCH═N), 8.19 (s, 3H, ArCH═N), 7.52 (d, 3H, J=2 Hz, Ar H), 6.86 (d, 3H, J=2 Hz, Ar H), 3.35 (m, 6H, cyclohexane 1,2-H's), 2.03 (3, 9H, Me), 1.6-1.9 (m, 18H, cyclohexane 3,6-$H_2$ and 4eq,5eq-H's), 1.45 (m, 6H, cyclohexane 4ax,5ax-H's); 13C NMR δ 63.67, 159.55, 156.38, 134.42, 129.75, 127.13, 119.00, 75.68, 73.62, 33.68, 33.41, 24.65, 24.57, 20.22; ESI(+) MS m/e (%) 727 M+H (100); IR 1634 $cm^{-1}$.

Example 77

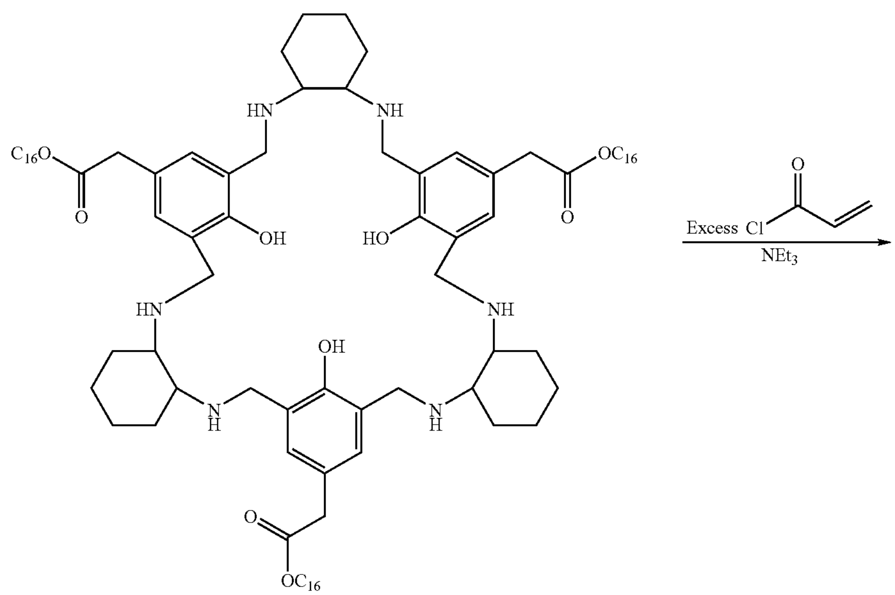

-continued

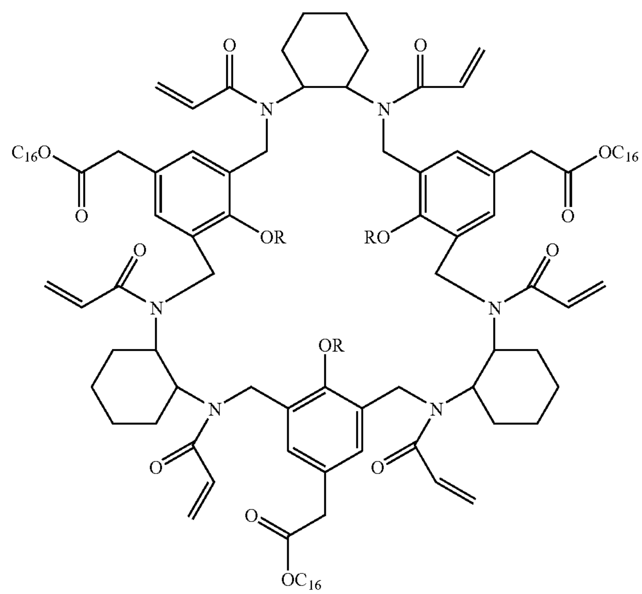

Hexamer 1jh-AC

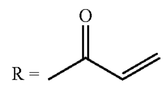

32.7 mg Hexamer 1jh (recrystallized times) was added to 30 mL dry THF. 100 μL triethylamine and 100 μL acryloyl chloride (freshly distilled) were added subsequently to the THF mixture using Schlenk technique. Solution was stirred for 18 hrs in an acetone/dry ice bath. After removal of solvent a white precipitate remained. The precipitate was redissolved in $CH_2Cl_2$ and filtered through a fritted funnel. $CH_2Cl_2$ solution was added to the separatory funnel and washed one time with water followed by two brine (NaCl) washes. The $CH_2Cl_2$ solution was dried over $MgSO_4$ and then filtered to remove $MgSO_4$. A yellow precipitate remained after solvent removal. $^1$H NMR ($CDCl_3$): δ −0.867-0.990 (3H), 1.259 (21.8H), 1.39 (1.86H), 1.64 (12.7H), 2.8 (1.25H), 3.46-3.62 (2.47H), 3.71 (0.89H), 3.99 (2.46H), 5.06 (0.71H), 5.31 (3.80H), 5.71 (1.43H), 5.90 (0.78H), 6.2-6.4 (2.49H), 6.59 (0.80H), 6.78 (0.47H), 6.98 (0.28H). FTIR-ATR: 3340, 2926 (—$CH_2$—), 2854 (—$CH_2$—), 1738 (Ester Carbonyl), 1649 and 1613 (Acrylate), 983 (═CH), 959 sh (═CH2). ESI-MS: 1978.5 (Hex1JhAC+8-AC), 1948.8 (Hex1JhAC+7-AC+Na+), 1923.3 (Hex1JhAC+7-AC), 1867.6 (Hex1JhAC+6-AC), 1842.6, 1759.7 (Hex1JhAC+4-AC).

Example 78

Figure 20A:
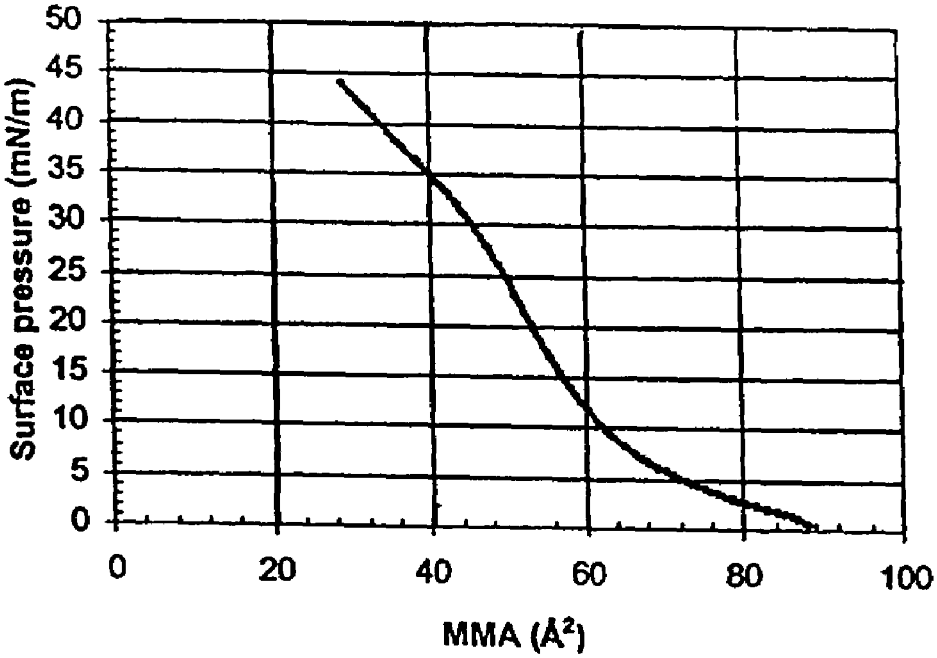
FIG. 20A shows an example of the Langmuir isotherm of an embodiment of a hexamer macrocyclic module.
Figure 20B:
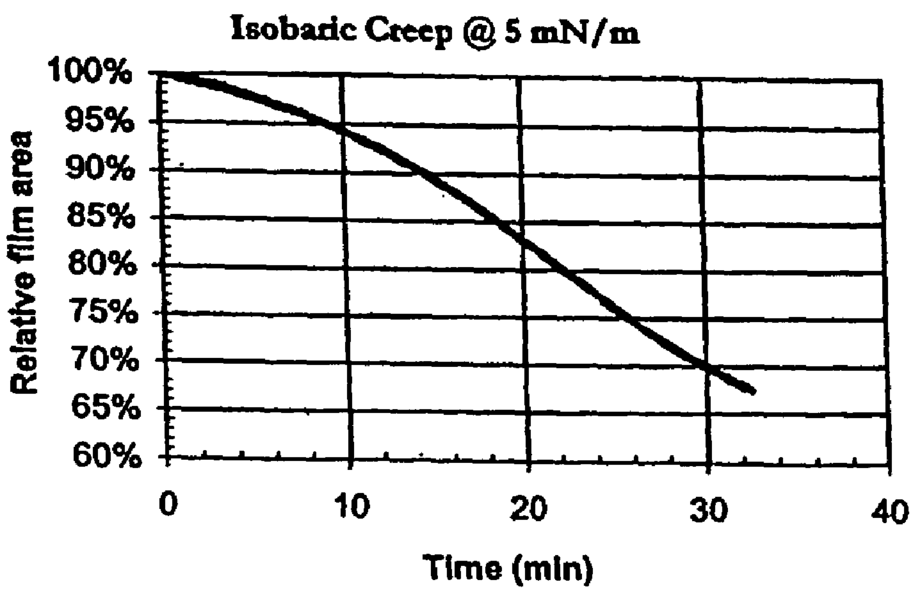
FIG. 20B shows an example of the isobaric creep of an embodiment of a hexamer macrocyclic module.

The Langmuir isotherm and isobaric creep for hexamer 1a-Me are shown in FIGS. 20A and 20B, respectively.

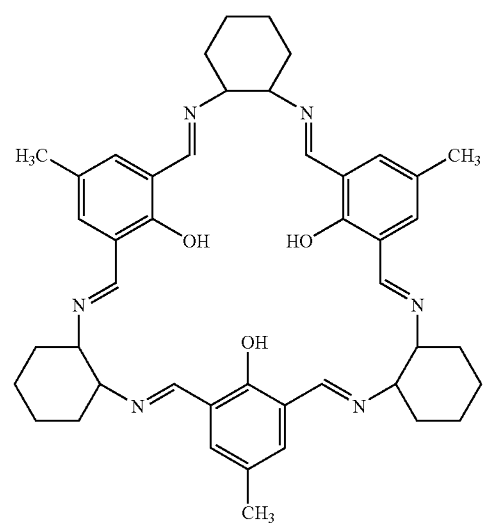

Hexamer 1a-Me

-continued

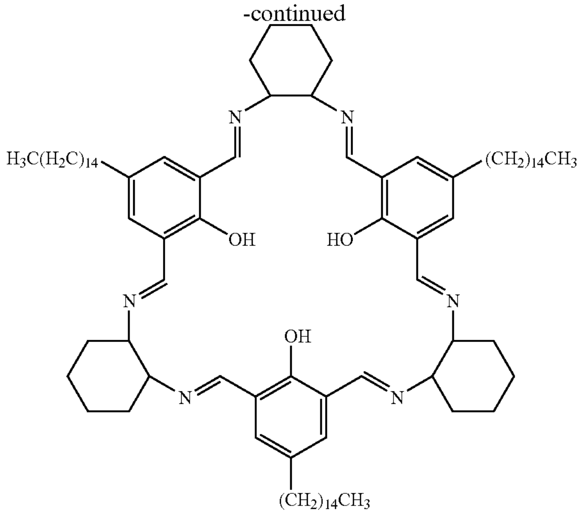

Hexamer 1a-C15

Figure 21A:
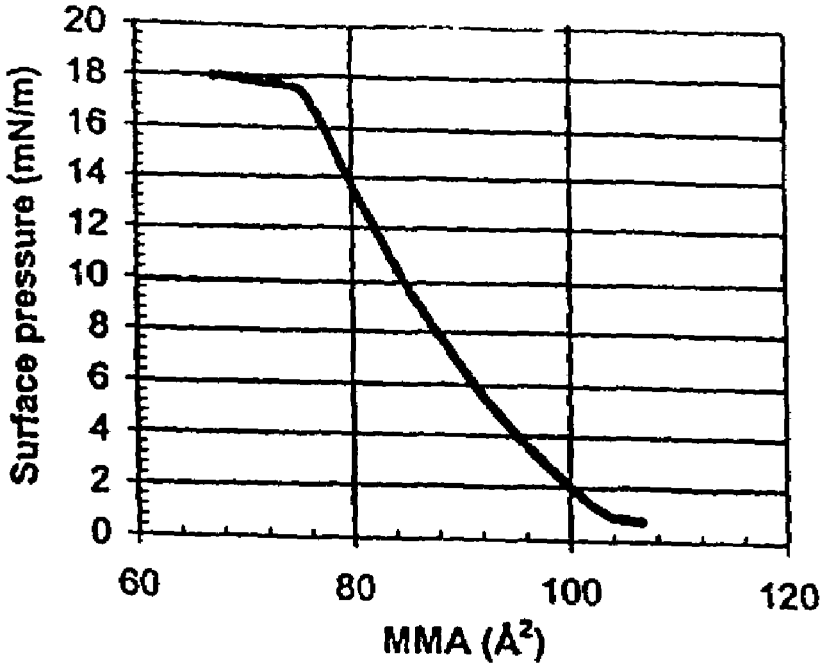
FIG. 21A shows an example of the Langmuir isotherm of an embodiment of a hexamer macrocyclic module.
Figure 21B:
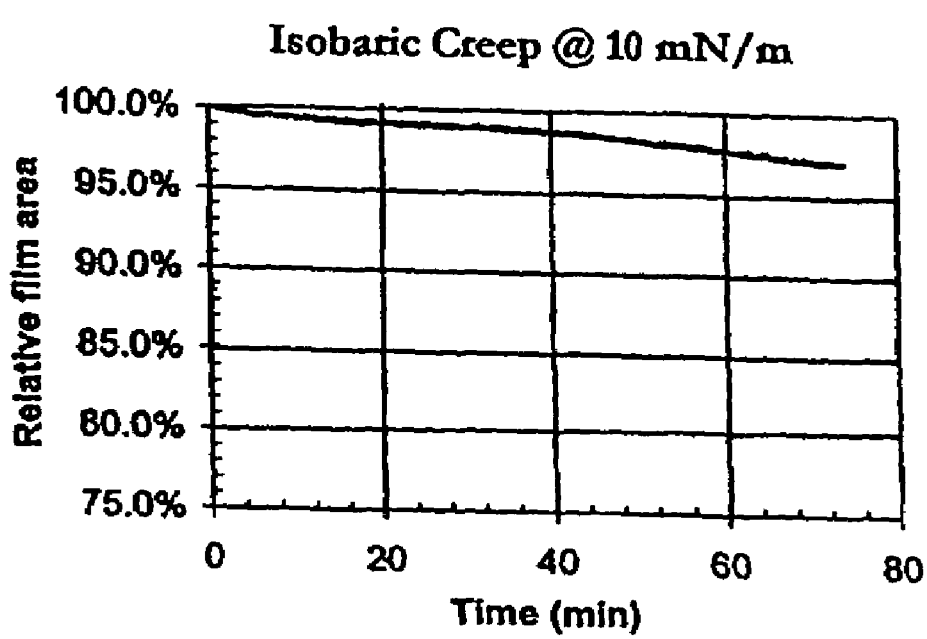
FIG. 21B shows an example of the isobaric creep of an embodiment of a hexamer macrocyclic module.

The relative stability of the Langmuir film of Hexamer 1a-Me is illustrated by the isobaric creep data shown in FIG. 20B. The area of the film decreased by about 30% after about 30 min at 5 mN/m surface pressure. The Langmuir isotherm and isobaric creep for Hexamer 1a-C15 are shown in FIGS. 21A and 21B, respectively. The relative stability of the Langmuir film of Hexamer 1a-C15 is illustrated by the isobaric creep data shown in FIG. 21B. The area of the film decreased by about 1-2% after about 30 min at 10 mN/m surface pressure, and by about 2% after about 60 min. The collapse pressure was about 18 mN/m for Hexamer 1a-C15.

What is claimed is:

1. A composition comprising a solution or suspension comprising macrocyclic modules and at least one polymeric component wherein each of the macrocyclic modules is independently selected from the group consisting of Hexamer 1a, Hexamer 1dh, Hexamer 3j-amine, Hexamer 1jh, Hexamer 1jh-AC, Hexamer 2j-amine/ester, Hexamer 1dh-acryl, Octamer 5jh-aspartic, and Octamer 4jh-acryl, wherein at least some of the macrocyclic modules are coupled to each other, and wherein the at least one polymeric component comprises poly(maleic anhydride-co-alpha olefin).

2. A composition comprising a solution or suspension comprising macrocyclic modules and at least one polymeric component wherein each of the macrocyclic modules is independently selected from the group consisting of Hexamer 1a, Hexamer 1dh, Hexamer 3j-amine, Hexamer 1jh, Hexamer 1jh-AC, Hexamer 2j-amine/ester, Hexamer 1dh-acryl, Octamer 5jh-aspartic, and Octamer 4jh-acryl, wherein at least some of the macrocyclic modules are coupled to each other, wherein the at least one polymeric component comprises a polymerizable monomer, and wherein the polymerizable monomer comprises $CH_2{=}CHC(O)OCH_2CH_2OH$.

3. A composition comprising a solution or suspension comprising macrocyclic modules, at least one polymeric component, and a non-polymerizable amphiphile wherein each of the macrocyclic modules is independently selected from the group consisting of Hexamer 1a, Hexamer 1dh, Hexamer 3j-amine, Hexamer 1jh, Hexamer 1jh-AC, Hexamer 2j-amine/ester, Hexamer 1dh-acryl, Octamer 5jh-aspartic, and Octamer 4jh-acryl, wherein at least some of the macrocyclic modules are coupled to each other, and wherein the non-polymerizable amphiphile is decylamine or stearic acid.

4. A composition comprising a solution or suspension comprising macrocyclic modules and at least one polymeric component wherein the polymeric component comprises poly(maleic anhydride-co-alpha olefin) and wherein at least some of the macrocyclic modules are coupled to each other through one or more linker molecules wherein the linker molecules are independently selected from the group consisting of

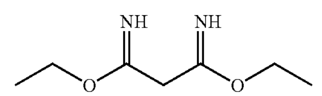

Diethyl malonite (DEM)

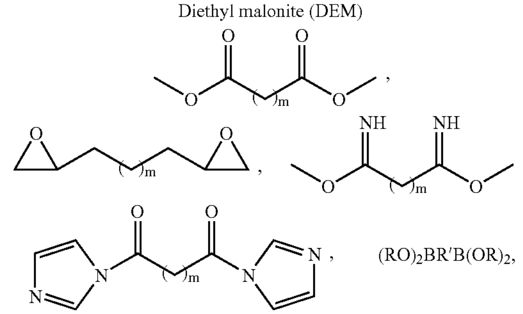

$(RO)_2BR'B(OR)_2$, $X—(CH_2)_n—X$, $XC(O)—(CH_2)_n—C(O)X$,

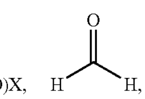

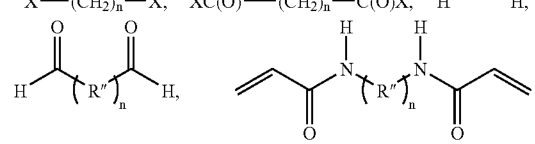

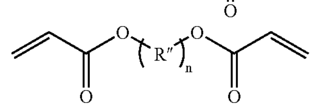

and

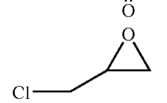

wherein m is 1-10, n is 1-6, R is —H or —$CH_3$, R' is —$(CH_2)_n$— or phenyl, R" is —$(CH_2)_n$—, polyethylene glycol (PEG), or polypropylene glycol (PPG), and X is Br, CI, or I.

5. The composition of claim 4, wherein at least some of the macrocyclic modules are coupled to the at least one polymeric component.

6. The composition of claim 5, wherein at least some of the macrocyclic modules are coupled to the at least one polymeric component through linker molecules.

7. The composition of claim 4, wherein each of the macrocyclic modules are independently selected from the group consisting of Hexamer 1a, Hexamer 1dh, Hexamer 3j-amine, Hexamer 1jh, Hexamer 1jh-AC, Hexamer 2j-amine/ester, Hexamer 1dh-acryl, Octamer 5jh-aspartic, and Octamer 4jh-acryl.

8. The composition of claim 7, wherein each of the macrocyclic modules comprises Hexamer 1dh.

9. The composition of claim 4, wherein the at least one polymeric component further comprises at least one component wherein the component is poly(maleic anhydrides)s, poly(ethylene-co-maleic an hydride)s, polyacrylates, polymethylmethacrylate, polymers containing at least one oxacyclopropane group, polyethyleneimides, polyetherimides, polyethylene oxides, polypropylene oxides, polyurethanes, polystyrenes, poly(vinyl acetate)s, polytetrafluoroethylenes, polyethylenes, polypropylenes, ethylene-propylene copolymers, polyisoprenes, polyneopropenes, polyamides, polyimides, polysulfones, polyethersulfones, polyethylene terephthalates, polybutylene terephthalates, polysulfonamides, polysulfoxides, polyglycolic acids, polyacrylamides, polyvinylalcohols, polyesters, polyester ionomers, polycarbonates, polyvinylchlorides, polyvinylidene chlorides, polyvinylidene fluorides, polyvinylpyrrolidones, polylactic acids, polypeptides, polysorbates, polylysines, hydrogels, carbohydrates, polysaccharides, agaroses, amyloses, amylopectins, glycogens, dextrans, celluloses, cellulose acetates, chitins, chitosans, peptidoglycans, glycosaminoglycans, polynucleotides, poly(T), poly(A), nucleic acids, proteoglycans, glycoproteins, glycolipids, or mixtures thereof.

10. The composition of claim 4, further comprising a non-polymerizable amphiphile.

11. The composition of claim 10, wherein the non polymerizable amphiphile is decylamine or stearic acid.

* * * * *